(12) United States Patent
Zhu et al.

(10) Patent No.: US 12,184,554 B2
(45) Date of Patent: Dec. 31, 2024

(54) MULTI-ACCESS MANAGEMENT SERVICE PACKET CLASSIFICATION AND PRIORITIZATION TECHNIQUES

(71) Applicant: Intel Corporation, Santa Clara, CA (US)

(72) Inventors: Jing Zhu, Portland, OR (US); Menglei Zhang, Portland, OR (US); Shu-ping Yeh, Campbell, CA (US); Shilpa Talwar, Santa Clara, CA (US); Juan Fang, Portland, OR (US)

(73) Assignee: Intel Corporation, Santa Clara, CA (US)

(*) Notice: Subject to any disclaimer, the term of this patent is extended or adjusted under 35 U.S.C. 154(b) by 224 days.

(21) Appl. No.: 17/469,331

(22) Filed: Sep. 8, 2021

(65) Prior Publication Data

US 2021/0409335 A1    Dec. 30, 2021

Related U.S. Application Data

(60) Provisional application No. 63/078,782, filed on Sep. 15, 2020, provisional application No. 63/077,495, filed on Sep. 11, 2020.

(51) Int. Cl.
*H04L 47/24* (2022.01)
*H04L 69/14* (2022.01)

(52) U.S. Cl.
CPC .............. *H04L 47/24* (2013.01); *H04L 69/14* (2013.01)

(58) Field of Classification Search
CPC . H04L 47/24; H04L 47/2433; H04L 12/2889; H04L 47/2441; H04L 47/28;
(Continued)

(56) References Cited

U.S. PATENT DOCUMENTS 6,957,212 B2    10/2005    Peng
8,949,501 B1    2/2015    Akhter et al.
(Continued)

FOREIGN PATENT DOCUMENTS

EP    3414932 A1    12/2018
WO    WO 2015-152787 A1    10/2015
(Continued)

OTHER PUBLICATIONS

Kanugovi et al. "Multi-Access Management Services (MAMS)", IETF, RFC 8743, https://datatracker.ietf.org/doc/html/rfc8743, Total Pages: 143 (Year: 2020).*

(Continued)

*Primary Examiner* — Shah M Rahman

(74) *Attorney, Agent, or Firm* — Schwabe, Williamson & Wyatt, P.C.

(57) ABSTRACT

The present disclosure is related to Multi-Access Management Services (MAMS), which is a programmable framework that provides mechanisms for the flexible selection of network paths in a multi-access (MX) communication environment, based on an application's needs. Generic Multi-Access (GMA) functions are also integrated into the MAMS framework. The present disclosure discusses Per-Packet Prioritization (PPP), intra-flow classification, and Active Queue Management (AQM) techniques for MAMS/GMA systems. Other embodiments may be described and/or claimed.

20 Claims, 30 Drawing Sheets

(58) Field of Classification Search
CPC .............. H04L 47/6215; H04L 67/289; H04W 28/065; H04W 28/0284; H04W 28/0289; H04W 28/24; H04W 88/06
See application file for complete search history.

(56) References Cited

U.S. PATENT DOCUMENTS

| | | | |
|---|---|---|---|
| 9,398,121 B1 | 7/2016 | Brandwine | |
| 2003/0091054 A1* | 5/2003 | Futenma | H04L 9/40 375/E7.277 |
| 2006/0168336 A1* | 7/2006 | Koyanagi | H04L 47/11 709/240 |
| 2010/0202323 A1* | 8/2010 | Nishida | H04W 40/36 370/254 |
| 2013/0246672 A1 | 9/2013 | Saputra | |
| 2014/0307593 A1 | 10/2014 | Zhao et al. | |
| 2015/0029879 A1 | 1/2015 | Chou et al. | |
| 2015/0078359 A1 | 3/2015 | Scahill et al. | |
| 2015/0215835 A1 | 7/2015 | Sirotkin | |
| 2016/0112896 A1* | 4/2016 | Karampatsis | H04L 47/32 370/230.1 |
| 2016/0270145 A1 | 9/2016 | Srinivasa Gopalan et al. | |
| 2016/0381491 A1* | 12/2016 | Watfa | H04W 4/08 455/41.2 |
| 2017/0019830 A1 | 1/2017 | Lindoff et al. | |
| 2017/0093541 A1* | 3/2017 | Pan | H04W 72/23 |
| 2018/0027508 A1* | 1/2018 | Tanaka | H04W 84/12 370/338 |
| 2018/0077022 A1 | 3/2018 | Van Oost et al. | |
| 2018/0092085 A1 | 3/2018 | Shaheen et al. | |
| 2018/0018385 A1 | 6/2018 | Sabella et al. | |
| 2018/0270742 A1 | 9/2018 | Bergstrom et al. | |
| 2019/0036841 A1* | 1/2019 | Nolan | H04L 67/12 |
| 2019/0306749 A1 | 10/2019 | Bergstrom et al. | |
| 2019/0306752 A1 | 10/2019 | Lai | |
| 2019/0394833 A1 | 12/2019 | Talebi Fard et al. | |
| 2020/0045612 A1 | 2/2020 | Stauffer et al. | |
| 2020/0053018 A1 | 2/2020 | White et al. | |
| 2020/0178196 A1 | 6/2020 | Wang et al. | |
| 2021/0051104 A1* | 2/2021 | He | G06N 20/00 |
| 2021/0058936 A1* | 2/2021 | Gordaychik | H04W 72/23 |
| 2021/0100047 A1 | 4/2021 | Chiba et al. | |
| 2021/0144590 A1* | 5/2021 | Li | H04W 28/0975 |
| 2021/0211914 A1 | 7/2021 | De La Oliva et al. | |
| 2021/0306900 A1* | 9/2021 | Mehta | H04W 4/50 |
| 2021/0385865 A1* | 12/2021 | Mueck | H04W 74/0816 |
| 2021/0400537 A1 | 12/2021 | Zhang et al. | |
| 2021/0409335 A1 | 12/2021 | Zhu et al. | |
| 2022/0191733 A1* | 6/2022 | Ali | H04W 24/08 |
| 2023/0056442 A1 | 2/2023 | Ly et al. | |
| 2023/0189368 A1* | 6/2023 | Zhou | H04L 69/18 370/328 |
| 2023/0276483 A1* | 8/2023 | Xu | H04L 67/50 370/329 |

FOREIGN PATENT DOCUMENTS

| | | |
|---|---|---|
| WO | WO2017/139699 A1 | 8/2017 |
| WO | WO 2017-189176 A2 | 11/2017 |
| WO | WO 2019-076440 A1 | 4/2019 |
| WO | WO 2019-192528 A1 | 10/2019 |
| WO | WO 2020/232404 A1 | 11/2020 |
| WO | WO2021/257974 A1 | 12/2021 |
| WO | WO2022005917 A1 | 1/2022 |
| WO | WO2022005918 A1 | 1/2022 |

OTHER PUBLICATIONS

J. Zhu et al., "Generic Multi-Access (GMA) Encapsulation Protocol" draft-zhu-intarea-gma-07, IETF, 13 pages (May 14, 2020).
S. Kanugovi et al., "RFC 8743: Multi-Access Management Services (MAMS)", IETF RFC 8743, 143 pages (Mar. 2020).
International Search Report and Written Opinion mailed Oct. 6, 2021 for International Patent Application No. PCT/US2021/038063, 14 pages.
"3GPP; TSG SA; Study on enhanced support of Industrial Internet of Things (IIoT) in 5G System (Release 17)", 3GPP TR 23.700-20 V0.3.0 (Jan. 28, 2020).
Han-Chuan Hsieh et al., "5G Virtualized Multi-access Edge Computing Platform for IoT Applications", Journal of Network and Computer Applications, vol. 115, pp. 94-102, (May 10, 2018).
International Preliminary Report on Patentability mailed Oct. 13, 2022 for International Patent Application PCT/US2020/066969, 8 pages.
Extended European Search Report mailed May 10, 2023 for European Patent Application No. 20806061.6, 11 pages.
S. Kanugovi Nokia e al., "Multiple Access Management Services: Draft-Kanugovi-intarea-mams-fraaework-03", (Feb. 28, 2019), 141 pages.
3GPP, "3rd Generation Partnership Project; Technical Specification Group Services and System Aspects; Study on access traffic steering, switch and splitting support in the 5G system architecture (Release 16)", 3GPP TR 23.793 V16.0.0 (Dec. 2018), 114 pages.
International Search Report and Written Opinion mailed Apr. 15, 2021 for International Patent Application PCT/US2020/066969, 13 pages.
G. Dommety, "Key and Sequence Number Extensions to GRE", Internet Engineering Task Force (IETF) RFC 2890, 7 pages (Sep. 2000).
A. Huttunen et al., "UDP Encapsulation of IPsec ESP Packets", Internet Engineering Task Force (IETF) RFC 3984, 15 pages (Jan. 2005).
A. Ford et al., "TCP Extensions for Multipath Operation with Multiple Addresses", Internet Engineering Task Force (IETF) RFC 6824, 64 pages (Jan. 2013).
N. Leymann et al., "Huawei's GRE Tunnel Bonding Protocol", Internet Engineering Task Force (IETF) RFC 81557, 44 pages (May 2017).
S. Kanugovi et al., "Multi-Access Management Services (MAMS)", Internet Engineering Task Force (IETF) RFC 8743, 143 pages (Mar. 2020).
J. Zhu et al., "Generic Multi-Access (GMA) Encapsulation Protocol", Internet Engineering Task Force (IETF) RFC 9188, 15 pages (Feb. 2022).
International Search Report and Written Opinion mailed Oct. 8, 2021 for International Patent Application No. PCT/US2021/039253, 12 pages.
"3rd Generation Partnership Project; Technical Specification Group Services and System Aspects; Study on access traffic steering, switch and splitting support in the 5G system architecture (Release 16)", 3GPP TR 23.793 V16.0.0 (Dec. 19, 2018), 114 pages.
"3rd Generation Partnership Project; Technical Specification Group Services and System Aspects; Study on Access Traffic Steering, Switch and Splitting support in the 5G system architecture Phase 2 (Release 17)", 3GPP TR 23.700-93 V0.1.1 (Jun. 23, 2020), 43 pages.
International Preliminary Report on Patentability mailed Jan. 12, 2023 for International Patent Application No. PCT/US2021/039253, 7 pages.
International Search Report and Written Opinion mailed Nov. 19, 2021 for International Patent Application No. PCT/US2021/039252, 13 pages.
International Preliminary Report on Patentability mailed Jan. 12, 2023 for International Patent Application No. PCT/US2021/039252, 8 pages.
U.S. Appl. No. 63/025,086 "Dynamic Traffic Management in Next Generation Multi-Access Management Service Frameworks", filed May 14, 2020, 78 pages.
U.S. Appl. No. 17/922,947 "RAN-Aware Traffic Distribution Rules and RAN Measurements for Enhanced Access Traffic Steering Switching and Splitting", filed Nov. 2, 2022, 92 pages.
U.S. Appl. No. 17/925,430 "Wireless Local Area Network Enhancements for Access Traffic Steering Switching Splitting", filed Nov. 15, 2022, 64 pages.

(56) References Cited

OTHER PUBLICATIONS

"3rd Generation Partnership Project; Technical Specification Group Services and System Aspects; System architecture for the 5G System (5GS); Stage 2 (Release 15)", 3GPP TS 23.501 V15.9.0 (Mar. 27, 2020), 248 pages.
A. Ford et al., "RFC 8684 TCP Extensions for Multipath Operation with Multiple Addresses": http://tools.ietf.org/html/draft-ietf-mptcp-multiaddressed-09, 6 pages (Mar. 2020).
"3rd Generation Partnership Project; Technical Specification Group Services and System Aspects; Management and orchestration; 5G performance measurements (Release 16)", 3GPP TS 28.552 V16.5.0 (Mar. 27, 2020), 173 pages.
"3rd Generation Partnership Project; Technical Specification Group Radio Access Network; Evolved Universal Terrestrial Radio Access (E-UTRA); Layer 2—Measurements (Release 15)", 3GPP TS 36.314 V15.2.0 (Jan. 11, 2019), 28 pages.
"IEEE Standard for Information technology—Telecommunications and information exchange between systems Local and metropolitan area networks—Specific requirements—Part 11: Wireless LAN Medium Access Control (MAC) and Physical Layer (PHY) Specifications," IEEE Std 802.11-2016, 3534 pages (Dec. 14, 2016).
Wi-Fi Alliance, "Wi-Fi Agile Multiband Technical Specification", Version 1.5, 32 pages (2020).
Wi-Fi Alliance, "Optimized Connectivity Specification", Version 1.1.6, 26 pages (2020).
International Preliminary Report on Patentability mailed Dec. 29, 2022 for International Patent Application PCT/US2021/038063, 10 pages.
Nádas et al., "Per Packet Value: A Practical Concept for Network Resource Sharing", 2016 IEEE Global Communications Conference (GLOBECOM), Dec. 4, 2016, pp. 1-7.
Laki et al., "Take your own share of the PIE", Proceedings of the Applied Networking Research Workshop, Jul. 15, 2017, pp. 27-32.
Nádas et al., "Towards a congestion control-independent core-stateless AQM", Proceedings of the Applied Networking Research Workshop, Jul. 16, 2018, pp. 84-90.
Laki et al., "Scalable Per Subscriber QoS with Core-Stateless Scheduling", ACM SIGCOMM Industrial Demos, 2018, 2 pages.
Nádas et al., "Stateless resource sharing in networks with multi-layer virtualization", 2019 IEEE International Conference on Communications (ICC), May 20, 2019, pp. 1-7.
Nádas et al., "Towards core-stateless fairness on multiple timescales", Proceedings of the Applied Networking Research Workshop, Jul. 22, 2019, pp. 30-36.
Fejes et al., "Decoupling delay and resource sharing targets with efficient core-stateless AQM", Proceedings of the ACM SIGCOMM 2019 Conference Posters and Demos, Aug. 19, 2019, pp. 128-130.
Fejes et al., "Who will Save the Internet from the Congestion Control Revolution?", Workshop on Buffer Sizing, Stanford University (2019), 6 pages, available at: http://ppv.elte.hu/buffer-sizing/.
Fejes et al., "On the Incompatibility of Scalable Congestion Controls over the Internet", 2020 IFIP Networking Conference (Networking), IEEE, Jun. 22, 2020, pp. 749-754, available at: http://ppv.elte.hu/scalable-cc-comp/.
Nádas et al., A congestion control independent L4S scheduler. InProceedings of the Applied Networking Research Workshop, Jul. 27, 2020, pp. 45-51.
Laki et al., "Core-Stateless Forwarding With QoS Revisited: Decoupling Delay and Bandwidth Requirements", IEEE/ACM Transactions on Networking 29, No. 2, Dec. 9, 2020, pp. 503-516.
Fejes et al., "A Core-Stateless LAS Scheduler for P4-enabled hardware switches with emulated HQoS", IEEE Infocom 2021 Demo (Virtual), 2021, 2 pages, available at: http://ppv.elte.hu/ic21/.
Bemten et al., "Network Calculus: A Comprehensive Guide", Technical Report No. 201603, Oct. 8, 2016, 57 pages.
Charny et al., "Delay Bounds in a Network with Aggregate Scheduling", International Workshop on Quality of Future Internet Services 2000 (QoFIS'2000), Sep. 25, 2000, pp. 1-13, Springer Berlin, Heidelberg.
Zhu et al., "Generic Multi-Access (GMA) Encapsulation Protocol", draft-zhu-intarea-gma-07, May 14, 2020, 13 pages.
Feng et al., "The BLUE active queue management algorithms", Sep. 2002, 19 pages, available at: http://www.researchgate.net/publication/3334841.
Mustafa Maad Hamdi et al., "A review on Queue Management Algorithms in Large Networks", 2020, 13 pages, 2nd International Scientific Conference of Engineering Sciences.
Nichols et al., "Definition of the Differentiated Services Field (DS Field) in the IPV4 and IPv6 Headers", Dec. 1998, 20 pages.
Ramakrishnan et al., "The Addition of Explicit Congestion Notification (ECN) to IP", Sep. 2001, 63 pages.
Amante et al., "IPv6 Flow Label Specification", Nov. 2011, 15 pages.
D. Black, "Relaxing Restrictions on Explicit Congestion Notification (ECN) Experimentation", Jan. 2018, 20 pages.
G. Fairhurst, "Update to IANA Registration Procedures for Pool 3 Values in the Differentiated Services Field Codepoints (DSCP) Registry", Aug. 2018, 7 pages.
Zhu et al., "Improving QoE for Skype Video Call in Mobile Broadband Network", 2012, 6 pages.
International Search Report and Written Opinion mailed Aug. 31, 2020 for International Patent Application No. PCT/US2020/033261, 14 pages.
International Preliminary Report on Patentability mailed Nov. 25, 2021 for International Patent Application No. PCT/US2020/033261, 10 pages.
"3rd Generation Partnership Project; Technical Specification Group Services and System Aspects; Study on access traffic steering, switch and splitting support in the 5G system architecture (Release 16)", 3GPP TR 23.793 v16.0.0, 115 pages (Dec. 19, 2018).
S. Kanugovi et al., "Multiple Access Management Services", draft-kanugovi-intarea-mams-framework-03, Internet Engineering Task Force (IETF), 156 pages (Feb. 28, 2019), https://tools.ietf.org/search/draft-kanugovi-intarea-mams-framework-03.
S. Kanugovi et al., Multiple Access Management Services, draft-kanugovi-intarea-mams-framework-04, Internet Engineering Task Force (IETF), 122 pages (May 31, 2019), https://datatracker.ietf.org/doc/html/draft-kanugovi-intarea-mams-framework-04.
J. Zhu et al., "User-Plane Protocols for Multiple Access Management Service", draft-zhu-intarea-mams-user-protocol-07, Internet Engineering Task Force (IETF), 14 pages (Apr. 3, 2019), https://datatracker.ietf.org/doc/html/draft-zhu-intarea-mams-user-protocol-07.
"3rd Generation Partnership Project; Technical Specification Group Services and System Aspects; System Architecture for the 5G System; Stage 2 (Release 16)", 3GPP TS 23.501 v16.1.0, 368 pages (Jun. 11, 2019).
"3rd Generation Partnership Project; Technical Specification Group Core Network and Terminals; 5G System; Access and Mobility Management Services; Stage 3 (Release 16)", 3GPP TS 29.518 V16.0.0, 199 pages (Jun. 13, 2019).
"Multi-access Edge Computing (MEC); Framework and Reference Architecture", ETSI GS MEC 003 V2.1.1, 21 pages (Jan. 2019).
"Multi-access Edge Computing (MEC); Phase 2: Use Cases and Requirements", ETSI GS MEC 002 V2.1.1, 66 pages (Oct. 2018).
"Mobile Edge Computing(MEC); Bandwidth Management API", ETSI GS MEC 015 V1.1.1, 20 pages (Oct. 2017).
"3rd Generation Partnership Project; Technical Specification Group Core Network and Terminals; 5G System; Network Exposure Function Northbound APIs; Stage 3 (Release 16)", 3GPP TS 29.522 V16.0.0, 43 pages (Jun. 18, 2019).
"Multi-access Edge Computing (MEC); General principles for MEC Service APIs Disclaimer", ETSI GS MEC 009 V2.1.1, 64 pages (Jan. 2019).
"3rd Generation Partnership Project; Technical Specification Group Services and System Aspects; System Architecture for the 5G System; Stage 2 (Release 16)" 3GPP TS 23.501 v16.0.2, 317 pages (Apr. 1, 2019).
"3rd Generation Partnership Project; Technical Specification Group Core Network and Terminals; 5G System; Access and Mobility Management Services; Stage 3 (Release 15)", 3GPP TS 29.518 V15.3.0, 195 pages (Mar. 24, 2019).

(56) References Cited

OTHER PUBLICATIONS

"Mobile Edge Computing (MEC); Radio Network Information API", ETSI GS MEC 012 V1.1.1, 57 pages (Jul. 2017).
Sangeetha Bangolae et al., "Performance Study of Fast BSS Transition using IEEE 802.11r", Proceedings of the 2006 Int'l Conference on Wireless Comm. and Mobile Computing (IWCMC '06), pp. 737-742 (Jul. 3, 2006), https://dl.acm.org/doi/pdf/10.1145/1143549.1143696.
"Wi-Fi Roaming Aggressiveness Setting", Intel Corporation, Article ID 000005546, 2 pages (Oct. 28, 2021).
Yordan, "Oppo and vivo announce Dual Wi-Fi for their flagships", GSMArena.com, 3 pages (Jul. 18, 2019), https://www.gsmarena.com/oppo_vivo_dual_wifi-news-38203.php.
Q. De Coninck et al., "Multipath Extensions for QUIC (MP-QUIC)", IETF, draft-deconinck-quic-multipath-07, 36 Pages (May 3, 2021), https://datatracker.ietf.org/doc/html/draft-deconinck-quic-multipath-07.
J. Zhu et al., "Generic Multi-Access (GMA) Encapsulation Protocol", IETF, draft-zhu-intarea-gma-14, 17 pages (Nov. 24, 2021), https://datatracker.ietf.org/doc/html/draft-zhu-intarea-gma-14.
J. Zhu et al., "User-Plane Protocols for Multiple Access Management Service", IETF, draft-zhu-intarea-mams-user-protocol-09, 8 pages (Mar. 4, 2020).
"3rd Generation Partnership Project; Technical Specification Group Core Network and Terminals; 5G System; Access Traffic Steering, Switching and Splitting (ATSSS); Stage 3 (Release 17)", 3GPP TS 24.193 v17.2.0 (Sep. 24, 2021), 71 pages.
"3rd Generation Partnership Project; Technical Specification Group Core Network and Terminals; Access Network Discovery and Selection Function (ANDSF) Management Object (MO) (Release 16)", 3GPP TS 24.312 v16.0.0 (Sep. 9, 2020), 394 pages.
"3rd Generation Partnership Project; Technical Specification Group Radio Access Network; Evolved Universal Terrestrial Radio Access (E-UTRA); LTE/WLAN Radio Level Integration Using IPsec Tunnel (LWIP) encapsulation; Protocol specification (Release 16)", 3GPP TS 36.361 v16.0.0 (Sep. 24, 2020), 10 pages.
Extended European Search Report mailed Apr. 14, 2023 for European Patent Application No. 22203400.1, 13 pages.
Kanugovi et al., "Control Plane Protocols and Procedures for Multiple Access Management Services", IETF, draft-zhu-intarea-mams-control-protocol-02 (Jul. 3, 2017), 31 pages.
Li et al., "Multipath Transmission for Internet: A Survey", 39 pages, IEEE Communications Surveys & Tutorials, vol. 18, No. 4, Fourth Quarter 2016, pp. 2887-2925 (Jun. 29, 2016).
"TCP Keep-Alives" in Braden, "Requirements for Internet Hosts—Communication Layers", IETF RFC 1122, section 4.2.3.6, pp. 101-102 (Oct. 1, 1989), 2 pages.
Nikc McKeown et al., "Tiny Tera: A Packet Switch Core", IEEE Micro, IEEE Service Center, Los Alamitos, CA, US deel 17, nr.1, (Jan. 1, 1997), 8 pages.
S. Kanugovi et al., "Multi-Access Management Services (MAMS)", rtc8743.txt, Multi-Access Management Services (MAMS); RFC8743.TXT, Internet Engineering Task Force, IETF; Standard, Internei Society (ISOC) 4, Rue Des Falaises CH-1205 Geneva, Switzerland, (Mar. 25, 2020), 73 pages.
Boyd et al., "Convex Optimization", Cambridge University Press, Cambridge, UK, ISBN: 978-0-521-83378-3, 730 pages (Mar. 2004).
"Multi-access Edge Computing (MEC); Radio Network Information API", ETSI GS MEC 012 V2.1.1, 66 pages (Dec. 2019).
Ford et al., "TCP Extensions for Multipath Operation with Multiple Addresses", Internet Engineering Task Force (IETF), Internet Draft, draft-ietf-mptcp-multiaddressed-09, 62 pages (Jun. 6, 2012), https://datatracker.ietf.org/doc/html/draft-ietf-mptcp-multiaddressed-09.
"Intel® Network Edge Virtualization (NEV) Software Development Kit", Intel Corp., Intel® Network Edge Virtualization Product Brief, 3 pages (Aug. 16, 2015), https://networkbuilders.intel.com/docs/Intel_Wireless_Product_Brief_for_IDF_v8.pdf.
"Simplify Application Development for the Network Edge", Intel Corp., Service Provider NFV, White Paper, 5 pages (Sep. 26, 2018), https://www.intel.com/content/dam/www/public/us/en/documents/white-papers/nev-sdk-white-paper.pdf.
"O-RAN Architecture Description", O-RAN Alliance, O-RAN-WG1-O-RAN Architecture Description, v01.00.00, 24 pages (Feb. 2020).
"O-RAN Working Group 2, AI/ML workflow description and requirements", O-RAN Alliance, ORAN-WG2.AIML, v01.00, 34 pages (Dec. 2019).
Singh et al., "Optimal Traffic Aggregation in Multi-RAT Heterogeneous Wireless Networks", IEEE ICC2016—Workshops: W09-Workshop on 5G RAN Design, 6 pages (Mar. 7, 2016).
Zhu et al., "Generic Multi-Access (GMA) Convergence Encapsulation Protocols", INTAREA/Network Working Group, Internet Draft, draft-zhu-intarea-gma-04, 10 pages (Sep. 30, 2019), https://datatracker.ietf.org/doc/pdf/draft-zhu-intarea-gma-04.
Zhu et al., "Generic Multi-Access (GMA) Convergence Encapsulation Protocols", INTAREA/Network Working Group, Internet Draft, draft-zhu-intarea-gma-05, 12 pages (Dec. 16, 2019), https://datatracker.ietf.org/doc/pdf/draft-zhu-intarea-gma-05.
Extended European Search Report issued Jun. 14, 2024 for EP Application No. 21825017.3, 4 pages.
Deutsche Bahn Ag, "Exemplary Mapping of 3GPP Building Blocks to FRMCS Logical Architecture Draft," ETSI Draft RT(19)075028r3, ETSI, Dec. 12, 2019, 13 pages.
Office Action mailed Jun. 21, 2024 for U.S. Appl. No. 17/437,711, 96 pages.
Notice of Allowance mailed Aug. 2, 2024 for U.S. Patent Application No. 17/923,170, 71 pages.
Office Action mailed Sep. 18, 2024 for U.S. Appl. No. 17/797,661, 72 pages.

* cited by examiner

MULTI-ACCESS MANAGEMENT SERVICE PACKET CLASSIFICATION AND PRIORITIZATION TECHNIQUES

RELATED APPLICATIONS

The present application claims priority to U.S. Provisional App. No. 63/077,495 filed Sep. 11, 2020 and U.S. Provisional App. No. 63/078,782 filed Sep. 15, 2020, the contents of each of which are hereby incorporated by reference in their entireties.

TECHNICAL FIELD

The present application is generally related to Edge computing, network communication, and communication system implementations, and in particular, to Multiple Access Management Services (MAMS) systems/networks and Generic Multi-Access (GMA) frameworks.

BACKGROUND

Multiple Access Management Services (MAMS) is a programmable framework that provides mechanisms for flexible selection of network paths in a multi-connection (access) communication environment based on application needs and/or requirements. The MAMS framework can be supported by an Edge computing system/network, such as ETSI MEC or the like. Additionally, the Third Generation Partnership Project (3GPP) Fifth Generation (5G) system architecture has been extended to support functionality similar to MAMS, which is referred to as Access Traffic Switching, Steering, and Splitting (ATSSS).

BRIEF DESCRIPTION OF THE DRAWINGS

In the drawings, which are not necessarily drawn to scale, like numerals may describe similar components in different views. Like numerals having different letter suffixes may represent different instances of similar components. Some implementations are illustrated by way of example, and not limitation, in the figures of the accompanying drawings in which.

DETAILED DESCRIPTION

Figure 1:
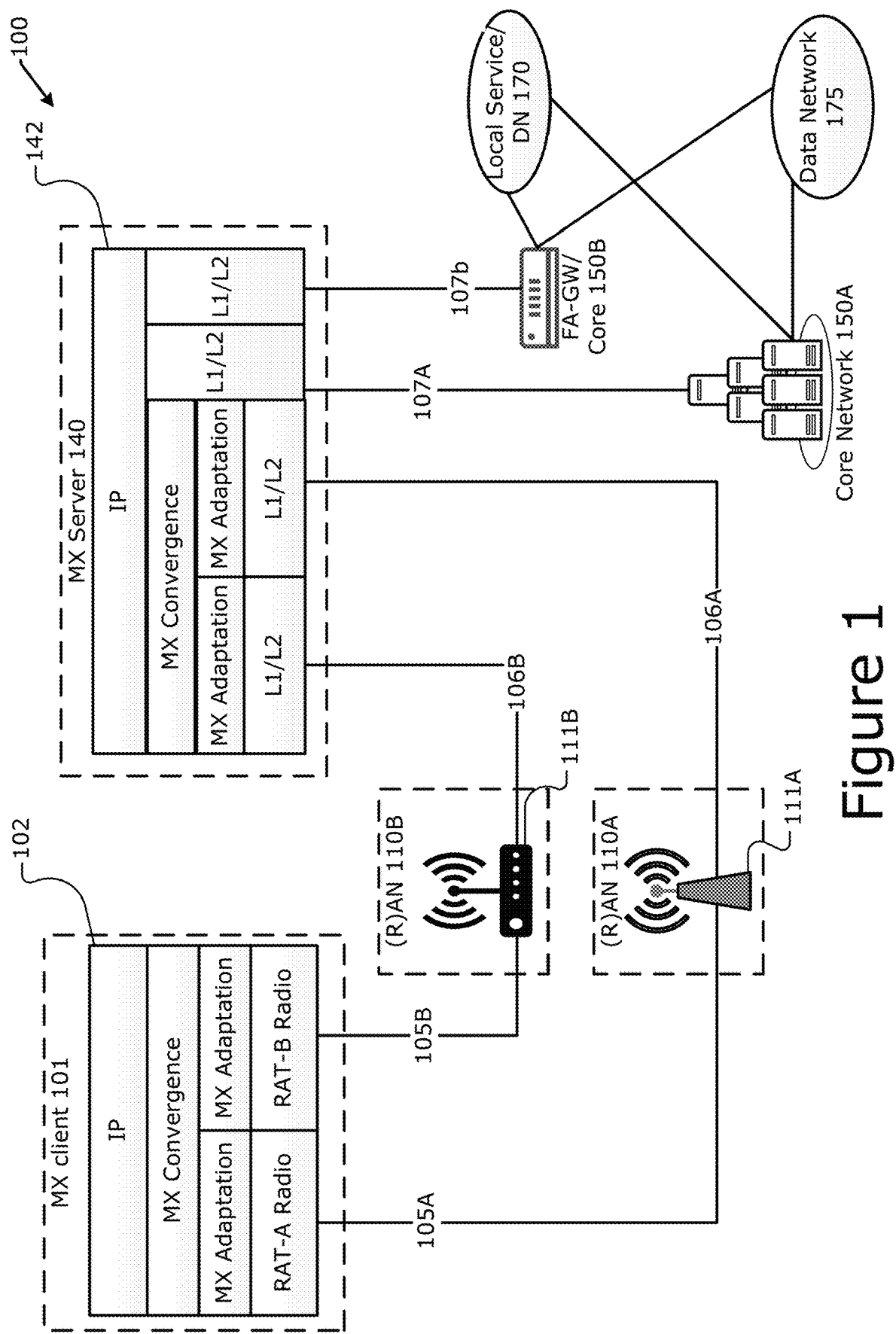
FIG. 1 depicts an example multi-access network utilizing Multiple Access Management Services (MAMS).

The present specification generally relates to data processing, service management, resource allocation, compute management, network communication, application partitioning, and communication system implementations, and in particular, to techniques and configurations for adapting various Edge computing devices and entities to dynamically support multiple entities (e.g., multiple tenants, users, stakeholders, service instances, applications, etc.) in a distributed Edge computing environment. The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the present disclosure. However, it will be apparent to those skilled in the art having the benefit of the present disclosure that the various aspects of the present disclosure may be practiced in other ways that depart from the specific details discussed herein. In certain instances, descriptions of well-known devices, circuits, and methods are omitted so as not to obscure the description with unnecessary detail.

1. Multi-Access Management Services (MAMS) and Generic Multi-Access (GMA)

Today, a device (e.g., mobile stations, user equipment (UEs), etc.) can be simultaneously connected to multiple communication networks based on different technology implementations (including different Radio Access Technologies (RATs)) and network architectures. In such multi-connectivity scenarios, it may be desirable to combine multiple access networks or select the best one to improve quality of experience (QoE) for a user and improve overall network utilization and efficiency. An access network is the segment in a network that delivers user data packets to a client via an access link such as a WiFi airlink, an cellular airlink, or DSL. The overall QoE perceived by the end users as well as utilization of the resources can be optimized with smart selection and combination of the paths used for the user plane (UP). In an advanced solution, the network paths can be dynamically selected based on knowledge of current conditions in the relevant access networks. The Multiple Access Management Services (MAMS) framework enables the smart selection and flexible combination of access and core network paths based on defined policies. By use of up-to-date information from available access networks, the best possible network efficiency and end user QoE perception based on application needs can be guaranteed. The MAMS framework can be used to flexibly select the combination of uplink (UL) and downlink (DL) access and core network paths having an optimal performance, and UP treatment for improving network utilization and efficiency and enhanced QoE for user applications (apps). With the MAMS framework, the optimal network paths can selected on UP level without any impact on the control plane signaling of the underlying access networks. Additional aspects of the MAMS framework are discussed in Kanugovi et al., "Multi-Access Management Services (MAMS)", Internet Engineering Task Force (IETF), Request for Comments (RFC) 8743 (March 2020) ("[RFC8743]"), and an example multi-access (MA) network implementing the MAMS framework is shown by FIGS. 1 and 2.

Figure 2:
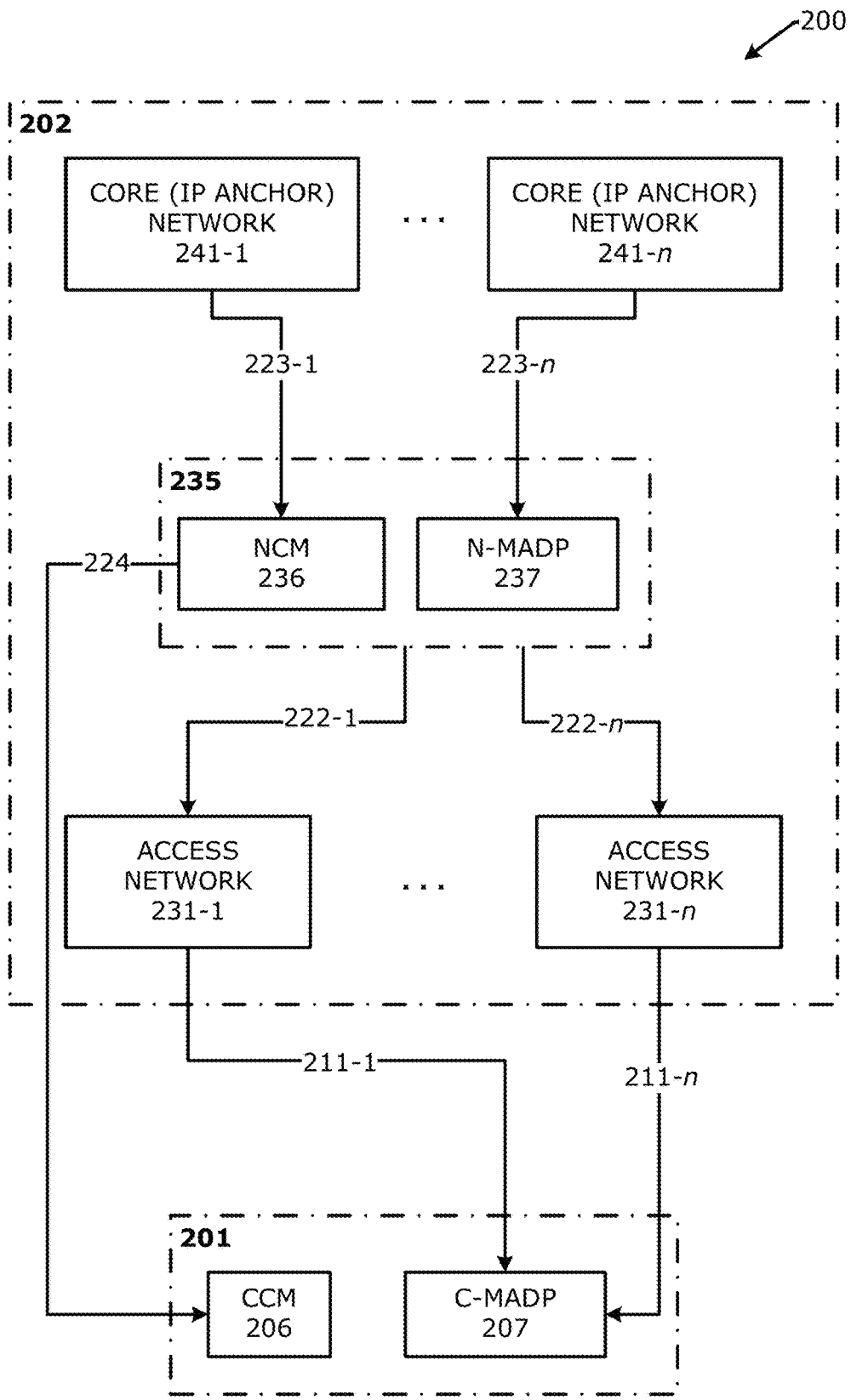
FIG. 2 illustrates a MAMS reference architecture.

FIG. 1 depicts an example multi-access ("MX" or "MA") network 100 utilizing MAMS technology. In particular, FIG. 1 shows a MAMS e2e UP protocol stack in the MX network 100, which includes both WiFi and 3GPP-based access. In this example, an MX client 101 includes a UP protocol stack 102 and a server 140 includes a UP protocol stack 142.

The MX client 101 is an end-user device that supports connections with one or more access nodes, possibly over different access technologies (or RATs), and is also referred to as a user station, user device, user equipment (UE), or multi-radio UE 101. The client 101 may be a multiconnectivity client 101 that has, or supports, multiple network connections.

The MX server 140 (or "MAMS server 140") provides MAMS-related user-plane (UP) functionalities and/or optimizations in the network 100. The MX server 140 handles aggregation of multiple network paths 105, 106, 107, and/or the forwarding of user data traffic across multiple network paths 105, 106, 107. The MX server 140 may also be referred to as an MX gateway and/or a Network Multi Access Data Proxy (N-MADP) (see e.g., N-MADP 237 in FIG. 2). Throughout the present disclosure, the MX server 140 may be referred to as server 140, a MAMS server 140, MA server 140, edge node 140, MEC host 140, MAMS-MEC system 140, or similar. When the client 101 transmits packets to the server 140, the client 101 may be referred to as a "MAMS transmitter," "MX transmitter," or the like, and the server 140 may be referred to as a "MAMS receiver," "MX receiver," or the like. When the client 101 receives packets from the server 140, the client 101 may be referred to as a "MAMS receiver," "MX receiver," or the like, and the server 140 may be referred to as a "MAMS transmitter," "MX transmitter," or the like.

In some implementations, the MAMS server 140 runs in an edge computing system/platform/network (see e.g., FIGS. 20-31) and/or a cloud computing system/service/platform, and can deliver traffic between client server over multiple connections or paths. In an example implementation, the edge compute nodes comprise(s) a MEC host (or MEC server). Additionally or alternatively, the MX server 140 may be one or more MEC applications (apps) operated by a MEC server/host (see e.g., FIGS. 27-28). Various aspects of MEC hosts and MAMS servers are discussed in more detail infra.

The MX UE 101 (or "multi-radio UE 101") accesses or otherwise communicates with a data network (DN) 175 or local service 170 (also referred to as a local DN 170) via one or more (radio) access networks ("(R)ANs") 110 and the server 140. Each (R)AN 110 is a segment in a network that delivers user data packets to the client 101 and/or server 140 via access link(s) 105, which may be a wired connection (e.g., Ethernet, DSL, Coax, USB, and/or the like) or a wireless (radio) connection (e.g., WiFi airlink, 5G/NR airlink, LTE airlink, and/or the like). Each of the (R)ANs 110 implement an access technology ("AT"), which is the underlying mechanism(s) used to access a corresponding network.

In some implementations, the AT is a fixed access (wired) technology such as Ethernet, digital subscriber line technologies (DSL or xDSL); G.hn; coaxial cable access ("coax") such as Multimedia over Coax Alliance (MoCA), Data Over Cable Service Interface Specification (DOCSIS), and/or the like; powerline communication ("PLC" or "powerline") such as high definition (HD)-PLC and/or the like; Fiber to the x (FTTX; also referred to as "fiber in the loop"); Passive Optical Network (PON); and/or the like. Here, (R)AN node 111 may be a broadband modem (e.g., cable modem, DSL modem, an Optical Network Terminal (ONT) or an Optical Network Unit (ONU), G.hn semiconductor device, etc.), which may be used in combination with customer premises equipment (e.g., home/enterprise router(s), residential/enterprise gateway(s), mesh network device(s), WiFi access point(s), etc.). The fixed AN node 111 connects the client 101 to the access network 110 via an access connection 105 that operates according to an access protocol (e.g., Ethernet, V.35, Universal Serial Bus (USB) and/or Ethernet over USB, Point-to-Point Protocol over Ethernet (PPPoE), Internet Protocol over Ethernet (IPoE), G.hn, DOCSIS, and/or the like). Here, the access connection 105 may include one or more wires (e.g., telephone wiring, coax, power lines, plastic and/or glass optical fibers, and/or the like), and the particular wires used may depend on the underlying AT and/or infrastructure.

In other implementations, the AT may be a radio access technology (RAT) such as 3GPP Long Term Evolution (LTE), 3GPP Fifth Generation (5G)/New Radio (NR), MulteFire, ETSI Global System for Mobile Communications (GSM), WiFi®, Worldwide Interoperability for Microwave Access (WiMAX) (sometimes referred to as "wireless broadband" or "WiBro"), and/or the like. (R)ANs 110 could also encompass personal area network technologies such as Bluetooth® or Bluetooth Low Energy (BLE), IEEE 802.15.4 based protocols (e.g., 6LoWPAN, WirelessHART, MiWi, Thread, etc.), WiFi-direct, and/or the like. Each (R)AN 110 includes one or more (R)AN nodes 111, which may be macro cell base stations, remote radio heads (RRHs), small and/or micro cell base stations, access points (APs), home gateways (HGs), and/or other like network elements. A collection of (R)AN nodes 111 may also be referred to as an "access level edge network" or "access level edge." The (R)AN nodes 111 are configurable or operable to perform setup of transport resources, (e.g., for CDN services and/or other application level services) as well as scheduling signaling resources for providing network service of the underlying access network/RAT. Here, the access connection 105 may include wireless or air interfaces based on the underlying RAT (e.g., Uu-interface for LTE or 5G/NR RATs, PC5 interface for LTE or 5G/NR RATs, WiFi air interface for WLAN RATs, millimeter wave (mmWave) interface, Visible Light Communication (VLC) interface, and/or the like).

Each (R)AN 110a, 110b includes one or more respective network access nodes (NANs) 111a, 111b, which is/are communicatively coupled with/to a respective back-end network. One way to implement this service model is to use a multi-path Layer-4 (transport) solution such as Multi-Path TCP (see e.g., IETF RFC 6824 (January 2013)("[rfc6824]")) or MultiPath QUIC (MPQUIC) (see e.g., De Coninck et al., "Multipath Extensions for QUIC (MP-QUIC)," draft-deconinck-quic-multipath-07, IETA, QUIC Working Group (3 May 2021) ("[MPQUIC]")). Such solution is usually OS dependent and only applicable to specific application/traffic. Moreover, it operates at the individual flow level and offer suffers from high complexity & low efficiency. Recently, a new Layer-3 solution (see e.g., Zhu et al., "User-Plane Protocols for Multiple Access Management Service," draft-zhu-intarea-mams-user-protocol-09, IETA, INTAREA (4 Mar. 2020) ("[UPMAMS]")) has been proposed to support multi-path management without such limitations and drawback. In this implementation, the addition control information for multi-path management (e.g., sequence number, etc.) is appended as a trailer at the end of IP packet.

In the example of FIG. 1, the (R)AN 110A is a 3GPP-based access network such as an LTE E-UTRAN where the one or more (R)AN nodes 111A are evolved NodeBs (eNBs) or a next generation RAN (NG-RAN) where the one or more (R)AN nodes 111 are Next Generation NodeBs (gNBs) and/or NG Evolved Node-Bs (NG-eNBs). Additionally, in the example of FIG. 1, the (R)AN 110A is a WiFi-based access network where the (R)AN nodes 111B are WiFi Access Points (APs). The APs may be, for example, wireless routers, roadside ITS stations or roadside units, gateway appliances, central hubs, or the like. The multi-radio UE 101 is capable of establishing a 3GPP access link 105A with the eNB/gNB 111A (e.g., Uu interface or the like), and capable of establishing a WiFi access link 105B with the AP 111B. The eNB/gNB 111A communicates with the server 140 via a 3GPP backhaul link 106A and the AP 111B communicates with the server 140 via a WiFi backhaul link 106B. The 3GPP backhaul link 106A and the WiFi backhaul link 106B may be a suitable wired connection such as Ethernet, USB, Data Highway Plus (DH+), PROFINET, or the like. Furthermore, the MX server 140 is also communicatively coupled with a core network 150A via backhaul interface 107A and communicatively coupled with a Fixed Access (FA) gateway (GW) and/or FA-Core network 150B via the backhaul link 107B. In this example, the core network 150A may be a 3GPP core network such as a 5G core network (5GC) or an LTE Evolved Packet Core (EPC). Additionally or alternatively, the FA-GW may be a broadband network gateway (BNG) and/or the FA-Core may be broadband core that provides transport, and various resources provide content (provider data center, video head end, and so on). Additionally or alternatively, the FA-GW/Core may be a residential gateway (RG), a 5G-RG, a Fixed Network (FN) RG (FN-RG), an FN Broadband RG (FN-BRG), an FN Cable RG (FN-CRG), a Wireline 5G Access Network (W-5GAN), a Wireline 5G Cable Access Network (W-5GCAN), a Wireline Access Gateway Function (W-AGF), and/or some other suitable element/entity.

For purposes of the present disclosure, individual links 105, 106, or 107 may be referred to as access network connections (ANCs) or access network paths (ANPs). For example, an ANC or ANP may comprise a radio link 105 between client 101 and (R)AN node 111 in one or both directions. Additionally or alternatively, an ANC or ANP may refer to a combination of a link 105 and link 106 between client 101 and MX server 140 in one or both directions. Additionally or alternatively, an ANC or ANP may refer to a combination of a of links/paths 105, 106 and 107 between client 101 and local service 170 or data network 175 in one or both directions. Unless stated otherwise, the terms ANC, ANP, "link," "channel," "path," "connection," and the like may be used interchangeably throughout the present disclosure.

Additionally, the client 101 is configured provide radio information to one or more NANs 111 and/or one or more other entities/elements (e.g., Edge server(s), (R)AN(s) 110, core network function(s) (NF(s)), application function(s) (AF(s)), app server(s), cloud service(s), and/or the like). The radio information may be in the form of one or more measurement reports, and/or may include, for example, signal strength measurements, signal quality measurements, and/or the like. Each measurement report is tagged with a timestamp and the location of the measurement (e.g., the current location of the client 101). As examples, the measurements collected by the client 101 and/or included in the measurement reports may include one or more of the following: bandwidth (BW), network or cell load, latency, jitter, round trip time (RTT), number of interrupts, out-of-order delivery of data packets, transmission power, bit error rate, bit error ratio (BER), Block Error Rate (BLER), packet loss rate, packet reception rate (PRR), e2e delay, signal-to-noise ratio (SNR), signal-to-noise and interference ratio (SINR), signal-plus-noise-plus-distortion to noise-plus-distortion (SINAD) ratio, carrier-to-interference plus noise ratio (CINR), Additive White Gaussian Noise (AWGN), energy per bit to noise power density ratio (Eb/No), energy per bit to interference power density ratio ($E_c/I_o$), peak-to-average power ratio (PAPR), Reference Signal Received Power (RSRP), Received Signal Strength Indicator (RSSI), Reference Signal Received Quality (RSRQ), GNSS timing of cell frames for UE positioning for E-UTRAN or 5G/NR (e.g., a timing between an AP or RAN node reference time and a GNSS-specific reference time for a given GNSS), GNSS code measurements (e.g., the GNSS code phase (integer and fractional parts) of the spreading code of the ith GNSS satellite signal), GNSS carrier phase measurements (e.g., the number of carrier-phase cycles (integer and fractional parts) of the ith GNSS satellite signal, measured since locking onto the signal; also called Accumulated Delta Range (ADR)), channel interference measurement, thermal noise power measurement, received interference power measurement, and/or other like measurements. The RSRP, RSSI, and/or RSRQ measurements may include RSRP, RSSI, and/or RSRQ measurements of cell-specific reference signals, channel state information reference signals (CSI-RS), and/or synchronization signals (SS) or SS blocks for 3GPP networks (e.g., LTE or 5G/NR) and RSRP, RSSI, and/or RSRQ measurements of various beacon, Fast Initial Link Setup (FILS) discovery frames, or probe response frames for IEEE 802.11 WLAN/WiFi networks. Other measurements may be additionally or alternatively used, such as those discussed in 3GPP TS 36.214 v16.2.0 (2021 Mar. 31) ("[TS36214]"), 3GPP TS 38.215 v16.4.0 (2020-12) ("[TS38215]"), IEEE 802.11-2020, "IEEE Standard for Information Technology—Telecommunications and Information Exchange between Systems—Local and Metropolitan Area Networks—Specific Requirements—Part 11: Wireless LAN Medium Access Control (MAC) and Physical Layer (PHY) Specifications" (2021 Feb. 26) ("[IEEE80211]"), and/or the like. Additionally or alternatively, any of the aforementioned measurements (or combination of measurements) may be collected by one or more NANs 111.

Additionally or alternatively, any of the aforementioned measurements (or combination of measurements) may be collected by one or more NANs 111 and provided to a suitable entity/element (e.g., Edge server(s), (R)AN(s) 110, NF(s), AF(s), app server(s), cloud service(s), and/or the like). The radio information may be reported either at a low periodicity or a high periodicity depending on a data transfer that is to take place, and/or other information about the data transfer. Additionally or alternatively, the element/entity may request the measurements from the NANs 111 at low or high periodicity, or the NANs 111 may provide the measurements to the element/entity at low or high periodicity. Additionally or alternatively, the element/entity may obtain other relevant data (e.g., Key Performance Indicators (KPIs), Key Quality Indicators, (KQIs), and/or the like) from other same or similar elements/entities with the measurement reports or separately from the measurement reports.

MAMS is a programmable framework that provides mechanisms for the flexible selection of network paths in an MX communication environment 100, based on the application needs and/or requirements, as well as adapt to dynamic network conditions when multiple network connections serve a client device 101. The MAMS framework leverages network intelligence and policies to dynamically adapt traffic distribution across selected paths and UP treatments (e.g., encryption needed for transport over WiFi, or tunneling needed to overcome a network address translation (NAT) between client 101 and a multi-path proxy) to changing network/link conditions. Network path selection and configuration messages are carried as UP data between the functional elements in the MX network 100B and the client 101, and thus, with little or no impact on the control plane (CP) signaling schemes of the underlying access networks (e.g., WiFi and 3GPP access networks in FIG. 1). For example, in MX network 100 with 3GPP and WiFi technologies existing LTE and WiFi signaling procedures will be used to set up the LTE and WiFi connections, respectively, and MAMS-specific CP messages are carried as LTE or WiFi UP data. The MAMS framework defined in this document provides the capability to make a smart selection of a flexible combination of access paths and core network paths, as well as to choose the UP treatment when the traffic is distributed across the selected paths. Thus, it is a broad programmable framework that provides functions beyond the simple sharing of network policies such as those provided by the Access Network Discovery and Selection Function (ANDSF) discussed in 3GPP TS 24.312 v15.0.0 (2018 Jun. 21) ("[TS24312]"), which offers policies and rules for assisting 3GPP clients to discover and select available access networks. Further, it allows the choice and configuration of UP treatment for the traffic over the paths, depending on the application's needs The MAMS framework mechanisms are not dependent on any specific access network types or UP protocols (e.g., TCP, UDP, Generic Routing Encapsulation (GRE), QUIC, Multipath TCP (MPTCP), SCTP, MultiPath QUIC (MPQUIC), etc.). The MAMS framework coexists and complements the existing protocols by providing a way to negotiate and configure those protocols to match their use to a given MA scenario based on client and network capabilities, and the specific needs of each access network path. Further, the MAMS framework allows load balancing of the traffic flows across the selected access network paths, and the exchange of network state information to be used for network intelligence to optimize the performance of such protocols.

The MAMS framework is based on principles of UP interworking, which can be deployed as an overlay without impacting the underlying networks. MAMS co-exists and complements existing communication protocols by providing a way to negotiate and configure the protocols based on client and network capabilities. Further it allows exchange of network state information and leveraging network intelligence to optimize the performance of such communication protocols. MAMS has minimal or no dependency on the actual access technology of the participating links, which allows MAMS to be scalable for addition of newer access technologies and for independent evolution of the existing access technologies.

FIG. 1 also depicts a MAMS Data Plane Protocol Stack (DPPS) for transporting user payloads, for example, an IP Protocol Data Unit (PDU) carried via the IP layer and/or the like. The DPPS 102 and 142 includes the client-side MAMS DPPS 102 implemented by the client 101 and the server-side MAMS DPPS 142 implemented by the server 140. For devices equipped with multiple radio link technologies (or multiple RAT circuitries), such as 5G/NR, LTE, WiFi, etc., MAMS [RFC8743] provides a programmable framework to dynamically select and transmit data simultaneously over multiple radio links for high throughput, low latency, and improved reliability. The MAMS DPPS 102, 142 includes the following two (sub)layers: the convergence (sub)layer and the adaptation (sub)layer. The MX adaptation (sub)layer is added to (or on top of) each RAT circuitry, and the MX convergence (sub)layer connects the IP and MX adaptation (sub)layers.

The MX convergence layer is configurable or operable to perform MX-specific tasks in the UP. The MX convergence layer performs multi-access specific tasks/functions such as, for example, access (path) selection, multi-link (path) aggregation, splitting/reordering, lossless switching, keep-alive, probing, fragmentation, and/or concatenation. The MX convergence layer can be implemented by using existing UP protocols such MPTCP, Multipath QUIC (MPQUIC), or by adapting encapsulating header/trailer schemes such as GRE or Generic Multi-Access (GMA). In some implementations, the MX convergence supports GMA, MPTCP Proxy, GRE Aggregation Proxy, and MPQUIC. As discussed in more detail infra, the GMA protocol may be used to encode additional control information (e.g., Key, Sequence Number, Timestamp, etc.) at this (sub)layer.

The MX adaptation layer is configurable or operable to address and/or handle transport-network-related aspects such as, for example, tunneling, network-layer reachability and/or security, and NAT. The MX Adaptation Layer can be implemented using existing protocols (e.g. TCP, UDP, IPSec, QUIC, etc.). Additionally or alternatively, the MX Adaptation Layer can be implemented using UDP tunneling, IPsec, DTLS (see e.g., Rescorla et al., "Datagram Transport Layer Security Version 1.2", IETF, RFC 6347 (January 2012) and/or Moriarty et al., "Deprecating TLS 1.0 and TLS 1.1", IETF, RFC 8996 (March 2021) (collectively "[DTLS]"), or a Client NAT (e.g., a source NAT at the client with inverse mapping at the server 140 and/or Network Multi Access Data Proxy (N-MADP) 237 of FIG. 2). Additionally or alternatively, the adaptation method of the MX Adaptation Layer is UDP without DTLS, UDP with DTLS, IPsec (see e.g., Huttunen et al., "UDP Encapsulation of IPsec ESP Packets", IETF, Network Working Group, RFC 3948 (January 2005) ("[RFC3948]")), or Client NAT.

The MX Adaptation Layer can be independently configured for each of the access links 105A and 105B. In particular, UP packets of the anchor connection can be encapsulated in a UDP tunnel of a delivery connection between the N-MADP and C-MADP (see e.g., N-MADP 237 and C-MADP 207 in FIG. 2), an IPsec tunnel can be established between the N-MADP and C-MADP (see e.g., N-MADP 237 and C-MADP 207 in FIG. 2) on the network path that is considered untrusted, and/or DTLS can be used if UDP tunneling is used on the network path that is considered "untrusted". For example, in FIG. 1 including 3GPP (R)AN 110A (assumed secure) and WiFi (R)AN 1101B (assumed to not be secure), the MX adaptation layer can be omitted for the 3GPP link 105A, but is configured with IPsec to secure the WiFi link 105B.

The MX convergence layer operates on top of the MX adaptation sublayer in the protocol stack. From the transmitter (Tx) perspective, a user payload (e.g., IP PDU) is processed by the MX convergence layer first, and then by the MX adaptation layer before being transported over a delivery access connection, From the receiver (Rx) perspective, an IP packet received over a delivery connection is processed by the MX adaptation sublayer first, and then by the MX convergence sublayer.

Where GMA is used, the MX convergence layer may be replaced with a "GMA convergence layer" or "GMA convergence sublayer." Here, multiple access networks 110 are combined into a single IP connection. If the NCM (see e.g., NCM 236 of FIG. 2) determines that N-MADP (see e.g., N-MADP 237 of FIG. 2) is to be instantiated with GMA as the MX Convergence Protocol, it exchanges the support of GMA convergence capability in the discovery and capability exchange procedures.

Where MPTCP is used, the MX convergence layer may be replaced with an MPTCP layer on top of individual TCP layers, where each TCP layer is onto of a respective MX adaption layer. Here, MPTCP is reused as the "MX Convergence Sublayer" protocol, and multiple access networks are combined into a single MPTCP connection. Hence, no new UP protocol or PDU format is needed in this case. If the NCM 236 determines that the N-MADP is to be instantiated with MPTCP as the MX Convergence Protocol, it exchanges the support of MPTCP capability during discovery and capability exchange procedures. MPTCP proxy protocols may be used to manage traffic steering and aggregation over multiple delivery connection.

Where GRE is used, the MX convergence layer may be replaced with a GRE layer on top of a GRE Delivery Protocol (e.g., IP) layer. Here, GRE is reused as the "MX Convergence sub-layer" protocol, and multiple access networks are combined into a single GRE connection. Hence, no new UP protocol or PDU format is needed in this case. If the NCM 236 determines that N-MADP is to be instantiated with GRE as the MX Convergence Protocol, it exchanges the support of GRE capability in the discovery and capability exchange procedures.

The MAMS framework can be supported by an Edge computing system/network, such as ETSI Multi-access Edge Computing (MEC) (see e.g., FIGS. 27-28), which defines the technical requirements for the implementation of MEC platforms. MEC is a technology that allows applications to be instantiated at the Edge of an access network, and provides a low-latency and a close proximity environment to user equipment (UEs). As a result, vertical industries are expected to significantly benefit from the deployment of MEC infrastructure together with the deployment of (R)ANs 110. These RANs 110 may be operated by different mobile network operations (MNOs) and/or operate different RATs. MEC systems are access agnostic, and thus, can support MAMS. In some implementations, MAMS can be a MEC service which provides services to MEC applications over the Mp1 interface. Meanwhile, the MEC platform can consume services provided by NFs in 3GPP network via an NEF or PCF if the AF is in the trust domain. Moreover, the 3GPP 5G system architecture has been extended to support functionality similar to MAMS, which is referred to as ATSSS.

FIG. 2 illustrates an example MAMS reference architecture 200 for a scenario of a client served by n networks (where n is a number). The MAMS framework allows for dynamic selection and flexible combination of access and core network paths as UL and DL for a device connected to multiple communication networks. The multiple communication networks interwork at the UP. The architecture is extendable to combine any number of networks, as well as any choice of participating network/access types (e.g., LTE, WLAN, MuLTEfire, DSL, 5G/NR, etc.) and deployment architectures (e.g., with UP gateway function at the access Edge, and/or the like).

FIG. 2 illustrates a scenario of a client 201 served by multiple (1 to n) core networks 241-1 to 241-n (where n is a number). The MAMS architecture 200 includes the following functional elements: a client 201 including a Client Connection Manager (CCM) 206 and a Client Multi Access Data Proxy (C-MADP) 207; multiple (1 to n) access networks (ANs) 231 (including AN 231-1 to AN 231-n); a MAMS system 235 including a Network Connection Manager (NCM) 236 and a Network Multi Access Data Proxy (N-MADP) 237; and the multiple (1 to n) core networks 241-1 to 241-n. The CCM 206 and NCM 236 handle CP aspects, and the C-MADP 207 and N-MADP 237 handle UP aspects. The core networks (or simply "cores") 241-1 to 241-n are elements that anchor the client's 201 network address (e.g., IP address or the like) used for communication with applications via the network. One or more of the cores 241-1 to 241-n may correspond to cloud computing service(s), 5G core network(s) (5GCs), LTE core network(s) (e.g., evolved packet core (EPC)), a DSL/FIXED core, WLAN core, data center(s), and/or other like back-end system.

The client 201 is an end-user device supporting connections with multiple access networks 231-1 to 231-n (which may be the same or similar to (R)ANs 110 and/or (R)AN nodes 111 in FIG. 1), possibly over different access technologies. When the client 201 is capable of handling multiple network connections, the client 201 may be referred to as a "multiconnectivity client" or the like. The client 201 may be the same or similar as client 101 depicted by FIG. 1.

The ANs 231 are network elements in the network that deliver user data packets to the client 201 via respective point-to-point access links 211-1 to 211-n, which may include, for example, WiFi links, LTE cellular links, 5G/NR cellular links, DSL (fixed access) connections, and/or the like. In some implementations, the point-to-point access links 211-1 to 211-n may additionally or alternatively include short-range radio links such as, for example, Bluetooth® or BLE, IEEE 802.15.4 based protocols (e.g., 6LoWPAN, WirelessHART, MiWi, Thread, etc.), WiFi-direct, and/or the like. The ANs 231 may correspond to (R)ANs 110 and/or (R)AN nodes 111 of FIG. 1.

A server manager (e.g., NCM 236) is a functional entity in a network 202 (e.g., network element, network appliance, gateway, Edge node(s), cloud node(s), etc.) that handles control messages from a client manager (e.g., CCM 206) and configures multi-access operations on the server side 202. Additionally or alternatively, the NCM 236 is a functional element in the network that handles MAMS control messages from the client 201 and configures the distribution of data packets over the available access and core network paths, and manages the UP treatment (e.g., tunneling, encryption, etc.) of the traffic flows. Additionally or alternatively, the NCM 236 provides the intelligence in the network to configure network paths and UP protocols based on client negotiation. The NCM 236 also acts as a common MA gateway for network policy input and interface to application platforms. One or more NCM 236 instances can be hosted at the access Edge (e.g., in one or more access networks 110, at individual access network nodes 111, and/or in one or more Edge compute nodes) and/or core network gateways.

The NCM 236 configures the network (N-MADP 237) and client (C-MADP 207) UP functions, such as negotiating with the client 201 for the use of available AN paths 221-1 to 221-*n*, protocols, and rules for processing the UP traffic, as well as link-monitoring procedures. The CP messages between the NCM 236 and the CCM 206 are transported as an overlay on the UP, without any impact on the underlying access networks. The NCM 236 handles MAMS CP messages from the client 201 and configures distribution of data packets over the multiple available access paths 221-1 to 221-*n*, delivery paths 222-1 to 222-*n*, and/or core network paths 223-1 to 223-*n*, as well as UP treatment of traffic flows. The CP messages exchanged between the NCM 236 and CCM 206 are transported as an overlay on the UP, without any impact to the underlying ANs 231.

The CP path 224 may be overlaid over any access UP path. A "path" may be a flow (e.g., an IP flow, UDP flow, etc.) between two hosts. An IP flow or UDP flow may be denoted by a 4-tuple (e.g., IP source address, IP destination address, source port, destination port). Additionally or alternatively, WebSocket is used for transporting management and control messages between the NCM 236 and CCM 206, wherein MX Control Message are carried over (or encapsulated in) a WebSocket, and the WebSocket is carried over (or encapsulated in) TCP/TLS.

A client manager (e.g., CCM 206) is a functional entity in the client device 201 (e.g. desktop, workstation, laptop, smartphone, smart appliance, IoT device, etc.) that exchanges control messages with a server manager (e.g., NCM 236) to configure multi-access operations on the client side 201. Additionally or alternatively, the CCM 206 is a functional entity in the client 201 that exchanges MAMS signaling messages with the NCM 236, and which configures the network paths at the client 201 for the transport of user data.

The CCM 206 is a peer functional element in the client 201 for handling MAMS CP procedures. The CCM 206 manages multiple network connections 221-1 to 221-*n* at the client 201, and configures the multiple network paths 221-1 to 221-*n* at the client 201 for transport of user data. The CCM 206 exchanges MAMS signaling with the NCM 236 to support such functions as the configuration of the UL and DL user network path for transporting user data packets and the adaptive selection of network path by the NCM 236 by reporting on the results of link probing. Link probing and reporting may be used to support adaptive network path selection by the NCM 236. In the DL for user data received by the client 201, the CCM 206 configures C-MADP 207 such that application data packet received over any of the accesses to reach the appropriate application on the client 201. In the UL for the data transmitted by the client 201, the CCM 206 configures the C-MADP 207 to determine the best access links 221 to be used for UL data based on a combination of local policy and network policy delivered by the NCM 236 over link 224.

The C-MADP 207 is a functional entity in the client 201 that handles user data traffic forwarding across multiple network paths. The C-MADP 207 is responsible for MAMS-specific UP functionalities in the client 201 such as encapsulation, fragmentation, concatenation, reordering, retransmissions, etc. The C-MADP 207 is configured by the CCM 206 based on signaling exchange with the NCM 236 and local policies at the client 201. The CCM 206 configures the selection of delivery connections 222-1 to 222-*n* and the UP protocols to be used for UL user data traffic based on the signaling exchanged with the NCM 236.

The N-MADP 237 is a functional entity in the network 202 that handles the forwarding of user data traffic across multiple network paths. The N-MADP 237 is responsible for MAMS-related UP functionalities in the network 202. Such as encapsulation, fragmentation, concatenation, reordering, retransmission, etc. The N-MADP 237 is the distribution node that routes the UL UP traffic to the appropriate anchor connection 223-1 to 223-*n* towards a respective core network 241-1 to 241-*n*, and the DL user traffic to the client 201 over the appropriate delivery connection(s) 222-1 to 222-*n*. The anchor connections 223-1 to 223-*n* are network paths from the N-MADP 237 to the UP gateway (IP anchor) that has assigned an network address to the client 201, and the delivery connections 222-1 to 222-*n* are network paths from the N-MADP 237 to the client 201. One or more The N-MADP 237 instances can be hosted at the Access Edge (e.g., in one or more access networks 110 and/or at individual access network nodes 111) and/or Core Gateways. The N-MADP 237 instances may be hosted with or separate from the NCM 236 instances.

In the DL, the NCM 236 configures the use of delivery connections 222-1 to 222-*n*, and UP protocols at the N-MADP 237 for transporting user data traffic. The N-MADP 237 may implement Equal-Cost Multi-Path routing (ECMP) support for the down link traffic. Additionally or alternatively, the N-MADP 237 may be connected to a router or other like network element (e.g., AP 2036 of FIG. 20) with ECMP functionality. The NCM 236 configures the N-MADP 237 with a load balancing algorithm based on static and/or dynamic network policies. These network policies may include assigning access and core paths for specific user data traffic type, data volume based percentage distribution, link availability and feedback information from exchange of MAMS signaling with the CCM 206 at the client 201, and/or the like. The N-MADP 237 can be configured with appropriate UP protocols to support both per-flow and per-packet traffic distribution across the delivery connections.

In the UL, the N-MADP 237 selects the appropriate anchor connection 223-1 to 223-*n* over which to forward the user data traffic, received from the client 201 via one or more delivery connections 222-1 to 222-*n*. The forwarding rules in the UL at the N-MADP 237 are configured by the NCM 236 based on application requirements (e.g., enterprise hosted application flows via a LAN or WLAN anchor 241 (e.g., WiFi, cloud, and/or Edge network), Mobile Operator hosted applications via a cellular core network 241, and/or the like).

The NCM 236 and the N-MADP 237 can be either collocated with one another or instantiated on different network nodes. The NCM 236 can setup multiple N-MADP 237 instances in the network. The NCM 236 controls the selection of an individual N-MADP 237 instance by the client and the rules for distribution of user traffic across the N-MADP 237 instances. In this way, different N-MADP 237 instances may be used to handle different sets of clients for load balancing across clients. Additionally, the different N-MADP 237 instances may be used for different address deployment topologies (e.g., N-MADP 237 hosted at the UP node at the access Edge or in the core network, while the NCM 236 hosted at the access edge node), as well as address access network technology architecture. For example, an N-MADP 237 instance at a CN node 241 may be used to manage traffic distribution across LTE and DSL networks, and another N-MADP 237 instance at a (R)AN node 231-1, 231-n may be used to manage traffic distribution across LTE and WiFi traffic. Furthermore, a single client 201 can be configured to use multiple N-MADP 237 instances, which may be used for addressing different application requirements. For example, individual N-MADP 237 instances may be used to handle TCP and UDP transport based traffic.

The CCM 206 and NCM 236 exchange signaling messages to configure the UP functions, C-MADP 207 and N-MADP 237, at the client and network respectively. The CCM 206 may obtain the NCM 236 credentials (FQDN or network address) for sending the initial discovery messages. As an example, the client 201 can obtain the NCM 236 credentials using methods like provisioning, DNS query. Once the discovery process is successful, the (initial) NCM 236 can update and assign additional NCM 236 addresses, for example, based on MCC/MNC tuple information received in the MX Discovery Message, for sending subsequent CP messages.

The CCM 206 discovers and exchanges capabilities with the NCM 236. The NCM 236 provides the credentials of the N-MADP 237 end-point and negotiates the parameters for UP with the CCM 206. CCM 206 configures C-MADP 207 to setup the UP path (e.g., MPTCP/UDP Proxy Connection) with the N-MADP 237 based on the credentials (e.g., (MPTCP/UDP) Proxy network address (e.g., IP address and port), Associated Core Network Path), and the parameters exchanged with the NCM 236. Further, NCM 236 and CCM 206 exchange link status information to adapt traffic steering and UP treatment with dynamic network conditions. The key procedures are described in details in the following subsections.

A UDP (or QUIC) connection may be configured between the C-MADP 207 and the N-MADP 237 to exchange control messages. The control messages may be or include, for example, keep-alive, probe request (REQ)/acknowledgement (ACK), Packet Loss Report (PLR), First Sequence Number (FSN), Coded MX SDU (CMS), Traffic Splitting Update (TSU), Traffic Splitting ACK (TSA) messages, and/or path quality estimation information. The N-MADP 237 end-point network address (e.g., IP address or the like) and port number (e.g., UDP port number of the UDP connection) is used to identify MX control PDUs.

The various elements depicted in the example of FIG. 2 may be implemented using a variety of different physical and/or virtualized components. For example, the elements within MAMS network 202 may be implemented using one or more components of an Edge node, such as one or more LTE or 5G RANs, or the MEC system 2700 of FIG. 27 or the like. Additionally or alternatively, the MAMS system 235 may be implemented in or by an individual RAN node, such as one or more of the RAN nodes 111 in FIG. 1. In one example, the MAMS system 235 is implemented as part of the layer 3 (L3) protocol stack (e.g., the RRC layer or the like). In another example, the MAMS system 235 is implemented as part of a layer above L3 such as the network layer (e.g., IP, UDP, QUIC, GTP-U, etc.) data plane protocol stack of the RAN nodes. In another example, the MAMS system 235 may be implemented as a separate layer between the L3 and upper layers. In another example, the MAMS system 235 may be implemented in or by a gNB-CU of a CU/DU split architecture. In another example, the MAMS system 235 may be implemented in or by a vBBU pool, or a cloud RAN (C-RAN). Additionally or alternatively, the functional elements within MAMS network 202 may be implemented by one or more network functions (or as a VNF) of CN 150A in FIG. 1. For example, the N-MADP 237 may run on an S-GW or P-GW when CN 150A is an EPC, or the N-MADP 237 may run on a User Plane Function (UPF) when CN 150A is a 5GC.

In MEC-based implementations (see e.g., FIGS. 27-28), the MAMS system 235 may be implemented in or by a MEC host/server (e.g., MEC host 2702 in FIG. 27) that is located in, or co-located with, a RAN 110 or RAN node 111. The functions that are located in the network side (e.g., the NCM 236 and N-MADP 237) can be hosted either at a centralized location or at the Edge cloud (see e.g., Edge cloud 3163 of FIG. 31). They can be deployed either as MEC application (e.g., MEC app(s) 2726 of FIG. 27) or co-located with other functions (e.g., MEC platform 2732 of FIG. 27). Additionally or alternatively, up-to-date information from the access networks may be provided to the NCM 236 for intelligent network path selection over APIs by the MEC platform (e.g., MEC platform 2732 of FIG. 27) the same way as it exposes RNI over RNI API, TMS over a TMS API, and/or BWMS over BWM API. Additionally or alternatively, similar levels of information may be defined for 3GPP access networks as well as for WiFi, MulteFire, DSL, etc., either by amending the existing RNI/BWM APIs or by defining new APIs specific for the new access technologies.

Figure 27:
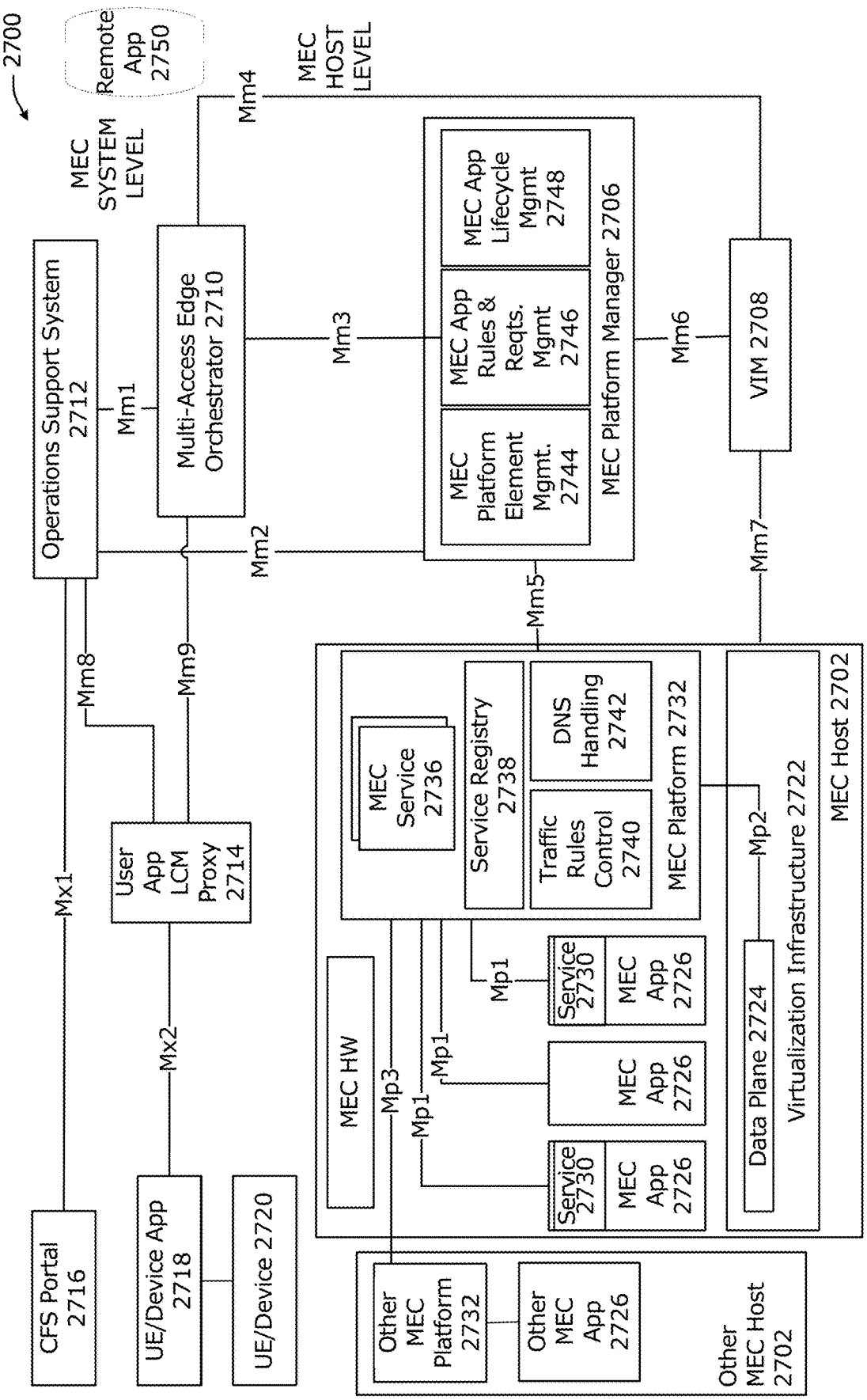
FIG. 27 illustrates a MEC system reference architecture.

In additional or alternative MEC-based implementations (see e.g., FIGS. 27-28), the NCM 236 can be hosted on a MEC cloud server (e.g., MEC host 2702 and/or MEC app(s) 2726 in FIG. 27) that is located in the UP path at the Edge of the multi-technology access network. The NCM 236 and CCM 206 can negotiate the network path combinations based on an application's needs and the necessary UP protocols to be used across the multiple paths. The network conditions reported by the CCM 206 to the NCM 236 can be complemented by a Radio Analytics application (see e.g., [MEC012]) residing at the MEC cloud server to configure the UL and DL access paths according to changing radio and congestion conditions. Additionally or alternatively, the UP functional element (e.g., the N-MADP 237) can either be collocated with the NCM 236 at the MEC cloud server (e.g., MEC-hosted applications, etc.) or placed at a separate network element like a common UP gateway across the multiple networks. Also, even in scenarios where an N-MADP 237 is not deployed, the NCM 206 can be used to augment the traffic steering decisions at the client 201. These enhancements is to improve the end user's QoE by leveraging the best network path based on an application's needs and network conditions, and building on the advantages of significantly reduced latency and the dynamic and real-time exposure of radio network information available at the MEC.

As used herein a "GMA receiver" may be an N-MADP 237 instance or C-MADP 207 instance (see e.g., FIG. 2) instantiated with GMA as the convergence protocol that receives packets encapsulated or otherwise generated according to GMA procedures, and processes the received packets per the procedures discussed in Zhu et al., "Generic Multi-Access (GMA) Convergence Encapsulation Protocols," draft-zhu-intarea-gma-10, IETA, INTAREA/Network Working Group (21 Jun. 2021) ("[GMA10]"), which is hereby incorporated by reference in its entirety. Additionally, as used herein a "GMA transmitter" may be an N-MADP 237 instance or C-MADP 207 instance instantiated with GMA as the convergence protocol that processes and/or encapsulates or otherwise generates packets/PDUs according to GMA procedures discussed in [GMA10].

As mentioned previously, MAMS is a programmable framework that provides mechanisms for flexible selection of network paths in a multi-connection (access) communication environment, based on application needs. It leverages network intelligence and policies to dynamically adapt traffic distribution across selected paths and user plane treatment to changing network/link conditions. The network path selection and configuration messages are carried as user plane data between the functional elements in the network and the end-user device, and thus without any impact to the control plane signaling schemes of the individual access network. Today's MAMS solutions require deploying MAMS control and data plane network functions in the network [RFC8743]. The present disclosure extends the MAMS framework to support OTT MAMS (e.g., lossless switching, aggregation, etc.) without any change or dependency in network. The OTT MAMS can run as part of MAMS hosted on a cloud computing service/platform, an Edge computing platform/service (e.g., ETSI MEC, and/or the like), and/or using suitable Virtual Machines (VMs) and/or containers provided by such a cloud computing service/platform and/or Edge computing platform/service.

Furthermore, as the mobile and/or wireless access technologies and networks continue to evolve, it is becoming clear that no single radio technology will be able to meet the variety of requirements for human and machine communications. On the other hand, driving more data through a scarce and finite radio spectrum becomes a real challenge, and spectrum efficiency is approaching a plateau and will not deliver the needed increase in bandwidth improvement itself. For example, 3GPP 5G cellular technology is likely to utilize frequencies below 6 Gigahertz (GHz) as well as millimeter wave ("mmWave" or "MMW"), in both licensed and unlicensed bands. The present disclosure also provides a Software-Defined, Access-Agnostic, and High-Performance solution to such issues, which is referred to herein as Generic Multi-Access (GMA) to enable integration of multiple (heterogeneous or homogeneous) radio access networks and RATs at the Edge, without impacting existing RAT protocol stacks (e.g. PDCP, RRC, Ethernet, etc.) or existing network protocols (e.g., internet protocol (IP), transmission control protocol (TCP), user datagram protocol (UDP), Quick UDP Internet Connections (QUIC), etc.). GMA may be considered a Layer 2.5 protocol. The present disclosure describes various GMA e2e network architecture, protocols, procedures, algorithms, and system functionalities as well as deployment implementations.

Figure 3:
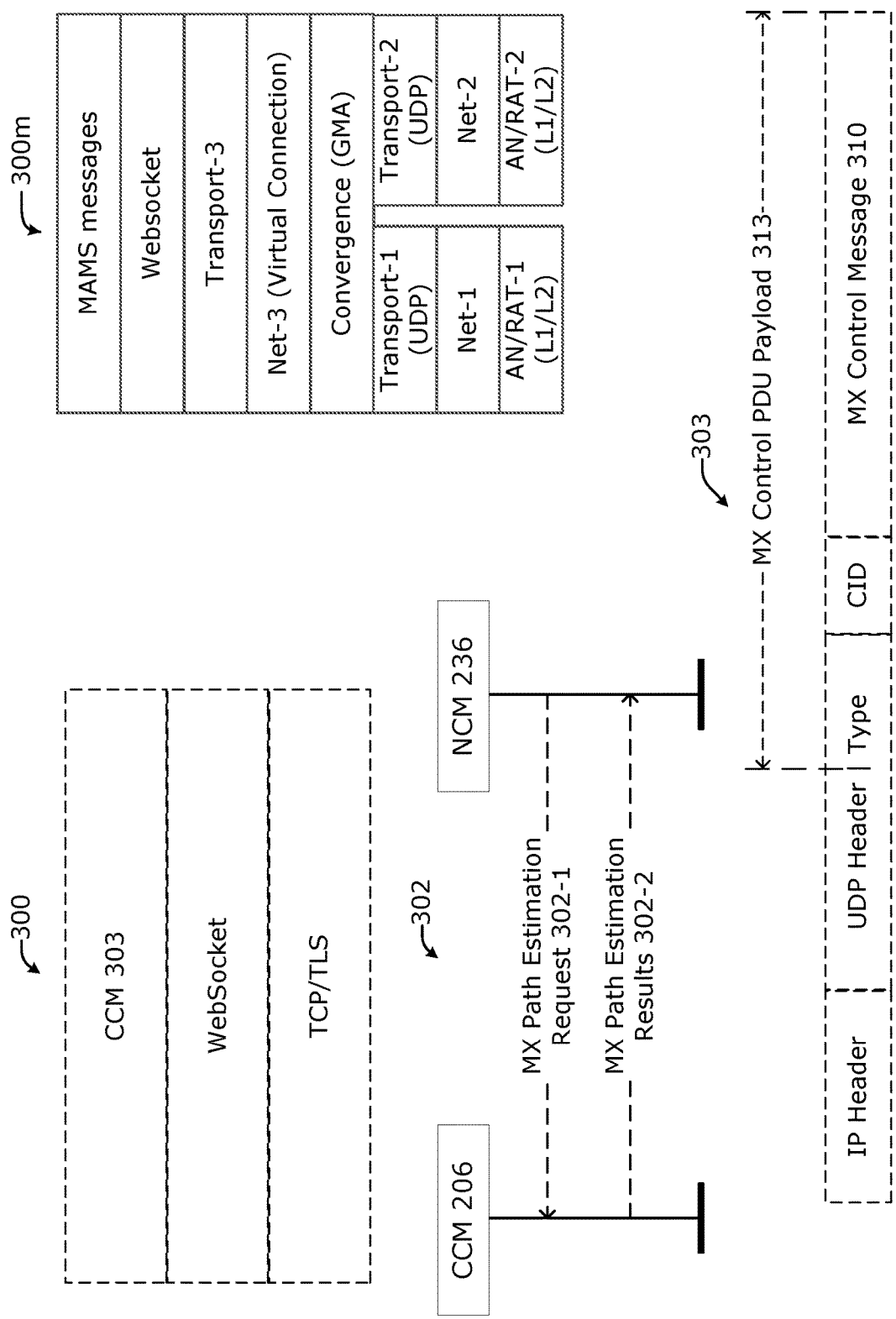
FIG. 3 illustrates an example MX control plane protocol and MX control message.

FIG. 3 depicts an example MAMS Control-Plane Protocol Stack (CPPS) 300. The CPPS 300 includes an Multi-Access (MX) Control Message layer 303, a WebSocket layer, and a Transport Control Protocol (TCP)/Transport Layer Security (TLS) layer. Here, WebSocket (see e.g., IETF RFC 6455 (December 2011) and IETF RFC 8441 (September 2018)) is used for transporting management and control messages (e.g., MX Control Messages 303) between the NCM 236 and the CCM 206. Each MAMS control message 303 may include one or more of the following fields: Version (indicates the version of the MAMS control protocol); Message Type (indicates the type of the message, e.g., MX Discover, MX Capability Request (REQ)/Response (RSP)); and Sequence Number (SN) (Auto-incremented integer to uniquely identify a particular message exchange (e.g., MX Capability Request/Response).

FIG. 3 shows a MAMS management protocol stack 300m. Here, a secure websocket is established over a third transport layer (e.g., TCP, UDP, IP Security Protocol (IPSec), etc.) tunnel that is established over a virtual network layer (anchor) connection (e.g., IP or some other suitable network layer protocol) for sending MAMS management messages between the CCM 206 and the NCM 236. The virtual (anchor) connection is on top of a convergence layer that implements a convergence protocol (e.g., GMA or the like), which encapsulates the MAMS management messages in the virtual (anchor) connection packet(s) (e.g., IP packets). The convergence (GMA) layer resides on top of respective transport (e.g., UDP or IPSec) tunneling layers for respective access networks (ANs) 1 and 2, which is on top of respective network layers (e.g., IP or the like), which are on top of layer 2 (L2) and Layer 1 (L1) of the respective access networks/RATs 1 and 2.

In some implementations, when the virtual connection has not been set up, the CCM 206 can only establish the secure websocket over one of the delivery IP connections first (e.g., RAT-1). After the virtual IP connection is up, the CCM 206 will close it and establish a new one over the (anchor) virtual IP connection, and the corresponding (virtual) IP packets (carrying one or more MAMS messages) are encapsulated in a same or similar way as data packets (see e.g., FIG. 18).

FIG. 3 also shows a MAMS Control-Plane (CP) Procedure 302 for Path Quality Estimation. Path quality estimations can be done either passively or actively. Traffic measurements in the network can be performed passively by comparing real-time data throughput of the client 201 with the capacity available in the network. In special deployments where the NCM 236 has interfaces 222 with access nodes 231, 111, the direct interfaces can be used to gather information regarding path quality. For example, the utilization of an LTE access node (eNB), to which the client 201 is attached, could be used as data for the estimation of path quality without creating any extra traffic overhead. Active measurements by the client 201 provide an alternative way to estimate path quality.

Procedure 302 begins at operation 302-1 where the NCM 236 sends an MX Path Estimation Request to the CCM 206. At operation 302-2, the CCM 206 sends an MX Path Estimation Results message to the NCM 236. The NCM 236 may send one or more of the following configuration parameters in the MX Path Estimation Request (operation 302-1) to the CCM 206: Connection ID (of the delivery connection 222 whose path quality needs to be estimated); Init Probe Test Duration (ms); Init Probe Test Rate (Mbps); Init Probe Size (bytes); Init Probe-ACK Required (0→No/1→Yes); Active Probe Frequency (ms); Active Probe Size (bytes); Active Probe Test Duration (ms); and Active Probe-ACK Required (0→No/1→Yes).

The CCM 226 configures the C-MADP 207 for probe receipt based on these parameters and for collection of the statistics according to the following configuration: Unique Session ID (session identifier provided to the client in an MX Capability Response); Init Probe Results Configuration (e.g., including Lost Probes (percent), and/or Probe Receiving Rate (packets per second)); Active Probe Results Configuration (e.g., including Average Throughput in the last Probe Duration).

The UP probing is divided into two phases: the Initialization phase and the Active phase. For the Initialization Phase, a network path that is not included by the N-MADP 237 for transmission of user data is deemed to be in the Initialization phase. The user data may be transmitted over other available network paths. For the Active Phase, a network path that is included by the N-MADP 237 for transmission of user data is deemed to be in the Active phase.

During the Initialization phase, the NCM 236 configures the N-MADP 237 to send an Init Probe-REQ message. The CCM 206 collects the Init Probe statistics from the C-MADP 207 and sends the MX Path Estimation Results message (operation 302-2) to the NCM 236 per the Initialization Probe Results configuration.

During the Active phase, the NCM 236 configures the N-MADP 237 to send an Active Probe-REQ message. The C-MADP 207 calculates the metrics as specified by the Active Probe Results configuration. The CCM 206 collects the Active Probe statistics from the C-MADP 207 and sends the MX Path Estimation Results message to the NCM 236 (operation 302-2) per the Active Probe Results configuration.

FIG. 3 also shows an MX Control message format 303. As shown, the MX Control message 303 includes an IP header, a UDP header, and an MX Control PDU Payload 313. The MX Control PDU Payload 313 includes a type field, a CID field, and an MX Control Message 310. The MX Control PDU 313 may include one or more of the following fields: Type (1 byte) to indicate the type of the MX Control message (a value of "0" indicates a Keep-Alive type, and a value of "1" indicates a Probe-REQ/ACK type; Others: Reserved); CID (1 byte) to indicate a connection ID of the delivery connection for sending the MX Control message 303; and an MX Control Message 310 (variable size/length) including the payload of the MX Control message 310. The MX Control message 303/PDU 310 is sent as a normal UP packet over the desired delivery connection whose quality and reachability need to be determined.

The control message 303/PDU 310 may be encoded as a Keep-Alive and/or Probe-REQ/ACK messages to support path quality estimation. The "Type" field is set to "0" for Keep-Alive messages. The C-MADP 207 may periodically send a Keep-Alive message over one or multiple delivery connections 222-1 to 222-$n$ (e.g., ANCs 105, 106, and/or 107), especially if UDP tunneling is used as the adaptation method for the delivery connection 222 with a NAT function on the path. A Keep-Alive message is 2 bytes long and includes a Keep-Alive Sequence Number field (2 bytes) to indicate the sequence number (SN) of the Keep-Alive message. The "Type" field is set to "1" for Probe-REQ/ACK messages. The N-MADP 237 may send a probe request (Probe-REQ) message for path quality estimation. In response, the C-MADP 207 may return a probe acknowledgement (Probe-ACK) message.

A Probe-REQ message may include one or more of the following fields: Probing Sequence Number (2 bytes) to indicate an SN of the Probe REQ message; Probing Flag (1 byte) where Bit 0 is a Probe-ACK flag to indicate whether the Probe-ACK message is expected (1) or not (0), Bit 1 is a Probe Type flag to indicate whether the Probe-REQ/ACK message was sent during the Initialization phase (0) when the network path is not included for transmission of user data, or during the Active phase (1) when the network path is included for transmission of user data, Bit 2 is a bit flag to indicate the presence of the Reverse Connection ID (R-CID) field, and Bits 3-7 are Reserved; Reverse Connection ID (R-CID) (1 byte) to indicate the connection ID of the delivery connection for sending the Probe-ACK message on the reverse path; and Padding (variable). The "Padding" field is used to control the length of the Probe-REQ message. The "R-CID" field is only present if both Bit 0 and Bit 2 of the "Probing Flag" field are set to "1". Moreover, Bit 2 of the "Probing Flag" field should be set to "0" if Bit 0 is "0", indicating that the Probe-ACK message is not expected. If the "R-CID" field is not present, but Bit 0 of the "Probing Flag" field is set to "1", the Probe-ACK message should be sent over the same delivery connection as the Probe-REQ message.

The C-MADP 207 should send the Probe-ACK message in response to a Probe-REQ message with the Probe-ACK flag set to "1". A Probe-ACK message is 3 bytes long and includes a Probing Acknowledgment Number field (2 bytes) to indicate/include a sequence number of the corresponding Probe-REQ message.

The CCM 206 and NCM 236 exchange signaling messages to configure the UP functions via the C-MADP 207 and the N-MADP 237 at the client and the network, respectively. The means for the CCM 206 to obtain the NCM 236 credentials (e.g., Fully Qualified Domain Name (FQDN) or network address (e.g., IP address, or the like)) for sending the initial discovery messages are out of scope for this document. As an example, the client can obtain the NCM 236 credentials by using such methods as provisioning or DNS queries. Once the discovery process is successful, the (initial) NCM 236 can update and assign additional NCM 236 addresses (e.g., based on Mobile Country Code (MCC)/Mobile Network Code (MNC) tuple information received in the MX Discover message) for sending subsequent CP messages.

The CCM 206 discovers and exchanges capabilities with the NCM 236. The NCM 236 provides the credentials of the N-MADP 237 endpoint and negotiates the parameters for the user plane with the CCM. The CCM 206 configures the C-MADP 207 to set up the UP path (e.g., MPTCP/UDP Proxy connection) with the N-MADP, based on the credentials (e.g., (MPTCP/UDP) Proxy network address (e.g., IP address or the like) and port, associated core network path), and the parameters exchanged with the NCM 236. Further, the NCM 236 and CCM 206 exchange link status information to adapt traffic steering and UP treatment to dynamic network conditions.

After sending a MAMS control message, the MAMS CP peer (NCM 236 or CCM 206) waits for a duration of MAMS_TIMEOUT ms before timing out in cases where a response was expected. The sender of the message will retransmit the message for MAMS_RETRY times before declaring failure if no response is received. A failure implies that the MAMS peer is dead or unreachable, and the sender reverts to native non-multi-access/single-path mode. The CCM 206 may initiate the MAMS discovery procedure for re-establishing the MAMS session.

MAMS CP peers execute the keep-alive procedures to ensure that the other peers are reachable and to recover from dead-peer scenarios. Each MAMS CP endpoint maintains a Keep-Alive timer that is set for a duration of MAMS_KEEP_ALIVE_TIMEOUT. The Keep-Alive timer is reset whenever the peer receives a MAMS control message. When the Keep-Alive timer expires, an MX Keep-Alive Request is sent.

The values for MAMS_RETRY and MAMS_KEEP_ALIVE_TIMEOUT parameters used in keep-alive procedures are deployment dependent. As an example, the client 201 and network can obtain the values using provisioning. On receipt of an MX Keep-Alive Request, the receiver responds with an MX Keep-Alive Response. If the sender does not receive a MAMS control message in response to MAMS_RETRY retries of the MX Keep-Alive Request, the MAMS peer declares that the peer is dead or unreachable. The CCM

206 may initiate the MAMS discovery procedure for re-establishing the MAMS session.

Additionally, the CCM 206 immediately sends an MX Keep-Alive Request to the NCM whenever it detects a handover from one (R)AN node 111 to another (R)AN node 111. During this time, the client 201 stops using MAMS UP functionality in the UL direction until it receives an MX Keep-Alive Response from the NCM 236.

The MX Keep-Alive Request includes the following information: Reason (e.g., can be timeout or handover. Handover shall be used by the CCM 206 only on detection of a handover); Unique Session ID (Unique session identifier for the CCM 206 that set up the connection. If the session already exists, then the existing unique session identifier is returned. An NCM ID is a unique identity of the NCM 236 in the operator network, and the session ID is a unique identity assigned to the CCM 206 instance by this NCM 236 instance); Connection ID (if the reason is handover, the inclusion of this field may be mandatory); and Delivery Node ID (identity of the node to which the client is attached. In the case of LTE, this is an E-UTRAN Cell Global Identifier (ECGI). In the case of WiFi, this is an AP ID or a Media Access Control (MAC) address. If the reason is "Handover", the inclusion of this field may be mandatory).

The present disclosure provides new mechanisms to support dynamic traffic splitting/steering at the convergence (sub)layer in MAMS. Existing solutions include various are e2e protocols, such as multi-path TCP (MPTCP), to utilize multiple path or RATs to achieve higher throughput. However, these e2e protocol solutions are managed at the server, which is far away from the data splitting point, and therefore, result in relatively high feedback delay. Moreover, the existing solutions cannot access the radio layer information.

[GMA10] specifies how to dynamically split user data traffic over multiple links at the MX convergence sublayer. The present disclosure provides dynamic traffic splitting for different optimization targets such as reducing e2e delay (e.g., "low delay") or minimizing cellular (e.g., 5G/NR, LTE, etc.) usage (e.g., "low cost"). The present disclosure includes GMA-based traffic splitting that operates in the convergence layer of the MAMS framework (see e.g., FIGS. 1-3). The GMA-based traffic splitting mechanisms are transparent to lower layers and do not require any information from those layers. Two multi-path traffic splitting options are provided including a low delay and low cost options. Various Edge computing frameworks, such as the MEC framework discussed herein, may be used to operate/implement the GMA-based traffic splitting. One example implementation includes using the Smart-Edge/MEC platform provided by Intel®.

Figure 4:
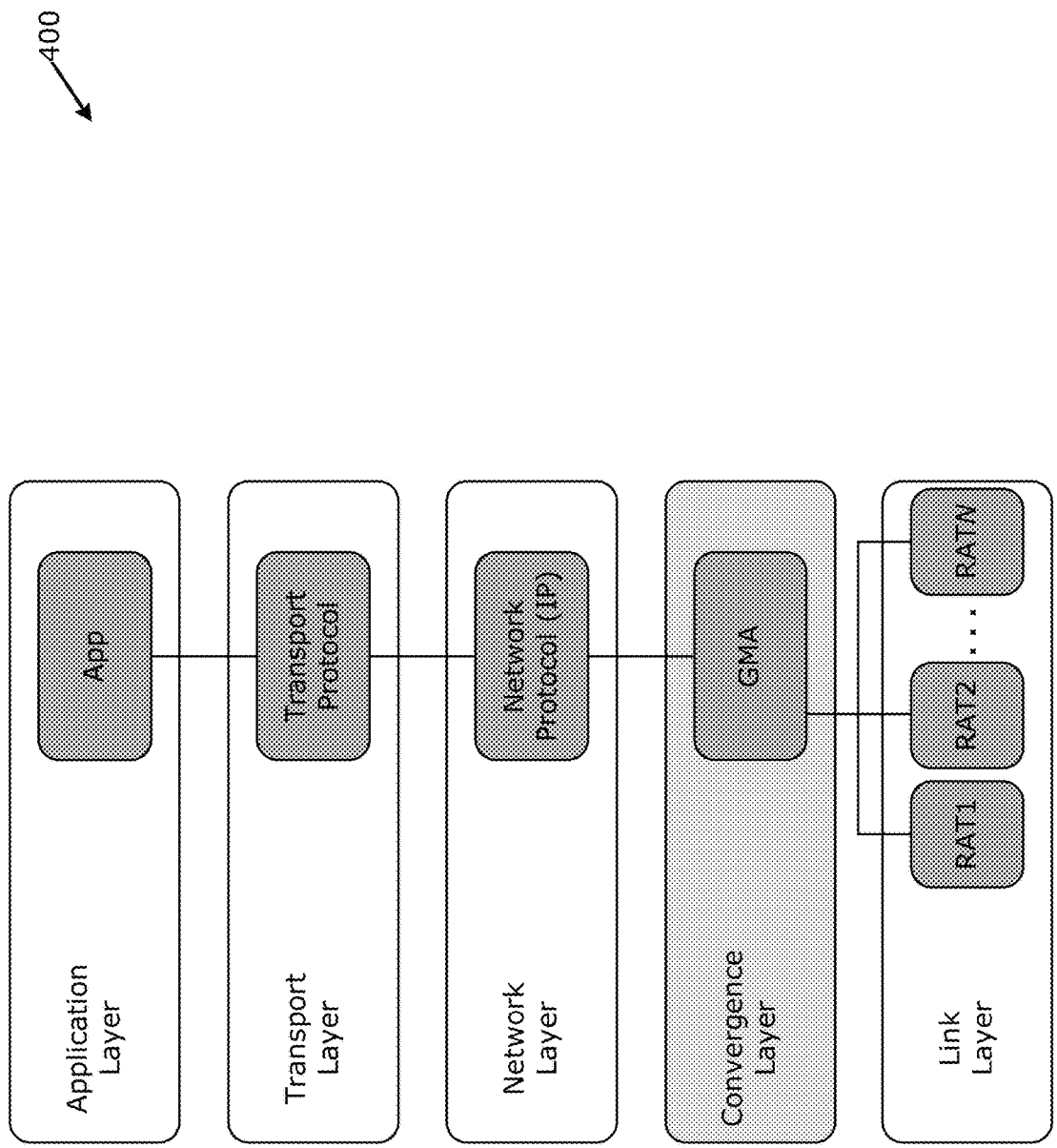
FIG. 4 depicts a Network model with convergence layer.

FIG. 4 depicts a network model (protocol stack) 400 with a convergence layer. In FIG. 4, an application layer (including one or more apps) is on top of a transport layer (which includes at least one transport protocol), which is on top of a network layer (which includes at least one network protocol), which is on top of the convergence layer (which includes at least one convergence protocol, which is GMA in this example), which is on top of a link layer (which includes 1 to N RAT protocols (where N is a number)). The transport layer protocol may implement one or more transport protocols such as, for example, TCP, UDP, QUIC, and/or any other suitable transport protocol such as those discussed herein. Additionally or alternatively, the network layer protocol may be IP and/or any other suitable network protocol such as those discussed herein.

Figure 5:
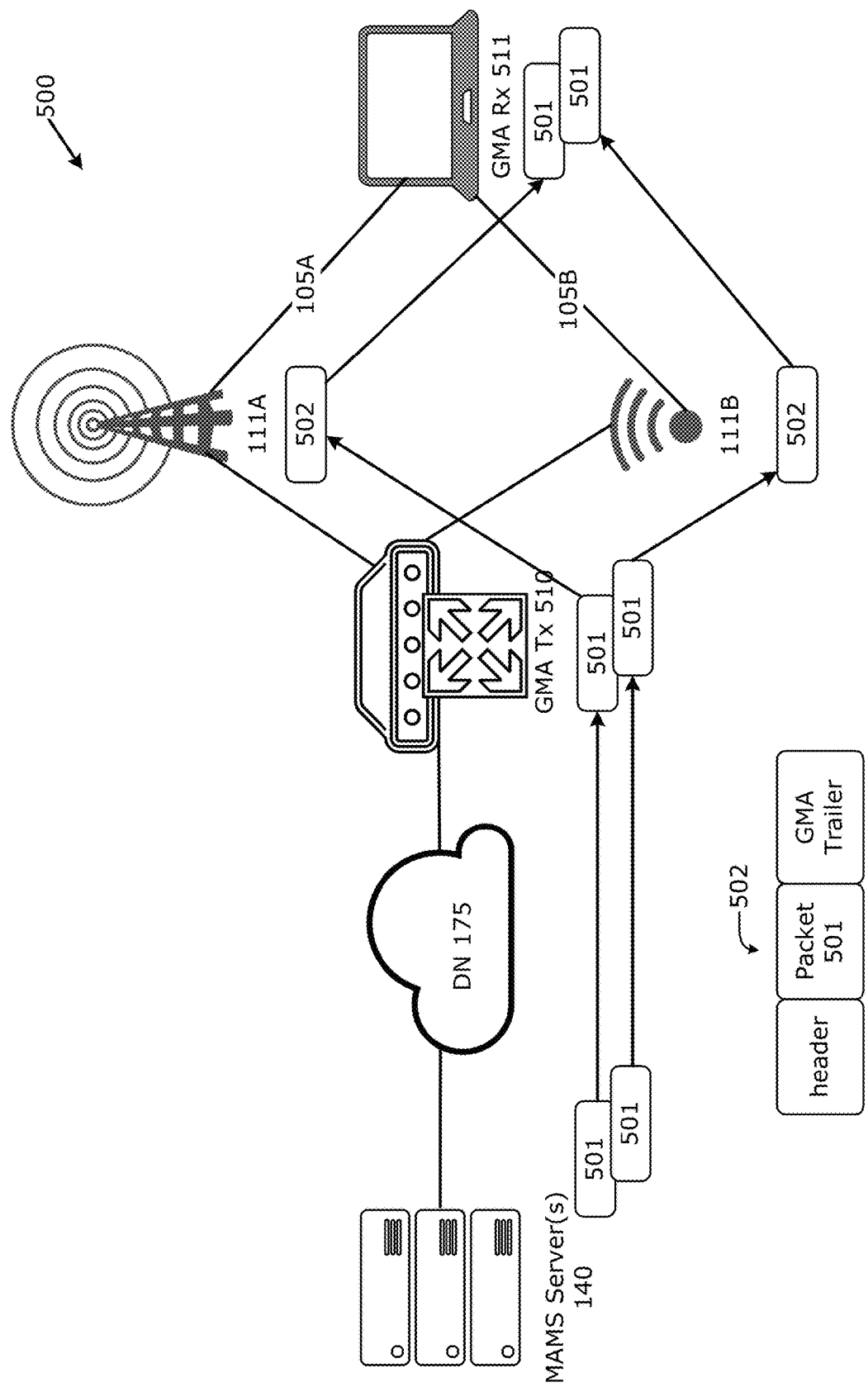
FIG. 5 depicts an example of GMA-based multi-access traffic splitting for downlink.

FIG. 5 shows a GMA multi-access traffic splitting example 500 for a downlink direction. In the example 500, data packets 501 are sent by the MAMS server(s) 140 to a GMA transmitter (Tx) 510 via the DN 175 (e.g., the Internet). The data packets 501 may have any suitable network protocol format; for example, the data packets 501 may be IP packets or the like. The GMA Tx 510 sends one or more packets to NAN 111A for delivery to a GMA receiver (Rx) 511 (e.g., client 101) and sends one or more packets to NAN 111B for delivery to the GMA Rx 511 (e.g., client 101). The NANs 111A, 111B generate encapsulated packets 502 from the packets 501 by adding a header (e.g., an IP header) and a GMA trailer (discussed in more detail infra) to each packet 501. The encapsulated packets 502 are then sent to the client 101 over the respective access network connections 105. The methods for encapsulating the packets 501 is discussed in [GMA10].

The main responsibilities of the convergence protocol (see e.g., FIG. 4) is based on whether the entity is acting as a GMA Tx entity 510 or a GMA Rx entity 511. The GMA Tx entity 510 splits or duplicates traffic over multiple radio links 105 and retransmits packets over a different radio link 105 based on e2e measurements. The GMA Rx entity 511 reorders packets received over different radio links 105 and forwards those packets to higher layer entities, in sequence.

1.1. Per Packet Prioritization (PPP)

Figure 14:
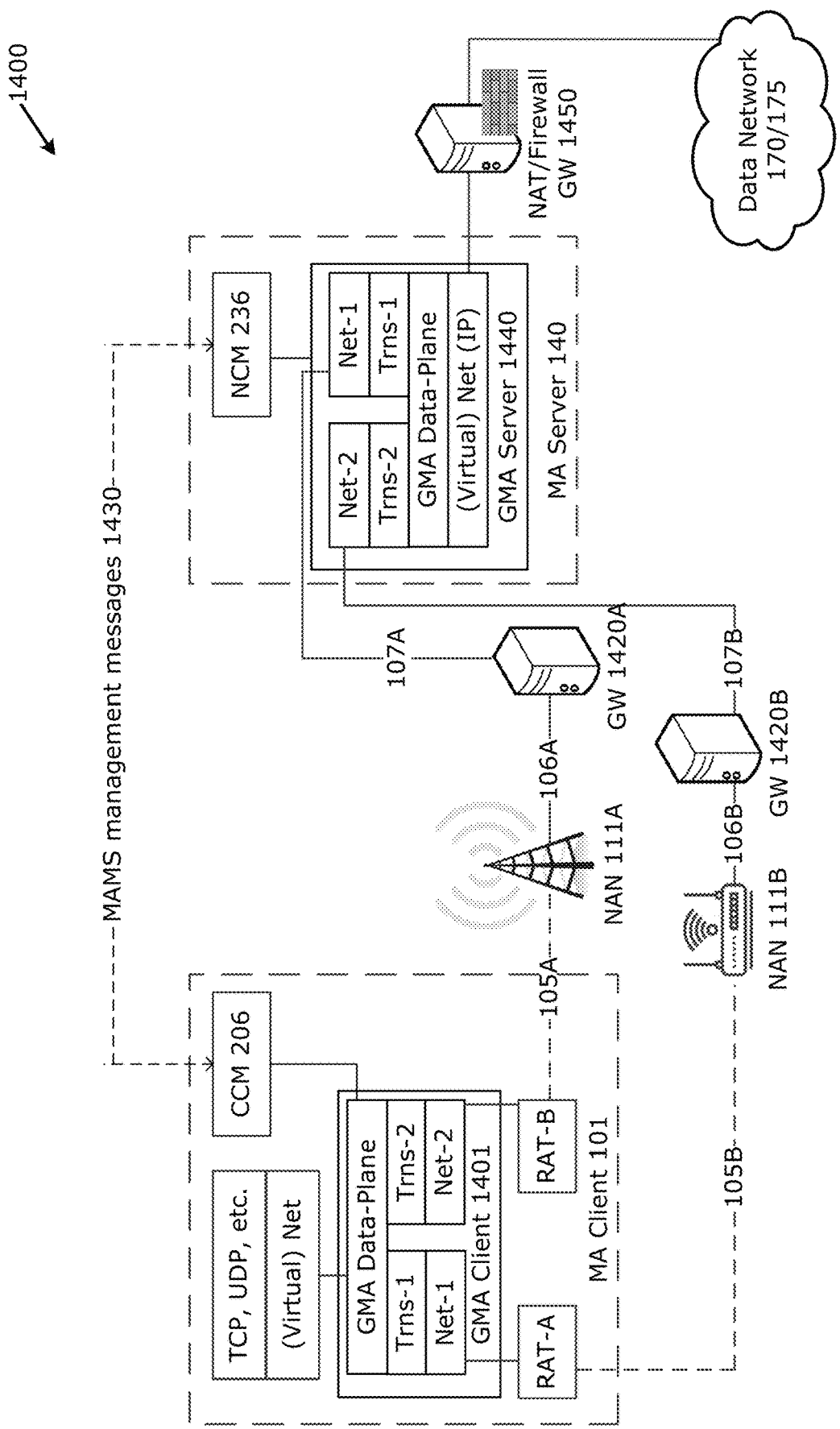
FIG. 14 depicts an OTT Generic Multi-Access (GMA) end-to-end (e2e) Network Reference Architecture.

Referring back to FIG. 1, the MX convergence (sub)layer operates on top of the MX adaptation (sub)layer in the protocol stacks 102 and 142. From the Transmitter (Tx) perspective, a User Payload (e.g. IP PDU) is processed by the convergence sublayer first, and then by the adaptation sublayer before being transported over a delivery access connection (e.g., connection 105A or connection 105B). From the Receiver (Rx) perspective, a packet (e.g., IP packet) received over a delivery connection is processed by the MX adaptation sublayer first, and then by the MX convergence sublayer (this is also shown by FIG. 14, which is discussed in more detail infra).

In the present disclosure, the convergence layer includes Per Packet Prioritization (PPP) mechanisms. Concepts similar to PPP are described in Nidas, "Per Packet Value: A Practical Concept for Network Resource Sharing", 2016 IEEE Global Communications Conference (GLOBECOM), pp. 1-7 (4 Dec. 2016), available at http://ppv.elte.hu/ ("[NADAS01]"), "PPV—PER PACKET VALUE", available at: http://ppv.elte.hu/("[PPV]"), which is hereby incorporated by reference in its entirety, to improve user experience and fairness.

[NADAS01] and [PPV] describes a Per Packet Value (PPV) framework that implements and enforces a variety of detailed and flexible policies under various traffic combinations. The PPV framework defines resource sharing policies for various situations by throughput-Packet Value (PV) functions. In the PPV framework, a Packet Marker is implemented at one or more compute nodes (e.g., RAN nodes 111, MX server 140, edge compute node 2036 and/or NANs 2031-2033 discussed infra with respect to FIG. 20, routers, switches, hubs, gateways, network appliances, etc.), which marks a PV on each packet, based on a throughput-PV function of that flow. The network, and Resource Nodes within the network, maximize the total PV of transmitted packets using available resources. This maximization results in implementing congestion policies, without the need for any flow awareness.

The PPV framework assigns two values or markings to packets, a packet value (PV) and a Congestion Threshold Value (CTV). The PV represents the gain of the operator when the packet is delivered; PVs express the relative importance of one packet to another (i.e., marginal utility). PVs are expressed as value per bit [value/bit] to make direct comparison among packets of different sizes possible, where the total value of a longer packet is higher than a shorter one with the same packet value marking, but normally it also takes proportionally more resources to transmit. The CTV indicates the delay requirements of the flow to which the packets belong. The CTV separates the packets with PVs that get transmitted from the ones that get dropped at a Resource Node. The CTV is based on the combination of available capacity, the amount of offered traffic, and the PV composition of the offered traffic. The CTV increases as the known or monitored congestion increases. Resource nodes forward packets according to the operator-defined maximum delay for the CTV of each packet. Both the PV and CTV can be carried in newly created or existing packet header fields, such as in the differentiated services code point (DSCP) field or in an Multiprotocol Label Switching (MPLS) label.

The Packet Marker marks or includes the PVs and CTVs in packets based on the throughput-PV function of those packets. In some implementations, all packets below a CTV are dropped, and the throughput of the remaining packets are defined by the throughput-PV function at this threshold (e.g., the CTV above the dropping-rule CTV). An example packet marker implementation (per flow) is as follows: (i) quantize the throughput-PV functions; (ii) associate a token bucket to each quantized region (PV as defined, incoming token rate is the throughput of this region, and the size is the token rate*typical buffer size of Resource Nodes); and (iii) when a packet of a flow arrives, select the token bucket with the highest PV, where there are enough tokens (packet size).

Each of the resource nodes maximize the total transmitted PV. Resource Nodes send packets with high PV at the expense of packets with low PV. In some implementations, each resource node serves packets in order of PV from PVs with the highest PV first, and so on. For first-in first-out (FIFO) implementations, a packet with the smallest PV is dropped when the FIFO queue becomes full. Furthermore, resource nodes can take into account different packets that have different resource when maximizing the total transmitted PV. In some implementations, the resource nodes do not directly compare PVs, and instead normalized by the cost of their transmission (r). Here, the Effective Packet Value (EPV) of a packet as its PV divided by its transmission cost (r). Resource nodes may also take care to preserve packet ordering within a flow, when needed.

The PPV framework (and/or cross-layer architecture discussed infra) (or adaptations thereof) may be used for the PPP mechanisms discussed herein. In some implementations, edge compute node (e.g., MX server 140 and/or edge compute node 2036 in FIG. 20) or client 101 mark each data packet with a priority value such that some packets can be dropped when congestion happens at access/edge nodes (e.g., RAN nodes 111, MX server 140, access/edge node layer 2030 in FIG. 20 discussed infra with respect to FIG. 20, routers, switches, hubs, gateways, network appliances, etc.).

Currently, IP headers support per-flow classification and/or prioritization through the differentiated services code point (DSCP) field in the IP header. However, DSCP cannot be used to carry "per-packet priority" because it has already been used to specify the priority or class of a flow. In various embodiments, the GMA encapsulation protocol [GMA10] is extended to carry the per-packet priority field without any impact to the existing IP header fields. As a result, intermediary elements (e.g., access/edge nodes) can perform queue management and packet dropping in response to congestion accordingly. The embodiments herein can be implemented in edge computing frameworks such as those discussed herein. In one example, the embodiments may be implemented using the Smart-Edge/MEC platform provided by Intel®.

Figure 6:
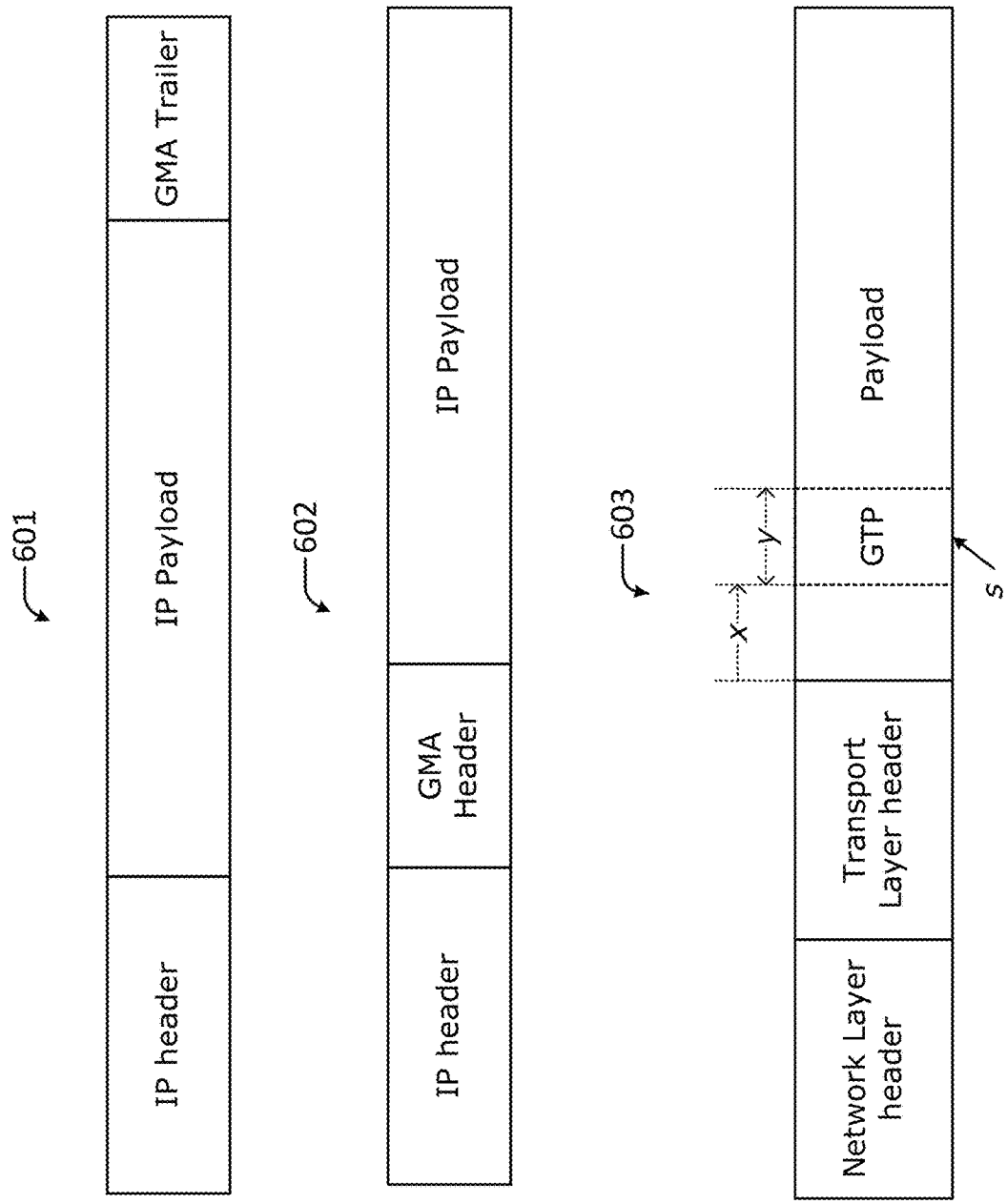
FIG. 6 depicts example GMA encapsulation formats and a Generic Packet Type (GPT)-based Packet format.

FIG. 6 depicts example GMA encapsulation formats. FIG. 6 shows two GMA encapsulation formats 601 and 602 as specified in [GMA10]. Here, the GMA control fields can be added either at the end of the IP payload as a trailer or at the beginning as a header. Other aspects of the GMA formats are discussed infra with respect to FIG. 19 and in [GMA10].. In both options, the original IP header remains as the IP header after encapsulation to maintain backward compatibility. The protocol type field of the IP header is changed to a specific value, for example, "114" (see e.g., [GMA10]), to indicate the presence of GMA trailer (or header). The two GMA end-points (e.g., Multi-Radio UE 101 and MX server 140 in FIG. 1) can negotiate which GMA format (e.g., trailer or header) to use through the MAMS control signaling or pre-configuration.

Currently, the GMA header and GMA trailer carries Sequence Number, Timestamp, Flow Identification, and other information to support various multi-access optimizations. In some implementations, a new control per-packet priority (PPP) field is added to the GMA encapsulation header or GMA encapsulation trailer to indicate PPP, which may be as follows:

Per-Packet Priority (PPP): an unsigned integer (0~255) to indicate the priority of the packet.

In some implementations, a higher PPP value in the PPP field indicates higher priority and a lower value in the PPP field indicates a lower priority (e.g., a PPP value of "0" indicates a lowest priority and a PPP value of "255" indicates a highest priority). In other implementations, a lower value in the PPP field indicates higher priority and a higher value in the PPP field indicates a lower priority (e.g., a PPP value of "255" indicates a lowest priority and a PPP value of "0" indicates a highest priority).

In various embodiments, new MAMS control messages can be used to allow MX server 140 and/or MX client 101 to configure one or more PPP mapping rules for UL traffic at the MX client 101 and/or configure PPP mapping rules for UL and/or DL traffic on the MX server 140. For example, the new MAMS control messages may include an MX PPP Configuration request message (mx_ppp_config_req) and/or an MX PPP Configuration response message (mx_ppp_config_rsp). Additionally or alternatively, the PPP indicator can be added to MAMs capability exchange messages (e.g., mx_capability_req and/or mx_capability_rsp). In various implementations, the PPP indicator configures a MAMS/MX node with one or more PPP mapping rules, where the PPP mapping rules are used to route packets and/or map PPP indicators to specific packets.

FIG. 6 also shows a Generic Payload Type (GPT) packet 603, which is used for packet classification purposes. The GPT packet 603 includes a network layer header (e.g., an IP header), a transport layer header (e.g., UDP, TCP, etc.), and a payload section. The payload section includes a GPT field, which is a generic field in the packet payload. The GPT field includes a GPT offset x, GPT length y, and GPT value s. The GPT offset x is a number of bits or bytes from the end of transport layer header to the start of the GPT field, which is used to indicate the location of the GPT field. The GPT length y is a length of the GPT field expressed as a number of bits or bytes. The GPT value s is a value of to be included in the GPT field. The GPT value s may be in the format of an unsigned integer. The GPT value s may be the PPP indication/value discussed previously. Other aspects of the GTP field/GPT packet 603 are discussed infra.

Figure 7:
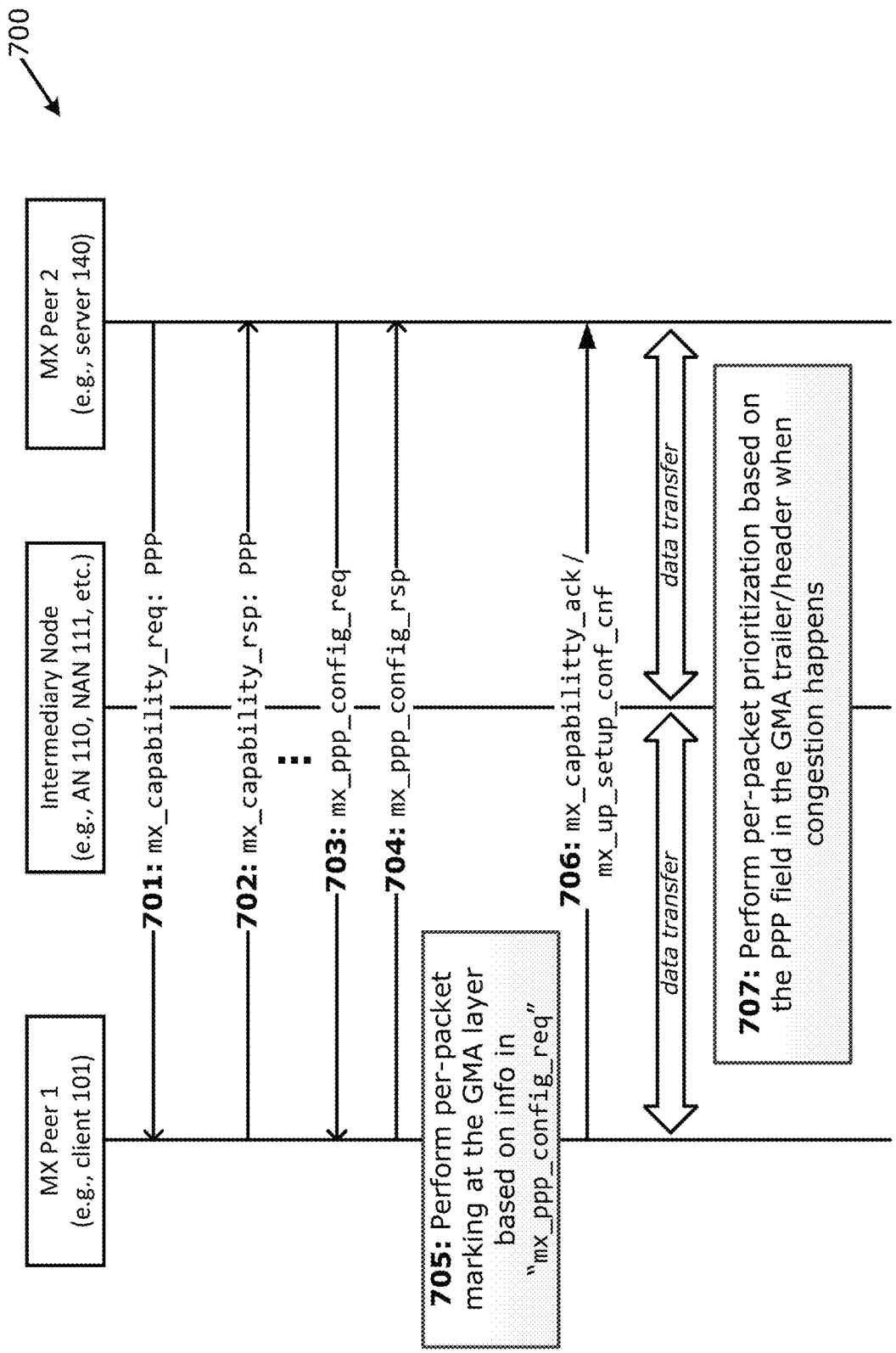
FIG. 7 depicts example procedure for Enhanced MAMS Control Messages for Per-Packet Prioritization according to various embodiments.

FIG. 7 shows a MAMS control message exchange procedure 700 for PPP. Procedure 700 is performed by two MX Peers (e.g., MX Peer 1 and MX Peer 2 in FIG. 7). In the example of FIG. 7, MX Peer 1 corresponds to the MX client 101, and the MX Peer 2 corresponds to the MX server 140. However, these roles could be reversed in other implementations.

Procedure 700 begins with a capability exchange (including an mx_capability_req being sent from MX Peer 2 to MX Peer 1 at operation 701, and an mx_capability_rsp being sent from MX Peer 1 to MX Peer 2 at operation 702). The capability exchange involves the NCM (or CCM) learning the network address (e.g., IP address) and port of MX Peer 1 (or MX Peer 2) from an MX System Info message obtained during an MX discovery procedure, and sending a mx_capability_req to the MX Peer 1 at operation 701. In response, the CCM (or NCM) (e.g., MX Peer 1) creates a unique identity for the NCM (or CCM) session and sends the mx_capability_rsp at operation 702.

The content and other aspects of the mx_capability_req and mx_capability_rsp messages are discussed infra in section 1.4 below. In various embodiments, the mx_capability_req and/or the mx_capability_rsp includes a PPP indicator (e.g., a data field, data element, and/or parameter/value) to indicate support for PPP. In some implementations, if both MX peers 1 and 2 support PPP, the NCM (e.g., implemented by MX Peer 2 (e.g., MX server 140)) will send out an mx_ppp_config_req message at operation 703, which may include a PPP configuration. Additionally or alternatively, the MX server 140 initiates the PPP configuration, updates the PPP configuration, and terminates/stops use of the PPP configuration. In one example implementation, the PPP configuration may include some or all of the following information:

Number of PPP rules (e.g., 1 to N, where N is a number such as 4)

For each PPP rule, include the following:

Flow Classification Parameters: parameters to use to identify a flow for which the PPP rule is applicable. For example, the flow classification parameters may be based on network layer header fields (e.g., IP source (src) address (addr), IP destination (dst) addr, protocol type, src port number, dst port number).

Rule Type:

0: determine PPP based on (app) packet size (excluding TCP/IP header) range.

1: determine PPP based on (app) packet size (PS) coding.

2: determine PPP based on Generic Payload Type (GPT), where GPT is a generic field in the packet payload 603 as shown in FIG. 6.

3: determine PPP based the incoming rate (load) of the traffic flow (see e.g., [PPV]).

Others: reserved.

Number of Priority levels (e.g., L, where L is a number).

For each priority level, include the information in Table 1.1-1.

TABLE 1.1-1

If (PPP Rule Type == 0)
{
  Packet size range: [min, max]
  PPP value
};
If (PPP Rule Type == 1)
{
  Packet size code = mod (PS, K)
  PPP value
};
If (PPP Rule Type == 2)
{
  GPT offset (x), length (y), and value (s)
  PPP value
};
If (PPP Rule Type == 3)
{
  rate range (e.g. kbps): [min, max]
  PPP range: [min, max]
}.

In the example of Table 1.1-1, the (app) packet size range in PPP Rule type 0 includes a minimum (min) and maximum (max) size or length of the packet to be transmitted that corresponds to a respective PPP value. For example, the PPP configuration may indicate a first packet size range that corresponds to a first PPP value, a second packet size range that corresponds to a second PPP value, and so forth to a first PPP value, an L-th packet size range that corresponds to a L-th PPP value.

The (app) packet size coding of PPP Rule type 1 refers to a determined code based on the packet size. In the example of Table 1.1-1, the packet size code is based on a modulo operation using the packet size PS and the number of priority levels L yielding a modulus (the modulus being the remainder of the Euclidean division of PS by L). Additionally or alternatively, other coding schemes can be used such as, for example, exclusive OR (XOR), Reed Soloman coding, polar coding, low density parity check coding (LDPC), tail biting convolutional coding, turbo coding, etc.). An additional or alternative rule can be based on a particular modulation coding scheme of an underlying RAT being used to transmit the packet.

The GPT parameters of PPP Rule type 2 refer to the GPT offset (x), length (y), value (s), and/or other parameters discussed infra. The rate range of PPP Rule type 3 refers to a data rate being used to transmit and/or receive packets, and in this example, is expressed in kilobits per second (kbps).

In some implementations, at operation 704 the MX Peer 1 (e.g., MAMS (GMA) client 101) sends an mx_ppp_config_rsp message. The mx_ppp_config_rsp message may include an acknowledgement of receipt of the mx_ppp_config_req message, and/or may include the same or similar content as the mx_ppp_config_req message.

Additionally or alternatively, the mx_ppp_config_req message (or mx_ppp_config_rsp message) can include some or all of the aforementioned information. For example, an updated PPP configuration may be included in the mx_ppp_config_req/rsp message that only includes values/rules to-be-updated with respect to an original (or previous) PPP configuration. In some implementations, the MX server 140 (or Gs 1440) updates the PPP configuration whenever the MX server 140 (or Gs 1440) detects any changes such as, for example, detecting a new QoS flow with PPP, detecting existing flows with updated PPP, detecting traffic congestion and/or overload conditions at the MX server 140 (or Gs 1440), the MX client 101 (or Gc 1401), and/or the NAN 130, and/or based on other conditions/criteria. Additionally or alternatively, one or more interfaces/APIs between the applications and MX server 140 (or Gs 1440) can be used to provide the PPP configuration from an application (e.g., edge app) to the MX server 140 (or Gs 1440). This interface/API could be the intra-flow classification API discussed infra with respect to FIG. 9. Additionally or alternatively, the ETSI MEC Traffic Management APIs (see e.g., FIG. 28) can be used for this purpose.

After the MX PPP configuration, at operation 705 the MX Peer 1 (e.g., MAMS client 101) applies the PPP configuration performs PPP marking based on the provided PPP mapping rule(s) (e.g., based on the information contained in the mx_pp_config_req), and the MX Peer 2 (e.g., MAMS (GMA) server 140) performs PPP marking for DL traffic based on the same or similar PPP mapping rule(s). In some implementations, the PPP marking is performed at the GMA layer of each MX Peer. Additionally or alternatively, the intermediary node (e.g., access network (AN) 110, NAN 111, router, gateway, etc.) performs PPP-based queue management when congestion occurs at operation 707. Additionally or alternatively, where the PPP configuration is an update of an existing or previous PPP configuration, the MX Peer 1 (e.g., MAMS client 101) applies the updated PPP configuration to new or existing traffic/flows (or sub-flows within new or existing flows).

At operation 706, the CCM (or NCM) (e.g., the MX Peer 1 (e.g., MAMS (GMA) client 101) sends a confirmation (or rejection) in an mx_capability_ack message. The content and other aspects of the mx_capability_ack message is discussed infra in section 1.4 below.

If the NCM (or CCM) receives an MX_REJECT, the current MAMS session will be terminated. If the CCM (or NCM) can no longer continue with the current capabilities, may send an MX Session Termination Request to terminate the MAMS session. In response, the NCM (or CCM) may send an mx_session_termination_rsp to confirm the termination. Additionally or alternatively, the MX Peer 1 (client 101) sends an mx_up_setup_conf_cnf message. This message may be included with the ACK message or sent as a separate message.

After the mx_capability_ack and/or mx_up_setup_conf_cnf message(s), data transfers may take place between the MX peers, where PPP is performed based on the value of the PPP field in the GMA trailer/header. In some embodiments, the PPP may be triggered or initiated when congestion is detected at the MX Peer 1 (client 101), the NAN 111, or the MX Peer 2 (server 140).

1.2. Intra-Flow Classification Mechanisms

Recently, the need to improve latency has been introduced for real time application such as gaming, robotics, and industrial automation. Inter-flow packet classification and Quality of Service (QoS) marking become increasingly important to provide differentiated service and support for these time-sensitive packet delivery in wireless networks.

Figure 8:
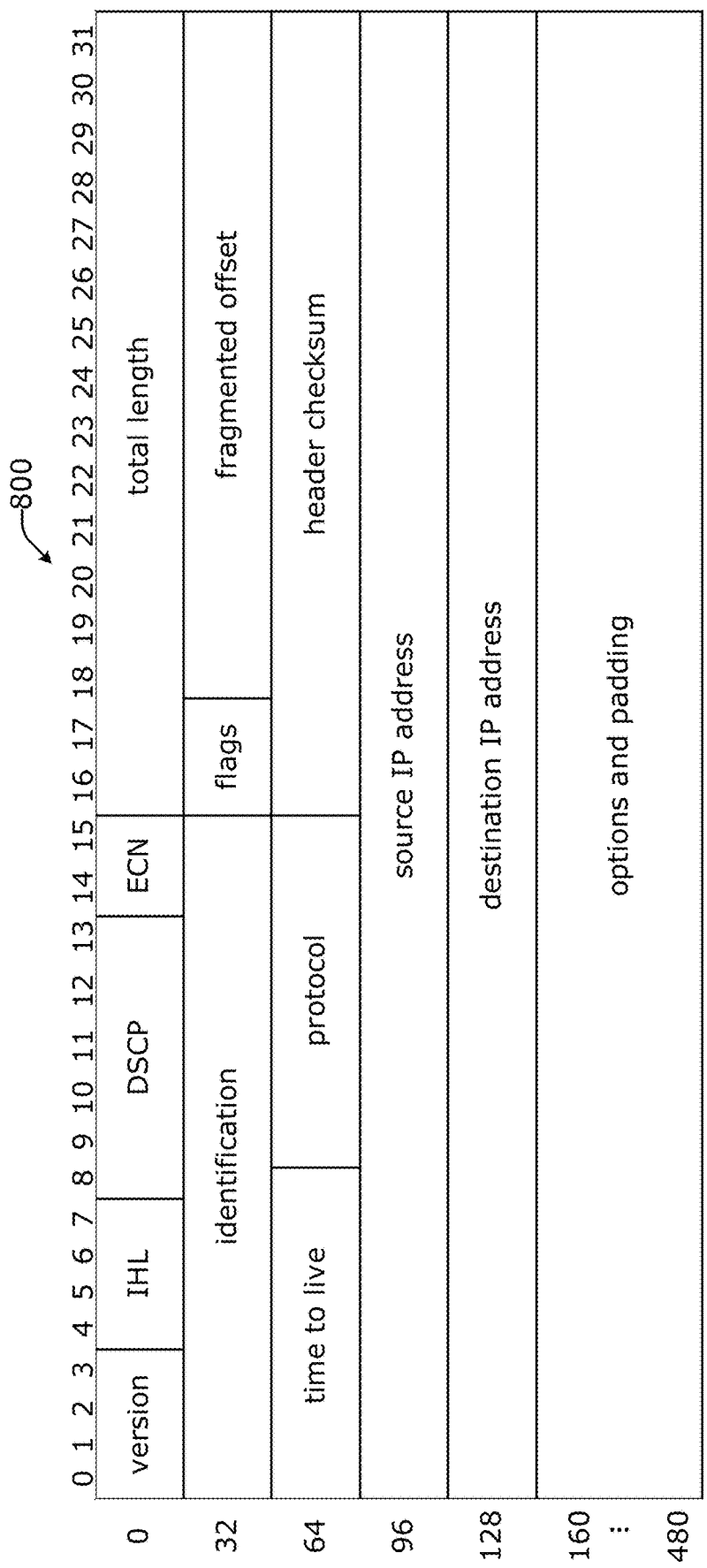
FIG. 8 illustrates an example Internet Protocol (IP) packet header format.

FIG. 8 shows a logical representation of the information that is used at the IP layer to enable the delivery of electronic data (e.g., the IP header 800). The header 800 contains information used to route data over a network (e.g., WLAN, the Internet, etc.) and has the same format regardless of the type of data being sent. The fields in the IP header and their descriptions are as follows.

Version—A 4-bit field that identifies the IP version being used (e.g., IPv4, IPv6, etc.); for Ipv4 the value in this field is always equal to 4.

Internet Header Length (IHL)—The IHL field contains the size of the IPv4 header, it has 4 bits that specify the number of 32-bit words in the header. The minimum value for this field is 5, which indicates a length of 5×32 bits=160 bits=20 bytes. As a 4-bit field, the maximum value is 15, this means that the maximum size of the IPv4 header is 15×32 bits=480 bits=60 bytes. Differentiated Services Code Point (DSCP)—Originally defined as the type of service (ToS) field, this field specifies differentiated services (DiffServ) per Nichols et al., "Definition of the Differentiated Services Field (DS Field) in the IPv4 and IPv6 Headers", IETF RFC 2474 (December 1998) and/or Fairhurst, "Update to IANA Registration Procedures for Pool 3 Values in the Differentiated Services Field Codepoints (DSCP) Registry", IETF RFC 8436 (August 2018).

Explicit Congestion Notification (ECN)—This field is defined in Ramakrishnan et al., "The Addition of Explicit Congestion Notification (ECN) to IP", IETF RFC 3168 (September 2001) and/or Black, "Relaxing Restrictions on Explicit Congestion Notification (ECN) Experimentation", IETF RFC 8311 (January 2018) and allows end-to-end notification of network congestion without dropping packets. ECN is an optional feature available when both endpoints support it and effective when also supported by the underlying network.

Total Length—This 16-bit field defines the entire packet size in bytes, including header and data. The minimum size is 20 bytes (header without data) and the maximum is 65,535 bytes. All hosts are required to be able to reassemble datagrams of size up to 576 bytes, but most modern hosts handle much larger packets. Links may impose further restrictions on the packet size, in which case datagrams must be fragmented. Fragmentation in IPv4 is performed in either the sending host or in routers. Reassembly is performed at the receiving host.

Identification—This field is an identification field and is primarily used for uniquely identifying the group of fragments of a single IP datagram.

Flags—A three-bit field follows and is used to control or identify fragments. They are (in order, from most significant to least significant): bit 0 (Reserved; must be zero); bit 1 (Don't Fragment (DF)); and bit 2 (More Fragments (MF)). If the DF flag is set, and fragmentation is required to route the packet, then the packet is dropped. This can be used when sending packets to a host that does not have resources to perform reassembly of fragments. It can also be used for path maximum transmission unit discovery (PMTUD), either automatically by the host IP software, or manually using diagnostic tools such as ping and/or traceroute. For unfragmented packets, the MF flag is cleared. For fragmented packets, all fragments except the last have the MF flag set. The last fragment has a non-zero Fragment Offset field, differentiating it from an unfragmented packet.

Fragment offset—This field specifies the offset of a particular fragment relative to the beginning of the original unfragmented IP datagram in units of eight-byte blocks. The first fragment has an offset of zero. The 13 bit field allows a maximum offset of $(2^{13}-1) \times 8=65,528$ bytes, which, with the header length included (65,528+20=65,548 bytes), supports fragmentation of packets exceeding the maximum IP length of 65,535 bytes.

Time to Live (TTL)—An eight-bit TTL field limits a datagram's lifetime to prevent network failure in the event of a routing loop. The TTL value in the TTL field is specified in seconds, and time intervals less than 1 second are rounded up to 1. In practice, the field is used as a hop count-when the datagram arrives at a router, the router decrements the TTL field by one. When the TTL field hits zero, the router discards the packet and typically sends an Internet Control Message Protocol (ICMP) time exceeded message to the sender. The program traceroute sends messages with adjusted TTL values and uses these ICMP time exceeded messages to identify the routers traversed by packets from the source to the destination.

Protocol—This field defines the protocol used in the data portion of the IP datagram.

Header Checksum—the 16-bit header checksum field is used for error-checking of the header. When a packet arrives at a router, the router calculates the checksum of the header and compares it to the checksum field. If the values do not match, the router discards the packet. Errors in the data field must be handled by the encapsulated protocol. Both UDP and TCP have separate checksums that apply to their data. When a packet arrives at a router, the router decreases the TTL field in the header. Consequently, the router must calculate a new header checksum.

Source IP Address—This field contains the IP address of the sender of the packet. This address may be changed in transit by a network address translation device.

Destination IP Address—This field contains the IP address of the intended recipient of the packet. This address may be changed in transit by a network address translation device.

Options and Padding—A field that varies in length from 0 to a multiple of 32-bits. If the option values are not a multiple of 32-bits, 0s are added or padded to ensure this field contains a multiple of 32 bits.

In general, QoS mechanisms include classification and marking mechanisms, policing and shaping mechanisms, congestion management mechanisms, and congestion avoidance mechanisms. The classification and marking mechanisms identify a priority assigned to individual packets and/or flows. Usually, packets are classified and marked after entering a system via an ingress interface. Then, the policing and shaping mechanisms may drop some of the packets. Then, the packets will be categorized again according to their marks. The congestion management and congestion avoidance mechanisms give different priorities to different types of packets so that the packets of higher priority can pass the gateway earlier in case of network congestion. Finally, the system will send packets which have been processed by QoS mechanisms out from one or more egress interfaces.

Inter-flow packet classification is a mechanism that allows applications to specify the QoS classification for a flow, for example, through the DSCP/ToS header field in the IP header 800, so that a transmitting (Tx) device can schedule its delivery accordingly. However, intra-flow classification mechanisms are lacking in existing networking technologies.

A previous solution proposed classifying intra-flow packets through a "Total Length" IP header field (e.g., packet size). However, it may not be feasible or desirable for applications to change packet size for the purpose of classification because of the complexity and resource usage required for such solutions.

The present disclosure provides intra-flow classification mechanisms. In embodiments, applications/devices can classify packets in the same flow based on the payload fields of one or more packets. The present disclosure defines a Generic Packet Type (GTP) field in the application payload such that the application can use this new field to indicate QoS requirements of a packet, flow, stream, etc. (e.g., maximum tolerable delay, priority, etc.). The embodiments herein provide packet formats and protocols for next generation Time Sensitive Networking (TSN) technologies, which can be used to provide low latency delivery for time sensitive applications, such as gaming, robotics, drones, and industrial automation. The embodiments herein provide also allow packets to be delivered in a time-sensitive manner which improves computing and network/signaling resource usage (e.g., by reducing resource consumption/overhead). Furthermore, the embodiments herein can be implemented in edge computing frameworks such as any of those discussed herein.

Referring back to the GTP packet 603 of FIG. 6, which includes, inter alia, a network layer header (e.g., IP header, and/or the like), a transport layer header (e.g., TCP header, UDP header, and/or the like), and an application payload section. The application payload section includes a GTP field. Usually, IP flows can be classified by the following five parameters: IP source address, IP destination address, transport protocol type (e.g., UDP, TCP, etc.), UDP/TCP source port, and UDP/TCP destination port. For IPv6 packets, a 3-tuple of a flow label, source address, and destination address fields can be used for flow classification.

In embodiments, the GPT field is used to further classify traffic or packets in a flow. This further classification of traffic or packets in a flow may be referred to as "intra-flow classification", where the traffic or packets are classified as belonging to sub-flows (i.e., where multiple sub-flows make up a data or traffic flow). The format and value(s) of the GTP field is/are not fixed and can be determined by individual applications. In some implementations, the GPT field includes the following parameters:

Offset (x): a number of bits/bytes from the end of a header (e.g., transport layer header as shown by FIG. 6) to the start of the GPT field, which is used to indicate the location of the GPT field;

Length (y): the number of bits/bytes of the GPT field (e.g., a size/length of the GPT field);

Value (s): the value of the GPT field in the format of an unsigned integer; and

QoS Class (c): the QoS class or packet type of the packet.

Here, an application can flexibly determine where the GPT field is located in the payload as well as the length of the field. The application may also determine the mapping between the value of the GTP field and the QoS class or packet. For example, the application may provide (x, y, s) and (s, c) to the system/device through an application programming interface (API), for example, a GTP intra-flow classification API (see e.g., FIG. 9).

Figure 9:
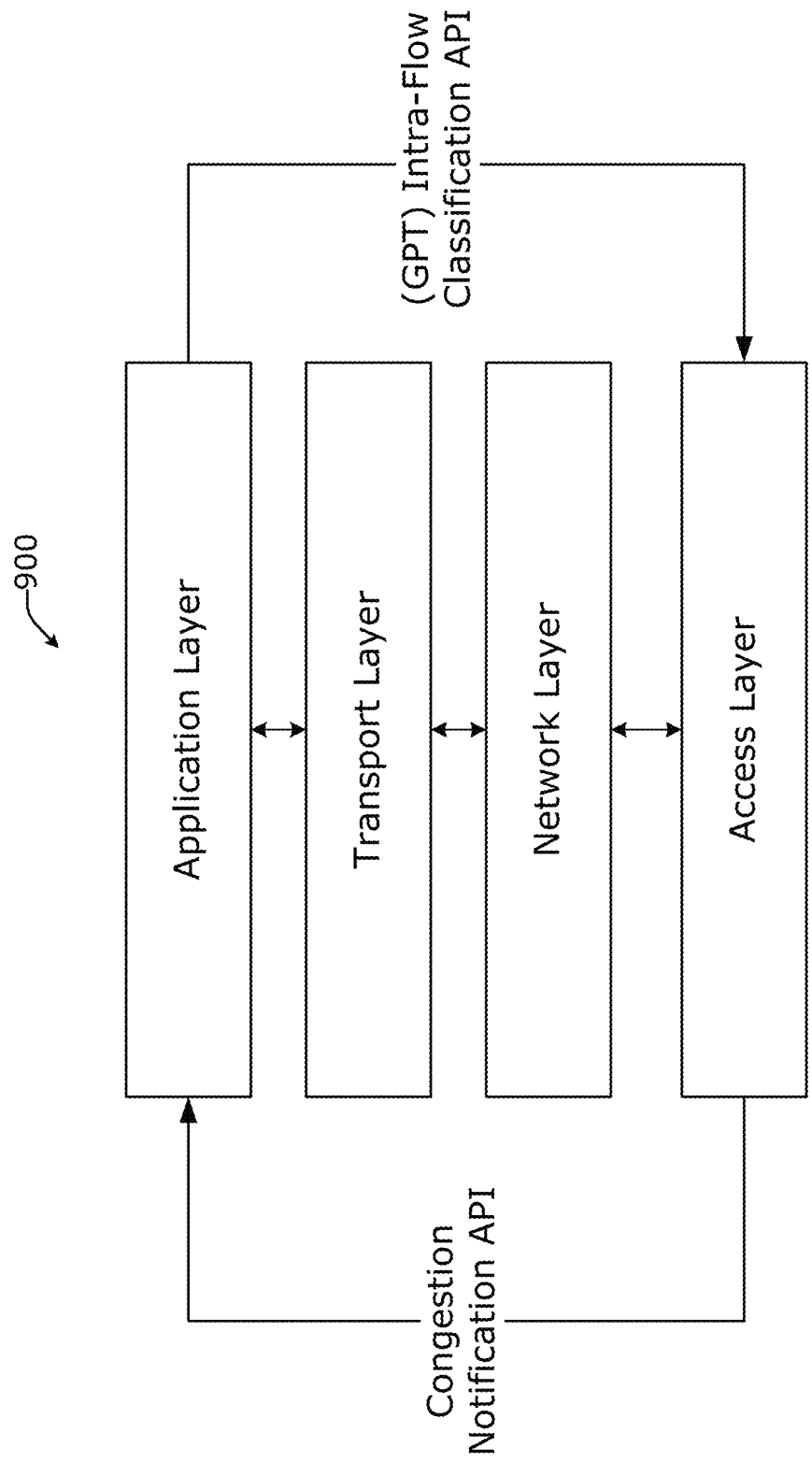
FIG. 9 depicts a GTP-based Intra-Flow Classification Protocol Stack.

FIG. 9 depicts a GTP intra-flow classification protocol stack 900. The protocol stack 900 may be implemented by an active queue management (AQM) entity of an MX compute node, such as an MX client 101, an access network 110 (or a compute node therein), a NAN 111, an MX server 140, a core network 150A (or a compute node therein), and/or an FA-GW/Core 150B (or a compute node therein) of FIG. 1; client 201, access networks 231 (or a compute node therein), MAMS system 235 (or a compute node therein), and/or core networks 241 (or a compute node therein) of FIG. 2; GMA Tx entity 510 and/or GMA Rx 511 of FIG. 5; and/or any other devices/systems discussed herein. The protocol stack 900 is based in part on a cross-layer architecture discussed in J. Zhu et al., "Improving QoE for Skype Video Call in Mobile Broadband Network", IEEE Globecom (2012) ("[ZHU01]"), which is hereby incorporated by reference in its entirety.

The protocol stack 900 includes an application layer, a transport layer (e.g., TCP, UDP, QUIC, etc.) layer, a network layer (e.g., IP, etc.), and an access layer. The transport and network layers may be the same or similar as discussed previously. The access layer may include one or more sub-layers, and the access layer may be specific to a particular access technology and/or Radio Access Technology (RAT) being implemented (e.g., WiFi, WiMAX, LTE, 5G/NR, Ethernet, etc.). For example, the access layer may correspond to the link layer of the internet protocol suite, and/or may correspond to the data link layer and/or the physical (PHY) layer of the OSI model. Additionally or alternatively, the access layer may include the convergence layer and the link layer of the protocol stack 400 of FIG. 4. Additionally or alternatively, the access layer may include a medium access control (MAC) layer and a PHY layer, which may be based on the different RAT circuitries implemented by the MX compute node. Additionally or alternatively, the access layer may include a GMA convergence layer, the transport layers, network layers, and the RAT layers in the protocol stacks 1700c, 1700d, and/or 1700e shown by FIG. 17 (here, the network layer and the transport layer in FIG. 9 correspond to the Net-3 and Transport-3 layers the protocol stack 1700c or 1700d, or the network layer and the transport layer in FIG. 9 correspond to the Net-1 and Transport-1 layers the protocol stack 1700e).

The protocol stack 900 also includes anew interface that is added between application layer and the access layer to provide direct communication between the application layer and an access layer. This interface includes the intra-flow classification API and the congestion notification API.

The congestion notification API carries congestion notifications from the access layer to the application layer. In some implementations, the congestion notification is a binary flag that indicates if the access network is experiencing congestion or not. The congestion notifications are provided by the access layer to the application layer. The application layer uses the congestion notification to reduce its source rate to alleviate network congestion. Additionally or alternatively, the application layer uses the congestion notifications to perform AQM (e.g., as discussed infra).

The intra-flow classification API carries intra-flow priority/classification information from the application layer to the access layer. The intra-flow priority/classification information may include an identifier added or otherwise included in a packet that identifies a sub-flow to which it is classified based on its priority. Here, packets belonging to the same flow are uniquely identified by its network layer parameters (e.g., source IP address, destination IP address, source port number, destination port number, and protocol type for an IP packets of an IP flow) are further classified into sub-flows based on its priority. Additionally or alternatively, packets belonging to the same flow are uniquely identified by other parameters of the flow such as, for example, application parameters, transport layer parameters, and/or the like. The intra-flow priority/classification information is/are provided by the application layer to the access layer. The access layer uses the intra-flow priority/classification information to better schedule packets when congestion happens (e.g., based on detection of a congestion or overload event/condition). Additionally or alternatively, the access layer uses the intra-flow priority/classification information to prioritize certain packets over other packets, and/or to perform AQM (e.g., as discussed infra).

The intra-flow classification API may be a GPT intra-flow classification API, which allows applications in the applications layer to communicate with the access layer to provide payload-based classification rules/policies. The GPT intra-flow classification API is a new out-band signal or interface between the application layer and communication devices in the access layer to deliver the GPT-based intra-flow classification rules/policies/configurations. The GPT intra-flow classification API allows individual applications to specify the format of the GPT field (see e.g., packet 603 of FIG. 6) through the combination of bit/byte offset (x) and length (y). The intra-flow classification rules/policies may include flow classification information (e.g., for an IP flow or subflow), a GPT offset (x), GPT length (y), and GPT QoS class mapping (c).

Various QoS class values (c) can be predefined or configured (e.g., using the PPP configuration discussed previously and/or a separate GPT configuration). For example, "c=0" may be defined as the default class without any specific QoS requirement, and "c=1" may be defined as a high-priority class with maximum tolerable delay of, for example, 10 milliseconds (ms). Then, the application can provide, through the GPT intra-flow classification API, a map (or configuration) mapping s="0~100" to "c=0" and s=">100" to "c=1". Additionally or alternatively, the QoS classes may be the same or similar as the QoS Flow IDs (QFIs) and/or 5G QoS Identifier (5QI) as defined for 3GPP 5G systems as discussed in 3GPP TS 23.501 v 17.1.1 (2021 Jun. 24) and/or 3GPP TS 38.300 v16.6.0 (2021 Jul. 6). Additionally or alternatively, other QoS classes/classifications can be used. In any of these implementations, the application can at least include (or provide) the following information via the GPT intra-flow classification API.

Intra-flow classification information: information used to identify a flow and/or subflows making up the flow (e.g., network address (e.g., IP address, etc.), protocol type, port number(s), app ID, session ID, etc.)
GPT offset (x)
GPT length (y)
GPT QoS mapping:
  Number of QoS Classes
  For each QoS Class, include:
  A QoS class value (c)
  A GPT value range (s)

Individual applications can provide a GTP configuration or other suitable data structure with the above information to the access layer over the GPT intra-flow classification API. Additionally or alternatively, the GPT intra-flow classification API can be used to provide the PPP configuration discussed previously to the access layer (e.g., from an application in the application layer to Gc 1401 or Gs 1440 in the access layer) and/or to other entities (e.g., from MX server 140 (or Gs 1440) to MX client 101 (or Gc 1401)). Additionally, although the above embodiments are described for marking flows and subflows, the embodiments herein are also applicable to data streams, and the like. The embodiments of FIG. 9 may be used with the PPP mechanisms discussed previously in section 1.1 and/or the embodiments discussed infra with respect to section 1.3.

1.3. PPP-Based Active Queue Management (AQM)

Modem applications/transport protocols, such as QUIC, encapsulate multiple traffic streams into one flow. For example, voice and video streams may be multiplexed into one video conference flow. Traditional traffic management techniques, such as IP differentiated services based on DSCP is a popular approach to manage network traffic and provide QoS. However, the traditional traffic management techniques operate on the flow level, and therefore, cannot fulfill the different QoS requirements of individual streams that are multiplexed into one flow.

The present disclosure provides Active Queue Management (AQM) techniques for traffic streams that are multiplexed into one flow. AQM, at least in some embodiments, refers to a policy of dropping packets inside a buffer associated with access layer circuitry (e.g., network interface controller (NIC) and/or radio transceiver circuitry for one or more RATs) before that buffer becomes full, often with the goal of reducing network congestion or improving end-to-end (e2e) latency. In some implementations, AQM tasks are performed by a network scheduler (also referred to as a packet scheduler, queuing algorithm, and/or the like) and/or a convergence layer entity (the term "AQM entity" as used herein may refer to a network scheduler, a convergence layer entity, and/or some other like entity that performs/ executes AQM tasks). In embodiments, new packet level QoS metrics are assigned to traffic streams that are multiplexed into one flow. These QoS metrics include per packet priority (PPP) (e.g., as discussed previously) and/or delay bound, which are determined by the sender or network edge based on traffic type. The QoS metrics can be carried in a suitable field of a network packet such as the DSCP field, or carried in a control header such as the convergence protocol of GMA (see e.g., [GMA10]). When congestion happens at a network device (e.g., the MX client 101, access network 110 (or a compute node therein), NAN 111, MX server 140, core network 150A (or a compute node therein), and/or FA-GW/Core 150B (or a compute node therein) of FIG. 1; client 201, access networks 231 (or a compute node therein), MAMS system 235 (or a compute node therein), and/or core networks 241 (or a compute node therein) of FIG. 2; GMA Tx entity 510 and/or GMA Rx 511 of FIG. 5; GW 1420A-1420B and/or NAT/Firewall gateway 1450 of FIG. 14; UEs 2011, 2021a, NANs 2031-2033, edge compute nodes 2036, CN 2042 (or compute node(s) therein), and/or cloud 2044 (or compute node(s) therein) of FIG. 20; central office 2120, NAN 2140, local processing hub 2150, and/or data sources 2160 of FIG. 21; any of the devices shown and described with respect to FIGS. 22-28; processor platform(s) 2900 and/or distribution platform 2905 of FIG. 29; compute node 3000 of FIG. 30; and/or any other devices/systems discussed herein), an AQM entity drops the packets with lower priority (e.g., video) first to protect more important packets (e.g., voice) in the same flow. In these ways, the new packet level QoS metrics improve the QoS for end users.

For purposes of the present disclosure, the following terms/variables may be used:
L—Number of priority levels (e.g., 3).
P—priority value within the range of [0, L−1]. A smaller P represents a higher priority, for example, P=0 is the highest priority and P=1 is the lowest priority. In some implementations, the aforementioned PPP value may correspond to this P value.
W(P, L)—Weighting function based on P and L. W(P, L) can be any function that increases as P decreases. One example is a linear function W(P, L)=1−(P/L).
D—Queuing delay of the dequeued packet, which could be the delay of current AQM entity/network device or accumulated delay in multi-hop scenario.
T—Per packet delay bound. In some implementations, an application can set T=0 as a default if the delay limit is disabled. If T equals zero or is greater than the AQM entity/network device's queuing delay bound $T_{DEV}$, then $T=T_{DEV}$.
N—Queue size limit.
Q—Current queue size. For enqueuing, Q includes the new packet that will be inserted to the end of the queue.

The queue management mechanisms described infra are based on packet level QoS Metrics: per packet priority P and (optionally) a delay bound T. P and T can be configured by the application at the sender/transmitter or at the network edge (e.g., edge compute node 2036). In various embodiments, P is set to zero by default and is increased as the importance of that packet decreases. T equals to zero if delay limit is disabled. Otherwise, the application sets T based on the requirement of the traffic stream. When congestion happens in or at a network device, the network device (or its AQM entity) drops packets with lower priority and delivers more important (higher priority) packets. Moreover, packets that violate the delay bound T are always dropped. If a packet carries a single traffic stream, the packet level QoS metrics is based on the traffic type. However, if multiple traffic streams are multiplexed in one packet, P equals the lowest P (highest priority) of all traffic streams and T equals the minimal delay limit of all traffic streams.

1.3.1. Early Dropping Based on Weighted Queue Size Limit

Figure 10:
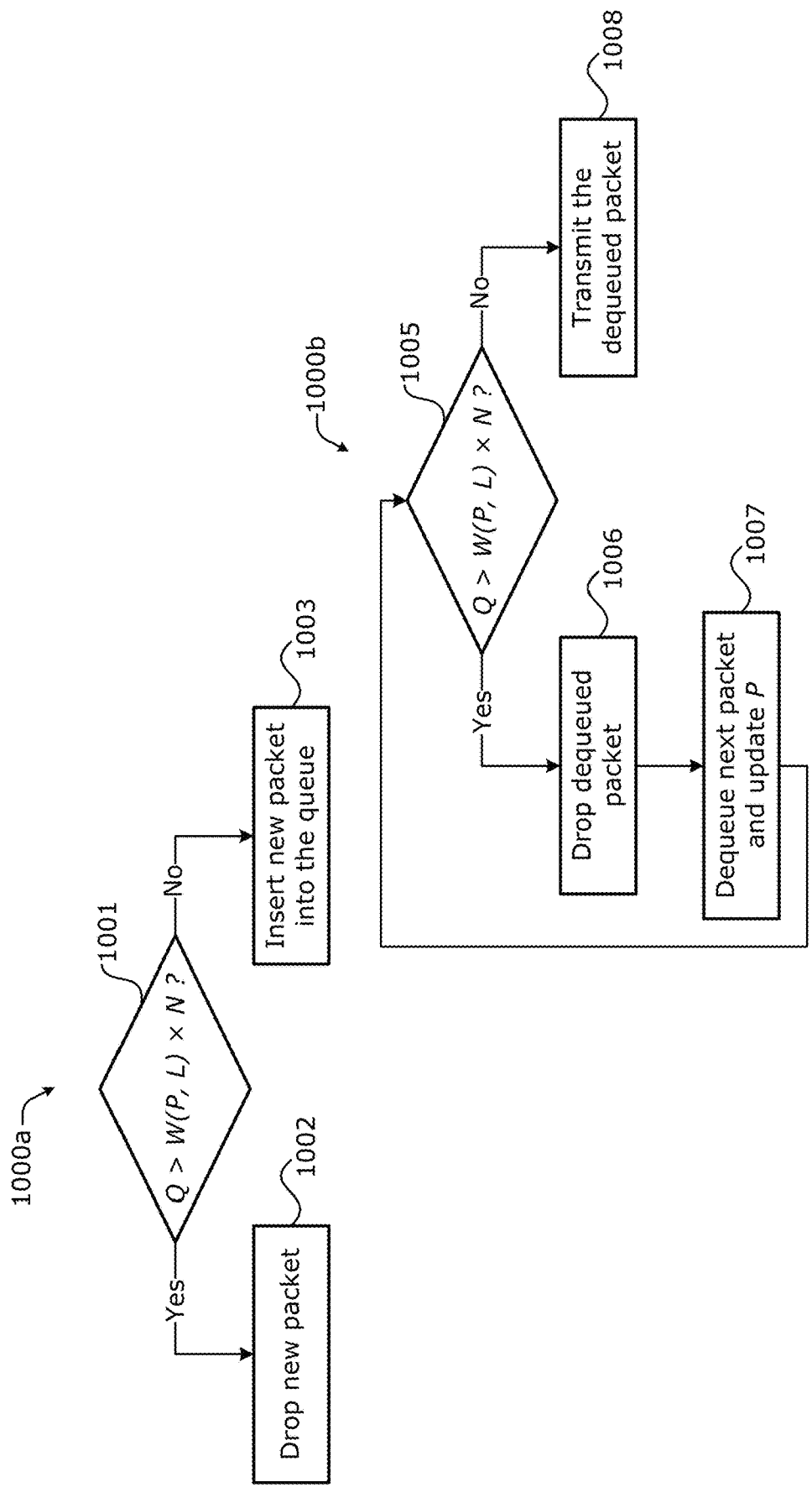
FIGS. 10, 11, 12, and 13 show example processes for performing PPP-based active queue management (AQM).

Upon enqueuing/dequeuing a packet, a weighted queue size limit is computed based on the per packet priority P. The packet is dropped if the current queue size is greater than a weighted queue size limit, which may be expressed as follows: Q>W(P, L)×N. When congestion happens in or at a network device, the network device (or its AQM entity) protects important packets by early dropping packets with lower priority than other packets in a particular queue. In other words, packets with lower priority are dropped even if the queue is not fully occupied. For example, when queue size Q=W(P*, L)×N packets with P>P* will be dropped. FIG. 10 shows example processes for AQM based on weighted queue size limit including an example enqueuing process 1000a and an example dequeuing process 1000b. Processes 1000a and 1000b may be performed by an AQM entity of a network device such as the devices/systems discussed herein.

Referring to the enqueuing process 1000a, upon enqueuing a new packet with priority P, if at operation 1001, Q>W(P, L)×N, then the new packet is dropped at operation 1002. Otherwise, the new packet is inserted into the end of the queue at operation 1003.

Referring to the dequeuing process 1000b, upon dequeuing a new packet with priority P, while Q>W(P, L)×N (operation 1005), drop the dequeued packet at operation 1006, and dequeue another packet and update P at operation 1007; else transmit the last dequeued packet at operation 1008.

Example pseudocode for the processes 1000a and 1000b is shown by Table 1.3.1-1.

TABLE 1.3.1-1

Upon enqueuing/dequeuing a new packet with priority P:
Enqueue:
  if Q > W(P, L) × N:
    drop the new packet;
  else insert the new packet into the end of the queue.
Dequeue:
  While Q > W(P, L) × N:
    drop the dequeued packet;
    dequeue another packet and update P;
  else transmit the last dequeued packet.

1.3.2. Early Dropping Based on Weighted Queuing Delay Limit

Some devices, such as WiFi stations, deploy a queuing delay-based drop policy. If the queuing delay of a dequeued packet is larger than a delay bound (e.g., $D>T_{DEV}$), the device drops this packet and dequeues a new one. This process may be repeated multiple times until the dequeued packet meets the delay requirement $T_{DEV}$. One limitation of this approach is that the $T_{DEV}$ is a single threshold set to all packets in the queue, which cannot meet the individual demands of different traffic types.

Figure 11:
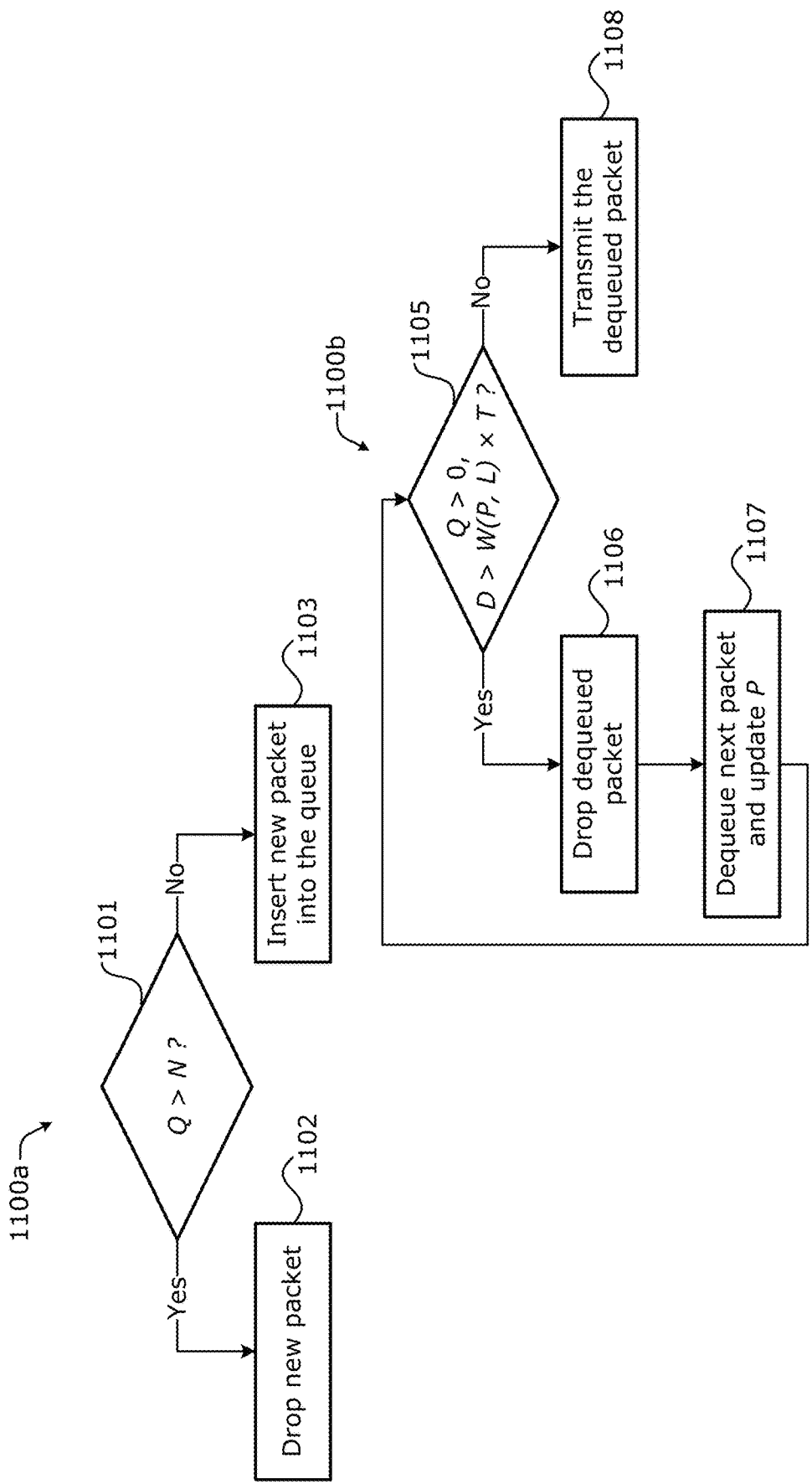

Here, an enhanced AQM is based on the weighted queuing delay limit, which is expressed as follows: W(P, L)×T, where T is configured by the application at the sender or network edge. If T equals zero or is greater than the delay limit of a network device $T_{DEV}$, then T equals $T_{DEV}$. When congestion happens, D increases and packets with lower priority will be dropped first. As D keeps increasing, packets with higher priority will also be dropped. Eventually, when D>T, all packets will be dropped. For example, when queuing delay D=W(P*, L)×T, packets with P>P* will be dropped. For multi-hop scenarios, the queuing delay D accounts for the accumulated queuing delay of traversed hops. FIG. 11 shows example processes for AQM based on weighted queue delay limit including an example enqueuing process 1100a and an example dequeuing process 1100b. Processes 1100a and 1100b may be performed by an AQM entity of a network device such as the devices/systems discussed herein.

Referring to the enqueuing process 1100a, upon enqueuing a new packet with priority P, if at operation 1101, Q>N, then the new packet is dropped at operation 1102. Otherwise, the new packet is inserted into the end of the queue at operation 1103.

Referring to the dequeuing process 1100b, upon dequeuing a new packet with priority P, while Q>0 and D>W(P, L)×T (operation 1105), drop the dequeued packet at operation 1106, and dequeue another packet and update P at operation 1107; else transmit the last dequeued packet at operation 1108.

Example pseudocode for the processes 1100a and 1100b is shown by Table 1.3.2-1.

TABLE 1.3.2-1

Upon enqueuing/dequeuing a new packet with priority P:
Enqueue:
   if Q > N:
      drop the new packet;
   else insert the new packet into the end of the queue.
Dequeue:
   While Q > 0 and D > W(P, L) × T:
      drop the dequeued packet;
      dequeue another packet and update P;
   transmit the last dequeued packet.

1.3.3. Fairness for Weighted Queue Size and Weighted Queuing Delay AQM

The AQM techniques described in sections 1.3.1 and 1.3.2 apply early dropping based on packet level QoS metrics. However, if applications use different algorithms to assign QoS metrics to packets, a network device that deploys shared FIFO queue may cause fairness issues. For example, an application A that assigns P=0 to all packets will experience less packet loss compared to another application B that distributes P in the range of [0, L−1], since the network devices will drop packets belonging to application B first due to the lower priority.

This fairness issue can be addressed in multiple ways. For example, a network device (or its AQM entity) can deploy a per flow FIFO queue and a simple scheduling algorithm such as round robin. Additionally or alternatively, the network device (or its AQM entity) can also deploy a shared queue with a per flow queue size limit N(i) and N≥Σ$_i$ N(i). Consequently, despite using a shared queue, the network device (or its AQM entity) buffers a fair number of packets per flow when congestion happens. Moreover, the drop condition for the weighted queue size limit technique is also updated with the per flow states: Q(i)>W(P,L)×N(i), where Q(i) is the current queue size of flow i.

1.3.4. Prioritized Drop for AQM

The QoS metrics can be also used to enhance existing AQMs, such as random early detection (RED), adaptive RED (ARED), robust RED (RRED), stabilized RED (SRED), explicit congestion notification (ECN), controlled delay (CoDel), Packet First in First Out (PFIFO), Blue, Stochastic Fair Blue (SFB), Resilient SFB (RSFB), Random Exponential Marking (REM), modified REM (M-REM), RED with Preferential Dropping (RED-PD), Common Applications Kept Enhanced (CAKE), smart queue management (SQM), Proportional Rate-based Control (PRC), proportional integral (PI) controller, and/or the like. In these embodiments, upon a packet drop event, the prioritized AQM randomly selects a flow (e.g., the flow of the first packet in the queue) and within this flow, the packet with the lowest priority is dropped. If there are multiple packets assigned to the lowest priority, packet closet to the front of the queue is dropped. If the deployed queue can only remove packets from the front the queue, such as a FIFO queue, the packet to be dropped is marked accordingly and that packet is dropped when it is dequeued from the queue.

One concern of this technique is the high computation overhead from the comparison of the priority of buffered packets that belongs to the selected flow when congestion happens. However, most of the state-of-the-art AQMs, such as CoDel, only drop one or a few packets per interval; therefore will not trigger loss event too often. Moreover, the overhead may be negligible if most of the packets are labeled as low priority since the packet priority inspection can be terminated whenever a packet with the lowest priority (P=L−1) is found. Finally, the prioritized AQM does not cause any fairness problems compared to the original AQM since it randomly selects a flow to on which to perform the prioritized drop.

The present disclosure provides practical implementations of the prioritized AQM scheme that improves on the Weighted Queuing Delay Limit technique discussed previously, although such implementations may be applied to other AQMs as mentioned previously. The Weighted Queuing Size Limit and the Weighted Queuing Delay Limit techniques use a weighting function to map priority levels to weighted queue size/delay thresholds, which prefer when L is a small. However, as L increases, the weighting function becomes harder to tune. The following methods/techniques provide better performance and less configurable parameters to tune. The following methods/techniques also allows the application to change L dynamically. A list of the additional control parameters are as follows (only parameters T and C need to be tuned):

State variables shared by some or all flows:
   C—initial congestion detection threshold within a threshold range (e.g., where the range is [0.1, 0.9], the initial threshold C can be 0.6). The threshold C is a configurable value.
   A—high congestion detection threshold within a range (e.g., [m, C] where m is the minimum value of the range (e.g., 0.1)) initialized to C at the beginning of the algorithm. A may also referred to as an upper bound congestion detection threshold.
   B—congestion detection low threshold within a range (e.g., [m, A] where m is the minimum value of the range (e.g., 0.1)) initialized to A at the beginning of the algorithm. B may also referred to as a lower bound congestion detection threshold.

State variables per-flow:
  x(i)—the number of queued packets with priority P=i (e.g., where i=2, . . . , L−1). This records packet #starting from priority level=2.
  Y—the number of to-be dropped packets (not including packets with P=0).
  $MAX_D$—the maximum (max) measured queuing delay of dequeued packets in the last time interval (e.g., 100 ms).

Figure 12:
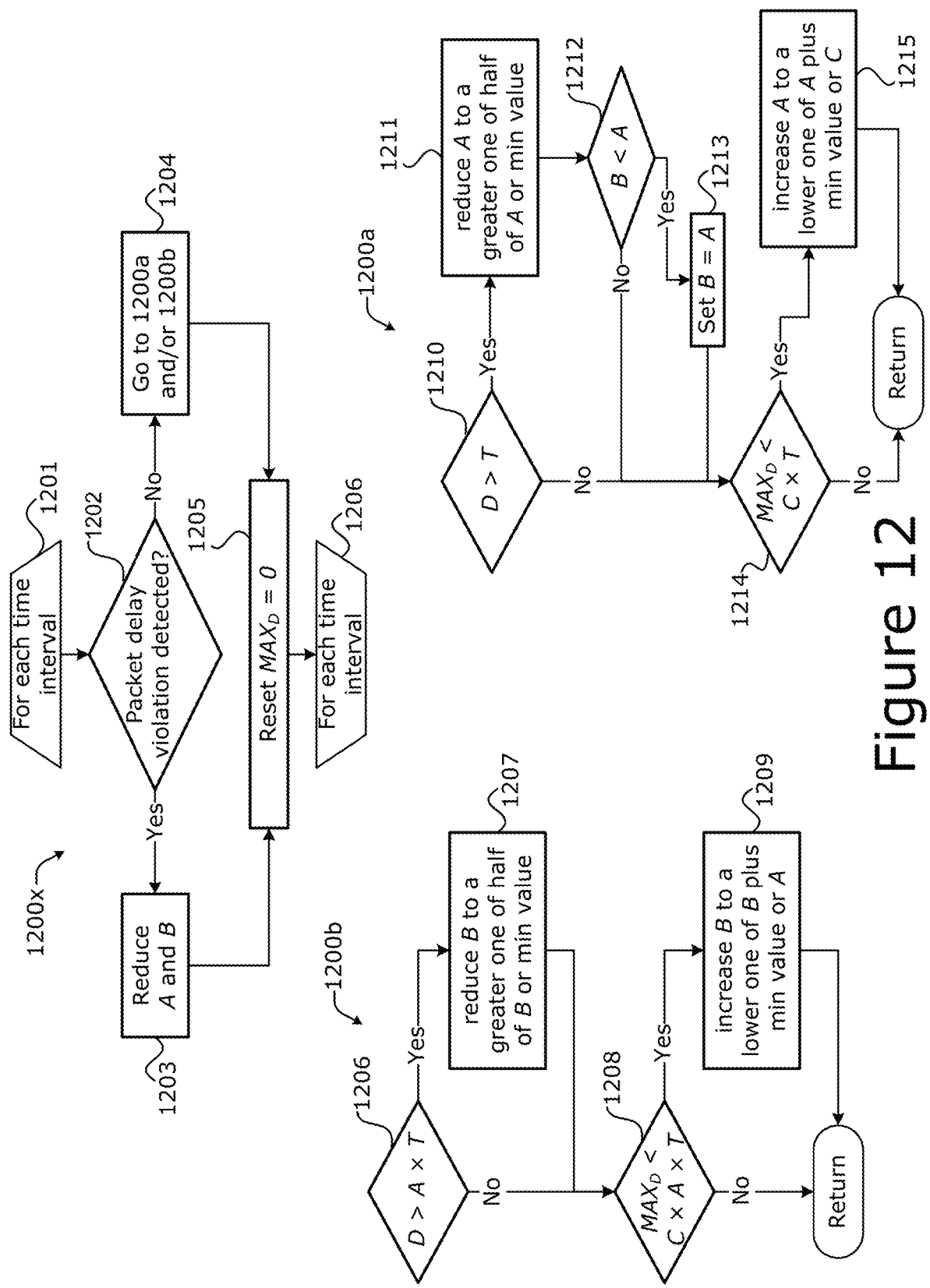

When a packet with priority P>1 is enqueued or dequeued, the number of queued packets is/are updated with the same priority x(P). Upon a light congestion event: D>B×T, packets in the queue are dropped according to their priority level (note that packets with P=0 are not dropped). In some implementations, packets are not dropped immediately. Instead, the network device (or its AQM entity) attempts to drop the same number of packets in the queue, but with lower priority. This is achieved by managing the state variable Y (referred to as a "drop parameter", "drop deficit", or the like). In other words, when there is a sufficient number of low priority packets in the queue, the drop parameter Y is increased and the dequeued packet(s) is/are transmitted. Otherwise, the drop parameter Y is decreased and the dequeued packet(s) is/are dropped. Upon a heavy congestion event: D>A×T, all packets with P>0 are dropped to protect the most important packets (i.e., packets with P=0). Furthermore, if D>T, dequeued packet(s) is/are dropped regardless of their priority. Moreover, whenever a packet is dropped, Y is reduced by 1 until Y=0. Additionally, the high and low congestion thresholds A and B are periodically updated, such that if high priority packets are dropped, the thresholds A and B are reduced to start dropping earlier. FIG. 12 shows example process 1200x for AQM prioritized dropping, which includes a low threshold B update process 1200a and a low threshold A update process 1200b. Process 1200x may be performed by an AQM entity of a network device such as the devices/systems discussed herein.

Process 1200x begins at open loop operation 1201 that repeats, for each time interval (e.g., 100 ms), the updating of congestion detection thresholds A and B as follows. Thresholds A and B is/are reduced (operation 1203), and proceeds to operation 1205, whenever a packet delay violation is detected (operation 1202). In some implementations, once threshold A and/or B is reduced, it cannot be reduced again in the current time interval and the following time interval. This prevents repeated reduces in a relatively short period. Additionally or alternatively, thresholds A and B will be increased at the end of the time interval if the maximum queuing delay is relatively low (e.g., at or below a predetermined threshold or the like). If a packet delay violation is not detected (operation 1202) and/or thresholds A and B is/are not reduced (operation 1203), then the AQM entity performs an update process for threshold A (process 1200a) and/or an update process for threshold B (process 1200b). After performing operation 1203 or 1204, the AQM entity proceeds to operation 1205 to reset the max measured queuing delay (e.g., set $MAX_D$=0) and then proceeds to close loop operation 1206 to repeat process 1200 for a next time interval. When there are no more time interval, process 1200 may end.

Referring to the low threshold B update process 1200b, if the queuing delay of the dequeued packet D is higher than the product of the high congestion detection threshold A and the per packet delay bound T (e.g., D>A×T) and B has not been reduced in the current and/or previous interval (1206), the AQM entity reduces the low threshold B until it equals a minimum value m (e.g., m=0.1) (1207). For example, if D>A×T and B is not reduced in the current and previous interval (1206), the AQM entity reduces the low threshold B to a greater one of half of B or a minimum value (e.g., B=max(B/2, m) where m is the minimum value (e.g., 0.1)) (1207). If the queuing delay D is not higher than the product of the high congestion detection threshold A and the per packet delay bound T (e.g., D≤A×T), and/or B has been reduced in the current and/or previous interval, and/or at the end of the time interval (1206), the AQM entity determines whether there is a low delay or not (1208). The AQM entity determines if there is low delay based on whether the max measured queuing delay of dequeued packets in the last time interval $MAX_D$ is lower than the product of the initial threshold C, the high congestion detection threshold A, and the per packet delay bound T (e.g., $MAX_D$≤C×A×T) (1208). If the low delay is not detected, the AQM entity returns back to process 1200x. If low delay is detected (e.g., $MAX_D$<C×A×T), then the AQM entity increases the low threshold B by a certain amount up to the high threshold A. For example, if $MAX_D$<C×A×T is true, then the AQM entity sets B to be a lower one of B plus the minimum value m (e.g., m=0.1) or the high threshold A (e.g., B=min(B+m, A)).

Referring to the high congestion threshold A update process 1200a, if the queuing delay of the dequeued packet D is higher than the per packet delay bound T (e.g., D>T) and A has not been reduced in the current and/or previous interval (1210), the AQM entity reduces the high threshold A until it equals a minimum value m (e.g., m=0.1) (1211). For example, if D>T and A is not reduced in the current and previous interval (1210), the AQM entity reduces the high congestion threshold A to a greater one of half of A or a minimum value (e.g., A=max(, m) where m is the minimum value (e.g., 0.1)) (1211). Then the AQM entity determines whether the high congestion detection threshold A is lower than the low congestion detection threshold B (e.g., B>A) (1212), and if so, the AQM entity sets the low congestion threshold B to be the same as the high congestion threshold A (e.g., B=A) (1213) and then proceeds to operation 1214.

Next, the AQM entity determines if there is low delay based on whether the max measured queuing delay of dequeued packets in the last time interval $MAX_D$ is lower than the product of the initial threshold C and the per packet delay bound T (e.g., $MAX_D$<C×T) (1214). If the low delay is detected, the AQM entity returns back to process 1200x. If low delay is detected (e.g., $MAX_D$<C×T), then the AQM entity increases the initial threshold C by a certain amount up to the initial threshold C. For example, if $MAX_D$<C×T is true, then the AQM entity sets A to be a lower one of B plus the minimum value m (e.g., m=0.1) or the high threshold A (e.g., A=min(A+m, C) where m is the minimum value (e.g., 0.1)).

Example pseudocode for process 1200x (including processes 1200A and 1200B) is shown by Table 1.3.4-1.

TABLE 1.3.4-1

For every time interval, update congestion detection threshold A and/or B as follows:
Low threshold B update conditions:
  if D > A × T and B is not reduced in current and previous interval:
    B = max(B/2, 0.1); //reduce Low threshold until it equals the min value 0.1.
      at the end of interval, if ($MAX_D$ < C × A × T) //Low delay
        B = min(B + 0.1, A). //increase Low threshold up to high threshold TABLE 1.3.4-1-continued High threshold A update condition:
   if D > T and A is not reduced in current and previous interval:
      A = max(A/2, 0.1); //reduce high threshoLd until it equals the min value 0.1.
      if B > A:
         B = A. //Low threshoLd is always Lower than high threshold
   at the end of interval, if (MAX$_D$ < C × T): //Low delay
      A = min(A + 0.1, C); //increase high threshold up to C
Reset: MAX$_D$ = 0

Figure 13:
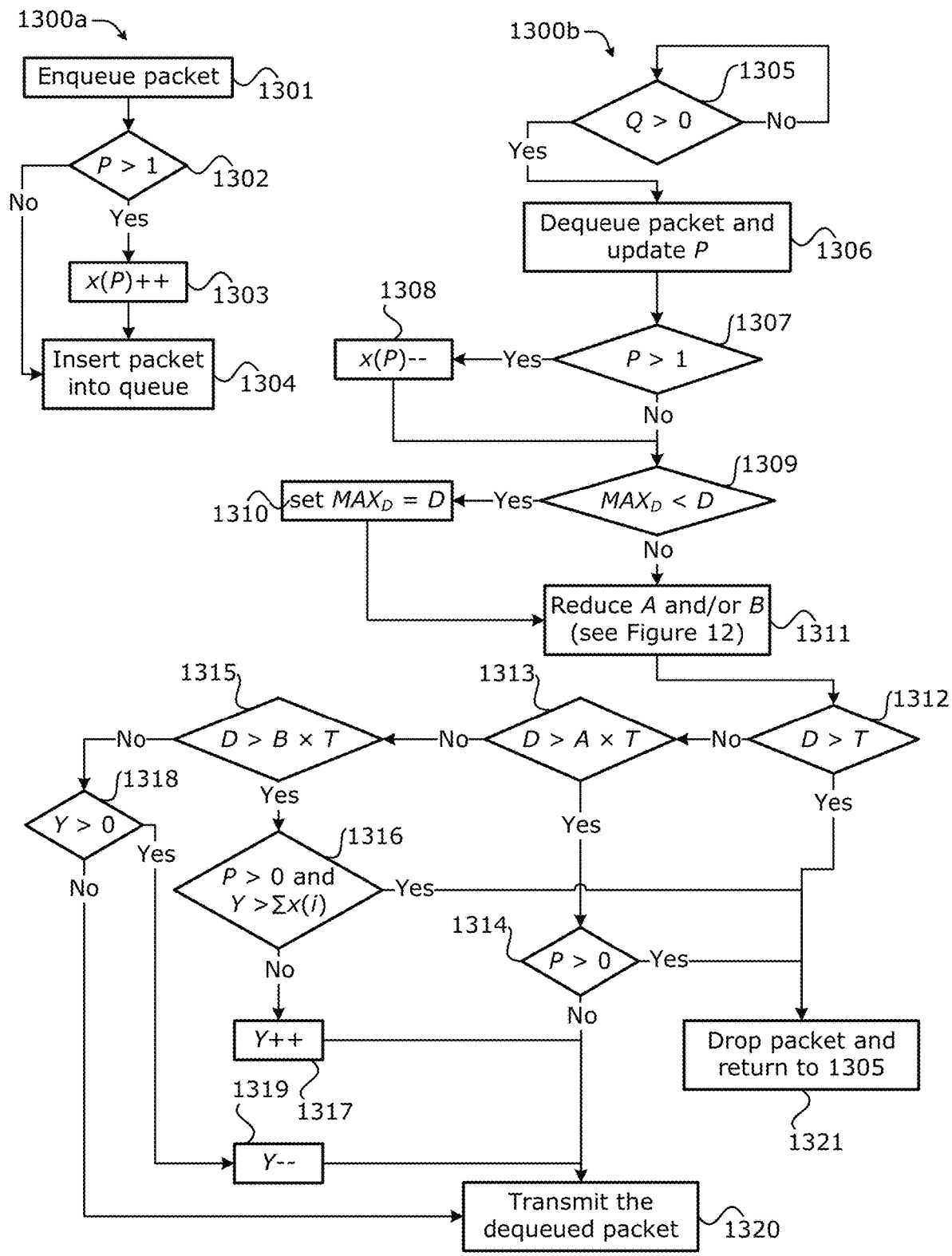

Process 1200x tunes the thresholds A and B for enhanced performance. However, in some implementations, the threshold tuning feature can be disabled to reduce computational complexity by setting the thresholds to have fixed values (e.g., set A and B as fixed values: A=C and B=). Additionally or alternatively, the threshold tuning process 1200x and/or the processes of FIGS. 10 and 11 can be used with the ingress process 1300a and egress process 1300b of FIG. 13.

Referring to ingress process 1300a, upon equeuing a new packet with priority P at operation 1301, if at operation 1302 P>1, then at operation 1303 x(P) is incremented (x(P)++) and the packet is inserted into the queue at operation 1304. If at operation 1302, P≤1, then the AQM entity proceeds to operation 1301 to insert the packet into the queue.

Referring to egress process 1300b, upon dequeuing a new packet with priority P, while the queue size is higher than zero (e.g., while Q>0) (1305), the AQM entity performs the remaining operations of process 1300b; otherwise, the AQM entity loops back to check if the queue size is above zero. When the queue size is above zero, the AQM entity dequeues a packet from the queue and updates P (1306) and determines whether P is above one (e.g., P>1) (1307). If P is above one, the AQM entity decrements the number of queued packets with priority (e.g., x(P)--) (1308) and then proceeds to operation 1309. If P is not above one, the AQM entity proceeds to determine whether the max measured queuing delay of the dequeued packets in the last time interval MAX$_D$ is below the measured or current queuing delay of the dequeued packet(s) D (e.g., MAX$_D$<D) (1309). If MAX$_D$<D, then the AQM entity sets the max measured queuing delay MAX$_D$ to be the measured or current queuing delay D (e.g., set MAX$_D$=D) (1310) and then proceeds to operation 1311. If the max measured queuing delay MAX$_D$ is not below the queuing delay D, then the AQM entity proceeds to reduce the thresholds A and/or B as discussed previously with respect to FIG. 12 (1311). In some implementations, operation 1311 may be omitted.

Next, the AQM entity determines whether a delay violation has occurred, which is based on whether the queuing delay of the dequeued packet D is above the per packet delay bound T (e.g., D>T) (1312). If there is a delay violation, the AQM entity drops the dequeued packet and continues to dequeue the next packet at operation 1305 (1321); otherwise, the AQM entity determines if whether a high congestion condition exists (1313). Detection of high congestion condition (1313) is based on whether the queuing delay D is above the product of the high congestion threshold A and the per packet delay bound T (e.g., D>A×T) (1313), and if so, the AQM entity drops all packets except for those with the highest priority (e.g., packets with priority P=0). In other words, if the queuing delay D is above the product of the threshold A and the per packet delay bound T, the AQM entity drops the packet if the packet has a priority above zero (e.g., P>0) (1314→1321), or transmits the packet if the packet does not have a priority above zero (e.g., P==0) (1314→1320).

If the queuing delay D is not above the product of the threshold A and the per packet delay bound T (1313), then the AQM entity determines whether a light congestion condition exists (1315). Detection of light congestion condition (1315) is based on whether the queuing delay D is above the low congestion threshold B and the per packet delay bound T (e.g., D>B×T) (1315). If the queuing delay D is not above the low congestion threshold B and the per packet delay bound T (e.g., D≤B×T) and Y is greater than zero, the AQM entity decreases the number of to-be dropped packets Y (1319) and then transmits the dequeued packet (1320).

If the queuing delay D is above the product of the low congestion threshold B and the per packet delay bound T (e.g., D>B×T) (1315), the AQM entity drops packets according to their respective priorities (e.g., packets with priority P=0 are not dropped). In other words, if the packet is not assigned a highest priority (e.g., P>0), and the number of to-be dropped packets Y is above the number of queued packets having a lower priority than the dequeued packets (e.g., Y>$\Sigma_{i=P+1}^{i=L-1} x(i)$) (1316), then there is/are not enough low priority packets in the queue, and then the AQM entity drops the dequeued packet (1321). Otherwise, there are enough low priority packets in the queue (1316), and the AQM entity increases the drop deficit (e.g., Y++) (1317) and transmits the dequeued packet (1320).

If the queuing delay D is not above the low congestion threshold B and the per packet delay bound T (e.g., D≤B×T) (1315), then the AQM entity may declare that there is no congestion. Here, the AQM entity reduces the drop deficit if the drop deficit is more than zero (1318→41319) and transmits the dequeued packet (1320). The drop deficit may be maintained at 0 if it is not more than zero (1318).

Example pseudocode for processes 1300a and 1300b is shown by Table 1.3.4-2.

TABLE 1.3.4-2

Upon enqueuing/dequeuing a new packet with priority P:
Ingress (enqueuing):
   if P > 1, x(P)++;
   insert packet into the queue.
Egress (dequeuing):
   While Q > 0: //while queue size is greater than 0
      dequeue a packet from the queue and update P;
      if P > 1, x(P)--;
      if MAX$_D$ < D, MAX$_D$ = D;
      reduce A or B if necessary; //see table D
      if D > T: //delay violation
         drop the packet and continue;
      else if D > A × T: //high congestion detected, drop all packets except P=0
         if P > 0, drop the packet and continue;
         else, break //exit while loop and transmit the packet TABLE 1.3.4-2-continued

```
else if D > B × T: //light congestion detected, drop packets based on
priority, packets with P = 0 is not dropped
    if P > 0 and Y > Σ_{i-P+1}^{i-L-1}x(i): //not enough Low priority packets in the queue
        drop the packet and continue;
    else: //enough low priority packets in the queue
        Y++; //add drop deficit
        break; //exit while loop and transmit this packet
    else: //no congestion
        if Y > 0; Y--; //reduce drop deficit y
        break; //exit while loop and transmit this packet
transmit the last dequeued packet.
```

1.4. MAMS Management Messages

The MAMS system 100, 200 and the GMA system 1400 (discussed infra) may use various MAMS management messages (e.g., message 1430 in FIG. 14) to configure data plane functions (e.g., Gc 1401 and Gs 1440 in FIG. 14), These MAMS management messages 1430 may include one or more of the following MAMS messages:

MX Discover Message (mx_discover): This message is the first message sent by the CCM 206 to discover the presence of NCM 236 in the network. It contains only the base information as described in Appendix C.2.1 of [RFC8743] with message_type set as mx_discover;

MX System Info Message (mx_system_info): This message is sent by the NCM 236 to the CCM 206 to inform the endpoints that the NCM 236 supports MAMS functionality. In addition to the base information described in Appendix C.2.1 of [RFC8743], it contains the following information:
  NCM Connection described infra and in Appendix C.2.3 of [RFC8743].

MX Capability Request (mx_capability_req): This message is sent by the CCM 206 to the NCM 236 to indicate the capabilities of the CCM 206 instance available to the NCM 236 indicated in the System Info message earlier. In addition to the base information described in Appendix C.2.1 of [RFC8743], it contains the following information:
  (a) Features and their activation status (see e.g., Appendix C.2.5 of [RFC8743]).
  (b) Number of Anchor Connections: The number of anchor connections (toward the core) supported by the NCM 236.
  (c) Anchor connections (see e.g., Appendix C.2.6 of [RFC8743]).
  (d) Number of Delivery Connections: The number of delivery connections (toward the access) supported by the NCM 236.
  (e) Delivery connections (see e.g., Appendix C.2.7 of [RFC8743]).
  (f) Convergence methods (see e.g., Appendix C.2.9 of [RFC8743]).
  (g) Adaptation methods (see e.g., Appendix C.2.10 of [RFC8743]).

The mx_capability_req message is enhanced to include the following new parameters:
  last ip_address to indicate the virtual network address (e.g., IP address or the like) used in the last MAMS session
  last_session_id to indicate the unique session id of the last MAMS session
  device_type to indicate the device type (e.g., 0: Android, 1: iOS, 2: Windows, 3: Linux, etc.).

Moreover, the following new messages are introduced in the GMA system 1400: mx_session_resume_req/rsp (discussed infra). The mx_session_resume_req/rsp messages is/are for notifying server that client has resumed the GMA operation, and for time synchronization. Both messages share the same format as mx_session_termination_req/rsp, and carry unique session id.

MX Capability Response (mx_capability_resp or mx_capability_rsp): This message is sent by the NCM 236 to the CCM 206 to indicate the capabilities of the NCM 236 instance and unique session identifier for the CCM 206. In addition to the base information described in Appendix C.2.1 of [RFC8743], the mx_capability_resp contains the following information:
  (a) Features and their activation status (see e.g., Appendix C.2.5 of [RFC8743]).
  (b) Number of Anchor Connections: The number of anchor connections (toward the core) supported by the NCM 236.
  (c) Anchor connections (see e.g., Appendix C.2.6 of [RFC8743]).
  (d) Number of Delivery Connections: The number of delivery connections (toward the access) supported by the NCM 236.
  (e) Delivery connections (see e.g., Appendix C.2.7 of [RFC8743]).
  (f) Convergence methods (see e.g., Appendix C.2.9 of [RFC8743]).
  (g) Adaptation methods (see e.g., Appendix C.2.10 of [RFC8743]).
  (h) Unique Session ID: This uniquely identifies the session between the CCM 206 and the NCM 236 in a network (see e.g., Appendix C.2.2 of [RFC8743]).

If the "number of anchor connections" parameter in mx_capability_rsp message is set to "0", indicating the server has rejected the client's request, the client should stop the procedure immediately and wait for the next event (e.g., WiFi connect) to start again.

MX Capability Acknowledge (mx_capability_ack): This message is sent by the CCM 206 to the NCM 236 to indicate acceptance of capabilities advertised by the NCM 236 in an earlier MX Capability Response message. In addition to the base information described in Appendix C.2.1 of [RFC8743], it contains the following information:
  (a) Unique Session ID: Same identifier as the identifier provided in the MX Capability Response (see e.g., Appendix C.2.2 of [RFC8743]).
  (b) Capability Acknowledgment: Indicates either acceptance or rejection of the capabilities sent by the CCM 206. Can use either "MX_ACCEPT" or "MX_REJECT" as acceptable values.

MX User-Plane Configuration Request (mx_up_setup_conf_req): This message is sent by the NCM 236 the CCM 206 to configure the user plane for MAMS. In addition to the base information described in Appendix C.2.1 of [RFC8743], it contains the following information:
  (a) Number of Anchor Connections: The number of anchor connections supported by the NCM 236.

(b) Setup of anchor connections (see e.g., Appendix C.2.11 of [RFC8743]).

The mx_up_setup_conf message is enhanced to configure a virtual IP interface on the client 101 (e.g., including the network address (e.g., IP address or the like), gateway, dns server, network mask, or the like).

MX User-Plane Configuration Confirmation (mx_up_setup_conf_cnf): This message is the confirmation of the UP setup message sent from the CCM 206 after successfully configuring the user plane on the client. This message contains the following information:
  (a) Unique Session ID: Same identifier as the identifier provided in the MX Capability Response (see e.g., Appendix C.2.2 of [RFC8743]).
  (b) MX probe parameters (included if probing is supported):
    (1) Probe Port: UDP port for accepting probe message.
    (2) Anchor connection ID: Identifier of the anchor connection to be used for probe function. Provided in the MX UP Setup Configuration Request.
    (3) MX Configuration ID: This parameter is included only if the MX Configuration ID parameter is available from the UP setup configuration. It indicates the MX configuration ID of the anchor connection to be used for probe function.
  (c) The following information is required for each delivery connection:
    (1) Connection ID: Delivery connection ID supported by the client.
    (2) Client Adaptation-Layer Parameters: If the UDP Adaptation Layer is in use, then the UDP port to be used on the C-MADP side.

As discussed herein, the mx_up_setup_cnf message is enhanced to configure a virtual IP interface on the client 101 (e.g., network address (e.g., IP address or the like), gateway, dns server, network mask, or the like), provide all the GMA client configuration parameters to the client 101, and provide a list of applications allowed to use GMA optimizations. It contains the following information: APP List (e.g., com.google.android.youtube, and/or the like).

MX Reconfiguration Request (mx_reconf_req): This message is sent by the NCM 236 to the CCM 206 to configure the user plane for MAMS. In addition to the base information described in Appendix C.2.1 of [RFC8743], it contains the following information:
  (a) Unique Session ID: Identifier for the CCM 206-NCM 236 association (see e.g., Appendix C.2.2 of [RFC8743]).
  (b) Reconfiguration Action: The reconfiguration action type can be one of "setup", "release", or "update".
  (c) Connection ID: Connection ID for which the reconfiguration is taking place.
  (d) Network address (e.g., IP address or the like): Included if Reconfiguration Action is either "setup" or "update".
  (e) SSID: If the connection type is WiFi, then this parameter contains the SSID to which the client has attached.
  (f) MTU of the connection: The MTU of the delivery path that is calculated at the client for use by the NCM 236 to configure fragmentation and concatenation procedures at the N-MADP.
  (g) Connection Status: This parameter indicates whether the connection is currently "disabled", "enabled", or "connected". Default: "connected".
  (h) Delivery Node ID: Identity of the node to which the client is attached. In the case of LTE, this is an ECGI. In the case of WiFi, this is an AP ID or a MAC address.

MX Reconfiguration Response (mx_reconf_rsp): This message is sent by the NCM 236 to the CCM 206 as a confirmation of the received MX Reconfiguration Request and contains only the base information in Appendix C.2.1 of [RFC8743].

MX Path Estimation Request (mx_path_est_req): This message is sent by the NCM 236 toward the CCM 206 to configure the CCM 206 to send MX Path Estimation Results. In addition to the base information described in Appendix C.2.1 of [RFC8743], it contains the following information:
  (a) Connection ID: ID of the connection for which the path estimation report is required.
  (b) Init Probe Test Duration: Duration of initial probe test, in milliseconds.
  (c) Init Probe Test Rate: Initial testing rate, in megabits per second.
  (d) Init Probe Size: Size of each packet for initial probe, in bytes.
  (e) Init Probe-ACK: If an acknowledgment for probe is required. (Possible values: "yes", "no")
  (f) Active Probe Frequency: Frequency, in milliseconds, at which the active probes shall be sent.
  (g) Active Probe Size: Size of the active probe, in bytes.
  (h) Active Probe Duration: Duration, in seconds, for which the active probe shall be performed.
  (i) Active Probe-ACK: If an acknowledgment for probe is required. (Possible values: "yes", "no")

MX Path Estimation Results (mx_path_est_results): This message is sent by the CCM 206 to the NCM 236 to report on the probe estimation configured by the NCM 236. In addition to the base information described in Appendix C.2.1 of [RFC8743], it contains the following information:
  (a) Connection ID: ID of the connection for which the path estimation report is required (see e.g., Appendix C.2.2 of [RFC8743]).
  (b) Init Probe Test Duration: Duration of initial probe test, in milliseconds.
  (c) Init Probe Test Rate: Initial testing rate, in megabits per second (see e.g., Appendix C.2.12 of [RFC8743]).
  (d) Init Probe Size: Size of each packet for initial probe, in bytes (see e.g., Appendix C.2.13 of [RFC8743]).

MX Traffic Steering Request (mx_traffic_steering_req): This message is sent by the NCM 236 to the CCM 206 to enable traffic steering on the delivery side in UL and DL configurations. In addition to the base information described in Appendix C.2.1 of [RFC8743], it contains the following information:
  (a) Connection ID: Anchor connection number for which the traffic steering is being defined.
  (b) MX Configuration ID: MX configuration for which the traffic steering is being defined.
  (c) DL Delivery (see e.g., Appendix C.2.14 of [RFC8743]).
  (d) Default UL Delivery: The default delivery connection for the UL. All traffic should be delivered on this connection in the UL direction, and the Traffic Flow Template (TFT) filter should be applied only for the traffic mentioned in Uplink Delivery
  (e) Uplink Delivery (see e.g., Appendix C.2.15 of [RFC8743]).
  (f) Features and their activation status (see e.g., Appendix C.2.5 of [RFC8743]).

MX Traffic Steering Response (mx_traffic_steering_rsp): This message is a response to an MX Traffic Steering Request from the CCM 206 to the NCM 236. In addition to the base information described in Appendix C.2.1 of [RFC8743], it contains the following information:
  (a) Unique Session ID: Same identifier as the identifier provided in the MX Capability Response (see e.g., Appendix C.2.2 of [RFC8743]).
  (b) Features and their activation status (see e.g., Appendix C.2.5 of [RFC8743]).

MX SSID Indication (mx_ssid_indication): This message is sent by the NCM 236 to the CCM 206 to indicate the list of allowed SSIDs that are supported by the MAMS entity on the network side. It contains the list of SSIDs. Each SSID comprises the type of SSID (which can be one of the following: SSID, BSSID, or HESSID) and the SSID itself.

MX Keep Alive Request (mx_keep_alive_req): An MX Keep-Alive Request can be sent from either the NCM 236 or the CCM 206 on expiry of the Keep-Alive timer or a handover event. The peer shall respond to this request with an MX Keep-Alive Response. In the case of no response from the peer, the MAMS connection shall be assumed to be broken, and the CCM 206 shall establish a new connection by sending MX Discover messages. In addition to the base information described in Appendix C.2.1 of [RFC8743], it contains the following information:
  (a) Keep-Alive Reason: Reason for sending this message (e.g., "Timeout", "Handover", or the like).
  (b) Unique Session ID: Identifier for the CCM 206—NCM 236 association (see e.g., Appendix C.2.2 of [RFC8743]).
  (c) Connection ID: Connection ID for which handover is detected, if the reason is "Handover".
  (d) Delivery Node ID: The target delivery node ID (e.g., NCGI, ECGI, WiFi AP ID/MAC address, etc.) to which the handover is executed.

MX Keep Alive Response (mx_keep_alive_rsp): On receiving an MX Keep-Alive Request from a peer, the NCM 236/CCM 206 shall immediately respond with an MX Keep-Alive Response on the same delivery path from where the request arrived. In addition to the base information, it contains the unique session identifier for the CCM 206-NCM 236 association (see e.g., Appendix C.2.2 of [RFC8743]).

MX Measurement Configuration (mx_measurement_conf): This message is sent from the NCM 236 to the CCM 206 to configure the period measurement reporting at the CCM 206.

The message contains a list of measurement configurations, with each element containing the following information:
  (a) Connection ID: Connection ID of the delivery connection for which the reporting is being configured.
  (b) Connection Type: Connection type for which the reporting is being configured (e.g., "LTE", "WiFi", "5G_NR", etc.).
  (c) Measurement Report Configuration: Actual report configuration based on the Connection Type (see e.g., Appendix C.2.17 of [RFC8743]).

MX Measurement Report (mx_measurement_report): This message is periodically sent by the CCM 206 to the NCM 236 after measurement configuration. In addition to the base information, it contains the following information:
  (a) Unique Session ID: Same identifier as the identifier provided in the MX Capability Response (see e.g., Appendix C.2.2 of [RFC8743]).
  (b) Measurement report for each delivery connection is measured by the client (see e.g., Appendix C.2.18 of [RFC8743]).

MX Session Termination Request (mx_session_termination_req): In the event where the NCM 236 or CCM 206 can no longer handle MAMS for any reason, it can send an MX Session Termination Request to the peer. In addition to the base information (MXBase), it contains a Unique Session ID and the reason for the termination such as, for example, "MX_NORMAL_RELEASE", "MX_NO_RESPONSE", or "INTERNAL_ERROR".

MX Session Termination Response (mx_session_termination_rsp): On receipt of an MX Session Termination Request from a peer, the NCM 236/CCM 206 shall respond with MX Session Termination Response on the same delivery path where the request arrived and clean up the MAMS-related resources and settings. The CCM 206 shall reinitiate a new session with MX Discover messages.

MX Application MADP Association Request (mx_app_madp_assoc_req): This message is sent by the CCM 206 to the NCM 236 to select MADP instances provided earlier in the MX UP Setup Configuration Request, based on requirements for the applications. In addition to the base information described in Appendix C.2.1 of [RFC8743], it contains the following information:
  (a) Unique Session ID: This uniquely identifies the session between the CCM 206 and the NCM 236 in a network (see e.g., Appendix C.2.2 of [RFC8743]).
  (b) A list of MX Application MADP Associations, with each entry as follows:
    (1) Connection ID: Represents the anchor connection number of the MADP instance.
    (2) MX Configuration ID: Identifies the MX configuration of the MADP instance.
    (3) Traffic Flow Template Uplink: Traffic Flow Template to be used in the UL direction (see e.g., Appendix C.2.16 of [RFC8743]).
    (4) Traffic Flow Template Downlink: Traffic Flow Template to be used in the DL direction (see e.g., Appendix C.2.16 of [RFC8743]).

MX Application MADP Association Response (mx_app_madp_assoc_rsp): This message is sent by the NCM 236 to the CCM 206 to confirm the selected MADP instances provided in the MX Application MADP Association Request by the CCM 206. In addition to the base information described in Appendix C.2.1 of [RFC8743], it contains information if the request has been successful.

MX Network Analytics Request (mx_network_analytics_req): This message is sent by the CCM 206 to the NCM 236 to request parameters like bandwidth, jitter, latency, and signal quality predicted by the network analytics function. In addition to the base information, it contains the following parameter:
  (a) Unique Session ID: Same identifier as the identifier provided in the MX Capability Response (see e.g., Appendix C.2.2 of [RFC8743]).
  (b) Parameter List: List of parameters in which the CCM 206 is interested: one or more of "bandwidth", "jitter", "latency", and "signal_quality".

MX Network Analytics Response (mx_network_analytics_rsp): This message is sent by the NCM 236 to the CCM 206 in response to the MX Network Analytics Request. For each delivery connection that the client has, the NCM 236 reports the requested parameter predictions and their respective likelihoods (between 1 and 100 percent). In addition to the base information described in Appendix C.2.1 of [RFC8743], it contains the following information:
  (a) Number of Delivery Connections: The number of delivery connections that are currently configured for the client.

(b) The following information is provided for each delivery connection:
  (1) Connection ID: Connection ID of the delivery connection for which the parameters are being predicted.
  (2) Connection Type: Type of connection. Can be "WiFi", "5G_NR", "MulteFire", or "LTE".
  (3) List of Parameters for which Prediction is requested, where each of the predicted parameters consists of the following:
    (a) Parameter Name: Name of the parameter being predicted (e.g., "bandwidth", "jitter", "latency", "signal_quality", and/or the like).
    (b) Additional Parameter: If Parameter name is "signal_quality", then this qualifies the quality parameter (e.g., "lte_rsrp", "lte_rsrq", "nr_rsrp", "nr_rsrq", "wifi_rssi", and/or the like).
    (c) Predicted Value: Provides the predicted value of the parameter and, if applicable, the additional parameter.
    (d) Likelihood: Provides a stochastic likelihood of the predicted value.
    (e) Validity Time: The time duration for which the predictions are valid.

In addition to the above, where the MAMS system implements the GMA protocol (see e.g., FIGS. 17 and 19) the following new messages are introduced:

MX Session Suspend Request (mx_session_suspend_req): used to notify the server 140 that the client 101 has suspended MAMS/GMA (session) operation, and may be used for time synchronization as discussed herein. The mx_session_suspend_req shares the same format as the mx_session_termination_req, and carries a unique_session_id.

MX Session Suspend Response (mx_session_suspend_rsp): used to notify the client 101 that the server 140 has suspended MAMS/GMA (session) operation, and may be used for time synchronization. The mx_session_suspend_rsp shares the same format as the mx_session_termination rsp, and carries a unique_session_id.

MX Session Resume Request (mx_session_resume_req): used to notify the server 140 that the client 101 has resumed MAMS/GMA (session) operation and/or may be used for time synchronization. The mx_session_resume_req shares the same format as the mx_session_termination_req and/or mx_session_termination_rsp, and carries the unique session id. The reason for resuming the session (e.g., MAMS and/or GMA operation) may be different than those listed for the mx_session_termination_req. The reason for the resuming a session may be, for example, application or device waking up from idle or sleep state (e.g., "APP_ACTIVE", "GC_ACTIVE", "GS_ACTIVE", etc.), delivery connection being (re)established (e.g., "MX_RESPONSE"), a screen being turned on, one or more packets being sent over a delivery connection, a total throughput being at or above a threshold amount of throughput, link quality being at or above a threshold quality measurement, and/or other reasons.

MX Session Resume Response (mx_session_resume_rsp): used to notify the client 101 that the server 140 has resumed MAMS/GMA (session) operation and/or may be used for time synchronization. The mx_session_resume_rsp shares the same format as the mx_session_termination_req and/or mx_session_termination_rsp, and carries a unique_session_id.

The above messages may be used during a suspend/resume procedure, which allows the MAMS client 101 to notify the MAMS server 140 about temporarily suspending all MAMS operations to conserve resources and/or save power. In response, the MAMS server 140 keeps all the MAMS context information of the client 101 and stops performing any MAMS-specific operations (e.g., GMA convergence on the data plane). This procedure enhances the MAMS framework to improve client power efficiency and reduce resource consumption, for example, when the client device 101 is unattended or/and has very little active traffic.

The previously described MAMS control/management messages may include the following data types.

Base information (MXBase): This data type is the base information that every message between the CCM 206 and NCM 236 exchanges has including the following information:
  (a) Version: Version of MAMS used.
  (b) Message Type: Message type being sent, where the following are considered valid values: "mx_discover", "mx_system_info", "mx_capability_req", "mx_capability_rsp", "mx_capability_ack", "mx_up_setup_conf_req", "mx_up_setup_cnf", "mx_reconf_req", "mx_reconf_rsp", "mx_path_est_req", "mx_path_est_results", "mx_traffic_steering_req", "mx_traffic_steering_rsp", "mx_ssid_indication", "mx_keep_alive_req", "mx_keep_alive_rsp", "mx_measurement_conf", "mx_measurement_report", "mx_session_termination_req", "mx_session_termination_rsp", "mx_session_resume_req", "mx_session_resume_rsp", "mx_app_madp_assoc_req", "mx_app_madp_assoc_rsp", "mx_network_analytics_req", "mx_network_analytics_rsp"
  (c) Sequence Number: Sequence number to uniquely identify a particular message exchange (e.g., MX Capability Request/Response/Acknowledge).

Unique Session ID: This data type represents the unique session ID between a CCM 206 and NCM 236 entity. It contains an NCM ID that is unique in the network and a session ID that is allocated by the NCM for that session. On receipt of the MX Discover message, if the session exists, then the old session ID is returned in the MX System Info message; otherwise, the NCM 236 allocates a new session ID for the CCM 206 and sends the new ID in the MX System Info message.

NCM Connections: This data type represents the connection available at the NCM 236 for MAMS connectivity toward the client. It contains a list of NCM 236 connections available, where each connection has the following information:
  (a) Connection Information, see Appendix C.2.4 of [RFC8743].
  (b) NCM Endpoint Information: Contains the network address (e.g., IP address or the like) and port exposed by the NCM 236 endpoint for the CCM 206.

Connection Information: This data type provides the mapping of connection ID and connection type. This data type contains the following information:
  (a) Connection ID: Unique number or string identifying the connection.
  (b) Connection Type: Type of RAT connection associated with the connection ID. Examples of the type of connection include "Wi-Fi", "5G_NR", "MulteFire", "LTE", "DSL", etc.

Features and Their Activation Status: This data type provides the list of all features with their activation status. Each feature status contains the following:
  (a) Feature Name: the name of the feature can be one of the following: "lossless_switching", "fragmentation", "concatenation", "uplink aggregation", "downlink_aggregation", and "measurement".

(b) Active status: Activation status of the feature: "true" means that the feature is active, and "false" means that the feature is inactive.

Anchor Connections: This data type contains the list of Connection Information items (see e.g., Appendix C.2.4 of [RFC8743]) that are supported on the anchor (core) side.

Delivery Connections: This data type contains the list of Connection Information items (see e.g., Appendix C.2.4 of [RFC8743]) that are supported on the delivery (access) side.

Method Support: This data type provides the support for a particular convergence or adaptation method. It consists of the following:
(a) Method: Name of the method.
(b) Supported: Whether the method listed above is supported or not. Possible values are "true" and "false".

Convergence Methods: This data type contains the list of all convergence methods and their support status. Examples of the possible convergence methods include: "GMA", "MPTCP_Proxy", "GRE_Aggregation_Proxy", and "MPQUIC".

Adaptation Methods: This data type contains the list of all adaptation methods and their support status. Examples of the possible adaptation methods include: "UDP_without_DTLS", "UDP_with_DTLS", "IPsec", and "Client_NAT".

Setup of Anchor Connections: This data type represents the setup configuration for each anchor connection that is required on the client's side. It contains the following information, in addition to the connection ID and type of the anchor connection:
(a) Number of Active MX Configurations: If more than one active configuration is present for this anchor, then this identifies the number of such connections.
(b) The following convergence parameters are provided for each active configuration:
  (1) MX Configuration ID: Present if there are multiple active configurations. Identifies the configuration for this MADP instance ID.
  (2) Convergence Method: Convergence method selected (see convergence methods discussed previously and/or described in Appendix C.2.9 of [RFC8743]).
  (3) Convergence Method Parameters described in Appendix C.2.11.1 of [RFC8743].
  (4) Number of Delivery Connections: The number of delivery connections (access side) that are supported for this anchor connection.
  (5) Setup of delivery connections described in Appendix C.2.11.2 of [RFC8743].

Convergence Method Parameters: This data type represents the parameters used for the convergence method and contains the following:
(a) Proxy IP: IP address of the proxy that is provided by the selected convergence method.
(b) Proxy Port: Port of the proxy that is provided by the selected convergence method.

Setup Delivery Connections: This is the list of delivery connections and their parameters to be configured on the client. Each delivery connection defined by its connection information (see e.g., Appendix C.2.4 of [RFC8743]) optionally contains the following:
(a) Adaptation Method: Selected adaptation method name. This shall be one of the methods listed in Appendix C.2.10 of [RFC8743].
(b) Adaptation Method Parameters: Depending on the adaptation method, one or more of the following parameters shall be provided:
  (1) Tunnel Network Address (e.g., IP address or the like).
  (2) Tunnel Port address.
  (3) Shared Secret.
  (4) MX header optimization: If the adaptation method is UDP_without_DTLS or UDP_with_DTLS, and convergence is GMA, then this flag represents whether or not the checksum field and the length field in the IP header of an MX PDU should be recalculated by the MX Convergence Layer. The possible values are "true" and "false". If it is "true", both fields remain unchanged; otherwise, both fields should be recalculated. If this field is not present, then the default of "false" should be considered.

Init Probe Results: This data type provides the results of the init probe request made by the NCM. It consists of the following information:
(a) Lost Probes: Percentage of probes lost.
(b) Probe Delay: Average delay of probe message, in microseconds.
(c) Probe Rate: Probe rate achieved, in megabits per second.

Active Probe Results: This data type provides the results of the active probe request made by the NCM. It consists of the following information:
(a) Average Probe Throughput: Average active probe throughput achieved, in megabits per second.

Downlink Delivery: This data type represents the list of connections that are enabled on the delivery side to be used in the downlink direction.

Uplink Delivery: This data type represents the list of connections and parameters enabled for the delivery side to be used in the uplink direction. The uplink delivery consists of multiple uplink delivery entities, where each entity consists of a TFT (see e.g., Appendix C.2.16 of [RFC8743]) and a list of connection IDs in the uplink, where traffic qualifying for such a TFT can be redirected.

Traffic Flow Template: The TFT generally follows the guidelines specified in 3GPP TS 23.060 v16.0.0 (2019 Mar. 25). The TFT in MAMS consists of one or more of the following:
(a) Remote Address and Mask: IP address and subnet for remote addresses represented in Classless Inter-Domain Routing (CIDR) notation. Default: "0.0.0.0/0".
(b) Local Address and Mask: IP address and subnet for local addresses represented in CIDR notation. Default: "0.0.0.0/0"
(c) Protocol Type: IP protocol number of the payload being carried by an IP packet (e.g., UDP, TCP). Default: 255.
(d) Local Port Range: Range of ports for local ports for which the TFT is applicable. Default: Start=0, End=65535.
(e) Remote Port Range: Range of ports for remote ports for which the TFT is applicable.
Default: Start=0, End=65535.
(f) Traffic Class: Represented by Type of Service in IPv4 and Traffic Class in IPv6. Default: 255
(g) Flow Label: Flow label for IPv6, applicable only for IPv6 protocol type. Default: 0 (see e.g., Amante et al., "IPv6 Flow Label Specification", IETF RFC 6437 (November 2011).

Measurement Report Configuration: This data type represents the configuration done by the NCM 236 toward the CCM 206 for reporting measurement events:
  (a) Measurement Report Parameter: Parameter that shall be measured and reported. This is dependent on the connection type:
    (1) For the connection type of "Wi-Fi", the allowed measurement type parameters are "WLAN_RSSI", "WLAN_LOAD", "UL_TPUT", "DL_TPUT", "EST_UL_TPUT", and "EST_DL_TPUT".
    (2) For the connection type of "LTE", the allowed measurement type parameters are "LTE_RSRP", "LTE_RSRQ", "UL_TPUT", and "DL_TPUT".
    (3) For the connection type of "5G_NR", the allowed measurement type parameters are "NR_RSRP", "NR_RSRQ", "UL_TPUT", and "DL_TPUT".
  (b) Threshold: High and low threshold for reporting.
  (c) Period: Period for reporting, in milliseconds.

Measurement Report: This data type represents the measurements reported by the CCM for each access network measured. This type contains the connection information, the Delivery Node ID that identifies either the cell (ECGI) or the WiFi Access Point ID or MAC address (or equivalent identifier in other technologies), and the actual measurement performed by the CCM in the last measurement period.

1.5. Generic Multi-Access (GMA) Encapsulation Protocol

As alluded to previously, for MX devices, it is desirable to combine the multiple access network connections seamlessly to improve quality of experience. Such optimization may require additional control information, for example, Sequence Number (SN), in each data packet (e.g., IP packet). The Generic Multi-Access (GMA) Encapsulation Protocol [GMA10] is a new light-weight and flexible encapsulation protocol for this need.

Referring back to FIG. 1, the convergence (sub)layer in the MAMS DPPS is responsible for multi-access operations, including multi-link (path) aggregation, splitting/reordering, lossless switching/retransmission, fragmentation, concatenation, etc. It operates on top of the adaptation (sub)layer in the protocol stack 102, 142. From the Tx perspective, a User Payload (e.g., IP packet) is processed by the convergence layer first, and then by the adaptation layer before being transported over a delivery connection; from the Receiver perspective, an IP packet received over a delivery connection is processed by the adaptation layer first, and then by the convergence layer.

Today, Generic Routing Encapsulation (GRE) is used as the encapsulation protocol at the convergence layer to encode additional control information (e.g., Key, Sequence Number) (see e.g., 3GPP TS 36.361 v15.0.0 (2018 Jul. 9) ("[LWIPEP]"), Dommety, G., "Key and Sequence Number Extensions to GRE", IETF RFC 2890, (September 2000) ("[GRE1]"), and Leymann et al., "Huawei's GRE Tunnel Bonding Protocol", IETF RFC 8157 (May 2017) ("[GRE2]"). However, there are two main drawbacks with this approach including, for example, IP-over-IP tunneling (required for GRE) leads to higher overhead especially for small packets; and it is difficult to introduce new control fields. For example, the overhead of IP-over-IP/GRE tunneling with both Key and Sequence Number is 32 Bytes (20 Bytes IP header+12 Bytes GRE header), which is 80% of a 40 Bytes TCP ACK packet.

The GMA encapsulation protocol is implemented at the convergence layer. GMA supports three encapsulation methods/formats: trailer-based IP encapsulation, header-based IP encapsulation, and non-IP encapsulation. Particularly, the IP Encapsulation methods avoid IP-over-IP tunneling overhead (e.g., 20 Bytes), which is 50% of a 40 Bytes TCP ACK packet. Moreover, GMA introduces new control fields to support fragmentation and concatenation, which are not available in conventional GRE-based solutions such as in [LWIPEP], [GRE1], and [GRE2].

GMA operates between endpoints that have been configured to operate with GMA through additional control messages and procedures (see e.g., [RFC8743]). Moreover, UDP or IPSec tunneling may be used at the adaptation sublayer to protect GMA operation from intermediary nodes (e.g., access nodes, edge nodes, etc.).

As shown by FIG. 1, a client device 101 (e.g., a smartphone, laptop, IoT device, etc.) may connect to the Internet via multiple access network connections 105. One of these connections (e.g., connection 105A) may operate as an anchor connection, and the other connection (e.g., connection 105B) may operate as the delivery connection. The anchor connection provides the network address (e.g., IP address or the like) and connectivity for end-to-end (e2e) Internet access, and the delivery connection provides additional path between the client 101 and the MX gateway (e.g., MX server 140) for multi-access optimizations. In some implementations, the anchor connection when GMA is used may be a virtual IP connection similar to what is used in a VPN, and there may be up to two simultaneous delivery connections (e.g., 5G/NR, LTE, WiFi, etc.), each of which has a dedicated UDP tunnel established over for data transfer.

For example, per-packet aggregation allows a single IP flow to use the combined bandwidth of the two connections. In another example, packets lost due to temporarily link outage may be retransmitted. Moreover, packets may be duplicated over multiple connections to achieve high reliability and low latency, and duplicated packets should be eliminated by the receiving side. Such multi-access optimization requires additional control information (e.g., SN) in each IP data packet, which can be supported by the GMA encapsulation protocol described herein and/or in [GMA10].

GMA is usually used when multiple access network connections are used, but may also be used when only a single access network connection is used. In these scenarios, GMA may be used for loss detection and recovery purposes, or used to concatenate multiple small packets to reduce per packet overhead/resource consumption.

FIG. 14 shows an OTT GMA E2E Network Reference Architecture 1400. In FIG. 14, the MA client 101 includes the CCM 206, which is a control-plane functional entity in the client 101 that exchanges MAMS control messages with the NCM 236 and configures multiple network paths at the client for transport of user data. The CCM 206 is communicatively coupled with a GMA client (Gc) 1401 in the MA client 101.

The Gc 1401 is a data plane functional entity in the client 101 that handles user data forwarding across multiple network paths 105 and MA convergence operations (e.g., splitting, steering, duplication, measurement, etc.). The Gc 1401 operates its own GMA protocol stack, which include the GMA data plane layer, which is on top of respective transport layers Tms-1 and Tms-2 (e.g., TCP, UDP, etc.), which are on top of respective network layers Net-1 and Net-2 (e.g., IP or the like). The respective network layers interact with respective access layer entities RAT-1 and RAT-2. In this example RAT-A is a WiFi station (STA) and RAT-B is an LTE UE.

The MA server 140 includes the NCM 236, which is control-plane functional entity in the network that handles MAMS control messages from the client 101, 1 and configures distribution of data packets over multiple network paths, and user plane treatment of the traffic flows. The NCM 236 is communicatively coupled with a GMA server (Gs) 1440 in the MA server 140. The Gs 1440 is a data plane functional entity in the network that handles user data forwarding across multiple network paths 107 and MA convergence operations (e.g., splitting, steering, duplication, measurement, etc.). The Gs 1440 includes a GMA protocol stack that is the same or similar to the GMA protocol stack in the Gc 1401. Furthermore, the MA server 140, and in particular the Gs 1440, may be communicatively coupled with a NAT/Firewall gateway 1450. The NAT/Firewall gateway 1450 may be disposed between the MA server 140 and a DN 170, 175 (e.g., the Internet, an enterprise network, a local area DN, and/or the like).

A websocket-based (e.g., TCP, UDP, etc.) secure connection is established between the CCM 206 and NCM 236 to exchange MAMS management messages 1430, which are used for configuring the data plane functions (e.g., Gc 1401 and Gs 1440). The MAMS management messages 1430 are discussed in more detail infra.

There are two types of connections in a GMA system 1400: anchor connections and delivery connections. An anchor connection is an IP connection that is used by applications for e2edata transfer. A delivery connection is a network connection (e.g., IP connection) that is used to deliver user data between the Gc 1401 and the Gs 1440. The anchor connection in the OTA GMA system 1400 is virtual network (e.g., IP) connection, which is similar to what is used in virtual private networks (VPNs). In some implementations, there may be up to two simultaneous delivery connections (e.g., 5G/NR, LTE, WiFi, etc.) each of which has a dedicated tunnel (e.g., UDP tunnel or the like) established for data transfer.

Figure 16:
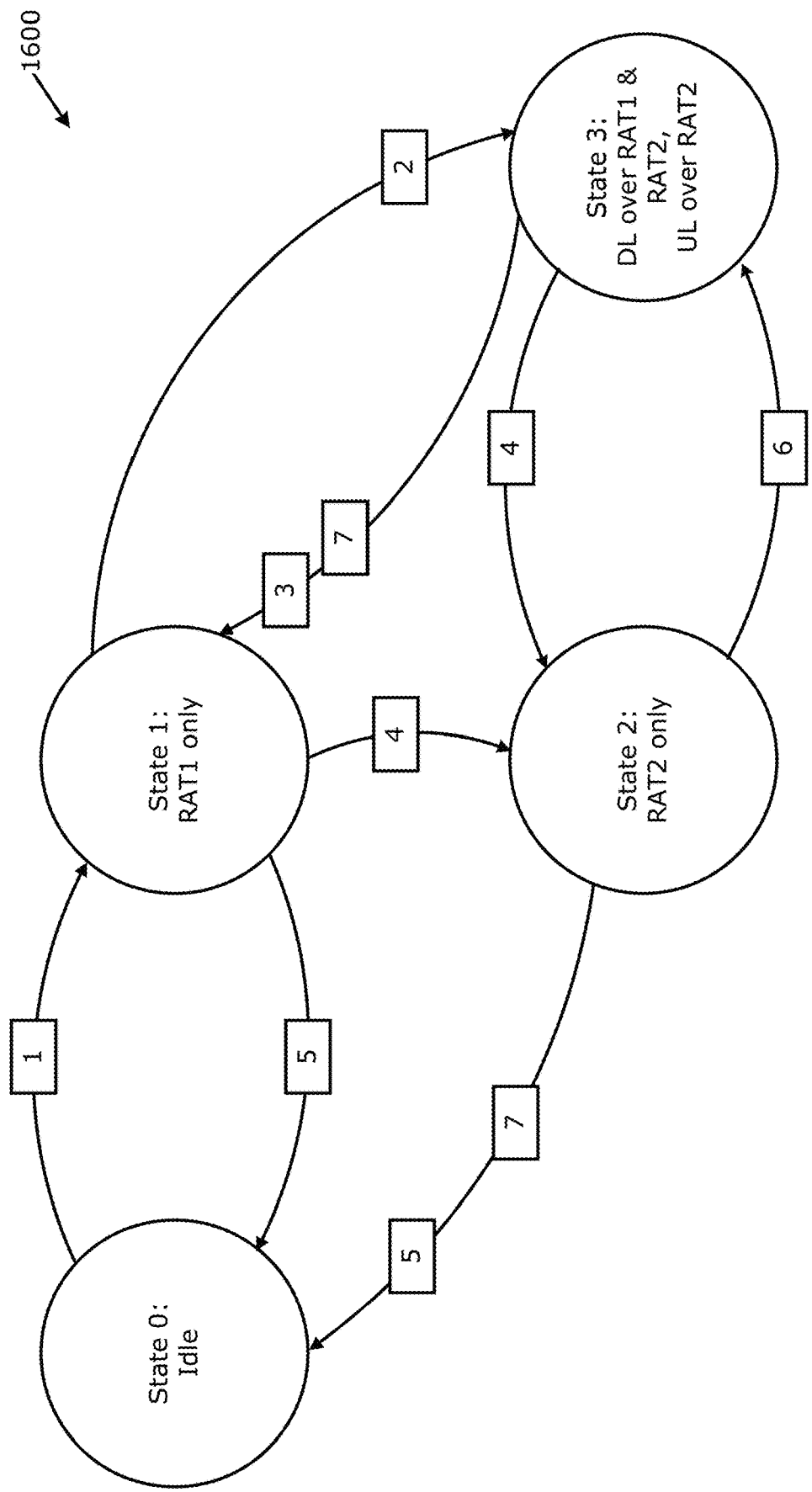
FIG. 16 illustrates a client-based GMA Data Traffic Control State Machine.

The Gc 1401 and/or the Gs 1440 select the delivery connection for MAMS messages based on a current state of the Gc 1401 and/or the Gs 1440, which may include one or more of the following: send all MAMS messages over a first (preferred) delivery connection (e.g., WiFi) in state 1 or 3 (see e.g., FIG. 16); and send all MAMS message over the second delivery connection (e.g., Cellular) in state 2 or 4 (see e.g., FIG. 16).

In one example implementation, the NAN 111A is a cellular base station such as a 5G/NR gNB, an LTE eNB, and/or the like, and the GW 1420A comprises one or more servers operating as an Evolved Packet Core (EPC) for LTE implementations or a 5G system (5GS)/5G core network (5GC) for 5G/NR implementations. In this example implementation, the one or more servers operate one or more network functions (NFs) such as a UPF in 5G/NR implementations, a Serving Gateway (S-GW) and/or Packet Data Network Gateway (P-GW) in LTE implementations, or the like. In this example implementation, connection 106A is an N3 reference point/interface for 5G/NR implementations or an S1 reference point/interface for LTE implementations, and connection 107A is an N6 reference point/interface for 5G/NR implementations or an SGi reference point/interface for LTE implementations.

In another example implementation (with may be combined with the previously described example implementation), the NAN 111B is a WLAN access point (AP) such as a WiFi AP, and the GW 1420B comprises one or more servers and/or network elements operating as a WLAN (WiFi) access gateway (WAG), a broadband network gateway (BNG), and/or the like. In this example implementation, each connection 106B and connection 107B may be a suitable tunneling interface/link such as a GRE tunnel, general packet radio service (GPRS) Tunneling Protocol (GTP) tunnel, Mobile IP (MIP), a Proxy MIP (PMIP) tunnel, VPN tunnel, and/or the like. The connection 106B and connection 107B may utilize the same or different tunneling protocols and/or communication technologies.

Figure 15:
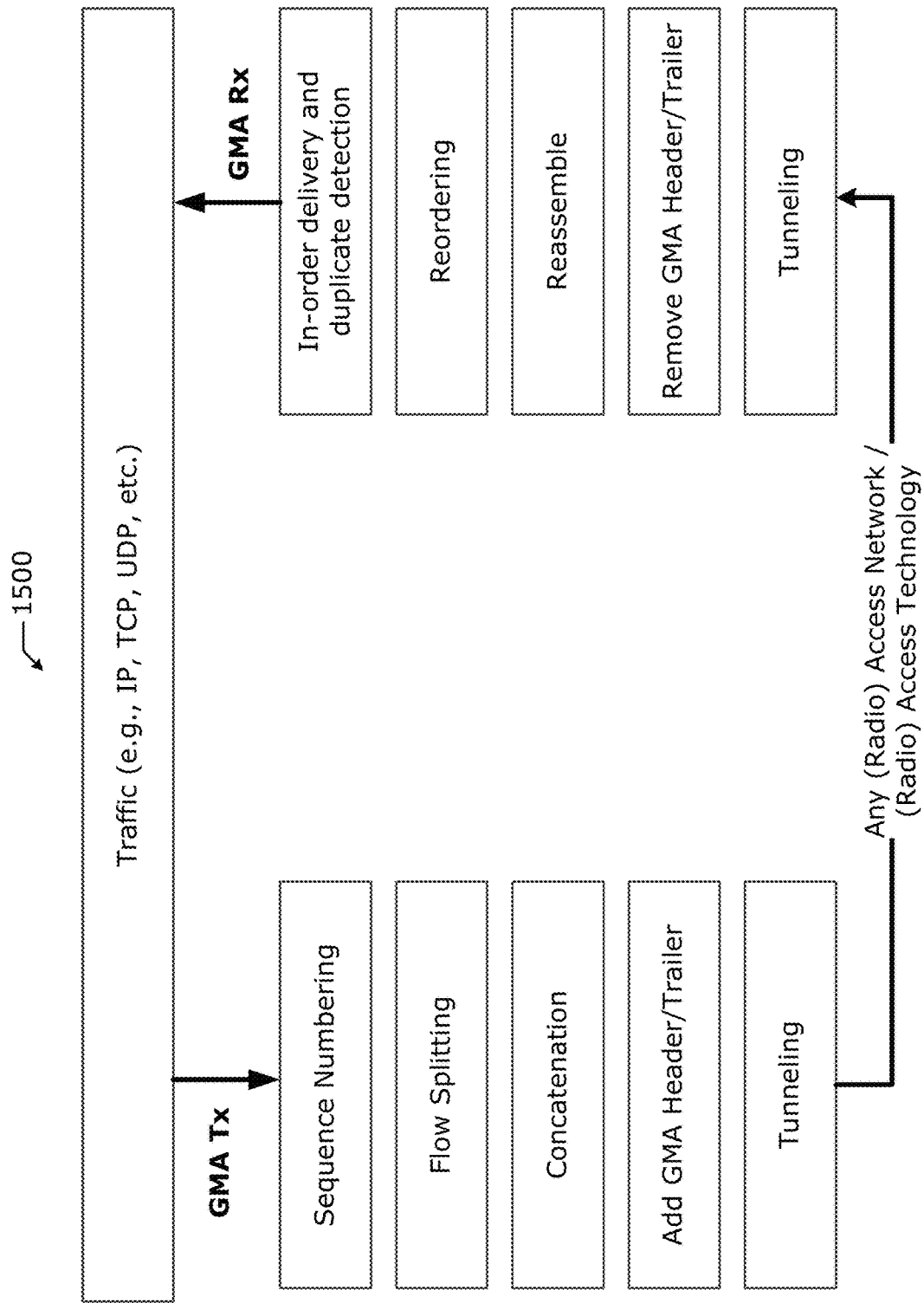
FIG. 15 depicts an example of GMA data plane functionalities.

FIG. 15 shows functionalities of a GMA data plane entity 1500. The GMA data plane entity 1500 corresponds to the Gs 1440 and/or the Gc 1401 discussed previously with respect to FIG. 14 (or corresponds to the GMA data-plane layer within the Gs 1440 and/or the Gc 1401). Here, the GMA data plane acts as a generic convergence layer for any (radio) access network and/or (radio) access technology. The GMA data plane entity 1500 performs various functions such as path quality measurements (QoS, packet loss, latency, etc.), multi-link traffic steering (e.g., traffic splitting/steering, reordering, retransmission, duplication, coding, fragmentation, concatenation, etc.), and QoS-aware traffic shaping and queuing (e.g., priority queuing (PQ), Strict Priority (SP), Weighted Round Robin (WRR), etc.).

The GMA data plane entity 1500 at a GMA Tx prepares traffic (e.g., IP, TCP, UDP, etc.) for transmission to a GMA Rx. The GMA Tx provides sequence number to packets, performs flow (traffic) splitting wherein packets are split or distributed to different multiple access networks (or RATs), simultaneously for delivery to the GMA Rx. The GMA Tx also performs concatenation, which involves putting multiple SDUs into one PDU to reduce packet processing and tunneling overhead, thereby improving signaling and processing efficiency. The GMA Tx also adds a GMA header or trailer to the packet(s) and performs tunneling by, for example, repackaging the packet according to a suitable GMA tunneling protocol. The packet(s) is/are then transmitted over a suitable access network (e.g., one of the different (R)ANs/(R)ATs discussed herein).

The GMA Rx receives the packet(s) and unpackages the packet(s) according to the tunneling protocol being used, and removes the GMA header/trailer. The GMA Rx also reassembles and reorders the packet(s) that are delivered over multiple access networks based on the sequence numbers provided by the GMA Tx. The GMA Rx then performs duplicate detection to identify (and discard) and duplicate packets, and then delivers, in-order, the reassembled and reordered packet(s) to higher layers Additionally or alternatively, the GMA data plane entity 1500 provides lossless switching, which involves the retransmission and/or recovery of packets that may be lost when switching from one network access path to another network access path. Additionally or alternatively, the GMA data plane entity 1500 performs or provides path quality measurements, which includes passive and active measurements of QoS parameters such as, for example, packet loss rate, round trip time, among many others (such as the various measurements discussed herein). Additionally or alternatively, the GMA data plane entity 1500 performs other functions such as automatic repeat request (ARQ)-like retransmission, duplication, network coding, traffic shaping/queuing, and/or the like.

FIG. 16 illustrates a client-based GMA data traffic control state machine 1600. The data traffic control state machine 1600 includes the following states:
 State 0 (Idle): the (anchor) virtual connection is down.
 State 1 (RAT1 only): all data traffic (DL and UL) are delivered over the first (preferred) RAT connection (RAT1).
 State 2 (RAT2 only): all data traffic are delivered over the second connection (RAT2).

State 3 (DL over RAT1 & RAT2, UL over RAT2): DL traffic are delivered over both connections, and UL traffic are delivered over the second connection (RAT2).

The data traffic control state machine 1600 includes the following state-transition triggers:

(1) The (anchor) virtual connection is established successfully. This trigger causes a transition from state 0 to state 1.

(2) Congestion is detected over the RAT1 DL and RAT2 Link Success has been declared/detected wherein the last control message over RAT2 was successful. This trigger causes a transition from state 1 to state 3. In some implementations, congestion detection (based on packet loss) is applicable only if the RAT1 Congestion Detection flag is disabled.

(3) Congestion is no longer present over the RAT1 DL (applicable only if the RAT1 Congestion Detection flag is disabled). This trigger causes a transition from state 3 to state 1.

(4) RAT1 received signal quality (or received signal strength) is relatively poor (e.g. <−75 decibel-milliwatts (dBm)) and/or RAT1 has declared or detected a link failure (or Radio Link Failure (RLF)). The particular mechanism for detecting and/or declaring a link failure (or RLF) is defined by the standards/specifications of RAT1. This trigger causes a transition from state 1 to state 2 or a transition from state 3 to state 2.

(5) The GMA/MAMS operation is terminated or suspended. Termination of the GMA/MAMS operation may include a delivery connection (RAT2 or RAT1) being lost for a predefined period (e.g., 10 minutes or some other amount of time) and/or total throughput is relatively low (e.g., <10 kilobits per second (Kbps)). Suspended GMA/MAMS operation may include a screen being off and/or total throughput is low (e.g., <10 Kbps). This trigger causes a transition from state 1 to state 0 or a transition from state 2 to state 1.

(6) RAT1 received signal quality is relatively good (e.g., >−70 dBm) and RAT1 has detected/declared a Link Success. This trigger causes a transition from state 2 to state 3.

(7) RAT2 has detected/declared a link failure (or RLF). The particular mechanism for detecting and/or declaring a link failure (or RLF) is defined by the standards/specifications of RAT2. This trigger causes a transition from state 3 to state 1 or a transition from state 2 to state 0.

If a link is declared "Link Failure", it should not be used to send any data or control packets, except "Probe/ACK", and the "Link Failure" status can only be turned off after successfully transmitting a probe message over the link.

The following three flows are defined for data traffic:

High Reliability (Flow ID=1): High Reliability traffic will be delivered by duplication over both RAT1 and RAT2 in state 1, 2 and 3. Notice that the receiver will be responsible for detecting and removing duplicated packet based on their sequence number (using the algorithm defined in 6.6.1). Notice that high reliability flow should have low data rate (e.g., <1 Mbps).

Delay Sensitive (Flow ID=2): Delay Sensitive traffic will be delivered over RAT2 only in State 1, 2 and 3.

High Throughput (Flow ID=3): High Throughput (e.g., DL) traffic will be delivered by aggregation over both RAT1 and RAT2 in State 3, and the receiver (Gc) will be responsible for reordering packets using algorithm defined in 6.6.1 or 6.6.2. UL traffic will be delivered by RAT1 in state 1 and by RAT2 in state 2. In state 3, UL traffic will be delivered by RAT2 if the "UL-over-RAT2 flag" is set to "1", and by RAT1 otherwise. The default value of "UL-over-RAT2 flag" is 0 (disabled).

In the example of FIG. 16, RAT1 may be a WLAN RAT (e.g., WiFi) and RAT2 may be a cellular RAT (e.g., 5G/NR, LTE, GSM, GPRS, WiMAX, etc.). The specific RAT protocols may define the mechanisms and/or parameters for determining Link Failures and/or Link Successes.

Figure 17:
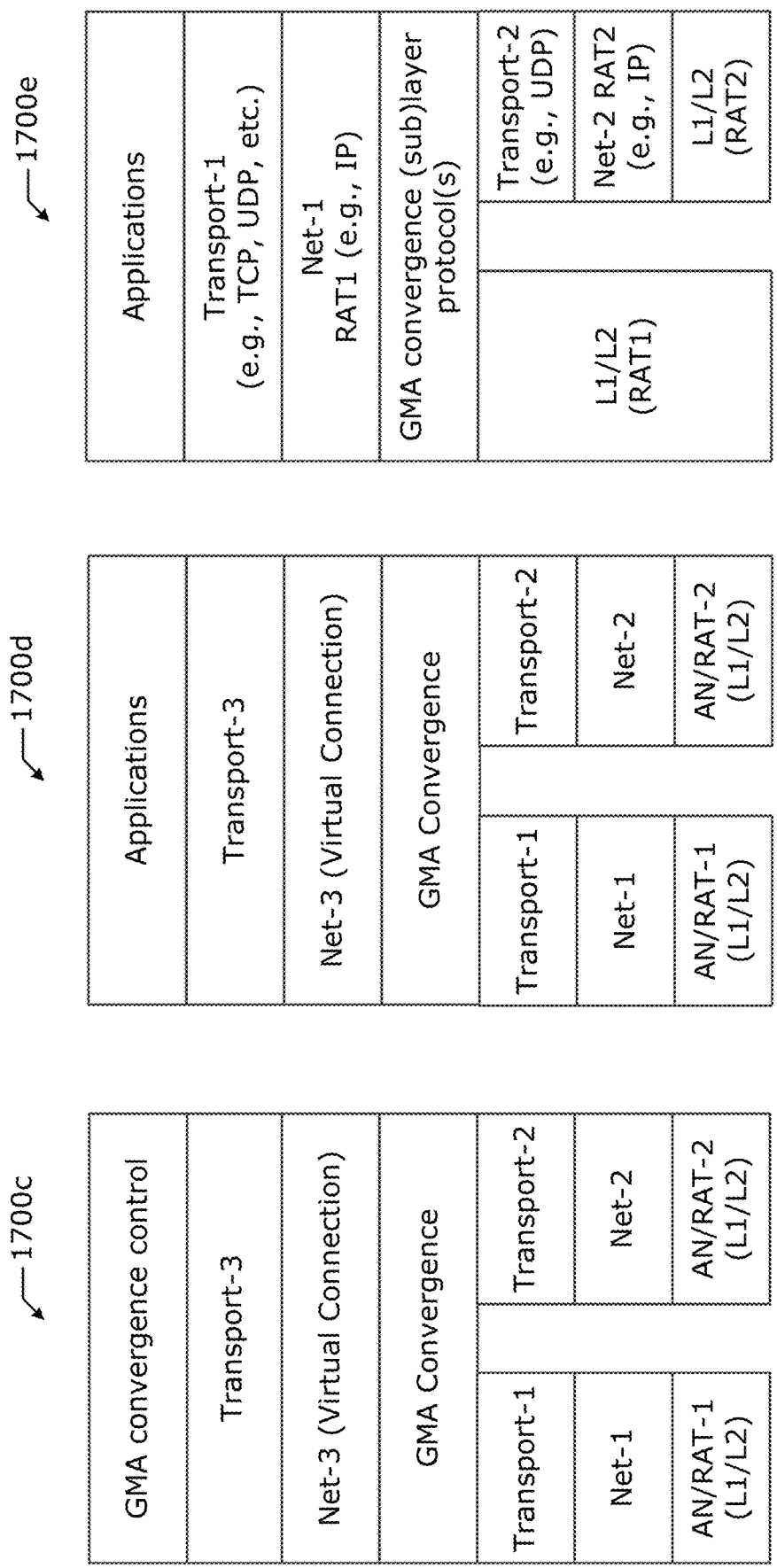
FIG. 17 depicts an example GMA-based data plane protocol stack for OTT MAMS deployments and a GMA-based MAMS data plane protocol stack.

FIG. 17 depicts an example GMA convergence control protocol stack 1700c. The GMA convergence control protocol stack 1700c includes a GMA convergence control layer which includes GMA/MAMS control messages. Additionally, a third transport layer (e.g., UDP or IP Security Protocol (IPSec)) tunnel is established over a virtual (anchor) IP connection (IP-3) for sending time-sensitive control messages (e.g., probes, traffic splitting updates, etc.).

The virtual (anchor) IP connection is on top of a GMA convergence layer (also referred to as a "GMA encapsulation layer"). This allows the (virtual) IP packets carrying a GMA control message(s) to be encapsulated with a GMA header, which only includes a 2B Flag field (discussed infra) where the Flag field is set to all "0"s. The GMA encapsulation layer resides on top of respective transport (e.g., UDP or IPSec) tunneling layers for respective access networks (ANs) 1 and 2, which is on top of respective IP layers, which are on top of layer 2 (L2) and Layer 1 (L1) of the respective ANs 1 and 2. The anchor connection is now virtual and no longer tied to any specific access network (e.g., AN1 and AN2 in the example of FIG. 17).

FIG. 17 also shows an example GMA convergence data protocol stack 1700d. The GMA convergence data protocol stack 1700d is similar to the GMA convergence control protocol stack 1700c except that the GMA convergence control layer in the stack 1700c is replaced with an applications layer.

Figure 18:
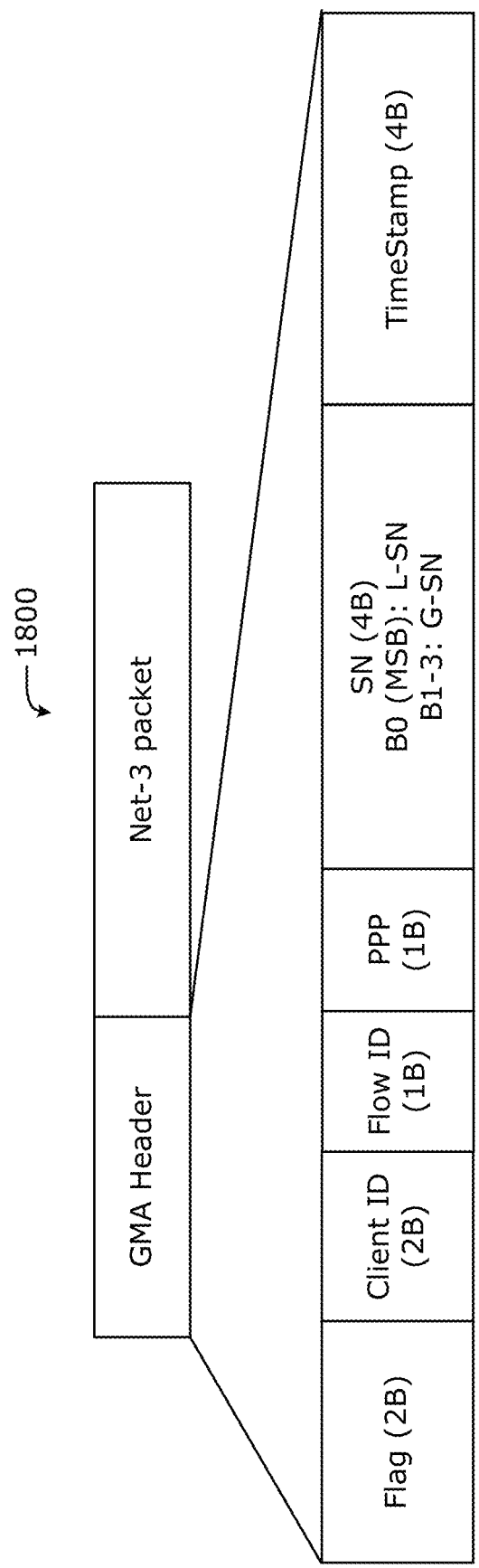
FIG. 18 depicts GMA convergence protocol data unit (PDU) format.

In both stacks stack 1700c, stack 1700d, anew protocol layer, the GMA convergence (also referred to as Trailer-based MAMS convergence [UPMAMS]) layer, is introduced to handle all multi-path (management) related operations (e.g., concatenation, splitting, reordering, duplication, elimination, measurements, etc.). In some implementations, the GMA convergence layer encapsulates the data and/or control messages using a GMA header-based encapsulation format is used as shown in FIG. 18. The GMA convergence encapsulation protocol is discussed in [GMA10]. When an access network 110 does not support any MAMS network functions, the virtual connection is established between an end-device (e.g., client device 101) and cloud server or Edge server. This virtual connection may then be used as the anchor connection for cloud applications or Edge applications. The virtual anchor connections may be an IP connection that is used by applications for e2e data transfer. The other connections (e.g., delivery connections) of AN1 and AN2 may be IP connections to deliver user data between the client and server. Additionally, the existing MAMS convergence sublayer functionalities [UPMAMS] can be reused as-is. Additionally or alternatively, the virtual (anchor) connection is established for sending time-sensitive MAMS control/management messages (e.g., probes, traffic splitting updates, etc.) The (virtual) packets carrying a GMA control/management messages are also encapsulated with the GMA header, which is also discussed in more detail infra FIG. 18 depicts GMA convergence protocol data unit (PDU) format 1800. The PDU 1800 includes a GMA header and an IP packet. The GMA header is discussed in more detail infra. In this example, the PDU 1800 includes a flag field (2 bits (B), a client ID field (2B), a flow ID field (1B), a Per-Packet Priority (PPP) field 1B), a sequence number (SN) field (4B), and a timestamp field (4B) as follows where Bit 0 is the most significant bit (MSB) and Bit 15 is the least significant bit (LSB): Bit #0 (MSB): Client ID; Bit #1: Flow ID; Bit #2: PPP (Per-Packet Priority); Bit #3: Sequence Number (B0: L-SN, B1-B3: G-SN); Bit #4: Timestamp; and Bit #13-15: GMA protocol (e.g., "0x07").

The B0 of the SN field includes is an L-SN (sub)field and B1-B3 of the SN field is a G-SN (sub)field. The G-SN is for reordering and the L-SN is for packet loss measurement.

The (2B) flag field indicates what additional fields are included in the GMA header. The following bits in the flag field may include a first value if the packet 1800 carries downlink data (e.g., "0xF807"), a second value if the packet carries uplink data (e.g., "0x7807"), a third value if the packet 1800 carries an encrypted control message (e.g., "0x800F"), or a fourth value if the packet 1800 carries an un encrypted control message (e.g., "0x0000"). Additionally or alternatively, if the packet 1800 carries uplink data, the "Client ID" field is not be included in the GMA header. Additionally or alternatively, if the packet 1800 carries an encrypted control message, it may include the following fields: Bit #0 (MSB): Client ID; Bit #12: Encryption Enabled; and Bit #13-15: GMA protocol (e.g., "0x07").

As shown in FIGS. 3, 17, and 18, there are three different network addresses (e.g., IP addresses) and three transport connections (e.g., UDP, TCP, etc.) for each client in a GMA system. The network address (e.g., IP address) of each delivery connection on the client is configured by a respective access network. All other network addresses (e.g., IP address) and transport ports (e.g., UDP, TCP ports, or the like) are configured in the GMA system through either client configuration or MAMS messages.

1.5.1. GMA Encapsulation Methods and Formats

The GMA encapsulation protocol supports the following three methods: trailer-based IP encapsulation; header-based IP encapsulation; and (header-based) non-IP encapsulation. Trailer-based IP encapsulation should be used as long as implementation allows. Header-based encapsulation should be used if trailered-based encapsulation is not feasible due to any reason (e.g., implementation constraints). In this case, if the adaptation layer (e.g., UDP tunneling) supports non-IP packet format, header-based non-IP encapsulation should be used; otherwise, header-based IP encapsulation should be used.

If non-IP encapsulation is configured, GMA header should always be present in every packet. In comparison, if IP encapsulation is configured, GMA header or trailer may be added dynamically on per-packet basis, and it indicates the presence of GMA header (or trailer) to set the protocol type of the GMA PDU to "114".

Figure 19:
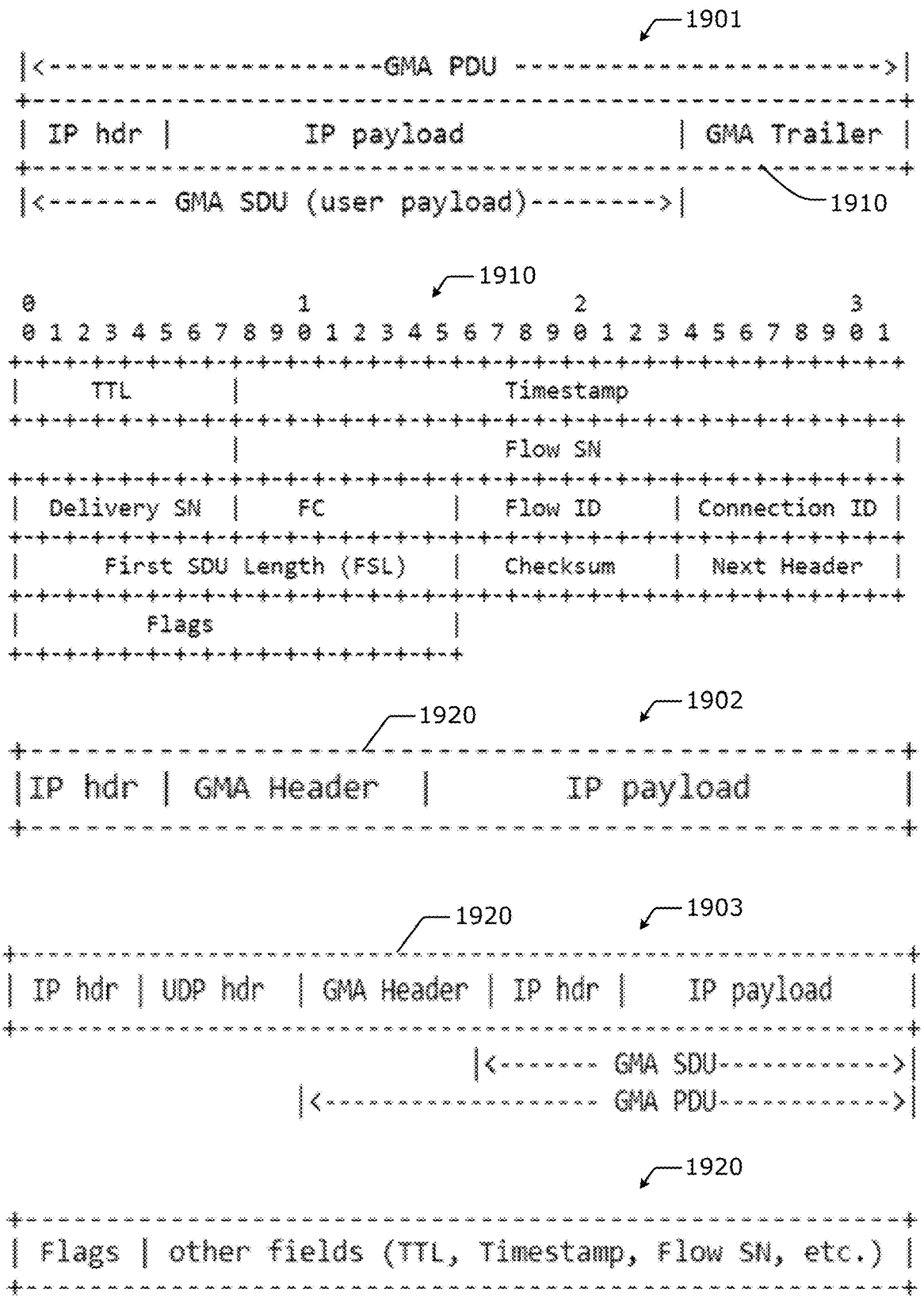
FIG. 19 illustrates various GMA packet formats.

The GMA endpoints may configure the encapsulation method through control signaling (see e.g., FIG. 2) or pre-configuration. For example, an "MX UP Setup Configuration Request" message as discussed in [RFC8743] includes the "MX Convergence Method Parameters," which provides the list of parameters to configure the convergence layer, and can be extended to indicate the GMA encapsulation method. A "GMA encapsulation format" parameter may be included to indicate one of the three GMA encapsulation methods FIG. 19 shows various GMA Protocol Data Unit (PDU) formats including a GMA PDU Format with Trailer-based IP Encapsulation 1901, a GMA PDU Format with Header-based IP Encapsulation 1902, and a GMA PDU Format with Non-IP Encapsulation 1903. Each GMA PDU (regardless of the particular format used) may carry one or more IP packets (also referred to as (GMA) service data units (SDUs)), or a fragment of an IP packet (or (GMA) SDU fragment), in the payload section of the PDU.

The GMA PDU 1901 includes an IP header, IP payload, and a GMA trailer 1910. The other GMA PDUs 1902 and 1903 include a GMA header 1920 instead of the GMA trailer 1910. The GMA trailer 1910 and GMA header 1920 include various GMA control fields. Usually, the trailer-based IP encapsulation GMA PDU 1901 is used as long as implementation allows/permits. However, the header-based encapsulation PDUs 1902 and 1903 may be used if the GMA control fields cannot be added at the end of the packets.

1.5.1.1. Trailer-Based IP Encapsulation

For the trailer-based GMA PDU 1901, the Protocol Type field in the IP header is changed to "114" (any 0-hop protocol) to indicate the presence of the GMA trailer 1910.

If the original IP packet is IPv4, the following three IP header fields may be changed:
IP length field—add the length of the "GMA Trailer" to the length of the original IP packet;
Time to Live (TTL)—set the TTL field to "1";
IP checksum field—recalculate IP checksum after changing the "Protocol Type" field, "TTL", and "IP Length".

If the original IP packet is Ipv6, the following two IP header fields may be changed:
IP length field—add the length of the "GMA Trailer" to the length of the original IP packet;
Hop Limit (HL) field—set the HL field to "0".

If UDP tunneling is used at the adaptation layer to carry the GMA PDU 1901, 1902 or 1903, these three IP header fields may remain unchanged, and the Rx will determine the GMA PDU length based on the UDP packet length.

FIG. 19 also shows an example format of the GMA trailer 1910, which shows various control fields present. The GMA trailer 1910 includes one or more mandatory fields and zero or more optional fields. The mandatory fields include the "flags" field and "next header" field, which are the last 3 bytes of the GMA trailer 1910. The Next Header field (1 Byte) indicates the IP protocol type of the (first) SDU in a PDU, and it stores the value before it was overwritten to '114.' For the Flags field (2 Bytes), Bit 0 is the most significant bit (MSB), and Bit 15 is the least significant bit (LSB). The Flags field includes the following fields: Checksum Present (bit 0): If the Checksum Present bit is set to 1, then the Checksum field is present; Concatenation Present (bit 1): If the Concatenation Present bit is set to 1, then the PDU carries multiple SDUs, and the First SDU Length field is present; Connection ID Present (bit 2): If the Connection ID Present bit is set to 1, then the Connection ID field is present; Flow ID Present (bit 3): If the Flow ID Present bit is set to 1, then the Flow ID field is present; Fragmentation Present (bit 4): If the Fragmentation Present bit is set to 1, then the PDU carry a fragment of the SDU and the Fragmentation Control field is present; Delivery SN Present (bit 5): If the Delivery Sequence Number (SN) Present bit is set to 1, then the Delivery SN field is present and contains the valid information; Flow SN Present (bit 6): If the Flow SN Present bit is set to 1, then the Sequence Number field is present; Timestamp Present (bit 7): If the Timestamp Present bit is set to 1, then the Timestamp field is present; TTL Present (bit 8): If the TTL Present bit is set to 1, then the TTL field is present; Reserved (bit 9-12): set to "0" and ignored on receipt; Version (bit 13~15): GMA version number, set to 0 for the GMA encapsulation protocol specified in [GMA10]. The Flags field is at the end of the PDU and the Next Header field is the second to last field. The GMA Rx may decode the Flags field first to determine the length of the GMA trailer, and then decodes the one or more optional fields included in the GMA PDU (discussed infra).

The GMA trailer 1910 may also include zero or more of the following optional fields: Checksum (1 Byte) to contain the (one's complement) checksum sum of all the 8 bits in the trailer 1910 (for purposes of computing the checksum, the value of the checksum field is Zero; this field is present only if the Checksum Present bit is set to one); First SDU Length (2 Bytes) indicates the length of the first IP packet in the PDU, only included if a PDU contains multiple IP packets (e.g., this field is present only if the Concatenation Present bit is set to one); Connection ID (1 Byte) includes an unsigned integer to identify the anchor and/or delivery connection of the GMA PDU (e.g., this field is present only if the Connection ID Present bit is set to one): the Anchor Connection ID data element/field (MSB 4 Bits of the Connection ID field) is an unsigned integer to identify the anchor connection, and the Delivery Connection ID data element/field (LSB 4 Bits of the Connection ID field) is an unsigned integer to identify the delivery connection; Flow ID (1 Byte) includes an unsigned integer to identify the IP flow that a PDU belongs to, for example, Data Radio Bearer (DRB) ID [LWIPEP] for a cellular (e.g. LTE, 5G/NR, etc.) connection (e.g., this field is present only if the Flow ID Present bit is set to one); Fragmentation Control (FC) (e.g. 1 Byte) to provide necessary information for re-assembly, only needed if a PDU carries fragments (e.g., this field is present only if the Fragmentation Present bit is set to one; see e.g., section 5 in [GMA10]); Delivery SN (1 Byte) includes an auto-incremented integer to indicate the GMA PDU transmission order on a delivery connection (e.g., the Delivery SN may be needed to measure packet loss of each delivery connection and therefore generated per delivery connection per flow; e.g., this field is present only if the Delivery SN Present bit is set to one); Flow SN (3 Bytes) includes an auto-incremented integer to indicate the GMA SDU (e.g., IP packet) order of a flow (e.g., the flow SN may be needed for retransmission, reordering, and fragmentation; the flow SN may be generated per flow; e.g., this field is present only if the Flow SN Present bit is set to one; Timestamp (4 Bytes) to contain the current value of the timestamp clock of the Tx in the unit of 1 millisecond. This field is present only if the Timestamp Present bit is set to one; and TTL (1 Byte) to contain the TTL value of the original IP header if the GMA SDU is IPv4, or the Hop-Limit value of the IP header if the GMA SDU is IPv6 (e.g., field is present only if the TTL Present bit is set to one). The GMA control fields follow the bit order in the flags field (e.g., Bit 0 (MSB) of the flags field is the checksum present bit, and the checksum field is the last in the trailer 1910 except for the two mandatory fields; Bit 1 is the concatenation present bit and the FSL field is the second to last, and so forth).

1.5.1.2. Header-Based IP Encapsulation

FIG. 19 also shows the header-based IP encapsulation format 1902. Here, the GMA header 1920 is inserted right after the IP header of the GMA SDU.

FIG. 19 also shows an example GMA header (hdr) format 1920, which includes the Flags field and the GMA control fields. In comparison to GMA trailer 1910, the only difference is that the Flags field is now in the front so that the Rx can first decode the Flags field to determine the GMA header length. Moreover, the IP header fields of the GMA PDU should be changed in the same way as trailered-based IP encapsulation (as discussed previously). Additionally or alternatively, the TTL, FSL, and Next Header fields are removed from the GMA control fields since the IP header fields of the GMA SDU remain unchanged during encapsulation. The order of the other GMA control fields is/are the same as discussed previously.

In some implementations, if the adaptation layer (e.g., UDP tunneling or the like) supports a non-IP packet format, the GMA PDU 1902 may be used without modification. If the adaptation layer (see e.g., FIG. 1B) only supports the IP packet format, the header-based IP encapsulation GMA PDU 1903 may be used. In the header-based IP encapsulation PDU 1903, the IP header of the GMA SDU (e.g., IP payload) is moved to the front of the packet so that the GMA PDU 1903 becomes an IP packet, and the IP header fields of the GMA PDU 1903 may be changed in the same manner as the trailer-based IP encapsulation PDU 1901.

The header or trailer based IP encapsulation PDUs 1902, 1901 may be used dynamically on a per-packet basis, and setting the protocol type of the GMA PDU to "114" indicates the presence of the GMA header 1920 in an IP packet.

1.5.1.3. (Header-Based) Non-IP Encapsulation

FIG. 19 also shows the header-based non-IP encapsulation format 1903. Here, "UDP Tunnelling" is configured at the MX adaptation layer. Additionally, the "TTL", "FSL", and "Next Header" are no longer needed. Moreover, the IP header fields of the GMA SDU remain unchanged. If non-IP encapsulation is configured, the GMA header 1920 is also present.

1.5.2. Fragmentation

The convergence layer MAY support fragmentation if a delivery connection has a smaller maximum transmission unit (MTU) than the original IP packet (SDU). The fragmentation procedure at the convergence sublayer is similar to IP fragmentation (see e.g., "DARPA Internet Program Protocol Specification" IETF RFC 791 (September 1981)) in principle, but with the following two differences for less overhead: the fragment offset field is expressed in number of fragments; and the maximum number of fragments per SDU is 2∂(=128).

The Fragmentation Control (FC) field in the GMA trailer (or header) contains the following bits: Bit #7: a More Fragment (MF) flag to indicate if the fragment is the last one (0) or not (1); and Bit #0-#6: Fragment Offset (in units of fragments) to specify the offset of a particular fragment relative to the beginning of the SDU.

A PDU carries a whole SDU without fragmentation if the FC field is set to all "0"s or the FC field is not present in the trailer. Otherwise, the PDU contains a fragment of the SDU.

The Flow SN field in the trailer is used to distinguish the fragments of one SDU from those of another. The Fragment Offset (FO) field tells the receiver the position of a fragment in the original SDU. The More Fragment (MF) flag indicates the last fragment.

To fragment a long SDU, the Tx creates n PDUs and copies the content of the IP header fields from the long PDU into the IP header of all the PDUs. The length field in the IP header of PDU should be changed to the length of the PDU, and the protocol type should be changed to 114.

The data of the long SDU is divided into n portions based on the MTU size of the delivery connection. The first portion of the data is placed in the first PDU. The MF flag is set to "1", and the FO field is set to "0". The i-th portion of the data is placed in the i-th PDU. The MF flag is set to "0" if it is the last fragment and set to "1" otherwise. The FO field is set to i−1.

To assemble the fragments of a SDU, the receiver combines PDUs that all have the same Flow SN. The combination is done by placing the data portion of each fragment in the relative order indicated by the Fragment Offset in that fragment's GMA trailer (or header). The first fragment will have the Fragment Offset set to "0", and the last fragment will have the More-Fragments flag set to "0".

GMA fragmentation operates above the IP layer of individual access connection (e.g., RAT1, RAT2, etc.) and between the two end points of convergence layer. The convergence layer end points (client, multi-access gateway) should obtain the MTU of individual connection through either manual configuration or implementing Path MTU Discovery (PMTUD) as suggested in Bonica et al., "IP Fragmentation Considered Fragile", IETF RFC 8900 (September 2020).

1.5.3. Concatenation

The convergence sublayer may support concatenation if a delivery connection has a larger maximum transmission unit (MTU) than the original IP packet (SDU). Only the SDUs with the same client network address (e.g., IP address or the like), and the same Flow ID may be concatenated. If the (trailer or header based) IP encapsulation method is used, the First SDU Length (FSL) field should be included in the GMA trailer (or header) to indicate the length of the first SDU. Otherwise, the FSL field should not be included.

To concatenate two or more SDUs, the Tx creates one PDU and copies the content of the IP header field from the first SDU into the IP header of the PDU. The data of the first SDU is placed in the first portion of the data of the PDU. The whole second SDU is then placed in the second portion of the data of the PDU. The procedure continues till the PDU size reaches the MTU of the delivery connection. If the FSL field is present, the IP length field of the PDU should be updated to include all concatenated SDUs and the trailer (or header), and the IP checksum field should be recalculated if the packet is IPv4.

To disaggregate a PDU, if the (header or trailer based) IP encapsulation method is used, the receiver first obtains the length of the first SDU from the FSL field and decodes the first SDU. The receiver then obtains the length of the second SDU based on the length field in the second SDU IP header and decodes the second SDU. The procedure continues till no byte is left in the PDU. If the non-IP encapsulation method is used, the IP header of the first SDU will not change during the encapsulation process, and the receiver SHOULD obtain the length of the first SDU directly from its IP header.

If a PDU contains multiple SDUs, the Flow SN field is for the last SDU, and the Flow SN of other SDU carried by the same PDU can be obtained according to its order in the PDU. For example, if the SN field is 6 and a PDU contains 3 SDUs (IP packets), the SN is 4, 5, and 6 for the first, second, and last SDU respectively. GMA concatenation can be used for packing small packets of a single application, e.g. TCP ACKs, or from multiple applications. Notice that a single GMA flow may carry multiple application flows (TCP, UDP, etc.).

1.5.4. Gma Protocol Stack

FIG. 17 also shows an (anchored) integrated GMA convergence protocol stack 1700e. As alluded to previously, GMA data plane functions (e.g., Gc and Gs) may be integrated into one or more existing network functions (e.g., a Gateway (GW), MEC, etc.) to avoid using virtual network interface (e.g., IP #3). The integrated GMA data plane protocol stack 1700e uses the RAT1 connection as the anchor connection. As a result, only one UDP tunnel is needed for delivering traffic over the non-anchor connection, which is the RAT2 connection.

In one example, the RAT1 anchor connection is a cellular connection (e.g., 5G/NR, LTE, etc.) and the RAT2 non-anchor connection is a WiFi connection. If using the 5G/LTE connection as the anchor for applications, and the WiFi connection as the delivery connection, UDP tunneling (or IPSec) may be used for delivering 5G/LTE IP traffic over a WiFi network. The GMA convergence sublayer (see also e.g., FIGS. 1A, 1B, 1C) is responsible for multi-path management operations (e.g., lossless switching, aggregation/splitting, etc.). In another example, a virtual IP connection may be used as the anchor, and the server 140 will provide all necessary information through MAMS signaling to configure the virtual IP connection on the client side 101. In the example GMA-MAMS DPPS 1700e, the GMA data plane functions (Gc 1401 and Gs 1440) may be integrated into an existing network function (e.g., Gateway, Edge server/host such as a MEC server/host, etc.) to avoid using a virtual network interface.

1.5.5. GMA Configuration Parameters

Some example GMA configuration parameters are as follows:
RAT1 probing interval: 30 seconds
RAT2 probing interval in state 1 and 2: 30 seconds
RAT2 probing interval in state 3: 10 second
RAT2 reconnecting interval: 60 seconds
Low throughput threshold: 10 kBps
Link disconnect timer: 10 minutes
RAT1 signal quality low threshold: −75 dBm
RAT1 signal quality high threshold: −70 dBm
RAT1 packet loss low threshold: 1%
RAT1 packet loss high threshold: 10%
Reordering queue size for High Throughput Flow (Flow ID=3): 1000 packets
Reordering timer for High Throughput Flow (Flow ID=3): 100 ms
Reordering queue size for High Reliability Flow (Flow ID=1): 20 packets
Reordering timer for High Reliability Flow (Flow ID=1): 10 ms
Measurement Interval (MI): 30 seconds
Reporting Interval (RI): 50 (MIs)
Default Flow ID (DFI): 3
Control message retransmission limit: 3
Virtual NIC MTU size: 1400 (bytes)
Idle Timer: 1 minute
Timestamp unit: 1000 (us)
UL-over-LTE flag: 0 (disabled, default)/1 (enabled)
Wi-Fi Congestion Detection flag: 0 (disabled, default)/1 (enabled)
Power Save flag: 0 (disabled, default)/1 (enabled)
Both Gc and Gs maintain the following (per-client) parameter(s):
Start Time: the duration between now and next "time zero" when Start_Time is reset (in the unit of 1 ms).
tx_timeStamp: a timestamp of when a packet is transmitted.
rx_timeStamp: a timestamp of when a packet is received.
Sync_Guard_Time: configurable parameter that controls how long Gc or Gs should wait before starting measurements (based on timestamp info in received packet(s)).

Gc and Gs reset their respective "Start_Time" immediately after the successful exchange of mx_session_resume_req/rsp, and the (tx) timestamp parameter in a control message indicates the duration between transmitting the message and resetting Start_Time.

In the above example, RAT1 is a WLAN connection/RAT (e.g., WiFi or the like) and RAT2 is a cellular connection/RAT (e.g., LTE, 5G/NR, GSM, WiMAX, or the like).

1.5.6. GMA Deployment Scenarios

Some example GMA based deployments may be as follows:

In a first GMA deployment, GMA client modules (e.g., GMA Gc and/or CCM 206) may be implemented as a "multi-home VPN" application and run on a UE (e.g., smartphone, tablet, PC, etc.) without any impact to platform or operation system.

In a second GMA deployment, the GMA server modules (e.g., GMA Gs and/or NCM 236) may be implemented as an "Edge/cloud server" application (e.g., MEC app or the like) and run in the Edge or cloud server without any impact to platform or operation system. If running GMA server on the Edge, the traffic routing policy may be configured on the Edge platform such that the following three flows are routed locally to the Edge platform:

TCP flow (for MAMS management messages): IP #1 (or IP #2)+TCP #1
UDP flow (for tunneling traffic over the $1^{st}$ delivery connection): IP #1+UDP #1
UDP flow (for tunneling traffic over the second delivery connection): IP #2+UDP #2

Moreover, a DNS configuration may be added to the Edge platform such that "gmaserver.mec.com" is mapped to IP #1 and IP #2 over the two delivery connections, respectively.

2. Edge Computing System Configurations and Arrangements

Edge computing, at a general level, refers to the implementation, coordination, and use of computing and resources at locations closer to the "edge" or collection of "edges" of the network. The purpose of this arrangement is to improve total cost of ownership, reduce application and network latency, reduce network backhaul traffic and associated energy consumption, improve service capabilities, and improve compliance with security or data privacy requirements (especially as compared to conventional cloud computing). Components that can perform edge computing operations ("edge nodes") can reside in whatever location needed by the system architecture or ad hoc service (e.g., in an high performance compute data center or cloud installation; a designated edge node server, an enterprise server, a roadside server, a telecom central office; or a local or peer at-the-edge device being served consuming edge services).

Individual compute platforms or other components that can perform edge computing operations (referred to as "edge compute nodes," "edge nodes," or the like) can reside in whatever location needed by the system architecture or ad hoc service. In many edge computing architectures, edge nodes are deployed at NANs, gateways, network routers, and/or other devices that are closer to endpoint devices (e.g., UEs, IoT devices, etc.) producing and consuming data. As examples, edge nodes may be implemented in a high performance compute data center or cloud installation; a designated edge node server, an enterprise server, a roadside server, a telecom central office; or a local or peer at-the-edge device being served consuming edge services.

Edge compute nodes may partition resources (e.g., memory, CPU, GPU, interrupt controller, I/O controller, memory controller, bus controller, network connections or sessions, etc.) where respective partitionings may contain security and/or integrity protection capabilities. Edge nodes may also provide orchestration of multiple applications through isolated user-space instances such as containers, partitions, virtual environments (VEs), virtual machines (VMs), Function-as-a-Service (FaaS) engines, Servlets, servers, and/or other like computation abstractions. Containers are contained, deployable units of software that provide code and needed dependencies. Various edge system arrangements/architecture treats VMs, containers, and functions equally in terms of application composition. The edge nodes are coordinated based on edge provisioning functions, while the operation of the various applications are coordinated with orchestration functions (e.g., VM or container engine, etc.). The orchestration functions may be used to deploy the isolated user-space instances, identifying and scheduling use of specific hardware, security related functions (e.g., key management, trust anchor management, etc.), and other tasks related to the provisioning and lifecycle of isolated user spaces Applications that have been adapted for edge computing include but are not limited to virtualization of traditional network functions (e.g., to operate telecommunications or Internet services) and the introduction of next-generation features and services (e.g., to support 5G network services). Use-cases which are projected to extensively utilize edge computing include connected self-driving cars, surveillance, Internet of Things (IoT) device data analytics, video encoding and analytics, location aware services, device sensing in Smart Cities, among many other network and compute intensive services.

Edge computing may, in some scenarios, offer or host a cloud-like distributed service, to offer orchestration and management for applications and coordinated service instances among many types of storage and compute resources. Edge computing is also expected to be closely integrated with existing use cases and technology developed for IoT and Fog/distributed networking configurations, as endpoint devices, clients, and gateways attempt to access network resources and applications at locations closer to the edge of the network.

The present disclosure provides specific examples relevant to edge computing configurations provided within Multi-Access Edge Computing (MEC) and 5G network implementations. However, many other standards and network implementations are applicable to the edge and service management concepts discussed herein. For example, many other edge computing/networking technologies may be applicable to the present disclosure in various combinations and layouts of devices located at the edge of a network. Examples of such other edge computing/networking technologies include Content Delivery Networks (CDNs) (also referred to as "Content Distribution Networks" or the like); Mobility Service Provider (MSP) edge computing and/or Mobility as a Service (MaaS) provider systems (e.g., used in AECC architectures); Nebula edge-cloud systems; Fog computing systems; Cloudlet edge-cloud systems; Mobile Cloud Computing (MCC) systems; Central Office Re-architected as a Datacenter (CORD), mobile CORD (M-CORD) and/or Converged Multi-Access and Core (COMAC) systems; and/or the like. Further, the techniques disclosed herein may relate to other IoT edge network systems and configurations, and other intermediate processing entities and architectures may also be used for purposes of the present disclosure.

Figure 20:
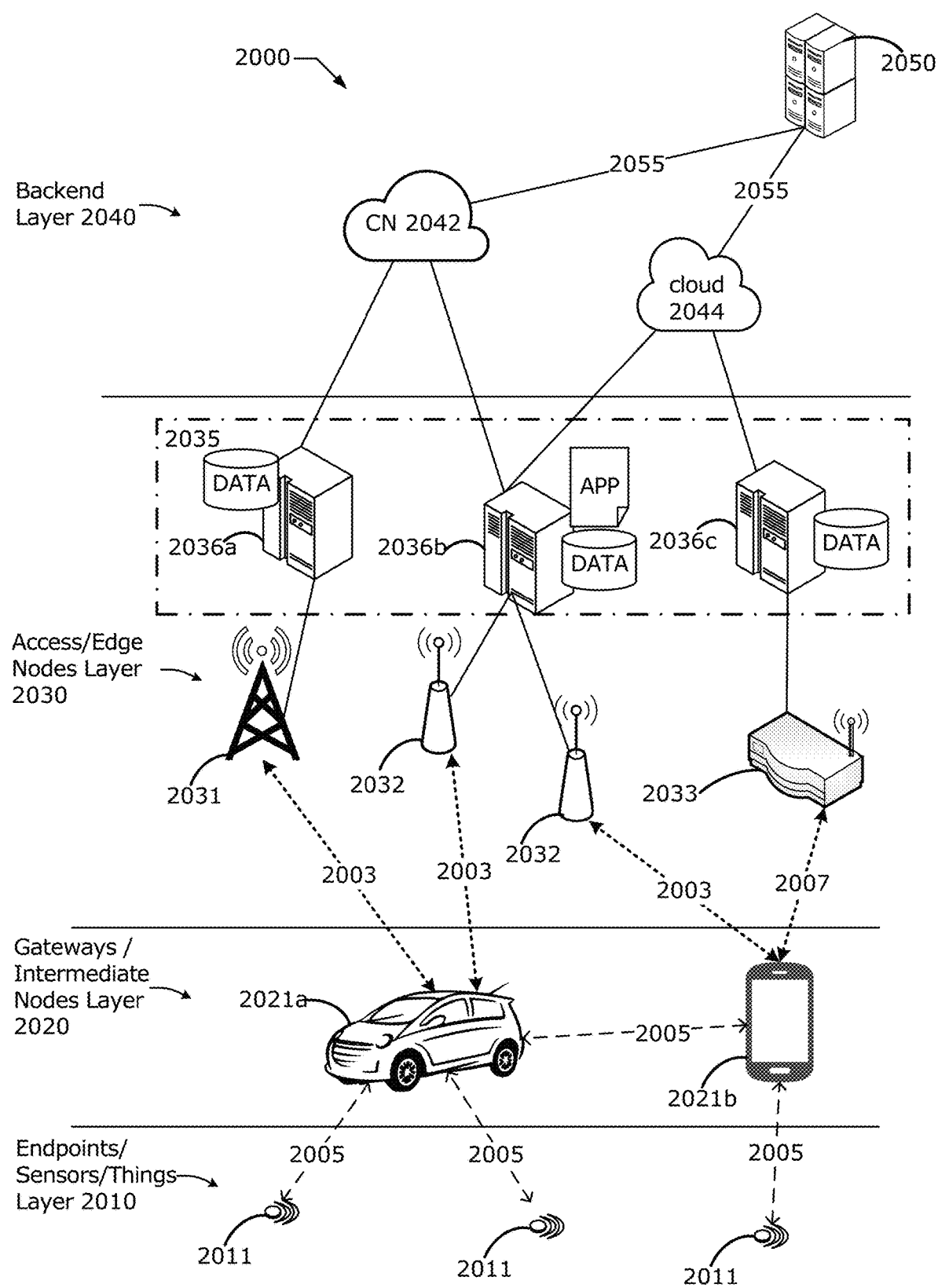
FIG. 20 illustrates an example edge computing environment.

FIG. 20 illustrates an example edge computing environment 2000. FIG. 20 specifically illustrates the different layers of communication occurring within the environment 2000, starting from endpoint sensors or things layer 2010 (e.g., operating in an Internet of Things (IoT) network topology) comprising one or more IoT devices 2011 (also referred to as edge endpoints 2010 or the like); increasing in sophistication to gateways or intermediate node layer 2020 comprising one or more user equipment (UEs) 2021*a* and 2021*b* (also referred to as intermediate nodes 2020 or the like), which facilitate the collection and processing of data from endpoints 2010; increasing in processing and connectivity sophistication to access node layer 2030 (or "edge node layer 2030") comprising a plurality of network access nodes (NANs) 2031, 2032, and 2033 (collectively referred to as "NANs 2031-2033" or the like) and a plurality of edge compute nodes 2036*a-c* (collectively referred to as "edge compute nodes 2036" or the like) within an edge computing system 2035; and increasing in connectivity and processing sophistication to a backend layer 2010 comprising core network (CN) 2042 and cloud 2044. The processing at the backend layer 2010 may be enhanced by network services as performed by one or more remote application (app) servers 2050 and/or other cloud services. Some or all of these elements may be equipped with or otherwise implement some or all features and/or functionality discussed herein.

The environment 2000 is shown to include end-user devices, such as intermediate nodes 2020 and endpoints 2010, which are configured to connect to (or communicatively couple with) one or more multiple communication networks (also referred to as "access networks," "radio access networks," or the like) based on different access technologies (or "radio access technologies") for accessing application services. These access networks may include one or more of NANs 2031, 2032, and/or 2033. The NANs 2031-2033 are arranged to provide network connectivity to the end-user devices via respective links 2003, 2007 between the individual NANs and the one or more UEs 2011, 2021.

As examples, the communication networks and/or access technologies may include cellular technology such as LTE, MuLTEfire, and/or NR/5G (e.g., as provided by Radio Access Network (RAN) node 2031 and/or RAN nodes 2032), WiFi or wireless local area network (WLAN) technologies (e.g., as provided by access point (AP) 2033 and/or RAN nodes 2032), and/or the like. Different technologies exhibit benefits and limitations in different scenarios, and application performance in different scenarios becomes dependent on the choice of the access networks (e.g., WiFi, LTE, etc.) and the used network and transport protocols (e.g., Transfer Control Protocol (TCP), Virtual Private Network (VPN), Multi-Path TCP (MPTCP), Generic Routing Encapsulation (GRE), etc.).

The intermediate nodes 2020 include UE 2021*a* and UE 2021*b* (collectively referred to as "UE 2021" or "UEs 2021"). In this example, the UE 2021*a* is illustrated as a vehicle UE, and UE 2021*b* is illustrated as a smartphone (e.g., handheld touchscreen mobile computing device connectable to one or more cellular networks). However, these UEs 2021 may comprise any mobile or non-mobile computing device, such as tablet computers, wearable devices, PDAs, pagers, desktop computers, laptop computers, wireless handsets, unmanned vehicles or drones, and/or any type of computing device including a wireless communication interface.

The endpoints 2010 include UEs 2011, which may be IoT devices (also referred to as "IoT devices 2011"), which are uniquely identifiable embedded computing devices (e.g., within the Internet infrastructure) that comprise a network access layer designed for low-power IoT applications utilizing short-lived UE connections. The IoT devices 2011 are any physical or virtualized, devices, sensors, or "things" that are embedded with hardware and/or software components that enable the objects, devices, sensors, or "things" capable of capturing and/or recording data associated with an event, and capable of communicating such data with one or more other devices over a network with little or no user intervention. As examples, IoT devices 2011 may be abiotic devices such as autonomous sensors, gauges, meters, image capture devices, microphones, light emitting devices, audio emitting devices, audio and/or video playback devices, electro-mechanical devices (e.g., switch, actuator, etc.), EEMS, ECUs, ECMs, embedded systems, microcontrollers, control modules, networked or "smart" appliances, MTC devices, M2M devices, and/or the like. The IoT devices 2011 can utilize technologies such as M2M or MTC for exchanging data with an MTC server (e.g., a server 2050), an edge server 2036 and/or edge computing system 2035, or device via a PLMN, ProSe or D2D communication, sensor networks, or IoT networks. The M2M or MTC exchange of data may be a machine-initiated exchange of data.

The IoT devices 2011 may execute background applications (e.g., keep-alive messages, status updates, etc.) to facilitate the connections of the IoT network. Where the IoT devices 2011 are, or are embedded in, sensor devices, the IoT network may be a WSN. An IoT network describes an interconnecting IoT UEs, such as the IoT devices 2011 being connected to one another over respective direct links 2005. The IoT devices may include any number of different types of devices, grouped in various combinations (referred to as an "IoT group") that may include IoT devices that provide one or more services for a particular user, customer, organizations, etc. A service provider (e.g., an owner/operator of server 2050, CN 2042, and/or cloud 2044) may deploy the IoT devices in the IoT group to a particular area (e.g., a geolocation, building, etc.) in order to provide the one or more services. In some implementations, the IoT network may be a mesh network of IoT devices 2011, which may be termed a fog device, fog system, or fog, operating at the edge of the cloud 2044. The fog involves mechanisms for bringing cloud computing functionality closer to data generators and consumers wherein various network devices run cloud application logic on their native architecture. Fog computing is a system-level horizontal architecture that distributes resources and services of computing, storage, control, and networking anywhere along the continuum from cloud 2044 to Things (e.g., IoT devices 2011). The fog may be established in accordance with specifications released by the OFC, the OCF, among others. Additionally or alternatively, the fog may be a tangle as defined by the IOTA foundation.

The fog may be used to perform low-latency computation/aggregation on the data while routing it to an edge cloud computing service (e.g., edge nodes 2030) and/or a central cloud computing service (e.g., cloud 2044) for performing heavy computations or computationally burdensome tasks. On the other hand, edge cloud computing consolidates human-operated, voluntary resources, as a cloud. These voluntary resource may include, inter-alia, intermediate nodes 2020 and/or endpoints 2010, desktop PCs, tablets, smartphones, nano data centers, and the like. In various implementations, resources in the edge cloud may be in one to two-hop proximity to the IoT devices 2011, which may result in reducing overhead related to processing data and may reduce network delay.

Additionally or alternatively, the fog may be a consolidation of IoT devices 2011 and/or networking devices, such as routers and switches, with high computing capabilities and the ability to run cloud application logic on their native architecture. Fog resources may be manufactured, managed, and deployed by cloud vendors, and may be interconnected with high speed, reliable links. Moreover, fog resources reside farther from the edge of the network when compared to edge systems but closer than a central cloud infrastructure. Fog devices are used to effectively handle computationally intensive tasks or workloads offloaded by edge resources.

Additionally or alternatively, the fog may operate at the edge of the cloud 2044. The fog operating at the edge of the cloud 2044 may overlap or be subsumed into an edge network 2030 of the cloud 2044. The edge network of the cloud 2044 may overlap with the fog, or become a part of the fog. Furthermore, the fog may be an edge-fog network that includes an edge layer and a fog layer. The edge layer of the edge-fog network includes a collection of loosely coupled, voluntary and human-operated resources (e.g., the aforementioned edge compute nodes 2036 or edge devices). The Fog layer resides on top of the edge layer and is a consolidation of networking devices such as the intermediate nodes 2020 and/or endpoints 2010 of FIG. 20.

Data may be captured, stored/recorded, and communicated among the IoT devices 2011 or, for example, among the intermediate nodes 2020 and/or endpoints 2010 that have direct links 2005 with one another as shown by FIG. 20. Analysis of the traffic flow and control schemes may be implemented by aggregators that are in communication with the IoT devices 2011 and each other through a mesh network. The aggregators may be a type of IoT device 2011 and/or network appliance. In the example of FIG. 20, the aggregators may be edge nodes 2030, or one or more designated intermediate nodes 2020 and/or endpoints 2010. Data may be uploaded to the cloud 2044 via the aggregator, and commands can be received from the cloud 2044 through gateway devices that are in communication with the IoT devices 2011 and the aggregators through the mesh network. Unlike the traditional cloud computing model, in some implementations, the cloud 2044 may have little or no computational capabilities and only serves as a repository for archiving data recorded and processed by the fog. In these implementations, the cloud 2044 centralized data storage system and provides reliability and access to data by the computing resources in the fog and/or edge devices. Being at the core of the architecture, the Data Store of the cloud 2044 is accessible by both Edge and Fog layers of the aforementioned edge-fog network.

As mentioned previously, the access networks provide network connectivity to the end-user devices 2020, 2010 via respective NANs 2031-2033. The access networks may be Radio Access Networks (RANs) such as an NG RAN or a 5G RAN for a RAN that operates in a 5G/NR cellular network, an E-UTRAN for a RAN that operates in an LTE or 4G cellular network, or a legacy RAN such as a UTRAN or GERAN for GSM or CDMA cellular networks. The access network or RAN may be referred to as an Access Service Network for WiMAX implementations. Additionally or alternatively, all or parts of the RAN may be implemented as one or more software entities running on server computers as part of a virtual network, which may be referred to as a cloud RAN (CRAN), Cognitive Radio (CR), a virtual baseband unit pool (vBBUP), and/or the like. Additionally or alternatively, the CRAN, CR, or vBBUP may implement a RAN function split, wherein one or more communication protocol layers are operated by the CRAN/CR/vBBUP and other communication protocol entities are operated by individual RAN nodes 2031, 2032. This virtualized framework allows the freed-up processor cores of the NANs 2031, 2032 to perform other virtualized applications, such as virtualized applications for various elements discussed herein.

The UEs 2021, 2011 may utilize respective connections (or channels) 2003, each of which comprises a physical communications interface or layer. The connections 2003 are illustrated as an air interface to enable communicative coupling consistent with cellular communications protocols, such as 3GPP LTE, 5G/NR, Push-to-Talk (PTT) and/or PTT over cellular (POC), UMTS, GSM, CDMA, and/or any of the other communications protocols discussed herein. Additionally or alternatively, the UEs 2011, 2021 and the NANs 2031-2033 communicate data (e.g., transmit and receive) data over a licensed medium (also referred to as the "licensed spectrum" and/or the "licensed band") and an unlicensed shared medium (also referred to as the "unlicensed spectrum" and/or the "unlicensed band"). To operate in the unlicensed spectrum, the UEs 2011, 2021 and NANs 2031-2033 may operate using LAA, enhanced LAA (eLAA), and/or further eLAA (feLAA) mechanisms. The UEs 2021, 2011 may further directly exchange communication data via respective direct links 2005, which may be LTE/NR Proximity Services (ProSe) link or PC5 interfaces/links, or WiFi based links or a personal area network (PAN) based links (e.g., IEEE 802.15.4 based protocols including ZigBee, IPv6 over Low power Wireless Personal Area Networks (6LoWPAN), WirelessHART, MiWi, Thread, etc.; WiFi-direct; Bluetooth/Bluetooth Low Energy (BLE) protocols).

Additionally or alternatively, individual UEs 2021, 2011 provide radio information to one or more NANs 2031-2033 and/or one or more edge compute nodes 2036 (e.g., edge servers/hosts, etc.). The radio information may be in the form of one or more measurement reports, and/or may include, for example, signal strength measurements, signal quality measurements, and/or the like. Each measurement report is tagged with a timestamp and the location of the measurement (e.g., the UEs 2021, 2011 current location). As examples, the measurements collected by the UEs 2021, 2011 and/or included in the measurement reports may include one or more of the following: bandwidth (BW), network or cell load, latency, jitter, round trip time (RTT), number of interrupts, out-of-order delivery of data packets, transmission power, bit error rate, bit error ratio (BER), Block Error Rate (BLER), packet loss rate, packet reception rate (PRR), e2e delay, signal-to-noise ratio (SNR), signal-to-noise and interference ratio (SINR), signal-plus-noise-plus-distortion to noise-plus-distortion (SINAD) ratio, carrier-to-interference plus noise ratio (CINR), Additive White Gaussian Noise (AWGN), energy per bit to noise power density ratio (Eb/NO), energy per bit to interference power density ratio (Ec/I0), peak-to-average power ratio (PAPR), Reference Signal Received Power (RSRP), Received Signal Strength Indicator (RSSI), Reference Signal Received Quality (RSRQ), GNSS timing of cell frames for UE positioning for E-UTRAN or 5G/NR (e.g., a timing between an AP or RAN node reference time and a GNSS-specific reference time for a given GNSS), GNSS code measurements (e.g., The GNSS code phase (integer and fractional parts) of the spreading code of the ith GNSS satellite signal), GNSS carrier phase measurements (e.g., the number of carrier-phase cycles (integer and fractional parts) of the ith GNSS satellite signal, measured since locking onto the signal; also called Accumulated Delta Range (ADR)), channel interference measurement, thermal noise power measurement, received interference power measurement, and/or other like measurements. The RSRP, RSSI, and/or RSRQ measurements may include RSRP, RSSI, and/or RSRQ measurements of cell-specific reference signals, channel state information reference signals (CSI-RS), and/or synchronization signals (SS) or SS blocks for 3GPP networks (e.g., LTE or 5G/NR) and RSRP, RSSI, and/or RSRQ measurements of various beacon, Fast Initial Link Setup (FILS) discovery frames, or probe response frames for IEEE 802.11 WLAN/ WiFi networks. Other measurements may be additionally or alternatively used, such as those discussed in 3GPP TS 36.214 v16.2.0 (2021 Mar. 31) ("[TS36214]"), 3GPP TS 38.215 v16.4.0 (2020-12) ("[TS38215]"), IEEE 802.11- 2020, "IEEE Standard for Information Technology—Telecommunications and Information Exchange between Systems—Local and Metropolitan AreaNetworks—Specific Requirements—Part 11: Wireless LAN Medium Access Control (MAC) and Physical Layer (PHY) Specifications" (2021-02-26) ("[IEEE80211]"), and/or the like. Additionally or alternatively, any of the aforementioned measurements (or combination of measurements) may be collected by one or more NANs 2031-2033 and provided to the edge compute node(s) 2036.

The radio information may be reported in response to a trigger event and/or on a periodic basis. Additionally or alternatively, individual UEs 2021, 2011 report radio information either at a low periodicity or a high periodicity depending on a data transfer that is to take place, and/or other information about the data transfer.

Additionally or alternatively, the edge compute node(s) 2036 may request the measurements from the NANs 2031- 2033 at low or high periodicity, or the NANs 2031-2033 may provide the measurements to the edge compute node(s) 2036 at low or high periodicity. Additionally or alternatively, the edge compute node(s) 2036 may obtain other relevant data from other edge compute node(s) 2036, core network functions (NFs), application functions (AFs), and/or other UEs 2011, 2021 such as Key Performance Indicators (KPIs), with the measurement reports or separately from the measurement reports.

The UE 2021*b* is shown to be configured to access an access point (AP) 2033 via a connection 2007. In this example, the AP 2033 is shown to be connected to the Internet without connecting to the CN 2042 of the wireless system. The connection 2007 can comprise a local wireless connection, such as a connection consistent with any IEEE 802.11 protocol, wherein the AP 2033 would comprise a wireless fidelity (WiFi®) router. Additionally or alternatively, the UEs 2021 and IoT devices 2011 can be configured to communicate using suitable communication signals with each other or with any of the AP 2033 over a single or multicarrier communication channel in accordance with various communication techniques, such as, but not limited to, an orthogonal frequency division multiplexing (OFDM) communication technique, a single-carrier frequency division multiple access (SC-FDMA) communication technique, and/or the like, although the scope of the present disclosure is not limited in this respect. The communication technique may include a suitable modulation scheme such as Complementary Code Keying (CCK); Phase-Shift Keying (PSK) such as Binary PSK (BPSK), Quadrature PSK (QPSK), Differential PSK (DPSK), etc.; or Quadrature Amplitude Modulation (QAM) such as M-QAM; and/or the like.

The one or more NANs 2031 and 2032 that enable the connections 2003 may be referred to as "RAN nodes" or the like. The RAN nodes 2031, 2032 may comprise ground stations (e.g., terrestrial access points) or satellite stations providing coverage within a geographic area (e.g., a cell). The RAN nodes 2031, 2032 may be implemented as one or more of a dedicated physical device such as a macrocell base station, and/or a low power base station for providing femtocells, picocells or other like cells having smaller coverage areas, smaller user capacity, or higher bandwidth compared to macrocells. In this example, the RAN node 2031 is embodied as a NodeB, evolved NodeB (eNB), or a next generation NodeB (gNB), and the RAN nodes 2032 are embodied as relay nodes, distributed units, or Road Side Unites (RSUs). Any other type of NANs can be used.

Any of the RAN nodes 2031, 2032 can terminate the air interface protocol and can be the first point of contact for the UEs 2021 and IoT devices 2011. Additionally or alternatively, any of the RAN nodes 2031, 2032 can fulfill various logical functions for the RAN including, but not limited to, RAN function(s) (e.g., radio network controller (RNC) functions and/or NG-RAN functions) for radio resource management, admission control, uplink and downlink dynamic resource allocation, radio bearer management, data packet scheduling, etc. Additionally or alternatively, the UEs 2011, 2021 can be configured to communicate using OFDM communication signals with each other or with any of the NANs 2031, 2032 over a multicarrier communication channel in accordance with various communication techniques, such as, but not limited to, an OFDMA communication technique (e.g., for downlink communications) and/or an SC-FDMA communication technique (e.g., for uplink and ProSe or sidelink communications), although the scope of the present disclosure is not limited in this respect.

For most cellular communication systems, the RAN function(s) operated by the RAN or individual NANs 2031-2032 organize downlink transmissions (e.g., from any of the RAN nodes 2031, 2032 to the UEs 2011, 2021) and uplink transmissions (e.g., from the UEs 2011, 2021 to RAN nodes 2031, 2032) into radio frames (or simply "frames") with 10 millisecond (ms) durations, where each frame includes ten 1 ms subframes. Each transmission direction has its own resource grid that indicate physical resource in each slot, where each column and each row of a resource grid corresponds to one symbol and one subcarrier, respectively. The duration of the resource grid in the time domain corresponds to one slot in a radio frame. The resource grids comprises a number of resource blocks (RBs), which describe the mapping of certain physical channels to resource elements (REs). Each RB may be a physical RB (PRB) or a virtual RB (VRB) and comprises a collection of REs. An RE is the smallest time-frequency unit in a resource grid. The RNC function(s) dynamically allocate resources (e.g., PRBs and modulation and coding schemes (MCS)) to each UE 2011, 2021 at each transmission time interval (TTI). A TTI is the duration of a transmission on a radio link 2003, 2005, and is related to the size of the data blocks passed to the radio link layer from higher network layers.

The NANs 2031/2032 may be configured to communicate with one another via respective interfaces or links (not shown), such as an X2 interface for LTE implementations (e.g., when CN 2042 is an Evolved Packet Core (EPC)), an Xn interface for 5G or NR implementations (e.g., when CN 2042 is an Fifth Generation Core (5GC)), or the like. The NANs 2031 and 2032 are also communicatively coupled to CN 2042. Additionally or alternatively, the CN 2042 may be an evolved packet core (EPC) network, a NextGen Packet Core (NPC) network, a 5G core (5GC), or some other type of CN. The CN 2042 may comprise a plurality of network elements, which are configured to offer various data and telecommunications services to customers/subscribers (e.g., users of UEs 2021 and IoT devices 2011) who are connected to the CN 2042 via a RAN. The components of the CN 2042 may be implemented in one physical node or separate physical nodes including components to read and execute instructions from a machine-readable or computer-readable medium (e.g., a non-transitory machine-readable storage medium). Additionally or alternatively, Network Functions Virtualization (NFV) may be utilized to virtualize any or all of the above-described network node functions via executable instructions stored in one or more computer-readable storage mediums (described in further detail infra). A logical instantiation of the CN 2042 may be referred to as a network slice, and a logical instantiation of a portion of the CN 2042 may be referred to as a network sub-slice. NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more CN 2042 components/functions.

The CN 2042 is shown to be communicatively coupled to an application server 2050 and a network 2050 via an IP communications interface 2055. the one or more server(s) 2050 comprise one or more physical and/or virtualized systems for providing functionality (or services) to one or more clients (e.g., UEs 2021 and IoT devices 2011) over a network. The server(s) 2050 may include various computer devices with rack computing architecture component(s), tower computing architecture component(s), blade computing architecture component(s), and/or the like. The server(s) 2050 may represent a cluster of servers, a server farm, a cloud computing service, or other grouping or pool of servers, which may be located in one or more datacenters. The server(s) 2050 may also be connected to, or otherwise associated with one or more data storage devices (not shown). Moreover, the server(s) 2050 may include an operating system (OS) that provides executable program instructions for the general administration and operation of the individual server computer devices, and may include a computer-readable medium storing instructions that, when executed by a processor of the servers, may allow the servers to perform their intended functions. Suitable implementations for the OS and general functionality of servers are known or commercially available, and are readily implemented by persons having ordinary skill in the art. Generally, the server(s) 2050 offer applications or services that use IP/network resources. As examples, the server(s) 2050 may provide traffic management services, cloud analytics, content streaming services, immersive gaming experiences, social networking and/or microblogging services, and/or other like services. In addition, the various services provided by the server(s) 2050 may include initiating and controlling software and/or firmware updates for applications or individual components implemented by the UEs 2021 and IoT devices 2011. The server(s) 2050 can also be configured to support one or more communication services (e.g., Voice-over-Internet Protocol (VoIP) sessions, PTT sessions, group communication sessions, social networking services, etc.) for the UEs 2021 and IoT devices 2011 via the CN 2042.

The Radio Access Technologies (RATs) employed by the NANs 2031-2033, the UEs 2021, 2011, and the other elements in FIG. 20 may include one or more V2X RATs, which allow these elements to communicate directly with one another, with infrastructure equipment (e.g., NANs 2031-2033), and other devices. Any number of V2X RATs may be used for V2X communication. In some implementations, at least two distinct V2X RATs may be used including WLAN V2X (W-V2X) RAT based on IEEE V2X technologies (e.g., DSRC for the U.S. and ITS-G5 for Europe) and 3GPP C-V2X RAT (e.g., LTE, 5G/NR, and beyond).

The W-V2X RATs include, for example, IEEE 1609.0-2019, "IEEE Guide for Wireless Access in Vehicular Environments (WAVE) Architecture" (2019 Apr. 10) ("[IEEE16090]"), SAE Int'l, "V2X Communications Message Set Dictionary" (formerly "Dedicated Short Range Communication (DSRC) Message Set Dictionary") (2020 Jul. 23) ("[J2735_202007]"), Intelligent Transport Systems in the 5 GHz frequency band (ITS-G5), the IEEE 802.11p protocol (which is the layer 1 (L1) and layer 2 (L2) part of WAVE, DSRC, and ITS-G5), and sometimes IEEE 802.16-2017, "IEEE Standard for Air Interface for Broadband Wireless Access Systems" (sometimes referred to as "Worldwide Interoperability for Microwave Access" or "WiMAX") (2018-03-02) ("[WiMAX]"). The term "DSRC" refers to vehicular communications in the 5.9 GHz frequency band that is generally used in the United States, while "ITS-G5" refers to vehicular communications in the 5.9 GHz frequency band in Europe. Since any number of different RATs are applicable (including IEEE 802.11p-based RATs) that may be used in any geographic or political region, the terms "DSRC" (used, among other regions, in the U.S.) and "ITS-G5" (used, among other regions, in Europe) may be used interchangeably throughout this disclosure. The access layer for the ITS-G5 interface is outlined in ETSI EN 302 663 V1.3.1 (2020-01) (hereinafter "[EN302663]") and describes the access layer of the ITS-S reference architecture. The ITS-G5 access layer comprises [IEEE80211] (which now incorporates IEEE 802.11p) and IEEE 802.2 Logical Link Control (LLC) ("[IEEE8022]") and/or IEEE/ISO/IEC 8802-2-1998 protocols, as well as features for Decentralized Congestion Control (DCC) methods discussed in ETSI TS 102 687 V1.2.1 (2018-04) ("[TS102687]"). The access layer for 3GPP LTE-V2X based interface(s) is outlined in, inter alia, ETSI EN 303 613 V1.1.1 (2020-01), 3GPP TS 23.285 v16.2.0 (2019-12); and 3GPP 5G/NR-V2X is outlined in, inter alia, 3GPP TR 23.786 v16.1.0 (2019-06) and 3GPP TS 23.287 v16.2.0 (2020-03).

The cloud 2044 may represent a cloud computing architecture/platform that provides one or more cloud computing services. Cloud computing refers to a paradigm for enabling network access to a scalable and elastic pool of shareable computing resources with self-service provisioning and administration on-demand and without active management by users. Computing resources (or simply "resources") are any physical or virtual component, or usage of such components, of limited availability within a computer system or network. Examples of resources include usage/access to, for a period of time, servers, processor(s), storage equipment, memory devices, memory areas, networks, electrical power, input/output (peripheral) devices, mechanical devices, network connections (e.g., channels/links, ports, network sockets, etc.), operating systems, virtual machines (VMs), software/applications, computer files, and/or the like. Cloud computing provides cloud computing services (or cloud services), which are one or more capabilities offered via cloud computing that are invoked using a defined interface (e.g., an API or the like). Some capabilities of cloud 2044 include application capabilities type, infrastructure capabilities type, and platform capabilities type. A cloud capabilities type is a classification of the functionality provided by a cloud service to a cloud service customer (e.g., a user of cloud 2044), based on the resources used. The application capabilities type is a cloud capabilities type in which the cloud service customer can use the cloud service provider's applications; the infrastructure capabilities type is a cloud capabilities type in which the cloud service customer can provision and use processing, storage or networking resources; and platform capabilities type is a cloud capabilities type in which the cloud service customer can deploy, manage and run customer-created or customer-acquired applications using one or more programming languages and one or more execution environments supported by the cloud service provider. Cloud services may be grouped into categories that possess some common set of qualities. Some cloud service categories that the cloud 2044 may provide include, for example, Communications as a Service (CaaS), which is a cloud service category involving real time interaction and collaboration services; Compute as a Service (CompaaS), which is a cloud service category involving the provision and use of processing resources needed to deploy and run software; Database as a Service (DaaS), which is a cloud service category involving the provision and use of database system management services; Data Storage as a Service (DSaaS), which is a cloud service category involving the provision and use of data storage and related capabilities; Firewall as a Service (FaaS), which is a cloud service category involving providing firewall and network traffic management services; Infrastructure as a Service (IaaS), which is a cloud service category involving infrastructure capabilities type; Network as a Service (NaaS), which is a cloud service category involving transport connectivity and related network capabilities; Platform as a Service (PaaS), which is a cloud service category involving the platform capabilities type; Software as a Service (SaaS), which is a cloud service category involving the application capabilities type; Security as a Service, which is a cloud service category involving providing network and information security (infosec) services; and/or other like cloud services.

Additionally or alternatively, the cloud 2044 may represent a network such as the Internet, a local area network (LAN), a wide area network (WAN), a wireless local area network (WLAN), or a wireless wide area network (WWAN) including proprietary and/or enterprise networks for a company or organization, or combinations thereof.

Here, the cloud 2044 includes one or more networks that comprise computers, network connections among the computers, and software routines to enable communication between the computers over network connections. In this regard, the cloud 2044 comprises one or more network elements that may include one or more processors, communications systems (e.g., including network interface controllers, one or more transmitters/receivers connected to one or more antennas, etc.), and computer readable media. Examples of such network elements may include wireless access points (WAPs), home/business servers (with or without RF communications circuitry), routers, switches, hubs, radio beacons, base stations, picocell or small cell base stations, backbone gateways, and/or any other like network device. Connection to the cloud 2044 may be via a wired or a wireless connection using the various communication protocols discussed infra. More than one network may be involved in a communication session between the illustrated devices. Connection to the cloud 2044 may require that the computers execute software routines which enable, for example, the seven layers of the OSI model of computer networking or equivalent in a wireless (cellular) phone network. Cloud 2044 may be used to enable relatively long-range communication such as, for example, between the one or more server(s) 2050 and one or more UEs 2021 and IoT devices 2011. Additionally or alternatively, the cloud 2044 may represent the Internet, one or more cellular networks, local area networks, or wide area networks including proprietary and/or enterprise networks, TCP/Internet Protocol (IP)-based network, or combinations thereof. In these implementations, the cloud 2044 may be associated with network operator who owns or controls equipment and other elements necessary to provide network-related services, such as one or more base stations or access points, one or more servers for routing digital data or telephone calls (e.g., a core network or backbone network), etc. The backbone links 2055 may include any number of wired or wireless technologies, and may be part of a LAN, a WAN, or the Internet. In one example, the backbone links 2055 are fiber backbone links that couple lower levels of service providers to the Internet, such as the CN 2012 and cloud 2044.

Additionally or alternatively, the various access technologies may include cellular technology such as LTE, MuLTEfire, and/or NR/5G (e.g., as provided by Radio Access Network (RAN) nodes 2031-2032, WLAN (e.g., WiFi®) technologies (e.g., as provided by an access point (AP) 2033), and/or the like. Different technologies exhibit benefits and limitations in different scenarios, and application performance in different scenarios becomes dependent on the choice of the access networks (e.g., WiFi, LTE, etc.) and the used network and transport protocols (e.g., Transfer Control Protocol (TCP), Virtual Private Network (VPN), Multi-Path TCP (MPTCP), Generic Routing Encapsulation (GRE), etc.).

The edge compute nodes 2036 may include or be part of an edge system 2035 (or edge network 2035). The edge compute nodes 2036 may also be referred to as "edge hosts 2036" or "edge servers 2036." The edge system 2035 includes a collection of edge servers 2036 (e.g., MEC hosts/servers 2702 of FIG. 27) and edge management systems (not shown by FIG. 20) necessary to run edge computing applications (e.g., MEC Apps 2726 of FIG. 27) within an operator network or a subset of an operator network. The edge servers 2036 are physical computer systems that may include an edge platform (e.g., MEC platform 2732 of FIG. 27) and/or virtualization infrastructure (e.g., VI 2732 of FIG. 27), and provide compute, storage, and network resources to edge computing applications. Each of the edge servers 2036 are disposed at an edge of a corresponding access network, and are arranged to provide computing resources and/or various services (e.g., computational task and/or workload offloading, cloud-computing capabilities, IT services, and other like resources and/or services as discussed herein) in relatively close proximity to intermediate nodes 2020 and/or endpoints 2010. The VI of the edge servers 2036 provide virtualized environments and virtualized resources for the edge hosts, and the edge computing applications may run as VMs and/or application containers on top of the VI. One example implementation of the edge system 2035 is a MEC system 2035, which is discussed in more detail infra with respect to FIGS. 27-28. It should be understood that the disclosed MEC systems and services deployment examples are only one illustrative example of edge computing systems/networks 2035, and that the present disclosure may be applicable to many other edge computing/networking technologies in various combinations and layouts of devices located at the edge of a network including the various edge computing networks/systems described herein. Further, the techniques disclosed herein may relate to other IoT edge network systems and configurations, and other intermediate processing entities and architectures may also be applicable to the present disclosure.

As shown by FIG. 20, each of the NANs 2031, 2032, and 2033 are co-located with edge compute nodes (or "edge servers") 2036*a*, 2036*b*, and 2036*c*, respectively. These implementations may be small-cell clouds (SCCs) where an edge compute node 2036 is co-located with a small cell (e.g., pico-cell, femto-cell, etc.), or may be mobile micro clouds (MCCs) where an edge compute node 2036 is co-located with a macro-cell (e.g., an eNB, gNB, etc.). The edge compute node 2036 may be deployed in a multitude of arrangements other than as shown by FIG. 20. In a first example, multiple NANs 2031-2033 are co-located or otherwise communicatively coupled with one edge compute node 2036. In a second example, the edge servers 2036 may be co-located or operated by RNCs, which may be the case for legacy network deployments, such as 3G networks. In a third example, the edge servers 2036 may be deployed at cell aggregation sites or at multi-RAT aggregation points that can be located either within an enterprise or used in public coverage areas. In a fourth example, the edge servers 2036 may be deployed at the edge of CN 2042. These implementations may be used in follow-me clouds (FMC), where cloud services running at distributed data centers follow the UEs 2021 as they roam throughout the network.

In any of the implementations discussed herein, the edge servers 2036 provide a distributed computing environment for application and service hosting, and also provide storage and processing resources so that data and/or content can be processed in close proximity to subscribers (e.g., users of UEs 2021, 2011) for faster response times The edge servers 2036 also support multitenancy run-time and hosting environment(s) for applications, including virtual appliance applications that may be delivered as packaged virtual machine (VM) images, middleware application and infrastructure services, content delivery services including content caching, mobile big data analytics, and computational offloading, among others. Computational offloading involves offloading computational tasks, workloads, applications, and/or services to the edge servers 2036 from the UEs 2011/2021, CN 2042, cloud 2044, and/or server(s) 2050, or vice versa. For example, a device application or client application operating in a UE 2021/2011 may offload application tasks or workloads to one or more edge servers 2036. In another example, an edge server 2036 may offload application tasks or workloads to one or more UE 2021/2011 (e.g., for distributed ML computation or the like).

Figure 21:
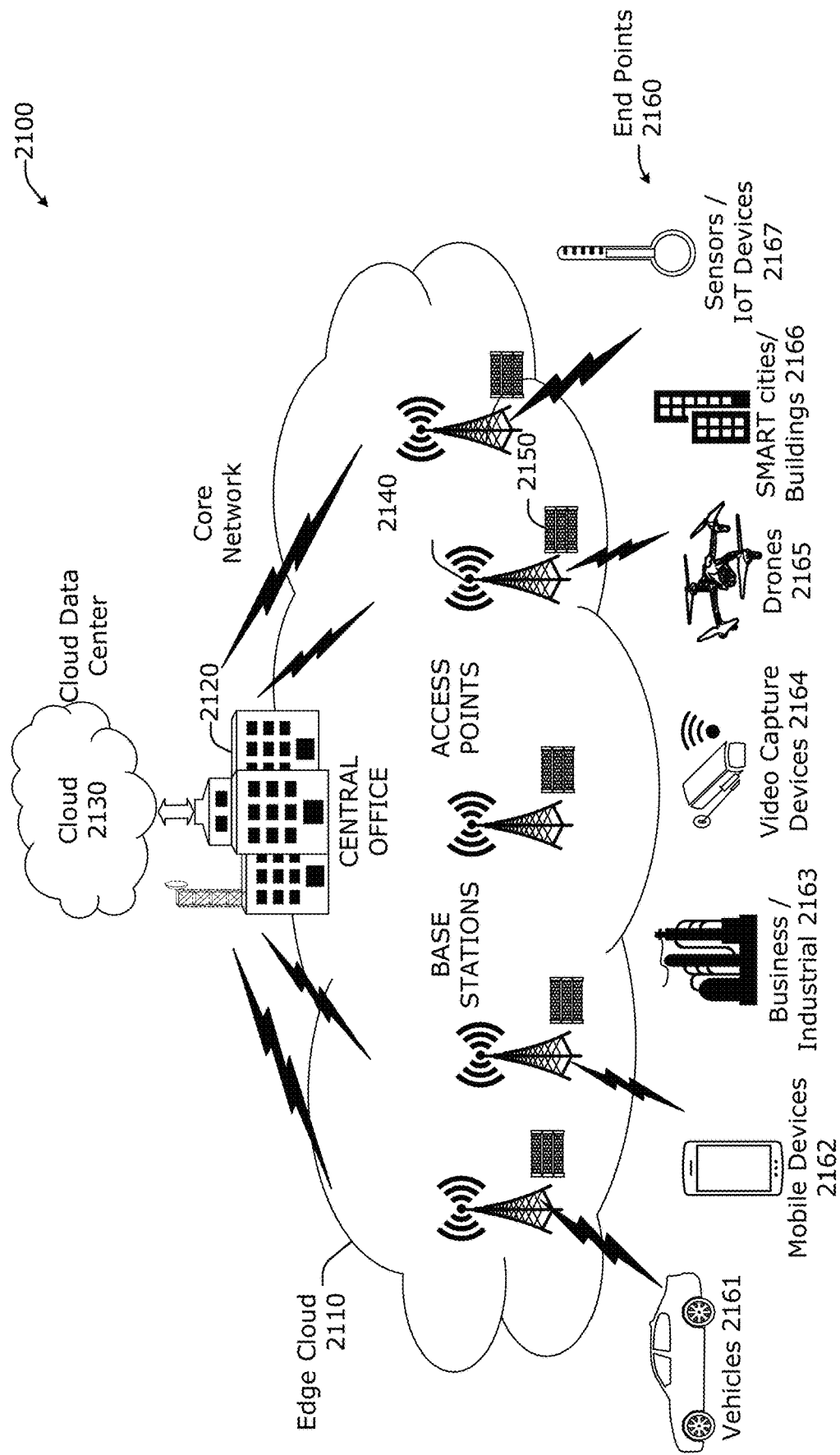
FIG. 21 illustrates an overview of an edge cloud configuration for edge computing.

FIG. 21 is a block diagram 2100 showing an overview of a configuration for edge computing, which includes a layer of processing referred to in many of the following examples as an "edge cloud". As shown, the edge cloud 2110 is co-located at an edge location, such as a network access node (NAN) 2140 (e.g., access point or base station), a local processing hub 2150, or a central office 2120, and thus may include multiple entities, devices, and equipment instances. The edge cloud 2110 is located much closer to the endpoint (consumer and producer) data sources 2160 (e.g., autonomous vehicles 2161, user equipment 2162, business and industrial equipment 2163, video capture devices 2164, drones 2165, smart cities and building devices 2166, sensors and IoT devices 2167, etc.) than the cloud data center 2130. Compute, memory, and storage resources which are offered at the edges in the edge cloud 2110 are critical to providing ultra-low latency response times for services and functions used by the endpoint data sources 2160 as well as reduce network backhaul traffic from the edge cloud 2110 toward cloud data center 2130 thus improving energy consumption and overall network usages among other benefits.

Compute, memory, and storage are scarce resources, and generally decrease depending on the edge location (e.g., fewer processing resources being available at consumer endpoint devices, than at a base station, than at a central office). However, the closer that the edge location is to the endpoint (e.g., user equipment (UE)), the more that space and power is often constrained. Thus, edge computing attempts to reduce the amount of resources needed for network services, through the distribution of more resources which are located closer both geographically and in network access time. In this manner, edge computing attempts to bring the compute resources to the workload data where appropriate, or, bring the workload data to the compute resources.

The following describes aspects of an edge cloud architecture that covers multiple potential deployments and addresses restrictions that some network operators or service providers may have in their own infrastructures. These include, variation of configurations based on the edge location (because edges at a base station level, for instance, may have more constrained performance and capabilities in a multi-tenant scenario); configurations based on the type of compute, memory, storage, fabric, acceleration, or like resources available to edge locations, tiers of locations, or groups of locations; the service, security, and management and orchestration capabilities; and related objectives to achieve usability and performance of end services. These deployments may accomplish processing in network layers that may be considered as "near edge", "close edge", "local edge", "middle edge", or "far edge" layers, depending on latency, distance, and timing characteristics.

Edge computing is a developing paradigm where computing is performed at or closer to the "edge" of a network, typically through the use of an appropriately arranged compute platform (e.g., x86, ARM, Nvidia or other CPU/GPU based compute hardware architecture) implemented at base stations, gateways, network routers, or other devices which are much closer to endpoint devices producing and consuming the data. For example, edge gateway servers may be equipped with pools of memory and storage resources to perform computation in real-time for low latency use-cases (e.g., autonomous driving or video surveillance) for connected client devices. Or as an example, base stations may be augmented with compute and acceleration resources to directly process service workloads for connected user equipment, without further communicating data via backhaul networks. Or as another example, central office network management hardware may be replaced with standardized compute hardware that performs virtualized network functions and offers compute resources for the execution of services and consumer functions for connected devices. Alternatively, an arrangement with hardware combined with virtualized functions, commonly referred to as a hybrid arrangement may also be successfully implemented. Within edge computing networks, there may be scenarios in services which the compute resource will be "moved" to the data, as well as scenarios in which the data will be "moved" to the compute resource. Or as an example, base station compute, acceleration and network resources can provide services in order to scale to workload demands on an as needed basis by activating dormant capacity (subscription, capacity on demand) in order to manage corner cases, emergencies or to provide longevity for deployed resources over a significantly longer implemented lifecycle.

Figure 22:
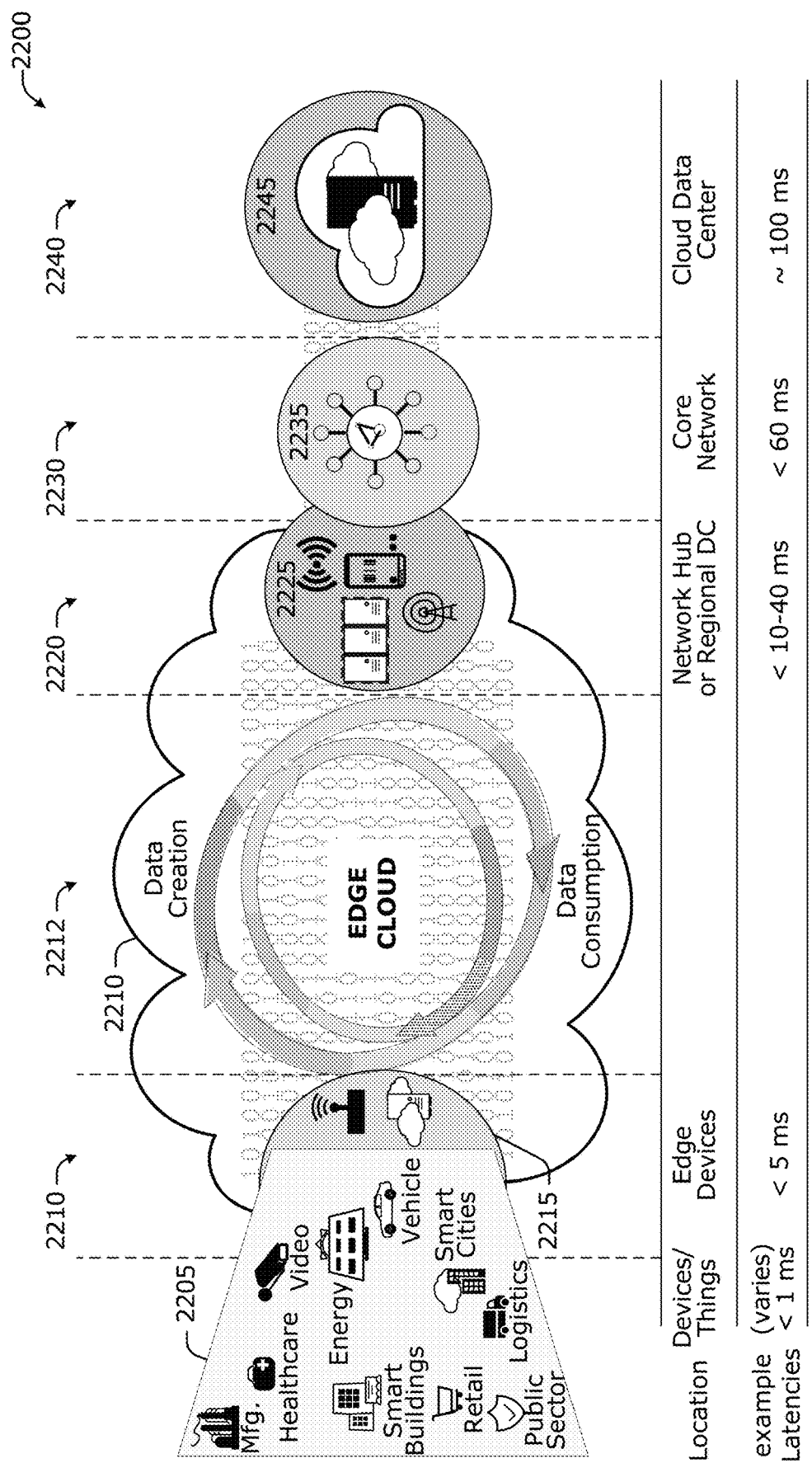
FIG. 22 illustrates operational layers among endpoints, an edge cloud, and cloud computing environments.

FIG. 22 illustrates operational layers among endpoints, an edge cloud, and cloud computing environments. Specifically, FIG. 22 depicts examples of computational use cases 2205, utilizing the edge cloud 2110 among multiple illustrative layers of network computing. The layers begin at an endpoint (devices and things) layer 2200, which accesses the edge cloud 2110 to conduct data creation, analysis, and data consumption activities. The edge cloud 2110 may span multiple network layers, such as an edge devices layer 2210 having gateways, on-premise servers, or network equipment (nodes 2215) located in physically proximate edge systems; a network access layer 2220, encompassing base stations, radio processing units, network hubs, regional data centers (DC), or local network equipment (equipment 2225); and any equipment, devices, or nodes located therebetween (in layer 2212, not illustrated in detail). The network communications within the edge cloud 2110 and among the various layers may occur via any number of wired or wireless mediums, including via connectivity architectures and technologies not depicted.

Examples of latency, resulting from network communication distance and processing time constraints, may range from less than a millisecond (ms) when among the endpoint layer 2200, under 5 ms at the edge devices layer 2210, to even between 10 to 40 ms when communicating with nodes at the network access layer 2220. Beyond the edge cloud 2110 are core network 2230 and cloud data center 2240 layers, each with increasing latency (e.g., between 50-60 ms at the core network layer 2230, to 100 or more ms at the cloud data center layer). As a result, operations at a core network data center 2235 or a cloud data center 2245, with latencies of at least 50 to 100 ms or more, will not be able to accomplish many time-critical functions of the use cases 2205. Each of these latency values are provided for purposes of illustration and contrast; it will be understood that the use of other access network mediums and technologies may further reduce the latencies. In some examples, respective portions of the network may be categorized as "close edge", "local edge", "near edge", "middle edge", or "far edge" layers, relative to a network source and destination. For instance, from the perspective of the core network data center 2235 or a cloud data center 2245, a central office or content data network may be considered as being located within a "near edge" layer ("near" to the cloud, having high latency values when communicating with the devices and endpoints of the use cases 2205), whereas an access point, base station, on-premise server, or network gateway may be considered as located within a "far edge" layer ("far" from the cloud, having low latency values when communicating with the devices and endpoints of the use cases 2205). It will be understood that other categorizations of a particular network layer as constituting a "close", "local", "near", "middle", or "far" edge may be based on latency, distance, number of network hops, or other measurable characteristics, as measured from a source in any of the network layers 2200-2240.

The various use cases 2205 may access resources under usage pressure from incoming streams, due to multiple services utilizing the edge cloud. To achieve results with low latency, the services executed within the edge cloud 2110 balance varying requirements in terms of: (a) Priority (throughput or latency) and Quality of Service (QoS) (e.g., traffic for an autonomous car may have higher priority than a temperature sensor in terms of response time requirement; or, a performance sensitivity/bottleneck may exist at a compute/accelerator, memory, storage, or network resource, depending on the application); (b) Reliability and Resiliency (e.g., some input streams need to be acted upon and the traffic routed with mission-critical reliability, where as some other input streams may be tolerate an occasional failure, depending on the application); and (c) Physical constraints (e.g., power, cooling and form-factor).

The end-to-end service view for these use cases involves the concept of a service-flow and is associated with a transaction. The transaction details the overall service requirement for the entity consuming the service, as well as the associated services for the resources, workloads, workflows, and business functional and business level requirements. The services executed with the "terms" described may be managed at each layer in a way to assure real time, and runtime contractual compliance for the transaction during the lifecycle of the service. When a component in the transaction is missing its agreed to SLA, the system as a whole (components in the transaction) may provide the ability to (1) understand the impact of the SLA violation, and (2) augment other components in the system to resume overall transaction SLA, and (3) implement steps to remediate.

Thus, with these variations and service features in mind, edge computing within the edge cloud 2110 may provide the ability to serve and respond to multiple applications of the use cases 2205 (e.g., object tracking, video surveillance, connected cars, etc.) in real-time or near real-time, and meet ultra-low latency requirements for these multiple applications. These advantages enable a whole new class of applications (Virtual Network Functions (VNFs), Function as a Service (FaaS), Edge as a Service (EaaS), standard processes, etc.), which cannot leverage conventional cloud computing due to latency or other limitations.

However, with the advantages of edge computing comes the following caveats. The devices located at the edge are often resource constrained and therefore there is pressure on usage of edge resources. Typically, this is addressed through the pooling of memory and storage resources for use by multiple users (tenants) and devices. The edge may be power and cooling constrained and therefore the power usage needs to be accounted for by the applications that are consuming the most power. There may be inherent power-performance tradeoffs in these pooled memory resources, as many of them are likely to use emerging memory technologies, where more power requires greater memory bandwidth. Likewise, improved security of hardware and root of trust trusted functions are also required, because edge locations may be unmanned and may even need permissioned access (e.g., when housed in a third-party location). Such issues are magnified in the edge cloud 2110 in a multi-tenant, multi-owner, or multi-access setting, where services and applications are requested by many users, especially as network usage dynamically fluctuates and the composition of the multiple stakeholders, use cases, and services changes.

At a more generic level, an edge computing system may be described to encompass any number of deployments at the previously discussed layers operating in the edge cloud 2110 (network layers 2200-2240), which provide coordination from client and distributed computing devices. One or more edge gateway nodes, one or more edge aggregation nodes, and one or more core data centers may be distributed across layers of the network to provide an implementation of the edge computing system by or on behalf of a telecommunication service provider ("telco", or "TSP"), internet-of-things service provider, cloud service provider (CSP), enterprise entity, or any other number of entities. Various implementations and configurations of the edge computing system may be provided dynamically, such as when orchestrated to meet service objectives.

Consistent with the examples provided herein, a client compute node may be embodied as any type of endpoint component, device, appliance, or other thing capable of communicating as a producer or consumer of data. Here, a "producer" refers to an entity or element that provides a service to other entities or elements on the same edge node or on different edge nodes, and a "consumer" refers to an entity or element that can consumer end user traffic and/or user services from a producer on the same or different edge nodes. For example, a producer app may provide location services, mapping services, transcoding services, AI/ML services, and/or other like services. Additionally or alternatively, a consumer app may be a content delivery network (CDN) node, AR or VR apps, gaming apps, and/or some other type of app. Further, the label "node" or "device" as used in the edge computing system does not necessarily mean that such node or device operates in a client or agent/minion/follower role; rather, any of the nodes or devices in the edge computing system refer to individual entities, nodes, or subsystems which include discrete or connected hardware or software configurations to facilitate or use the edge cloud 2110.

As such, the edge cloud 2110 is formed from network components and functional features operated by and within edge gateway nodes, edge aggregation nodes, or other edge compute nodes among network layers 2210-2230. The edge cloud 2110 thus may be embodied as any type of network that provides edge computing and/or storage resources which are proximately located to radio access network (RAN) capable endpoint devices (e.g., mobile computing devices, IoT devices, smart devices, etc.), which are discussed herein. In other words, the edge cloud 2110 may be envisioned as an "edge" which connects the endpoint devices and traditional network access points that serve as an ingress point into service provider core networks, including mobile carrier networks (e.g., Global System for Mobile Communications (GSM) networks, Long-Term Evolution (LTE) networks, 5G/6G networks, etc.), while also providing storage and/or compute capabilities. Other types and forms of network access (e.g., Wi-Fi, long-range wireless, wired networks including optical networks) may also be utilized in place of or in combination with such 3GPP carrier networks.

The network components of the edge cloud 2110 may be servers, multi-tenant servers, appliance computing devices, and/or any other type of computing devices. For example, the edge cloud 2110 may include an appliance computing device that is a self-contained electronic device including a housing, a chassis, a case or a shell. In some circumstances, the housing may be dimensioned for portability such that it can be carried by a human and/or shipped. Alternatively, it may be a smaller module suitable for installation in a vehicle for example. Example housings may include materials that form one or more exterior surfaces that partially or fully protect contents of the appliance, in which protection may include weather protection, hazardous environment protection (e.g., EMI, vibration, extreme temperatures), and/or enable submergibility. Example housings may include power circuitry to provide power for stationary and/or portable implementations, such as AC power inputs, DC power inputs, AC/DC or DC/AC converter(s), power regulators, transformers, charging circuitry, batteries, wired inputs and/or wireless power inputs. Smaller, modular implementations may also include an extendible or embedded antenna arrangement for wireless communications. Example housings and/or surfaces thereof may include or connect to mounting hardware to enable attachment to structures such as buildings, telecommunication structures (e.g., poles, antenna structures, etc.) and/or racks (e.g., server racks, blade mounts, etc.). Example housings and/or surfaces thereof may support one or more sensors (e.g., temperature sensors, vibration sensors, light sensors, acoustic sensors, capacitive sensors, proximity sensors, etc.). One or more such sensors may be contained in, carried by, or otherwise embedded in the surface and/or mounted to the surface of the appliance. Example housings and/or surfaces thereof may support mechanical connectivity, such as propulsion hardware (e.g., wheels, propellers, etc.) and/or articulating hardware (e.g., robot arms, pivotable appendages, etc.). In some circumstances, the sensors may include any type of input devices such as user interface hardware (e.g., buttons, switches, dials, sliders, etc.). In some circumstances, example housings include output devices contained in, carried by, embedded therein and/or attached thereto. Output devices may include displays, touchscreens, lights, LEDs, speakers, I/O ports (e.g., USB), etc. In some circumstances, edge devices are devices presented in the network for a specific purpose (e.g., a traffic light), but may have processing and/or other capacities that may be utilized for other purposes. Such edge devices may be independent from other networked devices and may be provided with a housing having a form factor suitable for its primary purpose; yet be available for other compute tasks that do not interfere with its primary task. Edge devices include Internet of Things devices. The appliance computing device may include hardware and software components to manage local issues such as device temperature, vibration, resource utilization, updates, power issues, physical and network security, etc. Example hardware for implementing an appliance computing device is described in conjunction with FIG. 31. The edge cloud 2110 may also include one or more servers and/or one or more multi-tenant servers. Such a server may include an operating system and implement a virtual computing environment. A virtual computing environment may include a hypervisor managing (e.g., spawning, deploying, destroying, etc.) one or more virtual machines, one or more containers, etc. Such virtual computing environments provide an execution environment in which one or more applications and/or other software, code or scripts may execute while being isolated from one or more other applications, software, code or scripts.

Figure 23:
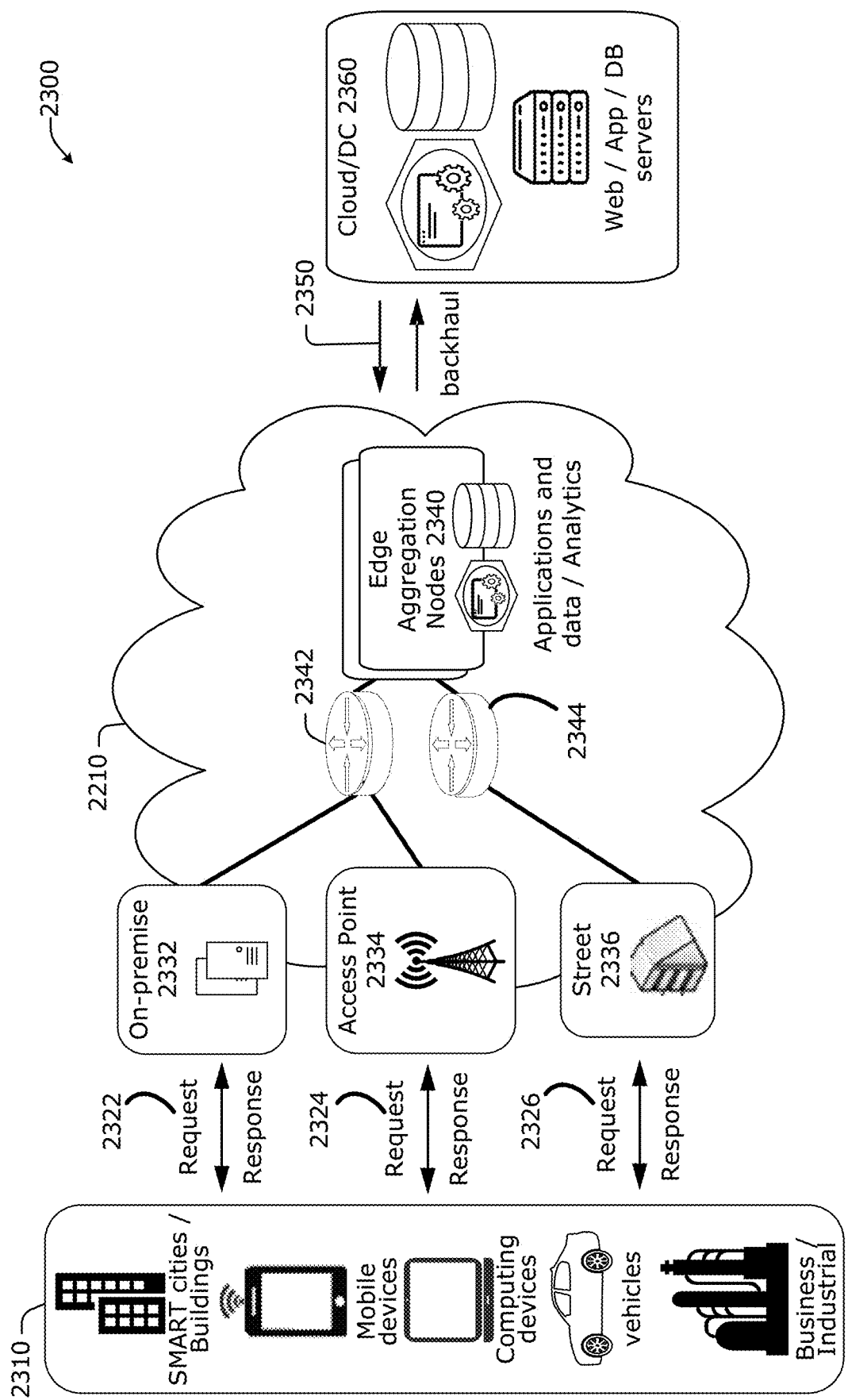
FIG. 23 illustrates an example approach for networking and services in an edge computing system.

In FIG. 23, various client endpoints 2310 (in the form of mobile devices, computers, autonomous vehicles, business computing equipment, industrial processing equipment) exchange requests and responses that are specific to the type of endpoint network aggregation. For instance, client endpoints 2310 may obtain network access via a wired broadband network, by exchanging requests and responses 2322 through an on-premise network system 2332. Some client endpoints 2310, such as mobile computing devices, may obtain network access via a wireless broadband network, by exchanging requests and responses 2324 through an access point (e.g., cellular network tower) 2334. Some client endpoints 2310, such as autonomous vehicles may obtain network access for requests and responses 2326 via a wireless vehicular network through a street-located network system 2336. However, regardless of the type of network access, the TSP may deploy aggregation points 2342, 2344 within the edge cloud 2110 to aggregate traffic and requests. Thus, within the edge cloud 2110, the TSP may deploy various compute and storage resources, such as at edge aggregation nodes 2340, to provide requested content. The edge aggregation nodes 2340 and other systems of the edge cloud 2110 are connected to a cloud or data center 2360, which uses a backhaul network 2350 to fulfill higher-latency requests from a cloud/data center for websites, applications, database servers, etc. Additional or consolidated instances of the edge aggregation nodes 2340 and the aggregation points 2342, 2344, including those deployed on a single server framework, may also be present within the edge cloud 2110 or other areas of the TSP infrastructure.

Figure 24:
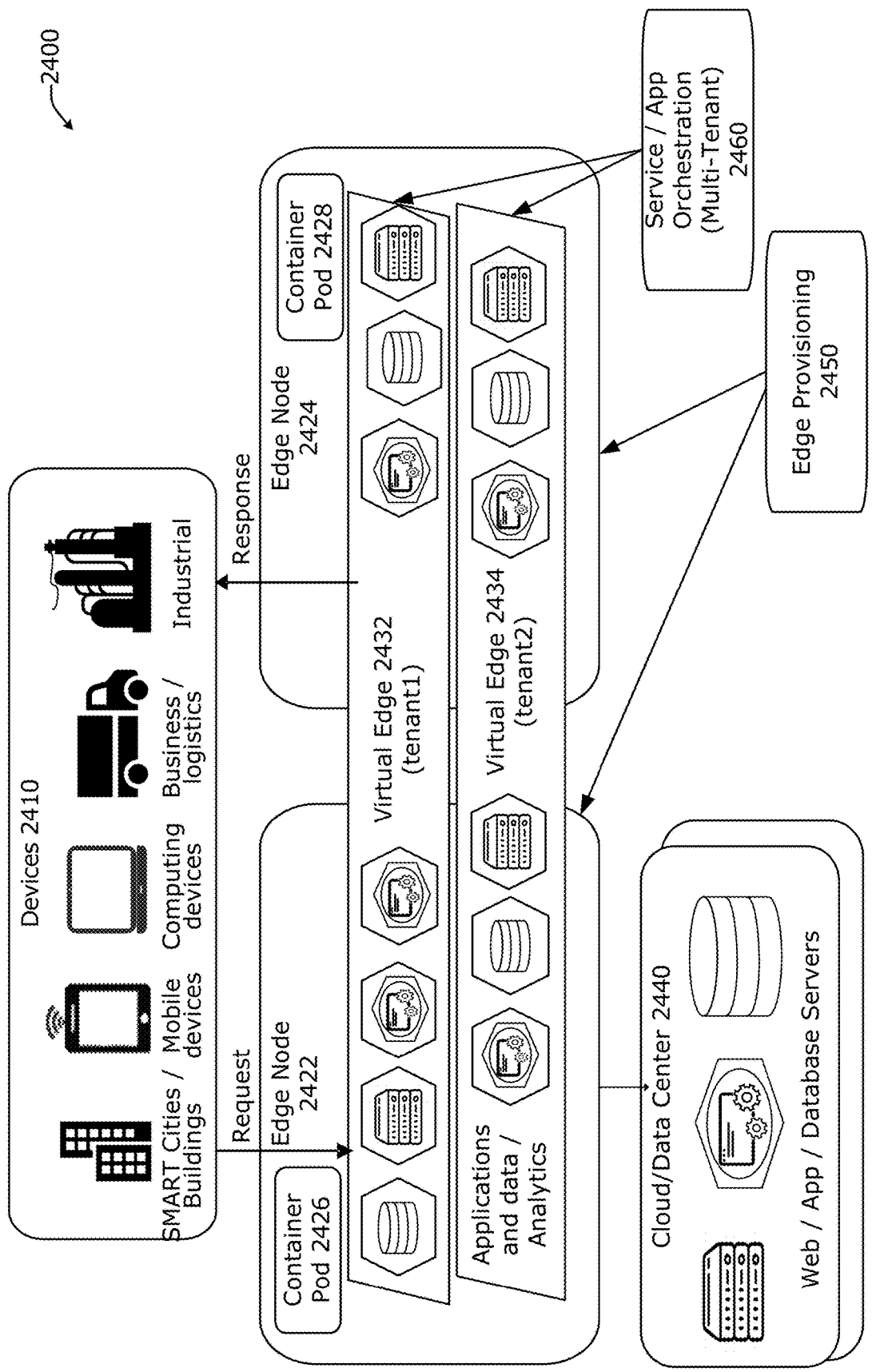
FIG. 24 illustrates deployment of a virtual edge configuration in an edge computing system operated among multiple edge nodes and multiple tenants.

FIG. 24 illustrates deployment and orchestration for virtualized and container-based edge configurations across an edge computing system operated among multiple edge nodes and multiple tenants (e.g., users, providers) which use such edge nodes. Specifically, FIG. 24 depicts coordination of a first edge node 2422 and a second edge node 2424 in an edge computing system 2400, to fulfill requests and responses for various client endpoints 2410 (e.g., smart cities/building systems, mobile devices, computing devices, business/logistics systems, industrial systems, etc.), which access various virtual edge instances. Here, the virtual edge instances 2432, 2434 provide edge compute capabilities and processing in an edge cloud, with access to a cloud/data center 2440 for higher-latency requests for websites, applications, database servers, etc. However, the edge cloud enables coordination of processing among multiple edge nodes for multiple tenants or entities.

In FIG. 24, these virtual edge instances include: a first virtual edge 2432, offered to a first tenant (Tenant 1), which offers a first combination of edge storage, computing, and services; and a second virtual edge 2434, offering a second combination of edge storage, computing, and services. The virtual edge instances 2432, 2434 are distributed among the edge nodes 2422, 2424, and may include scenarios in which a request and response are fulfilled from the same or different edge nodes. The configuration of the edge nodes 2422, 2424 to operate in a distributed yet coordinated fashion occurs based on edge provisioning functions 2450. The functionality of the edge nodes 2422, 2424 to provide coordinated operation for applications and services, among multiple tenants, occurs based on orchestration functions 2460.

Some of the devices in 2410 are multi-tenant devices where Tenant 1 may function within a tenant1 'slice' while a Tenant 2 may function within a tenant2 slice (and, in further examples, additional or sub-tenants may exist; and each tenant may even be specifically entitled and transactionally tied to a specific set of features all the way day to specific hardware features). A trusted multi-tenant device may further contain a tenant specific cryptographic key such that the combination of key and slice may be considered a "root of trust" (RoT) or tenant specific RoT. A RoT may further be computed dynamically composed using a DICE (Device Identity Composition Engine) architecture such that a single DICE hardware building block may be used to construct layered trusted computing base contexts for layering of device capabilities (such as a Field Programmable Gate Array (FPGA)). The RoT may further be used for a trusted computing context to enable a "fan-out" that is useful for supporting multi-tenancy. Within a multi-tenant environment, the respective edge nodes 2422, 2424 may operate as security feature enforcement points for local resources allocated to multiple tenants per node. Additionally, tenant runtime and application execution (e.g., in instances 2432, 2434) may serve as an enforcement point for a security feature that creates a virtual edge abstraction of resources spanning potentially multiple physical hosting platforms. Finally, the orchestration functions 2460 at an orchestration entity may operate as a security feature enforcement point for marshalling resources along tenant boundaries.

Edge computing nodes may partition resources (memory, central processing unit (CPU), graphics processing unit (GPU), interrupt controller, input/output (I/O) controller, memory controller, bus controller, etc.) where respective partitionings may contain a RoT capability and where fan-out and layering according to a DICE model may further be applied to Edge Nodes. Cloud computing nodes often use containers, FaaS engines, Servlets, servers, or other computation abstraction that may be partitioned according to a DICE layering and fan-out structure to support a RoT context for each. Accordingly, the respective RoTs spanning devices 2410, 2422, and 2440 may coordinate the establishment of a distributed trusted computing base (DTCB) such that a tenant-specific virtual trusted secure channel linking all elements end to end can be established.

Further, it will be understood that a container may have data or workload specific keys protecting its content from a previous edge node. As part of migration of a container, a pod controller at a source edge node may obtain a migration key from a target edge node pod controller where the migration key is used to wrap the container-specific keys. When the container/pod is migrated to the target edge node, the unwrapping key is exposed to the pod controller that then decrypts the wrapped keys. The keys may now be used to perform operations on container specific data. The migration functions may be gated by properly attested edge nodes and pod managers (as described above).

In further examples, an edge computing system is extended to provide for orchestration of multiple applications through the use of containers (a contained, deployable unit of software that provides code and needed dependencies) in a multi-owner, multi-tenant environment. A multi-tenant orchestrator may be used to perform key management, trust anchor management, and other security functions related to the provisioning and lifecycle of the trusted 'slice' concept in FIG. 24. For instance, an edge computing system may be configured to fulfill requests and responses for various client endpoints from multiple virtual edge instances (and, from a cloud or remote data center). The use of these virtual edge instances may support multiple tenants and multiple applications (e.g., augmented reality (AR)/virtual reality (VR), enterprise applications, content delivery, gaming, compute offload) simultaneously. Further, there may be multiple types of applications within the virtual edge instances (e.g., normal applications; latency sensitive applications; latency-critical applications; user plane applications; networking applications; etc.). The virtual edge instances may also be spanned across systems of multiple owners at different geographic locations (or, respective computing systems and resources which are co-owned or co-managed by multiple owners).

For instance, each edge node 2422, 2424 may implement the use of containers, such as with the use of a container "pod" 2426, 2428 providing a group of one or more containers. In a setting that uses one or more container pods, a pod controller or orchestrator is responsible for local control and orchestration of the containers in the pod. Various edge node resources (e.g., storage, compute, services, depicted with hexagons) provided for the respective edge slices 2432, 2434 are partitioned according to the needs of each container.

With the use of container pods, a pod controller oversees the partitioning and allocation of containers and resources. The pod controller receives instructions from an orchestrator (e.g., orchestrator 2460) that instructs the controller on how best to partition physical resources and for what duration, such as by receiving key performance indicator (KPI) targets based on SLA contracts. The pod controller determines which container requires which resources and for how long in order to complete the workload and satisfy the SLA. The pod controller also manages container lifecycle operations such as: creating the container, provisioning it with resources and applications, coordinating intermediate results between multiple containers working on a distributed application together, dismantling containers when workload completes, and the like. Additionally, a pod controller may serve a security role that prevents assignment of resources until the right tenant authenticates or prevents provisioning of data or a workload to a container until an attestation result is satisfied.

Also, with the use of container pods, tenant boundaries can still exist but in the context of each pod of containers. If each tenant specific pod has a tenant specific pod controller, there will be a shared pod controller that consolidates resource allocation requests to avoid typical resource starvation situations. Further controls may be provided to ensure attestation and trustworthiness of the pod and pod controller. For instance, the orchestrator 2460 may provision an attestation verification policy to local pod controllers that perform attestation verification. If an attestation satisfies a policy for a first tenant pod controller but not a second tenant pod controller, then the second pod could be migrated to a different edge node that does satisfy it. Alternatively, the first pod may be allowed to execute and a different shared pod controller is installed and invoked prior to the second pod executing.

Figure 25:
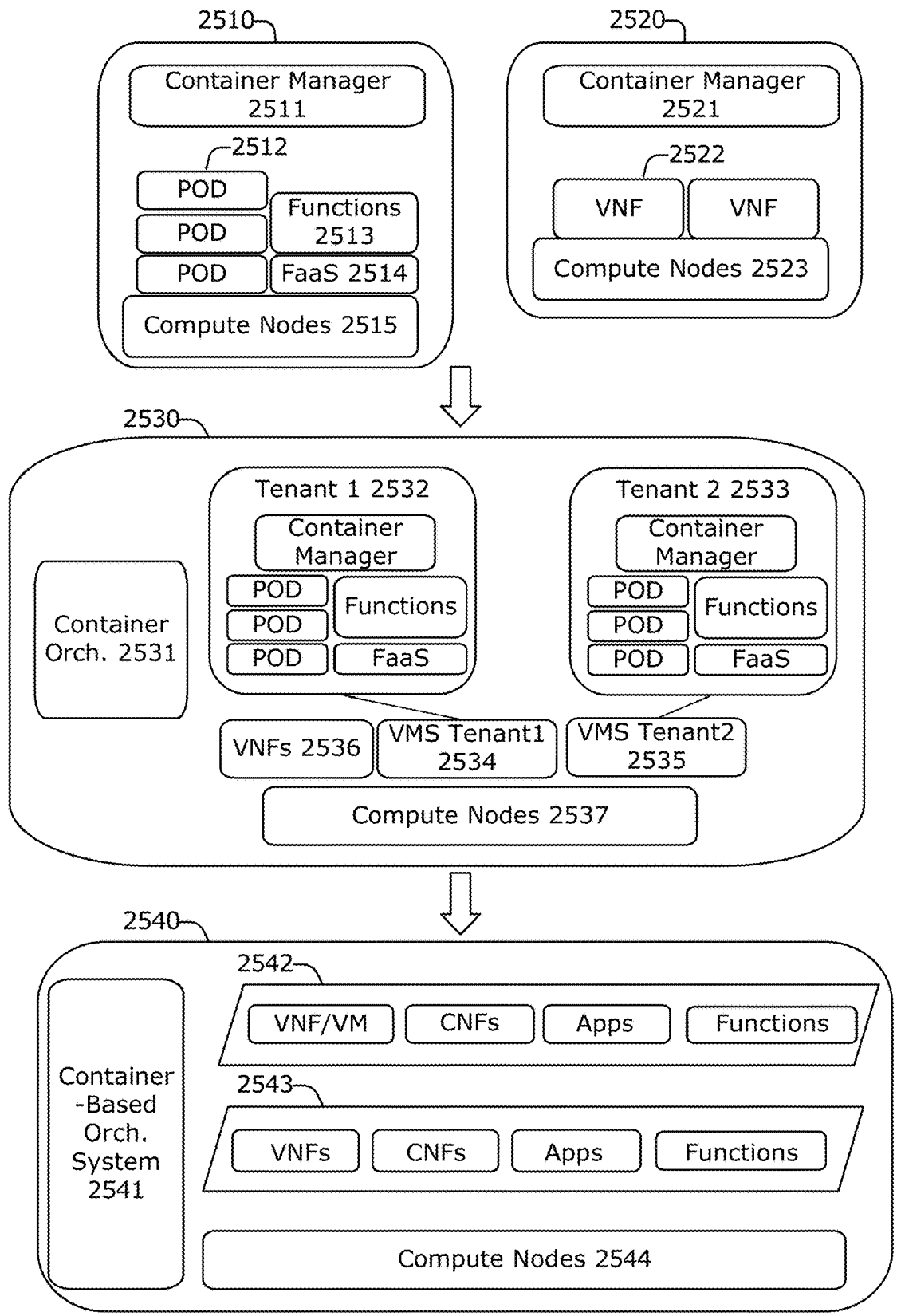
FIG. 25 illustrates various compute arrangements deploying containers in an edge computing system.

FIG. 25 illustrates additional compute arrangements deploying containers in an edge computing system. As a simplified example, system arrangements 2510, 2520 depict settings in which a pod controller (e.g., container managers 2511, 2521, and container orchestrator 2531) is adapted to launch containerized pods, functions, and functions-as-a-service instances through execution via compute nodes (2515 in arrangement 2510), or to separately execute containerized virtualized network functions through execution via compute nodes (2523 in arrangement 2520). This arrangement is adapted for use of multiple tenants in system arrangement 2530 (using compute nodes 2537), where containerized pods (e.g., pods 2512), functions (e.g., functions 2513, VNFs 2522, 2536), and functions-as-a-service instances (e.g., FaaS instance 2514) are launched within virtual machines (e.g., VMs 2534, 2535 for tenants 2532, 2533) specific to respective tenants (aside the execution of virtualized network functions). This arrangement is further adapted for use in system arrangement 2540, which provides containers 2542, 2543, or execution of the various functions, applications, and functions on compute nodes 2544, as coordinated by an container-based orchestration system 2541.

The system arrangements of depicted in FIG. 25 provides an architecture that treats VMs, Containers, and Functions equally in terms of application composition (and resulting applications are combinations of these three ingredients). Each ingredient may involve use of one or more accelerator (FPGA, ASIC) components as a local backend. In this manner, applications can be split across multiple edge owners, coordinated by an orchestrator.

In the context of FIG. 25, the pod controller/container manager, container orchestrator, and individual nodes may provide a security enforcement point. However, tenant isolation may be orchestrated where the resources allocated to a tenant are distinct from resources allocated to a second tenant, but edge owners cooperate to ensure resource allocations are not shared across tenant boundaries. Or, resource allocations could be isolated across tenant boundaries, as tenants could allow "use" via a subscription or transaction/contract basis. In these contexts, virtualization, containerization, enclaves and hardware partitioning schemes may be used by edge owners to enforce tenancy. Other isolation environments may include: bare metal (dedicated) equipment, virtual machines, containers, virtual machines on containers, or combinations thereof.

In further examples, aspects of software-defined or controlled silicon hardware, and other configurable hardware, may integrate with the applications, functions, and services an edge computing system. Software defined silicon (SDSi) may be used to ensure the ability for some resource or hardware ingredient to fulfill a contract or service level agreement, based on the ingredient's ability to remediate a portion of itself or the workload (e.g., by an upgrade, reconfiguration, or provision of new features within the hardware configuration itself).

Figure 26:
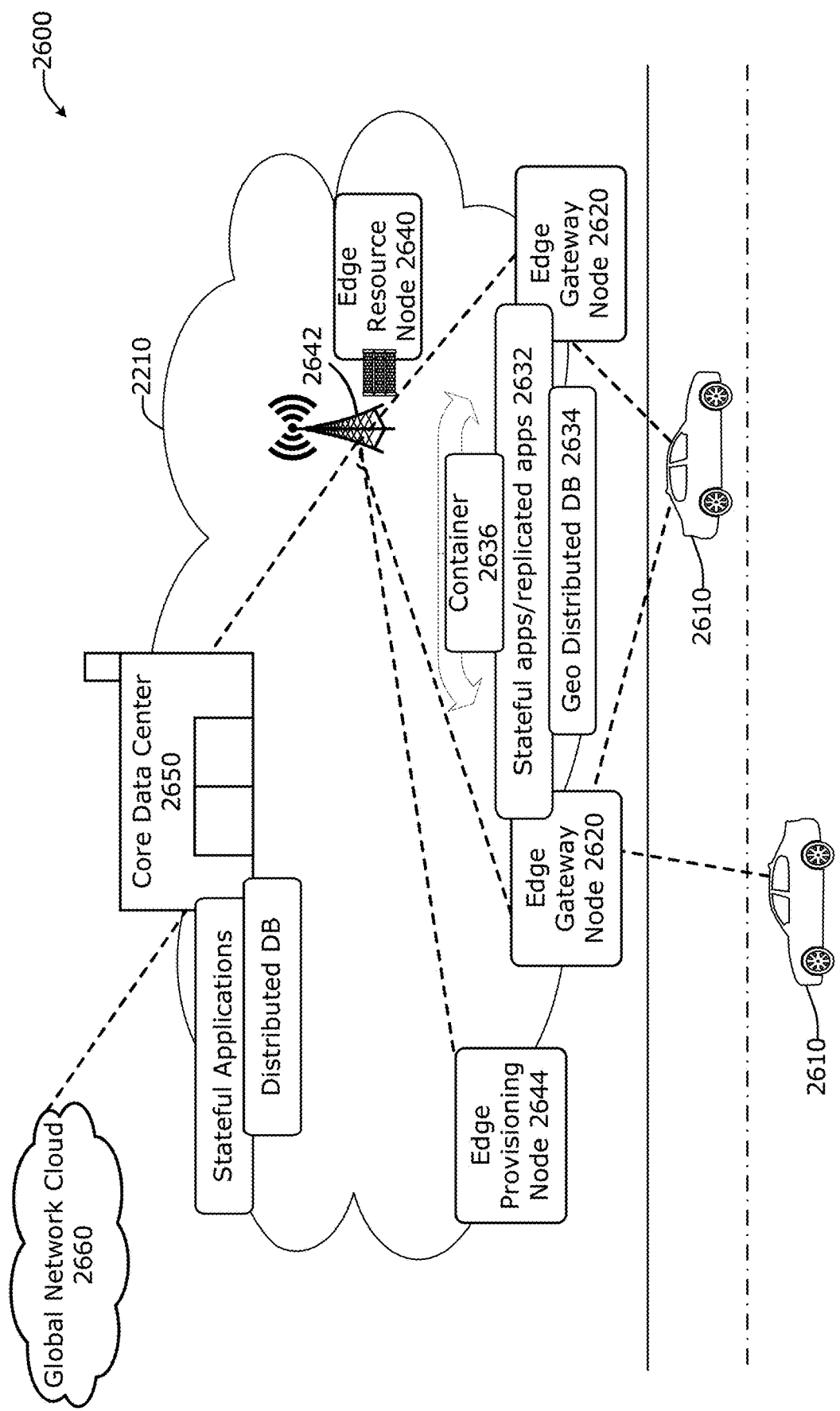
FIG. 26 illustrates a compute and communication use case involving mobile access to applications in an edge computing system.

The edge computing systems and arrangements discussed herein may be applicable in various solutions, services, and/or use cases involving mobility. FIG. 26 shows vehicle compute and communication use case involving mobile access to applications in an edge computing system 2600 that implements an edge cloud 2110. In this use case, respective client compute nodes 2610 may be embodied as in-vehicle compute systems (e.g., in-vehicle navigation and/or infotainment systems) located in corresponding vehicles which communicate with the edge gateway nodes 2620 during traversal of a roadway. For instance, the edge gateway nodes 2620 may be located in a roadside cabinet or other enclosure built-into a structure having other, separate, mechanical utility, which may be placed along the roadway, at intersections of the roadway, or other locations near the roadway. As respective vehicles traverse along the roadway, the connection between its client compute node 2610 and a particular edge gateway device 2620 may propagate so as to maintain a consistent connection and context for the client compute node 2610. Likewise, mobile edge nodes may aggregate at the high priority services or according to the throughput or latency resolution requirements for the underlying service(s) (e.g., in the case of drones). The respective edge gateway devices 2620 include an amount of processing and storage capabilities and, as such, some processing and/or storage of data for the client compute nodes 2610 may be performed on one or more of the edge gateway devices 2620.

The edge gateway devices 2620 may communicate with one or more edge resource nodes 2640, which are illustratively embodied as compute servers, appliances or components located at or in a network access node (NAN) 2642 (e.g., a base station of a cellular network). As discussed above, the respective edge resource nodes 2640 include an amount of processing and storage capabilities and, as such, some processing and/or storage of data for the client compute nodes 2610 may be performed on the edge resource node 2640. For example, the processing of data that is less urgent or important may be performed by the edge resource node 2640, while the processing of data that is of a higher urgency or importance may be performed by the edge gateway devices 2620 (depending on, for example, the capabilities of each component, or information in the request indicating urgency or importance). Based on data access, data location or latency, work may continue on edge resource nodes when the processing priorities change during the processing activity. Likewise, configurable systems or hardware resources themselves can be activated (e.g., through a local orchestrator) to provide additional resources to meet the new demand (e.g., adapt the compute resources to the workload data).

The edge resource node(s) 2640 also communicate with the core data center 2650, which may include compute servers, appliances, and/or other components located in a central location (e.g., a central office of a cellular communication network). The core data center 2650 may provide a gateway to the global network cloud 2660 (e.g., the Internet) for the edge cloud 2110 operations formed by the edge resource node(s) 2640 and the edge gateway devices 2620. Additionally, in some examples, the core data center 2650 may include an amount of processing and storage capabilities and, as such, some processing and/or storage of data for the client compute devices may be performed on the core data center 2650 (e.g., processing of low urgency or importance, or high complexity).

The edge gateway nodes 2620 or the edge resource nodes 2640 may offer the use of stateful applications 2632 and a geographic distributed database 2634. Although the applications 2632 and database 2634 are illustrated as being horizontally distributed at a layer of the edge cloud 2110, it will be understood that resources, services, or other components of the application may be vertically distributed throughout the edge cloud (including, part of the application executed at the client compute node 2610, other parts at the edge gateway nodes 2620 or the edge resource nodes 2640, etc.). Additionally, as stated previously, there can be peer relationships at any level to meet service objectives and obligations. Further, the data for a specific client or application can move from edge to edge based on changing conditions (e.g., based on acceleration resource availability, following the car movement, etc.). For instance, based on the "rate of decay" of access, prediction can be made to identify the next owner to continue, or when the data or computational access will no longer be viable. These and other services may be utilized to complete the work that is needed to keep the transaction compliant and lossless.

In further scenarios, a container 2636 (or pod of containers) may be flexibly migrated from an edge node 2620 to other edge nodes (e.g., 2620, 2640, etc.) such that the container with an application and workload does not need to be reconstituted, re-compiled, re-interpreted in order for migration to work. However, in such settings, there may be some remedial or "swizzling" translation operations applied. For example, the physical hardware at node 2640 may differ from edge gateway node 2620 and therefore, the hardware abstraction layer (HAL) that makes up the bottom edge of the container will be re-mapped to the physical layer of the target edge node. This may involve some form of late-binding technique, such as binary translation of the HAL from the container native format to the physical hardware format, or may involve mapping interfaces and operations. A pod controller may be used to drive the interface mapping as part of the container lifecycle, which includes migration to/from different hardware environments.

The scenarios encompassed by FIG. 26 may utilize various types of mobile edge nodes, such as an edge node hosted in a vehicle (car/truck/tram/train) or other mobile unit, as the edge node will move to other geographic locations along the platform hosting it. With vehicle-to-vehicle communications, individual vehicles may even act as network edge nodes for other cars, (e.g., to perform caching, reporting, data aggregation, etc.). Thus, it will be understood that the application components provided in various edge nodes may be distributed in static or mobile settings, including coordination between some functions or operations at individual endpoint devices or the edge gateway nodes 2620, some others at the edge resource node 2640, and others in the core data center 2650 or global network cloud 2660.

In further configurations, the edge computing system may implement FaaS computing capabilities through the use of respective executable applications and functions. In an example, a developer writes function code (e.g., "computer code" herein) representing one or more computer functions, and the function code is uploaded to a FaaS platform provided by, for example, an edge node or data center. A trigger such as, for example, a service use case or an edge processing event, initiates the execution of the function code with the FaaS platform.

In an example of FaaS, a container is used to provide an environment in which function code (e.g., an application which may be provided by a third party) is executed. The container may be any isolated-execution entity such as a process, a Docker or Kubernetes container, a virtual machine, etc. Within the edge computing system, various datacenter, edge, and endpoint (including mobile) devices are used to "spin up" functions (e.g., activate and/or allocate function actions) that are scaled on demand. The function code gets executed on the physical infrastructure (e.g., edge computing node) device and underlying virtualized containers. Finally, container is "spun down" (e.g., deactivated and/or deallocated) on the infrastructure in response to the execution being completed.

Further aspects of FaaS may enable deployment of edge functions in a service fashion, including a support of respective functions that support edge computing as a service (Edge-as-a-Service or "EaaS"). Additional features of FaaS may include: a granular billing component that enables customers (e.g., computer code developers) to pay only when their code gets executed; common data storage to store data for reuse by one or more functions; orchestration and management among individual functions; function execution management, parallelism, and consolidation; management of container and function memory spaces; coordination of acceleration resources available for functions; and distribution of functions between containers (including "warm" containers, already deployed or operating, versus "cold" which require initialization, deployment, or configuration).

The edge computing system 2600 can include or be in communication with an edge provisioning node 2644. The edge provisioning node 2644 can distribute software such as the example computer readable instructions 3182 of FIG. 31, to various receiving parties for implementing any of the methods described herein. The example edge provisioning node 2644 may be implemented by any computer server, home server, content delivery network, virtual server, software distribution system, central facility, storage device, storage disk, storage node, data facility, cloud service, etc., capable of storing and/or transmitting software instructions (e.g., code, scripts, executable binaries, containers, packages, compressed files, and/or derivatives thereof) to other computing devices. Component(s) of the example edge provisioning node 644 may be located in a cloud, in a local area network, in an edge network, in a wide area network, on the Internet, and/or any other location communicatively coupled with the receiving party(ies). The receiving parties may be customers, clients, associates, users, etc. of the entity owning and/or operating the edge provisioning node 2644. For example, the entity that owns and/or operates the edge provisioning node 2644 may be a developer, a seller, and/or a licensor (or a customer and/or consumer thereof) of software instructions such as the example computer readable instructions 3182 of FIG. 31. The receiving parties may be consumers, service providers, users, retailers, OEMs, etc., who purchase and/or license the software instructions for use and/or re-sale and/or sub-licensing.

In an example, edge provisioning node 2644 includes one or more servers and one or more storage devices/disks. The storage devices and/or storage disks host computer readable instructions such as the example computer readable instructions 3182 of FIG. 31, as described below. Similarly to edge gateway devices 2620 described above, the one or more servers of the edge provisioning node 2644 are in communication with a NAN 2642 or other network communication entity. In some examples, the one or more servers are responsive to requests to transmit the software instructions to a requesting party as part of a commercial transaction. Payment for the delivery, sale, and/or license of the software instructions may be handled by the one or more servers of the software distribution platform and/or via a third-party payment entity. The servers enable purchasers and/or licensors to download the computer readable instructions 3182 from the edge provisioning node 2644. For example, the software instructions, which may correspond to the example computer readable instructions 3182 of FIG. 31, may be downloaded to the example processor platform/s, which is to execute the computer readable instructions 3182 to implement the methods described herein.

In some examples, the processor platform(s) that execute the computer readable instructions 3182 can be physically located in different geographic locations, legal jurisdictions, etc. In some examples, one or more servers of the edge provisioning node 2644 periodically offer, transmit, and/or force updates to the software instructions (e.g., the example computer readable instructions 3182 of FIG. 31) to ensure improvements, patches, updates, etc. are distributed and applied to the software instructions implemented at the end user devices. In some examples, different components of the computer readable instructions 3182 can be distributed from different sources and/or to different processor platforms; for example, different libraries, plug-ins, components, and other types of compute modules, whether compiled or interpreted, can be distributed from different sources and/or to different processor platforms. For example, a portion of the software instructions (e.g., a script that is not, in itself, executable) may be distributed from a first source while an interpreter (capable of executing the script) may be distributed from a second source.

FIG. 27 illustrates a MEC system reference architecture (or MEC architecture) 2700 providing functionalities in accordance with ETSI GS MEC 003 v2.1.1 (2019-01) ("[MEC003]"); ETSI GS MEC 009 V2.1.1 (2019-01) ("[MEC009]"); ETSI GS MEC 011 V1.1.1 (2017-07) ("[MEC011]"); ETSI GS MEC 012 V2.1.1 (2019-12) ("[MEC012]"); ETSI GS MEC 013 v2.1.1 (2019-09) ("[MEC013]"); ETSI GS MEC 014 V1.1.1 (2018-02) ("[MEC014]"); ETSI GS MEC 015 v2.1.1 (2020-06) ("[MEC015]"); ETSI GS MEC 028 v2.1.1 (2020-06) ("[MEC028]"); ETSI GS MEC 029 v2.1.1 (2019-07) ("[MEC029]"); ETSI MEC GS 030 v2.1.1 (2020-04) ("[MEC030]"); among many other ETSI MEC standards. MEC offers application developers and content providers cloud-computing capabilities and an IT service environment at the Edge of the network. This environment is characterized by ultra-low latency and high bandwidth as well as real-time access to radio network information that can be leveraged by applications. MEC technology permits to flexible and rapid deployment of innovative applications and services towards mobile subscribers, enterprises and vertical segments. In particular, regarding the automotive sector, applications such as V2X (e.g., IEEE 802.11p based protocols such as DSRC/ITS-G5, or 3GPP C-V2X based protocols) need to exchange data, provide data to aggregation points and access to data in databases which provide an overview of the local situation derived from a multitude of sensors (by various cars, roadside units, etc.).

The MEC architecture 2700 includes MEC hosts 2702, a virtualization infrastructure manager (VIM) 2708, an MEC platform manager 2706, an MEC orchestrator 2710, an operations support system (OSS) 2712, a user app proxy 2714, a UE app 2718 running on UE 2720, and CFS portal 2716. The MEC host 2702 can include a MEC platform 2732 with filtering rules control component 2740, a DNS handling component 2742, a service registry 2738, and MEC services 2736. The MEC services 2736 can include at least one scheduler, which can be used to select resources for instantiating MEC apps (or NFVs) 2726 upon virtualization infrastructure (VI) 2722.

The MEC apps 2726 can be configured to provide services 2730, which can include processing network communications traffic of different types associated with one or more wireless connections (e.g., connections to one or more RANs or core network functions) and/or some other services such as those discussed herein. The other MEC host 2702 may have a same or similar configuration/implementation as the MEC host 2702, and the other MEC app 2726 instantiated within other MEC host 2702 can be similar to the MEC apps 2726 instantiated within MEC host 2702. The VI 2722 includes a data plane 2724 coupled to the MEC platform 2722 via an MP2 interface. Additional interfaces between various network entities of the MEC architecture 2700 are illustrated in FIG. 27.

The MEC system 2700 includes three groups of reference points, including "Mp" reference points regarding the MEC platform functionality; "Mm" reference points, which are management reference points; and "Mx" reference points, which connect MEC entities to external entities. The interfaces/reference points in the MEC system 2700 may include IP-based connections, and may be used to provide Representational State Transfer (REST or RESTful) services, and the messages conveyed using the reference points/interfaces may be in XML, HTML, JSON, or some other desired format, such as those discussed herein. A suitable Authentication, Authorization, and Accounting (AAA) protocol, such as the radius or diameter protocols, may also be used for communicating over the reference points/interfaces.

The logical connections between various entities of the MEC architecture 2700 may be access-agnostic and not dependent on a particular deployment. MEC enables implementation of MEC apps 2726 as software-only entities that run on top of a VI 2722, which is located in or close to the network Edge. A MEC app 2726 is an application that can be instantiated on a MEC host 2702 within the MEC system 2700 and can potentially provide or consume MEC services 2736.

The MEC entities depicted by FIG. 27 can be grouped into a MEC system level, MEC host level, and network level entities (not shown). The network level (not shown) includes various external network level entities, such as a 3GPP network, a local area network (e.g., a LAN, WLAN, PAN, DN, LADN, etc.), and external network(s). The MEC system level includes MEC system level management entities and UE 2720, and is discussed in more detail infra. The MEC host level includes one or more MEC hosts 2702, 2704 and MEC management entities, which provide functionality to run MEC Apps 2726 within an operator network or a subset of an operator network. The MEC management entities include various components that handle the management of the MEC-specific functionality of a particular MEC platform 2732, MEC host 2702, and the MEC Apps 2726 to be run.

The MEC platform manager 2706 is a MEC management entity including MEC platform element management component 2744, MEC app rules and requirements management component 2746, and MEC app lifecycle management component 2748. The various entities within the MEC architecture 2700 can perform functionalities as discussed in [MEC003]. The remote app 2750 is configured to communicate with the MEC host 2702 (e.g., with the MEC apps 2726) via the MEC orchestrator 2710 and the MEC platform manager 2706.

The MEC host 2702 is an entity that contains an MEC platform 2732 and VI 2722 which provides compute, storage, and network resources for the purpose of running MEC Apps 2726. The VI 2722 includes a data plane (DP) 2724 that executes traffic rules 2740 received by the MEC platform 2732, and routes the traffic among MEC Apps 2726, MEC services 2736, DNS server/proxy (see e.g., via DNS handling entity 2742), 3GPP network, local networks, and external networks. The MEC DP 2724 may be connected with the (R)AN nodes and the 3GPP core network, and/or may be connected with an access point via a wider network, such as the internet, an enterprise network, or the like.

The MEC platform 2732 is a collection of essential functionality required to run MEC Apps 2726 on a particular VI 2722 and enable them to provide and consume MEC services 2736, and that can provide itself a number of MEC services 937a. The MEC platform 2732 can also provide various services and/or functions, such as offering an environment where the MEC Apps 2726 can discover, advertise, consume and offer MEC services 2736 (discussed infra), including MEC services 2736 available via other platforms when supported. The MEC platform 2732 may be able to allow authorized MEC Apps 2726 to communicate with third party servers located in external networks. The MEC platform 2732 may receive traffic rules from the MEC platform manager 2706, applications, or services, and instruct the data plane accordingly (see e.g., Traffic Rules Control 2740). The MEC platform 2732 may send instructions to the DP 2724 within the VI 2722 via the Mp2 reference point. The Mp2 reference point between the MEC platform 2732 and the DP 2724 of the VI 2722 may be used to instruct the DP 2734 on how to route traffic among applications, networks, services, etc. The MEC platform 2732 may translate tokens representing UEs 2720, UE apps, individual sessions, and/or individual flows within a session in the traffic rules into specific network addresses (e.g., IP addresses or the like). The MEC platform 2732 also receives DNS records from the MEC platform manager 2706 and configures a DNS proxy/server accordingly. The MEC platform 2732 hosts MEC services 2736 including the multi-access Edge services discussed infra, and provide access to persistent storage and time of day information. Furthermore, the MEC platform 2732 may communicate with other MEC platforms 2732 of other MEC servers 2702 via the Mp3 reference point. Upon receipt of update, activation or deactivation of traffic rules from the MEC platform manager 2706, apps, or services, the MEC platform 2732 instructs the data plane 2724 accordingly. The MEC platform 2732 also receives DNS records from the MEC platform manager 2706 and uses them to configure a DNS proxy/server 2742. The traffic rules control 2740 allows the MEC platform 2732 to perform traffic routing including traffic rules update, activation, and deactivation. Additionally or alternatively, the traffic rules control 2740 allows the MEC platform 2732 to perform traffic steering, for example, by directing data packets over one or more access network connections in a multi-access environment comprising multiple access networks, each of which may have multiple access network connections and/or may implement different access technologies.

The VI 2722 represents the totality of all hardware and software components which build up the environment in which MEC Apps 2726 and/or MEC platform 2732 are deployed, managed and executed. The VI 2722 may span across several locations, and the network providing connectivity between these locations is regarded to be part of the VI 2722. The physical hardware resources of the VI 2722 includes computing, storage and network resources that provide processing, storage and connectivity to MEC Apps 2726 and/or MEC platform 2732 through a virtualization layer (e.g., a hypervisor, VM monitor (VMM), or the like). The virtualization layer may abstract and/or logically partition the physical hardware resources of the MEC server 2702 as a hardware abstraction layer. The virtualization layer may also enable the software that implements the MEC Apps 2726 and/or MEC platform 2732 to use the underlying VI 2722, and may provide virtualized resources to the MEC Apps 2726 and/or MEC platform 2732, so that the MEC Apps 2726 and/or MEC platform 2732 can be executed.

The MEC Apps 2726 are applications that can be instantiated on a MEC host/server 2702 within the MEC system 2700 and can potentially provide or consume MEC services 2736. The term "MEC service" refers to a service provided via a MEC platform 2732 either by the MEC platform 2732 itself or by a MEC App 2726. MEC Apps 2726 may run as VM on top of the VI 2722 provided by the MEC server 2702, and can interact with the MEC platform 2732 to consume and provide the MEC services 2736. The Mp1 reference point between the MEC platform 2732 and the MEC Apps 2726 is used for consuming and providing service specific functionality. Mp1 provides service registration 2738, service discovery, and communication support for various services, such as the MEC services 2736 provided by MEC host 2702. Mp1 may also provide application availability, session state relocation support procedures, traffic rules and DNS rules activation, access to persistent storage and time of day information, and/or the like. Additionally or alternatively, the MEC Apps 2726 may communicate with the MEC platform 2732 using the MEC APIs discussed in ETSI GS MEC 011 V2.1.1 (2019-11).

The MEC Apps 2726 are instantiated on the VI 2722 of the MEC server 2702 based on configuration or requests validated by the MEC management (e.g., MEC platform manager 2706). The MEC Apps 2726 can also interact with the MEC platform 2732 to perform certain support procedures related to the lifecycle of the MEC Apps 2726, such as indicating availability, preparing relocation of user state, etc. The MEC Apps 2726 may have a certain number of rules and requirements associated to them, such as required resources, maximum latency, required or useful services, etc. These requirements may be validated by the MEC management, and can be assigned to default values if missing. MEC services 2736 are services provided and/or consumed either by the MEC platform 2732 and/or MEC Apps 2726. The service consumers (e.g., MEC Apps 2726 and/or MEC platform 2732) may communicate with particular MEC services 2736 over individual APIs (including MEC V2X API and the other MEC APIs discussed herein). When provided by an application, a MEC service 2736 can be registered in a list of services in the service registries 2738 to the MEC platform 2732 over the Mp1 reference point. Additionally, a MEC App 2726 can subscribe to one or more services 2730/2736 for which it is authorized over the Mp1 reference point.

Examples of MEC services 2736 include V2X information services (VIS), RNIS (see e.g., [MEC012], Location Services [MEC013], UE identity services [MEC014], Traffic Management Services (TMS) and BWMS [MEC015], WLAN Access Information (WAI) services [MEC028], Fixed Access Information (FAI) services [MEC029], and/or other MEC services. The RNIS, when available, provides authorized MEC Apps 2726 with radio network related information, and expose appropriate up-to-date radio network information to the MEC Apps 2726. The RNI may include, inter alia, radio network conditions, measurement and statistics information related to the UP, information related to UEs 2720 served by the radio node(s) associated with the MEC host 2702 (e.g., UE context and radio access bearers), changes on information related to UEs 2720 served by the radio node(s) associated with the MEC host 2702, and/or the like. The RNI may be provided at the relevant granularity (e.g., per UE 2720, per cell, per period of time).

The service consumers (e.g., MEC Apps 2726, MEC platform 2732, etc.) may communicate with the RNIS over an RNI API to obtain contextual information from a corresponding RAN. RNI may be provided to the service consumers via aNAN (e.g., (R)AN node, RRH, AP, etc.). The RNI API may support both query and subscription (e.g., a pub/sub) based mechanisms that are used over a Representational State Transfer (RESTful) API or over a message broker of the MEC platform 2732 (not shown). A MEC App 2726 may query information on a message broker via a transport information query procedure, wherein the transport information may be pre-provisioned to the MEC App 2726 via a suitable configuration mechanism. The various messages communicated via the RNI API may be in XML, JSON, Protobuf, or some other suitable format.

The VIS provides supports various V2X applications including the journey-aware QoS predictions among many others. The RNI may be used by MEC Apps 2726 and MEC platform 2732 to optimize the existing services and to provide new types of services that are based on up to date information on radio conditions. As an example, a MEC App 2726 may use RNI to optimize current services such as video throughput guidance. In throughput guidance, a radio analytics MEC App 2726 may use MEC services to provide a backend video server with a near real-time indication on the throughput estimated to be available at the radio DL interface in a next time instant. The throughput guidance radio analytics application computes throughput guidance based on the required radio network information it obtains from a multi-access Edge service running on the MEC server 2702. RNI may be also used by the MEC platform 2732 to optimize the mobility procedures required to support service continuity, such as when a certain MEC App 2726 requests a single piece of information using a simple request-response model (e.g., using RESTful mechanisms) while other MEC Apps 2726 subscribe to multiple different notifications regarding information changes (e.g., using a pub/sub mechanism and/or message broker mechanisms).

The LS, when available, may provide authorized MEC Apps 2726 with location-related information, and expose such information to the MEC Apps 2726. With location related information, the MEC platform 2732 or one or more MEC Apps 2726 perform active device location tracking, location-based service recommendations, and/or other like services. The LS supports the location retrieval mechanism, e.g., the location is reported only once for each location information request. The LS supports a location subscribe mechanism, for example, the location is able to be reported multiple times for each location request, periodically or based on specific events, such as location change. The location information may include, inter alia, the location of specific UEs 2720 currently served by the radio node(s) associated with the MEC server 2702, information about the location of all UEs 2720 currently served by the radio node(s) associated with the MEC server 2702, information about the location of a certain category of UEs 2720 currently served by the radio node(s) associated with the MEC server 2702, a list of UEs 2720 in a particular location, information about the location of all radio nodes currently associated with the MEC host 2702, and/or the like. The location information may be in the form of a geolocation, a Global Navigation Satellite Service (GNSS) coordinate, a Cell identity (ID), and/or the like. The LS is accessible through the API defined in the Open Mobile Alliance (OMA) specification "RESTful Network API for Zonal Presence" OMA-TS-REST-NetAPI-ZonalPresence-V1-0-20160308-C. The Zonal Presence service utilizes the concept of "zone", where a zone lends itself to be used to group all radio nodes that are associated to a MEC host 2702, or a subset thereof, according to a desired deployment. In this regard, the OMA Zonal Presence API provides means for MEC Apps 2726 to retrieve information about a zone, the access points associated to the zones and the users that are connected to the access points. In addition, the OMA Zonal Presence API, allows authorized application to subscribe to a notification mechanism, reporting about user activities within a zone. A MEC server 2702 may access location information or zonal presence information of individual UEs 2720 using the OMA Zonal Presence API to identify the relative location or positions of the UEs 2720.

The TMS allows Edge applications to get informed of various traffic management capabilities and multi-access network connection information, and allows Edge applications to provide requirements, e.g. delay, throughput, loss, for influencing traffic management operations. In some implementations, the TMS includes Multi-Access Traffic Steering (MTS), which seamlessly performs steering, splitting, and duplication of application data traffic across multiple access network connections. The BWMS provides for the allocation of bandwidth to certain traffic routed to and from MEC Apps 2726, and specify static/dynamic up/down bandwidth resources, including bandwidth size and bandwidth priority. MEC Apps 2726 may use the BWMS to update/receive bandwidth information to/from the MEC platform 2732. Different MEC Apps 2726 running in parallel on the same MEC server 2702 may be allocated specific static, dynamic up/down bandwidth resources, including bandwidth size and bandwidth priority. The BWMS includes a bandwidth management (BWM) API to allowed registered applications to statically and/or dynamically register for specific bandwidth allocations per session/application. The BWM API includes HTTP protocol bindings for BWM functionality using RESTful services or some other suitable API mechanism. The BWM service is for allocating/adjusting BW resources for MEC apps, and allows MEC apps to provide their BW requirements.

Different MEC applications (apps) running in parallel on the same MEC host may require specific static/dynamic up/down bandwidth (BW) resources, including BW size and BW priority. In some cases different sessions running in parallel on the same app may each have specific BW requirements. In addition, sessions driven by Apps running from closer to end users (e.g., shorter RTT) may receive unfair advantage over session driven by apps running from distant locations (e.g., outside the RAN). To resolve potential resource conflicts between such competing applications, BWM and/or Multi-access Traffic Steering (MTS) services may be used.

The MTS services may be provided as part of the BWMS or separately from the BWMS. The MTS service is for seamlessly steering/splitting/duplicating app data traffic across multiple access network connections. The MTS service allows apps/MEC apps to get informed of various MTS capabilities and MX network connection info. The MTS also allows MEC apps to provide requirements (e.g., delay, throughput, loss, etc.) for influencing traffic management operations. The specific session or app/MEC app may be identified using a set of filters and/or identifiers (IDs) within the resource request.

The purpose of the UE Identity feature is to allow UE specific traffic rules in the MEC system 2700. When the MEC system 2700 supports the UE Identity feature, the MEC platform 2732 provides the functionality (e.g., UE Identity API) for a MEC App 2726 to register a tag representing a UE 2720 or a list of tags representing respective UEs 2720. Each tag is mapped into a specific UE 2720 in the MNO's system, and the MEC platform 2732 is provided with the mapping information. The UE Identity tag registration triggers the MEC platform 2732 to activate the corresponding traffic rule(s) 2740 linked to the tag. The MEC platform 2732 also provides the functionality (e.g., UE Identity API) for a MEC App 2726 to invoke a de-registration procedure to disable or otherwise stop using the traffic rule for that user.

The WAIS is a service that provides WLAN access related information to service consumers within the MEC System 2700. The WAIS is available for authorized MEC Apps 2726 and is discovered over the Mp1 reference point. The granularity of the WLAN Access Information may be adjusted based on parameters such as information per station, per NAN/AP, or per multiple APs (Multi-AP). The WLAN Access Information may be used by the service consumers to optimize the existing services and to provide new types of services that are based on up-to-date information from WLAN APs, possibly combined with the information such as RNI or Fixed Access Network Information. The WAIS defines protocols, data models, and interfaces in the form of RESTful APIs. Information about the APs and client stations can be requested either by querying or by subscribing to notifications, each of which include attribute-based filtering and attribute selectors.

The FAIS is a service that provides Fixed Access Network Information (or FAI) to service consumers within the MEC System 2700. The FAIS is available for the authorized MEC Apps 2726 and is discovered over the Mp1 reference point. The FAI may be used by MEC Apps 2726 and the MEC platform 2732 to optimize the existing services and to provide new types of services that are based on up-to-date information from the fixed access (e.g., NANs), possibly combined with other information such as RNI or WLAN Information from other access technologies. Service consumers interact with the FAIS over the FAI API to obtain contextual information from the fixed access network. Both the MEC Apps 2726 and the MEC platform 2732 may consume the FAIS; and both the MEC platform 2732 and the MEC Apps 2726 may be the providers of the FAI. The FAI API supports both queries and subscriptions (pub/sub mechanism) that are used over the RESTful API or over alternative transports such as a message bus. Alternative transports may also be used.

The MEC management comprises MEC system level management and MEC host level management. The MEC management comprises the MEC platform manager 2706 and the VI manager (VIM) 2708, and handles the management of MEC-specific functionality of a particular MEC server 2702 and the applications running on it. In some implementations, some or all of the multi-access Edge management components may be implemented by one or more servers located in one or more data centers, and may use virtualization infrastructure that is connected with NFV infrastructure used to virtualize NFs, or using the same hardware as the NFV infrastructure.

The MEC platform manager 2706 is responsible for managing the life cycle of applications including informing the MEC orchestrator (MEC-O) 2710 of relevant application related events. The MEC platform manager 2706 may also provide MEC Platform Element management functions 2744 to the MEC platform 2732, manage MEC App rules and requirements 2746 including service authorizations, traffic rules, DNS configuration and resolving conflicts, and manage MEC App lifecycles mgmt 2748. The MEC platform manager 2706 may also receive virtualized resources, fault reports, and performance measurements from the VIM 2708 for further processing. The Mm5 reference point between the MEC platform manager 2706 and the MEC platform 2732 is used to perform platform configuration, configuration of the MEC Platform element mgmt 2744, MEC App rules and reqts 2746, MEC App lifecycles mgmt 2748, and management of application relocation.

The VIM 2708 may be an entity that allocates, manages and releases virtualized (compute, storage and networking) resources of the VI 2722, and prepares the VI 2722 to run a software image. To do so, the VIM 2708 may communicate with the VI 2722 over the Mm7 reference point between the VIM 2708 and the VI 2722. Preparing the VI 2722 may include configuring the VI 2722, and receiving/storing the software image. When supported, the VIM 2708 may provide rapid provisioning of applications, such as described in "Openstack++ for Cloudlet Deployments", available at http://reports-archive.adm.cs.cmu.edu/anon/2015/CMU-CS-15-123.pdf. The VIM 2708 may also collect and report performance and fault information about the virtualized resources, and perform application relocation when supported. For application relocation from/to external cloud environments, the VIM 2708 may interact with an external cloud manager to perform the application relocation, for example using the mechanism described in "Adaptive VM Handoff Across Cloudlets", and/or possibly through a proxy. Furthermore, the VIM 2708 may communicate with the MEC platform manager 2706 via the Mm6 reference point, which may be used to manage virtualized resources, for example, to realize the application lifecycle management. Moreover, the VIM 2708 may communicate with the MEC-O 2710 via the Mm4 reference point, which may be used to manage virtualized resources of the MEC server 2702, and to manage application images. Managing the virtualized resources may include tracking available resource capacity, etc.

The MEC system level management includes the MEC-O 2710, which has an overview of the complete MEC system 2700. The MEC-O 2710 may maintain an overall view of the MEC system 2700 based on deployed MEC hosts 2702, available resources, available MEC services 2736, and topology. The Mm3 reference point between the MEC-O 2710 and the MEC platform manager 2706 may be used for the management of the application lifecycle, application rules and requirements and keeping track of available MEC services 2736. The MEC-O 2710 may communicate with the user application lifecycle management proxy (UALMP)

2714 via the Mm9 reference point in order to manage MEC Apps 2726 requested by UE app 2718.

The MEC-O 2710 may also be responsible for on-boarding of application packages, including checking the integrity and authenticity of the packages, validating application rules and requirements and if necessary adjusting them to comply with operator policies, keeping a record of on-boarded packages, and preparing the VIM(s) 2708 to handle the applications. The MEC-O 2710 may select appropriate MEC host(s) 901 for application instantiation based on constraints, such as latency, available resources, and available services. The MEC-O 2710 may also trigger application instantiation and termination, as well as trigger application relocation as needed and when supported.

The Operations Support System (OSS) 2712 is the OSS of an operator that receives requests via the Customer Facing Service (CFS) portal 2716 over the Mx1 reference point and from UE apps 2718 for instantiation or termination of MEC Apps 2726. The OSS 2712 decides on the granting of these requests. The CFS portal 2716 (and the Mx1 interface) may be used by third-parties to request the MEC system 2700 to run apps 2718 in the MEC system 2700. Granted requests may be forwarded to the MEC-O 2710 for further processing. When supported, the OSS 2712 also receives requests from UE apps 2718 for relocating applications between external clouds and the MEC system 2700. The Mm2 reference point between the OSS 2712 and the MEC platform manager 2706 is used for the MEC platform manager 2706 configuration, fault and performance management. The Mm1 reference point between the MEC-O 2710 and the OSS 2712 is used for triggering the instantiation and the termination of MEC Apps 2726 in the MEC system 2700.

The UE app(s) 2718 (also referred to as "device applications" or the like) is one or more apps running in a device 2720 that has the capability to interact with the MEC system 2700 via the user application lifecycle management proxy 2714. The UE app(s) 2718 may be, include, or interact with one or more client applications, which in the context of MEC, is application software running on the device 2718 that utilizes functionality provided by one or more specific MEC Apps 2726. The user app LCM proxy 2714 may authorize requests from UE apps 2718 in the UE 2720 and interacts with the OSS 2712 and the MEC-O 2710 for further processing of these requests. The term "lifecycle management," in the context of MEC, refers to a set of functions required to manage the instantiation, maintenance and termination of a MEC App 2726 instance. The user app LCM proxy 2714 may interact with the OSS 2712 via the Mm8 reference point, and is used to handle UE 2718 requests for running applications in the MEC system 2700. A user app may be an MEC App 2726 that is instantiated in the MEC system 2700 in response to a request of a user via an application running in the UE 2720 (e.g., UE App 2718). The user app LCM proxy 2714 allows UE apps 2718 to request on-boarding, instantiation, termination of user applications and when supported, relocation of user applications in and out of the MEC system 2700. It also allows informing the user apps about the state of the user apps. The user app LCM proxy 2714 is only accessible from within the mobile network, and may only be available when supported by the MEC system 2700. A UE app 2718 may use the Mx2 reference point between the user app LCM proxy 2714 and the UE app 2718 to request the MEC system 2700 to run an application in the MEC system 2700, or to move an application in or out of the MEC system 2700. The Mx2 reference point may only be accessible within the mobile network and may only be available when supported by the MEC system 2700.

In order to run an MEC App 2726 in the MEC system 2700, the MEC-O 2710 receives requests triggered by the OSS 2712, a third-party, or a UE app 2718. In response to receipt of such requests, the MEC-O 2710 selects a MEC server/host 2702 to host the MEC App 2726 for computational offloading, etc. These requests may include information about the application to be run, and possibly other information, such as the location where the application needs to be active, other application rules and requirements, as well as the location of the application image if it is not yet on-boarded in the MEC system 2700.

The MEC-O 2710 may select one or more MEC servers 2702 for computational intensive tasks. The selected one or more MEC servers 2702 may offload computational tasks of a UE app 2718 based on various operational parameters, such as network capabilities and conditions, computational capabilities and conditions, application requirements, and/or other like operational parameters. The application requirements may be rules and requirements associated to/with one or more MEC Apps 2726, such as deployment model of the application (e.g., whether it is one instance per user, one instance per host, one instance on each host, etc.); required virtualized resources (e.g., compute, storage, network resources, including specific hardware support); latency requirements (e.g., maximum latency, how strict the latency constraints are, latency fairness between users); requirements on location; multi-access Edge services that are required and/or useful for the MEC Apps 2726 to be able to run; multi-access Edge services that the MEC Apps 2726 can take advantage of, if available; connectivity or mobility support/requirements (e.g., application state relocation, application instance relocation); required multi-access Edge features, such as VM relocation support or UE identity; required network connectivity (e.g., connectivity to applications within the MEC system 2700, connectivity to local networks, or to the Internet); information on the operator's MEC system 2700 deployment or mobile network deployment (e.g., topology, cost); requirements on access to user traffic; requirements on persistent storage; traffic rules 2740; DNS rules 2742; etc.

The MEC-O 2710 considers the requirements and information listed above and information on the resources currently available in the MEC system 2700 to select one or several MEC servers 2702 to host MEC Apps 2726 and/or for computational offloading. After one or more MEC servers 2702 are selected, the MEC-O 2710 requests the selected MEC host(s) 2702 to instantiate the application(s) or application tasks. The actual algorithm used to select the MEC servers 2702 depends on the implementation, configuration, and/or operator deployment. The selection algorithm(s) may be based on the task offloading criteria/parameters, for example, by taking into account network, computational, and energy consumption requirements for performing application tasks, as well as network functionalities, processing, and offloading coding/encodings, or differentiating traffic between various RATs. Under certain circumstances (e.g., UE mobility events resulting in increased latency, load balancing decisions, etc.), and if supported, the MEC-O 2710 may decide to select one or more new MEC hosts 2702 to act as a primary/source node, and initiates the transfer of an application instance or application-related state information from the one or more source MEC hosts 2702 to the one or more target MEC hosts 2702.

In a first implementation, a UPF of the 5GS is mapped into the MEC architecture 2700 as the MEC data plane 2724. In this implementation, the UPF handles the UP path of PDU sessions. Additionally, the UPF provides the interface to a data network (e.g., DN 175 and/or local service 170 in FIGS. 1A-1B) and supports the functionality of a PDU session anchor.

In a second implementation, an application function (AF) of the 5GS is mapped into the MEC architecture 2700 as the MEC platform 2732. In these implementations, the AF is configurable or operable to perform application influence on traffic routing, access network capability exposure, and interact with the policy framework for policy control. The second implementation may be combined with the first implementation, or may be a standalone implementation. In the first and/or second implementations, since user traffic is routed to the local DN, MEC apps 2726, 2727, and/or 2728 can be mapped in or to the DN of the 5GS.

In a third implementation, the RAN of 5GS can be a virtual RAN based on a VNF, and the UPF is configurable or operable to function as the MEC data plane 2724 within an NF virtualization infrastructure (NFVI) (e.g., VI 2722). In these implementations, the AF can be configured as MEC platform VNF with MEC APIs, MEC app enablement functionality (see e.g., [MEC009]), and API principles functionality (see e.g., [MEC009]). Additionally, the local DN an include MEC apps 2726, 2727, and/or 2728 instantiated as VNFs. This implementation can be configured to provide functionalities in accordance with [MEC003] and/or ETSI GR MEC 017 V1.1.1 (2018-02) ("[MEC017]"). The third implementation may be combined with the first implementation and/or the second implementation, or may be a standalone implementation.

Additionally or alternatively, the access level Edge (e.g., the various NANs and/or (R)ANs discussed herein) can use one or more APIs to communicate with local/regional level Edge networks. The local/regional level Edge networks can include network nodes using corresponding applications to communicate with a national level Edge network. The national level Edge can include various NANs that use applications for accessing one or more remote clouds within the global level Edge. The NANs are also configurable or operable for vertical segment management and SLA compliance. Additionally or alternatively, MEC deployment can be based on the definition of "Edge" to provide degrees of freedom to MNOs, especially when deploying MEC in an NFV environment (e.g., MEC entities can be instantiated as Virtualized NFs (VNFs), thus with high flexibility in terms of deployment for the operator).

Additionally or alternatively, MEC system 2700 can be flexibly deployed depending on the use case/vertical segment/information to be processed. Some components of the MEC system 2700 can be co-located with other elements of the system. As an example, in certain use cases (e.g., enterprise), a MEC app 2726 may need to consume a MEC service locally, and it may be efficient to deploy a MEC host locally equipped with the needed set of APIs. In another example, deploying a MEC server 2702 in a data center (which can be away from the access network) may not need to host some APIs like the RNI API (which can be used for gathering radio network information from the radio base station). On the other hand, RNI information can be elaborated and made available in the cloud RAN (CRAN) environments at the aggregation point, thus enabling the execution of suitable radio-aware traffic management algorithms. Additionally or alternatively, a bandwidth management API may be present both at the access level Edge and also in more remote Edge locations, in order to set up transport networks (e.g., for CDN-based services).

Figure 28:
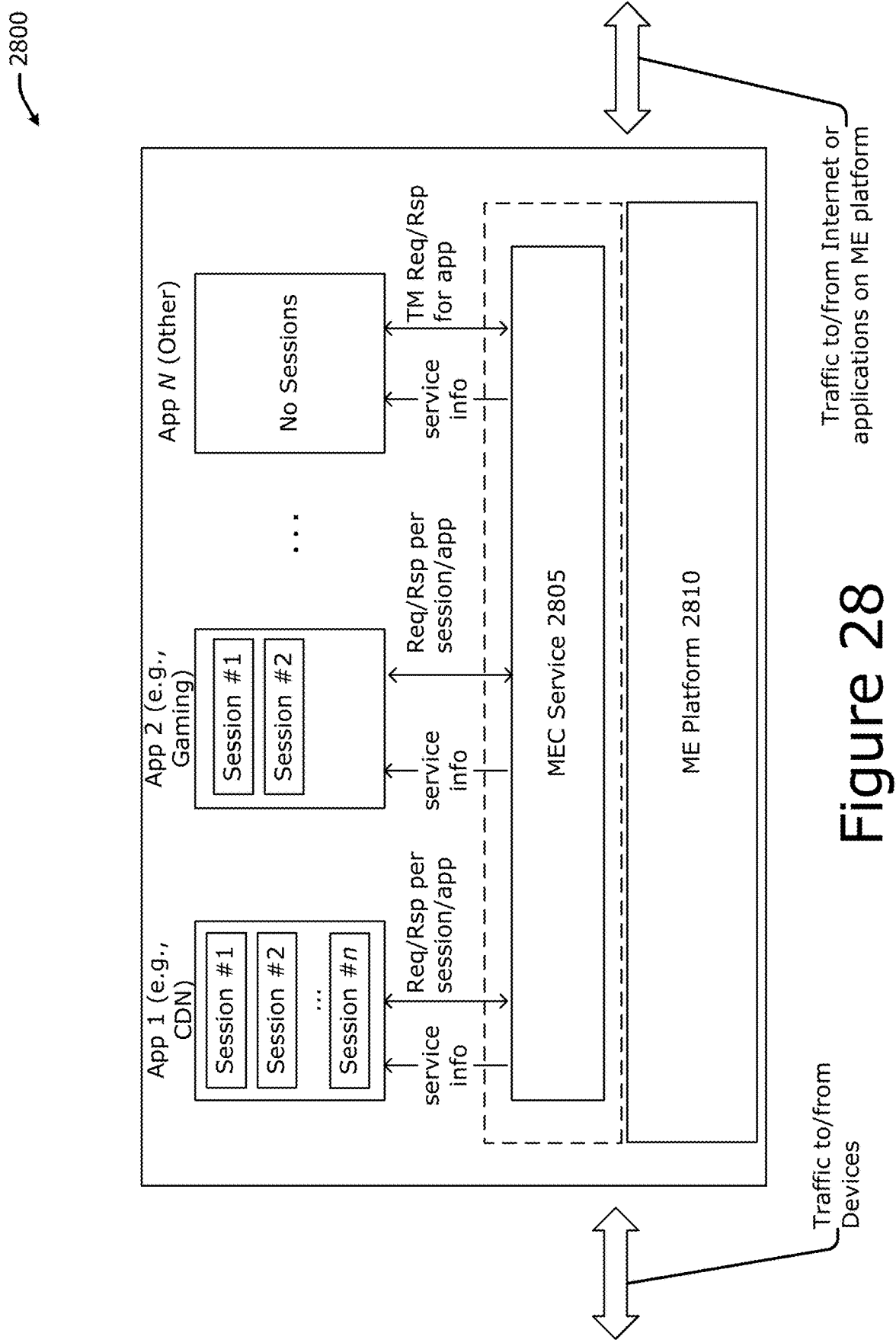
FIG. 28 illustrates an example MEC service architecture.

FIG. 28 illustrates an example MEC service architecture 2800. MEC service architecture 2800 includes the MEC service 2805, ME platform 2810 (corresponding to MEC platform 2732), and applications (Apps) 1 to N (where N is a number). As an example, the App 1 may be a CDN app/service hosting 1 to n sessions (where n is a number that is the same or different than N), App 2 may be a gaming app/service which is shown as hosting two sessions, and App N may be some other app/service which is shown as a single instance (e.g., not hosting any sessions). Each App may be a distributed application that partitions tasks and/or workloads between resource providers (e.g., servers such as ME platform 2810) and consumers (e.g., UEs 101, user apps instantiated by individual UEs 101, other servers/services, network functions, application functions, etc.). Each session represents an interactive information exchange between two or more elements, such as a client-side app and its corresponding server-side app, a user app instantiated by a UE 101 and a MEC app instantiated by the ME platform 2810, and/or the like. A session may begin when App execution is started or initiated and ends when the App exits or terminates execution. Additionally or alternatively, a session may begin when a connection is established and may end when the connection is terminated. Each App session may correspond to a currently running App instance. Additionally or alternatively, each session may correspond to a Protocol Data Unit (PDU) session or multi-access (MA) PDU session. A PDU session is an association between a UE 101 and a DN that provides a PDU connectivity service, which is a service that provides for the exchange of PDUs between a UE 101 and a Data Network 170, 175. An MA PDU session is a PDU Session that provides a PDU connectivity service, which can use one access network at a time, or simultaneously a 3GPP access network 110A and a non-3GPP access network 1101B. Furthermore, each session may be associated with a session identifier (ID) which is data the uniquely identifies a session, and each App (or App instance) may be associated with an App ID (or App instance ID) which is data the uniquely identifies an App (or App instance).

The MEC service 2805 provides one or more MEC services 2736 to MEC service consumers (e.g., Apps 1 to N). The MEC service 2805 may optionally run as part of the platform (e.g., ME platform 2810) or as an application (e.g., ME app). Different Apps 1 to N, whether managing a single instance or several sessions (e.g., CDN), may request specific service info per their requirements for the whole application instance or different requirements per session. The MEC service 2805 may aggregate all the requests and act in a manner that will help optimize the BW usage and improve Quality of Experience (QoE) for applications.

The MEC service 2805 provides a MEC service API that supports both queries and subscriptions (e.g., pub/sub mechanism) that are used over a Representational State Transfer ("REST" or "RESTful") API or over alternative transports such as a message bus. For RESTful architectural style, the MEC APIs contain the HTTP protocol bindings for traffic management functionality.

Each Hypertext Transfer Protocol (HTTP) message is either a request or a response. A server listens on a connection for a request, parses each message received, interprets the message semantics in relation to the identified request target, and responds to that request with one or more response messages. A client constructs request messages to communicate specific intentions, examines received responses to see if the intentions were carried out, and determines how to interpret the results. The target of an HTTP request is called a "resource." Additionally or alternatively, a "resource" is an object with a type, associated data, a set of methods that operate on it, and relationships to other resources if applicable. Each resource is identified by at least one Uniform Resource Identifier (URI), and a resource URI identifies at most one resource. Resources are acted upon by the RESTful API using HTTP methods (e.g., POST, GET, PUT, DELETE, etc.). With every HTTP method, one resource URI is passed in the request to address one particular resource. Operations on resources affect the state of the corresponding managed entities.

Considering that a resource could be anything, and that the uniform interface provided by HTTP is similar to a window through which one can observe and act upon such a thing only through the communication of messages to some independent actor on the other side, an abstraction is needed to represent ("take the place of") the current or desired state of that thing in our communications. That abstraction is called a representation. For the purposes of HTTP, a "representation" is information that is intended to reflect a past, current, or desired state of a given resource, in a format that can be readily communicated via the protocol. A representation comprises a set of representation metadata and a potentially unbounded stream of representation data. Additionally or alternatively, a resource representation is a serialization of a resource state in a particular content format.

An origin server might be provided with, or be capable of generating, multiple representations that are each intended to reflect the current state of a target resource. In such cases, some algorithm is used by the origin server to select one of those representations as most applicable to a given request, usually based on content negotiation. This "selected representation" is used to provide the data and metadata for evaluating conditional requests constructing the payload for response messages (e.g., 200 OK, 304 Not Modified responses to GET, and the like). A resource representation is included in the payload body of an HTTP request or response message. Whether a representation is required or not allowed in a request depends on the HTTP method used (see e.g., Fielding et al., "Hypertext Transfer Protocol (HTTP/1.1): Semantics and Content", IETF RFC 7231 (June 2014)).

The MEC API resource Universal Resource Indicators (URIs) are discussed in various ETSI MEC standards, such as those mentioned herein. The MTS API supports additional application-related error information to be provided in the HTTP response when an error occurs (see e.g., clause 6.15 of ETSI GS MEC 009 V2.1.1 (2019-01) ("[MEC009]")). The syntax of each resource URI follows [MEC009], as well as Berners-Lee et al., "Uniform Resource Identifier (URI): Generic Syntax", IETF Network Working Group, RFC 3986 (January 2005) and/or Nottingham, "URI Design and Ownership", IETF RFC 8820 (June 2020). In the RESTful MEC service APIs, including the VIS API, the resource URI structure for each API has the following structure:

{apiRoot}/{apiName}/{apiVersion}/{apiSpecificSuffixes}

Here, "apiRoot" includes the scheme ("https"), host and optional port, and an optional prefix string. The "apiName" defines the name of the API (e.g., MTS API, RNI API, etc.). The "apiVersion" represents the version of the API, and the "apiSpecificSuffixes" define the tree of resource URIs in a particular API. The combination of "apiRoot", "apiName" and "apiVersion" is called the root URI. The "apiRoot" is under control of the deployment, whereas the remaining parts of the URI are under control of the API specification. In the above root, "apiRoot" and "apiName" are discovered using the service registry (see e.g., service registry 2738 in FIG. 27). It includes the scheme ("http" or "https"), host and optional port, and an optional prefix string. For the a given MEC API, the "apiName" may be set to "mec" and "apiVersion" may be set to a suitable version number (e.g., "v1" for version 1). The MEC APIs support HTTP over TLS (also known as HTTPS). All resource URIs in the MEC API procedures are defined relative to the above root URI.

The JSON content format may also be supported. The JSON format is signaled by the content type "application/json". The MTS API may use the OAuth 2.0 client credentials grant type with bearer tokens (see e.g., [MEC009]). The token endpoint can be discovered as part of the service availability query procedure defined in [MEC009]. The client credentials may be provisioned into the MEC app using known provisioning mechanisms.

3. Hardware Components, Configurations, and Arrangements

Figure 29:
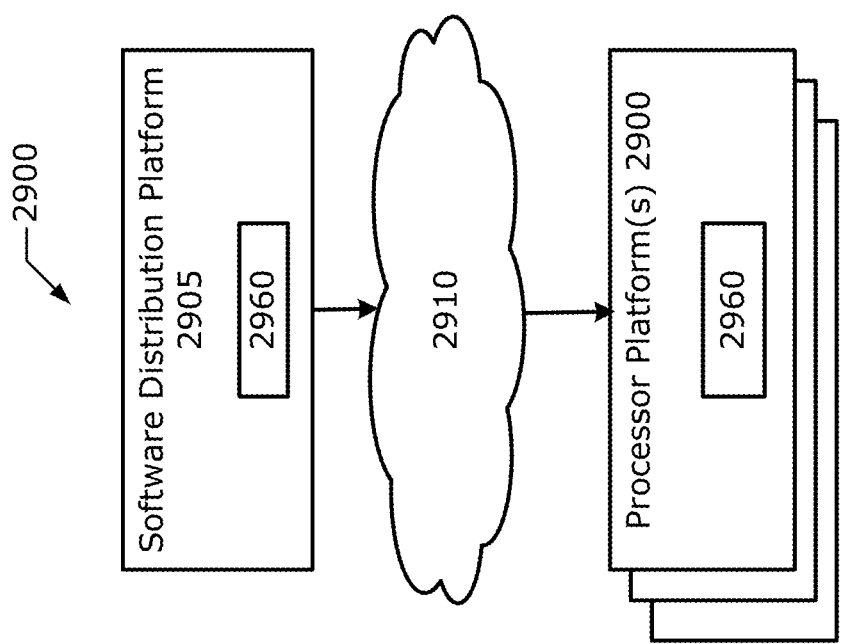
FIG. 29 illustrates an example software distribution platform.
Figure 31:
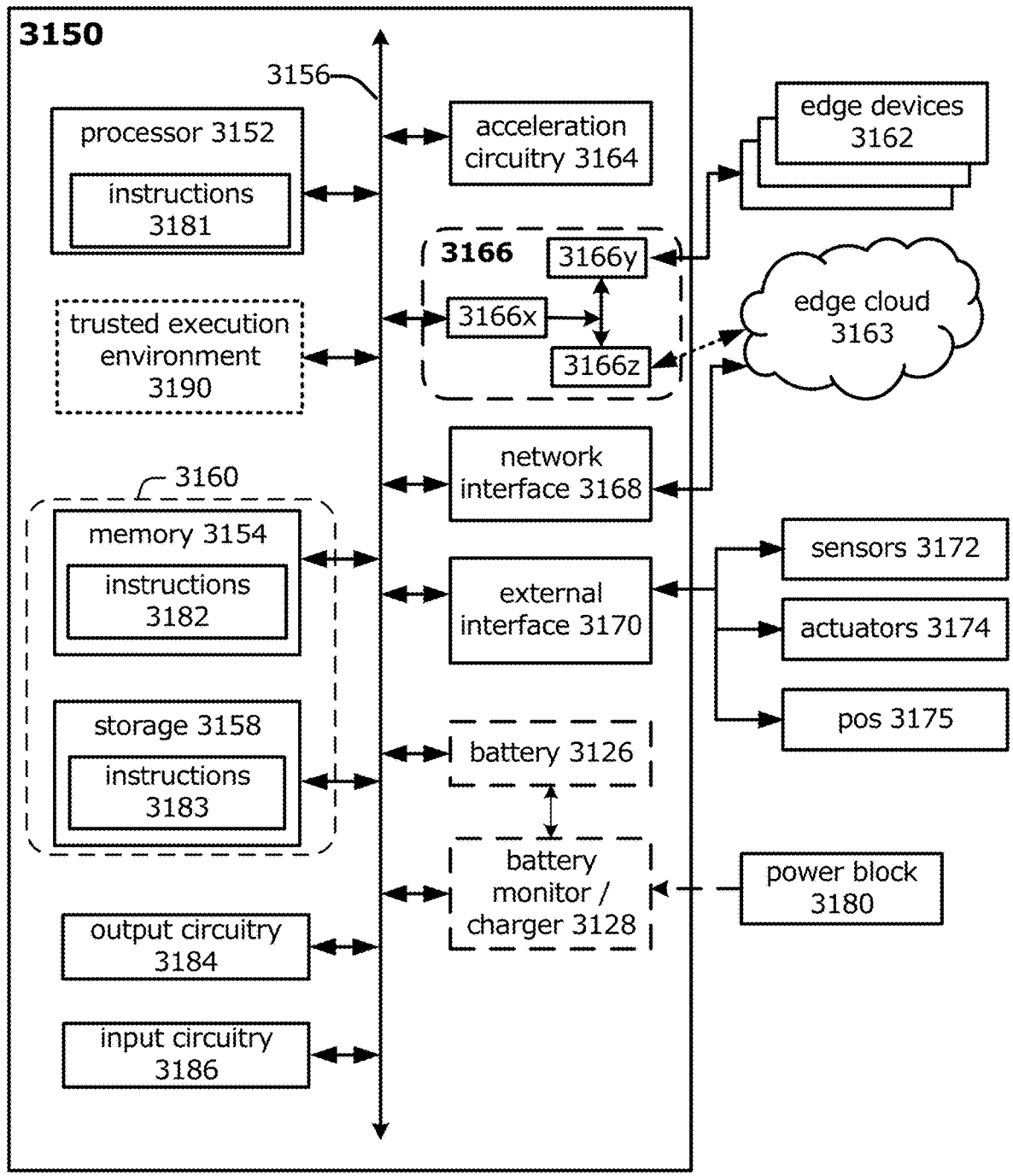

FIG. 29 illustrates a software distribution platform 2905 to distribute software 2960, such as the example computer readable instructions 3160 of FIG. 31, to one or more devices, such as example processor platform(s) 2900 and/or example connected edge devices 3162 (see e.g., FIG. 31) and/or any of the other computing systems/devices discussed herein. The example software distribution platform 2905 may be implemented by any computer server, data facility, cloud service, etc., capable of storing and transmitting software to other computing devices (e.g., third parties, the example connected edge devices 3162 of FIG. 31). Example connected edge devices may be customers, clients, managing devices (e.g., servers), third parties (e.g., customers of an entity owning and/or operating the software distribution platform 2905). Example connected edge devices may operate in commercial and/or home automation environments. In some examples, a third party is a developer, a seller, and/or a licensor of software such as the example computer readable instructions 3160 of FIG. 31. The third parties may be consumers, users, retailers, OEMs, etc. that purchase and/or license the software for use and/or re-sale and/or sub-licensing. In some examples, distributed software causes display of one or more user interfaces (UIs) and/or graphical user interfaces (GUIs) to identify the one or more devices (e.g., connected edge devices) geographically and/or logically separated from each other (e.g., physically separated IoT devices chartered with the responsibility of water distribution control (e.g., pumps), electricity distribution control (e.g., relays), etc.).

In FIG. 29, the software distribution platform 2905 includes one or more servers and one or more storage devices. The storage devices store the computer readable instructions 2960, which may correspond to the example computer readable instructions 3160 of FIG. 31, as described above. The one or more servers of the example software distribution platform 2905 are in communication with a network 2910, which may correspond to any one or more of the Internet and/or any of the example networks as described herein. In some examples, the one or more servers are responsive to requests to transmit the software to a requesting party as part of a commercial transaction. Payment for the delivery, sale and/or license of the software may be handled by the one or more servers of the software distribution platform and/or via a third-party payment entity.

The servers enable purchasers and/or licensors to download the computer readable instructions 2960 from the software distribution platform 2905. For example, the software 2960, which may correspond to the example computer readable instructions 3160 of FIG. 31, may be downloaded to the example processor platform(s) 2900, which is/are to execute the computer readable instructions 2960 to implement Radio apps.

In some examples, one or more servers of the software distribution platform 2905 are communicatively connected to one or more security domains and/or security devices through which requests and transmissions of the example computer readable instructions 2960 must pass. In some examples, one or more servers of the software distribution platform 2905 periodically offer, transmit, and/or force updates to the software (e.g., the example computer readable instructions 3160 of FIG. 31) to ensure improvements, patches, updates, etc. are distributed and applied to the software at the end user devices.

In FIG. 29, the computer readable instructions 2960 are stored on storage devices of the software distribution platform 2905 in a particular format. A format of computer readable instructions includes, but is not limited to a particular code language (e.g., Java, JavaScript, Python, C, C#, SQL, HTML, etc.), and/or a particular code state (e.g., uncompiled code (e.g., ASCII), interpreted code, linked code, executable code (e.g., a binary), etc.). In some examples, the computer readable instructions D182 stored in the software distribution platform 2905 are in a first format when transmitted to the example processor platform(s) 2900. In some examples, the first format is an executable binary in which particular types of the processor platform(s) 2900 can execute. However, in some examples, the first format is uncompiled code that requires one or more preparation tasks to transform the first format to a second format to enable execution on the example processor platform(s) 2900. For instance, the receiving processor platform(s) 2900 may need to compile the computer readable instructions 2960 in the first format to generate executable code in a second format that is capable of being executed on the processor platform(s) 2900. In still other examples, the first format is interpreted code that, upon reaching the processor platform(s) 2900, is interpreted by an interpreter to facilitate execution of instructions.

Figure 30:
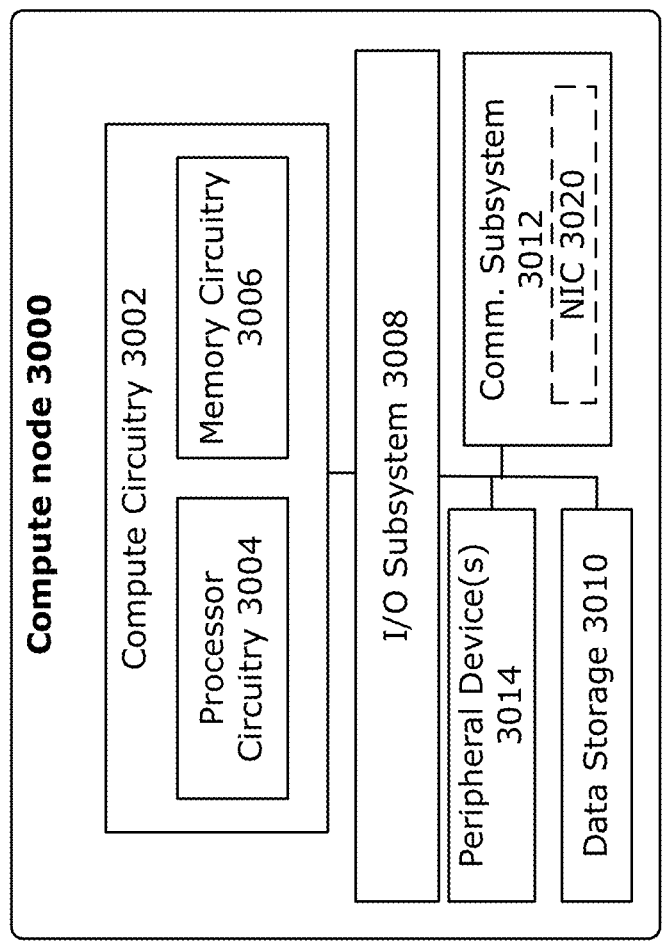
FIGS. 30 and 31 depict example components of various compute nodes in edge computing system(s).

FIGS. 30 and 31 depict further examples of edge computing systems and environments that may fulfill any of the compute nodes or devices discussed herein. Respective edge compute nodes may be embodied as a type of device, appliance, computer, or other "thing" capable of communicating with other edge, networking, or endpoint components. For example, an edge compute device may be embodied as a smartphone, a mobile compute device, a smart appliance, an in-vehicle compute system (e.g., a navigation system), or other device or system capable of performing the described functions.

In FIG. 30, an edge compute node 3000 includes a compute engine (also referred to herein as "compute circuitry") 3002, an input/output (I/O) subsystem 3008, data storage 3010, a communication circuitry subsystem 3012, and, optionally, one or more peripheral devices 3014. In other examples, respective compute devices may include other or additional components, such as those typically found in a computer (e.g., a display, peripheral devices, etc.). Additionally, in some examples, one or more of the illustrative components may be incorporated in, or otherwise form a portion of, another component.

The compute node 3000 may be embodied as any type of engine, device, or collection of devices capable of performing various compute functions. The compute node 3000 may correspond to the MX client 101, access network 110 (or a compute node therein), NAN 111 (or a compute node therein), MX server 140, core network 150A (or a compute node therein), and/or FA-GW/Core 150B (or a compute node therein) of FIG. 1; client 201, access networks 231 (or a compute node therein), MAMS system 235 (or a compute node therein), and/or core networks 241 (or a compute node therein) of FIG. 2; GMA Tx entity 510 and/or GMA Rx 511 of FIG. 5; GW 1420A-1420B and/or NAT/Firewall gateway 1450 of FIG. 14; UEs 2011, 2021a, NANs 2031-2033, edge compute nodes 2036, CN 2042 (or compute node(s) therein), and/or cloud 2044 (or compute node(s) therein) of FIG. 20; central office 2120, NAN 2140, local processing hub 2150, and/or data sources 2160 of FIG. 21; any of the devices shown and described with respect to FIGS. 22-28; processor platform(s) 2900 and/or distribution platform 2905 of FIG. 29; and/or any other devices/systems discussed herein.

In some examples, the compute node 3000 may be embodied as a single device such as an integrated circuit, an embedded system, an FPGA, a System-on-Chip (SoC), or other integrated system or device. The compute node 3000 includes or is embodied as a processor 3004 and a memory 3006. The processor 3004 may be embodied as any type of processor capable of performing the functions described herein (e.g., executing an application). For example, the processor 3004 may be embodied as a multi-core processor(s), a microcontroller, or other processor or processing/controlling circuit.

In some examples, the processor 3004 may be embodied as, include, or be coupled to an FPGA, an application specific integrated circuit (ASIC), reconfigurable hardware or hardware circuitry, or other specialized hardware to facilitate performance of the functions described herein. Also in some examples, the processor 3004 may be embodied as a specialized x-processing unit (xPU) also known as a data processing unit (DPU), infrastructure processing unit (IPU), or network processing unit (NPU). Such an xPU may be embodied as a standalone circuit or circuit package, integrated within an SOC, or integrated with networking circuitry (e.g., in a SmartNIC, or enhanced SmartNIC), acceleration circuitry, storage devices, storage disks, or AI hardware (e.g., GPUs or programmed FPGAs). Such an xPU may be designed to receive programming to process one or more data streams and perform specific tasks and actions for the data streams (such as hosting microservices, performing service management or orchestration, organizing or managing server or data center hardware, managing service meshes, or collecting and distributing telemetry), outside of the CPU or general purpose processing hardware. However, it will be understood that a xPU, a SOC, a CPU, and other variations of the processor 3004 may work in coordination with each other to execute many types of operations and instructions within and on behalf of the compute node 3000.

The memory 3006 may be embodied as any type of volatile (e.g., dynamic random access memory (DRAM), etc.) or non-volatile memory or data storage capable of performing the functions described herein. Volatile memory may be a storage medium that requires power to maintain the state of data stored by the medium. Non-limiting examples of volatile memory may include various types of random access memory (RAM), such as DRAM or static random access memory (SRAM). One particular type of DRAM that may be used in a memory module is synchronous dynamic random access memory (SDRAM).

In one example, the memory device is a block addressable memory device, such as those based on NAND or NOR technologies. A memory device may also include a three dimensional crosspoint memory device (e.g., Intel® 3D XPoint™ memory), or other byte addressable write-in-place nonvolatile memory devices. The memory device may refer to the die itself and/or to a packaged memory product. In some examples, 3D crosspoint memory (e.g., Intel® 3D XPoint™ memory) may comprise a transistor-less stackable cross point architecture in which memory cells sit at the intersection of word lines and bit lines and are individually addressable and in which bit storage is based on a change in bulk resistance. In some examples, all or a portion of the main memory 3006 may be integrated into the processor 3004. The main memory 3006 may store various software and data used during operation such as one or more applications, data operated on by the application(s), libraries, and drivers.

The compute circuitry 3002 is communicatively coupled to other components of the compute node 3000 via the I/O subsystem 3008, which may be embodied as circuitry and/or components to facilitate input/output operations with the compute circuitry 3002 (e.g., with the processor 3004 and/or the main memory 3006) and other components of the compute circuitry 3002. For example, the I/O subsystem 3008 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some examples, the I/O subsystem 3008 may form a portion of an SoC and be incorporated, along with one or more of the processor 3004, the main memory 3006, and other components of the compute circuitry 3002, into the compute circuitry 3002.

The one or more illustrative data storage devices/disks 3010 may be embodied as one or more of any type(s) of physical device(s) configured for short-term or long-term storage of data such as, for example, memory devices, memory, circuitry, memory cards, flash memory, hard disk drives, solid-state drives (SSDs), and/or other data storage devices/disks. Individual data storage devices/disks 3010 may include a system partition that stores data and firmware code for the data storage device/disk 3010. Individual data storage devices/disks 3010 may also include one or more operating system partitions that store data files and executables for operating systems depending on, for example, the type of compute node 3000.

The communication circuitry 3012 may be embodied as any communication circuit, device, or collection thereof, capable of enabling communications over a network between the compute circuitry 3002 and another compute device (e.g., an edge gateway node or the like). The communication circuitry 3012 may be configured to use any one or more communication technology (e.g., wired or wireless communications) and associated protocols (e.g., a cellular networking protocol such a 3GPP 4G or 5G standard, a wireless local area network protocol such as IEEE 802.11/ WiFi®, a wireless wide area network protocol, Ethernet, Bluetooth®, Bluetooth Low Energy, a IoT protocol such as IEEE 802.15.4 or ZigBee®, low-power wide-area network (LPWAN) or low-power wide-area (LPWA) protocols, etc.) to effect such communication.

The communication circuitry 3012 includes a network interface controller (NIC) 3020, which may also be referred to as a host fabric interface (HFI). The NIC 3020 may be embodied as one or more add-in-boards, daughter cards, network interface cards, controller chips, chipsets, or other devices that may be used by the compute node 3000 to connect with another compute device. In some examples, the NIC 3020 may be embodied as part of a system-on-a-chip (SoC) that includes one or more processors, or included on a multichip package that also contains one or more processors. In some examples, the NIC 3020 may include a local processor (not shown) and/or a local memory (not shown) that are both local to the NIC 3020. In such examples, the local processor of the NIC 3020 may be capable of performing one or more of the functions of the compute circuitry 3002 described herein. Additionally, or alternatively, in such examples, the local memory of the NIC 3020 may be integrated into one or more components of the client compute node at the board level, socket level, chip level, and/or other levels.

Additionally, in some examples, a respective compute node 3000 may include one or more peripheral devices 3014. Such peripheral devices 3014 may include any type of peripheral device found in a compute device or server such as audio input devices, a display, other input/output devices, interface devices, and/or other peripheral devices, depending on the particular type of the compute node 3000. In further examples, the compute node 3000 may be embodied by a respective edge compute node in an edge computing system (e.g., client compute node, edge gateway node, edge aggregation node, V-ITS-Ss discussed previous, etc.) or like forms of appliances, computers, subsystems, circuitry, or other components.

FIG. 31 illustrates an example of components that may be present in an edge computing node 3150 for implementing the techniques (e.g., operations, processes, methods, and methodologies) described herein. The edge computing node 3150 may correspond to the MX client 101, access network 110 (or a compute node therein), NAN 111 (or a compute node therein), MX server 140, core network 150A (or a compute node therein), and/or FA-GW/Core 150B (or a compute node therein) of FIG. 1; client 201, access networks 231 (or a compute node therein), MAMS system 235 (or a compute node therein), and/or core networks 241 (or a compute node therein) of FIG. 2; GMA Tx entity 510 and/or GMA Rx 511 of FIG. 5; GW 1420A-1420B and/or NAT/ Firewall gateway 1450 of FIG. 14; UEs 2011, 2021a, NANs 2031-2033, edge compute nodes 2036, CN 2042 (or compute node(s) therein), and/or cloud 2044 (or compute node(s) therein) of FIG. 20; central office 2120, NAN 2140, local processing hub 2150, and/or data sources 2160 of FIG. 21; any of the devices shown and described with respect to FIGS. 22-28; processor platform(s) 2900 and/or distribution platform 2905 of FIG. 29; compute node 3000 of FIG. 30; and/or any other devices/systems discussed herein. This edge computing node 3150 provides a closer view of the respective components of node 3000 when implemented as or as part of a computing device (e.g., as a mobile device, a base station, server, gateway, etc.). The edge computing node 3150 may include any combinations of the hardware or logical components referenced herein, and it may include or couple with any device usable with an edge communication network or a combination of such networks. The components may be implemented as ICs, portions thereof, discrete electronic devices, or other modules, instruction sets, programmable logic or algorithms, hardware, hardware accelerators, software, firmware, or a combination thereof adapted in the edge computing node 3150, or as components otherwise incorporated within a chassis of a larger system.

The edge computing node 3150 includes processing circuitry in the form of one or more processors 3152. The processor circuitry 3152 includes circuitry such as, but not limited to one or more processor cores and one or more of cache memory, low drop-out voltage regulators (LDOs), interrupt controllers, serial interfaces such as SPI, I2C or universal programmable serial interface circuit, real time clock (RTC), timer-counters including interval and watchdog timers, general purpose I/O, memory card controllers such as secure digital/multi-media card (SD/MMC) or similar, interfaces, mobile industry processor interface (MIPI) interfaces and Joint Test Access Group (JTAG) test access ports. In some implementations, the processor circuitry 3152 may include one or more hardware accelerators (e.g., same or similar to acceleration circuitry 3164), which may be microprocessors, programmable processing devices (e.g., FPGA, ASIC, etc.), or the like. The one or more accelerators may include, for example, computer vision and/or deep learning accelerators. In some implementations, the processor circuitry 3152 may include on-chip memory circuitry, which may include any suitable volatile and/or non-volatile memory, such as DRAM, SRAM, EPROM, EEPROM, Flash memory, solid-state memory, and/or any other type of memory device technology, such as those discussed herein The processor circuitry 3152 may be, for example, one or more processor cores (CPUs), application processors, GPUs, RISC processors, Acorn RISC Machine (ARM) processors, CISC processors, one or more DSPs, one or more FPGAs, one or more PLDs, one or more ASICs, one or more baseband processors, one or more radio-frequency integrated circuits (RFIC), one or more microprocessors or controllers, a multi-core processor, a multithreaded processor, an ultra-low voltage processor, an embedded processor, an xPU/DPU/IPU/NPU, special purpose processing unit, specialized processing unit, or any other known processing elements, or any suitable combination thereof. The processors (or cores) 3152 may be coupled with or may include memory/storage and may be configured to execute instructions stored in the memory/storage to enable various applications or operating systems to run on the platform 3150. The processors (or cores) 3152 is configured to operate application software to provide a specific service to a user of the platform 3150. Additionally or alternatively, the processor(s) 3152 may be a special-purpose processor(s)/controller(s) configured (or configurable) to operate according to the elements, features, and implementations discussed herein.

As examples, the processor(s) 3152 may include an Intel® Architecture Core™ based processor such as an i3, an i5, an i7, an i9 based processor; an Intel® microcontroller-based processor such as a Quark™, an Atom™, or other MCU-based processor; Pentium® processor(s), Xeon® processor(s), or another such processor available from Intel® Corporation, Santa Clara, California. However, any number other processors may be used, such as one or more of Advanced Micro Devices (AMD) Zen® Architecture such as Ryzen® or EPYC® processor(s), Accelerated Processing Units (APUs), MxGPUs, Epyc® processor(s), or the like; A5-A12 and/or S1-S4 processor(s) from Apple® Inc., Snapdragon™ or Centriq™ processor(s) from Qualcomm® Technologies, Inc., Texas Instruments, Inc.® Open Multimedia Applications Platform (OMAP)™ processor(s); a MIPS-based design from MIPS Technologies, Inc. such as MIPS Warrior M-class, Warrior I-class, and Warrior P-class processors; an ARM-based design licensed from ARM Holdings, Ltd., such as the ARM Cortex-A, Cortex-R, and Cortex-M family of processors; the ThunderX2® provided by Cavium™, Inc.; or the like. In some implementations, the processor(s) 3152 may be a part of a system on a chip (SoC), System-in-Package (SiP), a multi-chip package (MCP), and/or the like, in which the processor(s) 3152 and other components are formed into a single integrated circuit, or a single package, such as the Edison™ or Galileo™ SoC boards from Intel® Corporation. Other examples of the processor(s) 3152 are mentioned elsewhere in the present disclosure.

The processor(s) 3152 may communicate with system memory 3154 over an interconnect (IX) 3156. Any number of memory devices may be used to provide for a given amount of system memory. As examples, the memory may be random access memory (RAM) in accordance with a Joint Electron Devices Engineering Council (JEDEC) design such as the DDR or mobile DDR standards (e.g., LPDDR, LPDDR2, LPDDR3, or LPDDR4). In particular examples, a memory component may comply with a DRAM standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4. Other types of RAM, such as dynamic RAM (DRAM), synchronous DRAM (SDRAM), and/or the like may also be included. Such standards (and similar standards) may be referred to as DDR-based standards and communication interfaces of the storage devices that implement such standards may be referred to as DDR-based interfaces. In various implementations, the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems and so forth, a storage 3158 may also couple to the processor 3152 via the IX 3156. In an example, the storage 3158 may be implemented via a solid-state disk drive (SSDD) and/or high-speed electrically erasable memory (commonly referred to as "flash memory"). Other devices that may be used for the storage 3158 include flash memory cards, such as SD cards, microSD cards, eXtreme Digital (XD) picture cards, and the like, and USB flash drives. In an example, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, phase change RAM (PRAM), resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a Domain Wall (DW) and Spin Orbit Transfer (SOT) based device, a thyristor based memory device, or a combination of any of the above, or other memory. The memory circuitry 3154 and/or storage circuitry 3158 may also incorporate three-dimensional (3D) cross-point (XPOINT) memories from Intel® and Micron®.

In low power implementations, the storage 3158 may be on-die memory or registers associated with the processor 3152. However, in some examples, the storage 3158 may be implemented using a micro hard disk drive (HDD). Further, any number of new technologies may be used for the storage 3158 in addition to, or instead of, the technologies described, such resistance change memories, phase change memories, holographic memories, or chemical memories, among others.

The components of edge computing device 3150 may communicate over an interconnect (IX) 3156. The IX 3156 may include any number of technologies, including ISA, extended ISA, I2C, SPI, point-to-point interfaces, power management bus (PMBus), PCI, PCIe, PCIx, Intel® UPI, Intel® Accelerator Link, Intel® CXL, CAPI, OpenCAPI, Intel® QPI, UPI, Intel® OPA IX, RapidIO™ system IXs, CCIX, Gen-Z Consortium IXs, a HyperTransport interconnect, NVLink provided by NVIDIA®, a Time-Trigger Protocol (TTP) system, a FlexRay system, PROFIBUS, and/or any number of other IX technologies. The IX 3156 may be a proprietary bus, for example, used in a SoC based system.

The IX 3156 couples the processor 3152 to communication circuitry 3166 for communications with other devices, such as a remote server (not shown) and/or the connected edge devices 3162. The communication circuitry 3166 is a hardware element, or collection of hardware elements, used to communicate over one or more networks (e.g., cloud 3163) and/or with other devices (e.g., edge devices 3162). The collection of hardware elements include hardware devices such as baseband circuitry 316x, switches, filters, amplifiers, antenna elements, and the like to facilitate OTA communications)

The transceiver 3166 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the connected edge devices 3162. For example, a wireless local area network (WLAN) unit may be used to implement Wi-Fi® communications in accordance with the Institute of Electrical and Electronics Engineers (IEEE) 802.11 standard. In addition, wireless wide area communications, e.g., according to a cellular or other wireless wide area protocol, may occur via a wireless wide area network (WWAN) unit.

The communication circuitry 3166 (or multiple transceivers 3166) may communicate using multiple standards or radios for communications at a different range. For example, the communication circuitry 3166 may include short-range RAT circuitry 316y to communicate with relatively close devices (e.g., within about 10 meters) based on BLE, or another low power radio, to save power. More distant connected edge devices 3162 (e.g., within about 50 meters) may be reached over ZigBee® circuitry 316y and/or other intermediate power radios 316y. Both communications techniques may take place over a single radio 316y at different power levels or may take place over separate transceivers 316y, for example, a local transceiver 316y using BLE and a separate mesh transceiver 316y using ZigBee®.

A wireless network transceiver 316z may be included to communicate with devices or services in the edge cloud 3163 via local or wide area network protocols. The wireless network transceiver 316z may be an LPWA transceiver that follows the IEEE 802.15.4, or IEEE 802.15.4g standards, among others. The edge computing node 3150 may communicate over a wide area using LoRaWAN™ (Long Range Wide Area Network) developed by Semtech and the LoRa Alliance. The techniques described herein are not limited to these technologies but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the wireless network transceiver 316z, as described herein. For example, the transceiver 316z may include a cellular transceiver that uses spread spectrum (SPA/SAS) communications for implementing high-speed communications. Further, any number of other protocols may be used, such as Wi-Fi® networks for medium speed communications and provision of network communications. The transceiver 316z may include radios that are compatible with any number of 3GPP specifications, such as LTE and 5G/NR communication systems, discussed in further detail at the end of the present disclosure.

A network interface controller (NIC) 3168 may be included to provide a wired communication to nodes of the edge cloud 3163 or to other devices, such as the connected edge devices 3162 (e.g., operating in a mesh). The wired communication may provide an Ethernet connection or may be based on other types of networks, such as Controller Area Network (CAN), Local Interconnect Network (LIN), DeviceNet, ControlNet, Data Highway+, or PROFINET, among many others. An additional NIC 3168 may be included to enable connecting to a second network, for example, a first NIC 3168 providing communications to the cloud over Ethernet, and a second NIC 3168 providing communications to other devices over another type of network.

Given the variety of types of applicable communications from the device to another component or network, applicable communications circuitry used by the device may include or be embodied by any one or more of components 3164, 3166, 3168, or 3170. Accordingly, in various examples, applicable means for communicating (e.g., receiving, transmitting, etc.) may be embodied by such communications circuitry.

The edge computing node 3150 may include or be coupled to acceleration circuitry 3164, which may be embodied by one or more AI accelerators, a neural compute stick, neuromorphic hardware, an FPGA, an arrangement of GPUs, one or more SoCs (including programmable SoCs), one or more CPUs, one or more digital signal processors, dedicated ASICs (including programmable ASICs), PLDs such as CPLDs or HCPLDs, and/or other forms of specialized processors or circuitry designed to accomplish one or more specialized tasks. These tasks may include AI processing (including machine learning, training, inferencing, and classification operations), visual data processing, network data processing, object detection, rule analysis, or the like. In FPGA-based implementations, the acceleration circuitry 3164 may comprise logic blocks or logic fabric and other interconnected resources that may be programmed (configured) to perform various functions, such as the procedures, methods, functions, etc. discussed herein. In such implementations, the acceleration circuitry 3164 may also include memory cells (e.g., EPROM, EEPROM, flash memory, static memory (e.g., SRAM, anti-fuses, etc.) used to store logic blocks, logic fabric, data, etc. in LUTs and the like.

The IX 3156 also couples the processor 3152 to a sensor hub or external interface 3170 that is used to connect additional devices or subsystems. The additional/external devices may include sensors 3172, actuators 3174, and positioning circuitry 3175.

The sensor circuitry 3172 includes devices, modules, or subsystems whose purpose is to detect events or changes in its environment and send the information (sensor data) about the detected events to some other a device, module, subsystem, etc. Examples of such sensors 3172 include, inter alia, inertia measurement units (IMU) comprising accelerometers, gyroscopes, and/or magnetometers; microelectromechanical systems (MEMS) or nanoelectromechanical systems (NEMS) comprising 3-axis accelerometers, 3-axis gyroscopes, and/or magnetometers; level sensors; flow sensors; temperature sensors (e.g., thermistors); pressure sensors; barometric pressure sensors; gravimeters; altimeters; image capture devices (e.g., cameras); light detection and ranging (LiDAR) sensors; proximity sensors (e.g., infrared radiation detector and the like); depth sensors, ambient light sensors; optical light sensors; ultrasonic transceivers; microphones; and the like.

The actuators 3174, allow platform 3150 to change its state, position, and/or orientation, or move or control a mechanism or system. The actuators 3174 comprise electrical and/or mechanical devices for moving or controlling a mechanism or system, and converts energy (e.g., electric current or moving air and/or liquid) into some kind of motion. The actuators 3174 may include one or more electronic (or electrochemical) devices, such as piezoelectric biomorphs, solid state actuators, solid state relays (SSRs), shape-memory alloy-based actuators, electroactive polymer-based actuators, relay driver integrated circuits (ICs), and/or the like. The actuators 3174 may include one or more electromechanical devices such as pneumatic actuators, hydraulic actuators, electromechanical switches including electromechanical relays (EMRs), motors (e.g., DC motors, stepper motors, servomechanisms, etc.), power switches, valve actuators, wheels, thrusters, propellers, claws, clamps, hooks, audible sound generators, visual warning devices, and/or other like electromechanical components. The platform 3150 may be configured to operate one or more actuators 3174 based on one or more captured events and/or instructions or control signals received from a service provider and/or various client systems The positioning circuitry 3175 includes circuitry to receive and decode signals transmitted/broadcasted by a positioning network of a global navigation satellite system (GNSS).

Examples of navigation satellite constellations (or GNSS) include United States' Global Positioning System (GPS), Russia's Global Navigation System (GLONASS), the European Union's Galileo system, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS), etc.), or the like. The positioning circuitry 3175 comprises various hardware elements (e.g., including hardware devices such as switches, filters, amplifiers, antenna elements, and the like to facilitate OTA communications) to communicate with components of a positioning network, such as navigation satellite constellation nodes. Additionally or alternatively, the positioning circuitry 3175 may include a Micro-Technology for Positioning, Navigation, and Timing (Micro-PNT) IC that uses a master timing clock to perform position tracking/estimation without GNSS assistance. The positioning circuitry 3175 may also be part of, or interact with, the communication circuitry 3166 to communicate with the nodes and components of the positioning network. The positioning circuitry 3175 may also provide position data and/or time data to the application circuitry, which may use the data to synchronize operations with various infrastructure (e.g., radio base stations), for turn-by-turn navigation, or the like. When a GNSS signal is not available or when GNSS position accuracy is not sufficient for a particular application or service, a positioning augmentation technology can be used to provide augmented positioning information and data to the application or service. Such a positioning augmentation technology may include, for example, satellite based positioning augmentation (e.g., EGNOS) and/or ground based positioning augmentation (e.g., DGPS). In some implementations, the positioning circuitry 3175 is, or includes an INS, which is a system or device that uses sensor circuitry 3172 (e.g., motion sensors such as accelerometers, rotation sensors such as gyroscopes, and altimimeters, magnetic sensors, and/or the like to continuously calculate (e.g., using dead by dead reckoning, triangulation, or the like) a position, orientation, and/or velocity (including direction and speed of movement) of the platform 3150 without the need for external references.

In some optional examples, various input/output (I/O) devices may be present within or connected to, the edge computing node 3150, which are referred to as input circuitry 3186 and output circuitry 3184 in FIG. 31. The input circuitry 3186 and output circuitry 3184 include one or more user interfaces designed to enable user interaction with the platform 3150 and/or peripheral component interfaces designed to enable peripheral component interaction with the platform 3150. Input circuitry 3186 may include any physical or virtual means for accepting an input including, inter alia, one or more physical or virtual buttons (e.g., a reset button), a physical keyboard, keypad, mouse, touchpad, touchscreen, microphones, scanner, headset, and/or the like. The output circuitry 3184 may be included to show information or otherwise convey information, such as sensor readings, actuator position(s), or other like information. Data and/or graphics may be displayed on one or more user interface components of the output circuitry 3184. Output circuitry 3184 may include any number and/or combinations of audio or visual display, including, inter alia, one or more simple visual outputs/indicators (e.g., binary status indicators (e.g., light emitting diodes (LEDs)) and multi-character visual outputs, or more complex outputs such as display devices or touchscreens (e.g., Liquid Chrystal Displays (LCD), LED displays, quantum dot displays, projectors, etc.), with the output of characters, graphics, multimedia objects, and the like being generated or produced from the operation of the platform 3150. The output circuitry 3184 may also include speakers or other audio emitting devices, printer(s), and/or the like. Additionally or alternatively, the sensor circuitry 3172 may be used as the input circuitry 3184 (e.g., an image capture device, motion capture device, or the like) and one or more actuators 3174 may be used as the output device circuitry 3184 (e.g., an actuator to provide haptic feedback or the like). In another example, near-field communication (NFC) circuitry comprising an NFC controller coupled with an antenna element and a processing device may be included to read electronic tags and/or connect with another NFC-enabled device. Peripheral component interfaces may include, but are not limited to, a non-volatile memory port, a USB port, an audio jack, a power supply interface, etc. A display or console hardware, in the context of the present system, may be used to provide output and receive input of an edge computing system; to manage components or services of an edge computing system; identify a state of an edge computing component or service; or to conduct any other number of management or administration functions or service use cases.

A battery 3176 may power the edge computing node 3150, although, in examples in which the edge computing node 3150 is mounted in a fixed location, it may have a power supply coupled to an electrical grid, or the battery may be used as a backup or for temporary capabilities. The battery 3176 may be a lithium ion battery, or a metal-air battery, such as a zinc-air battery, an aluminum-air battery, a lithium-air battery, and the like.

A battery monitor/charger 3178 may be included in the edge computing node 3150 to track the state of charge (SoCh) of the battery 3176, if included. The battery monitor/charger 3178 may be used to monitor other parameters of the battery 3176 to provide failure predictions, such as the state of health (SoH) and the state of function (SoF) of the battery 3176. The battery monitor/charger 3178 may include a battery monitoring integrated circuit, such as an LTC4020 or an LTC2990 from Linear Technologies, an ADT7488A from ON Semiconductor of Phoenix Arizona, or an IC from the UCD90xxx family from Texas Instruments of Dallas, TX. The battery monitor/charger 3178 may communicate the information on the battery 3176 to the processor 3152 over the IX 3156. The battery monitor/charger 3178 may also include an analog-to-digital (ADC) converter that enables the processor 3152 to directly monitor the voltage of the battery 3176 or the current flow from the battery 3176. The battery parameters may be used to determine actions that the edge computing node 3150 may perform, such as transmission frequency, mesh network operation, sensing frequency, and the like.

A power block 3180, or other power supply coupled to a grid, may be coupled with the battery monitor/charger 3178 to charge the battery 3176. In some examples, the power block 3180 may be replaced with a wireless power receiver to obtain the power wirelessly, for example, through a loop antenna in the edge computing node 3150. A wireless battery charging circuit, such as an LTC4020 chip from Linear Technologies of Milpitas, California, among others, may be included in the battery monitor/charger 3178. The specific charging circuits may be selected based on the size of the battery 3176, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 3158 may include instructions 3182 in the form of software, firmware, or hardware commands to implement the techniques described herein. Although such instructions 3182 are shown as code blocks included in the memory 3154 and the storage 3158, it may be understood that any of the code blocks may be replaced with hardwired circuits, for example, built into an application specific integrated circuit (ASIC).

In an example, the instructions 3182 provided via the memory 3154, the storage 3158, or the processor 3152 may be embodied as a non-transitory, machine-readable medium 3160 including code to direct the processor 3152 to perform electronic operations in the edge computing node 3150. The processor 3152 may access the non-transitory, machine-readable medium 3160 over the IX 3156. For instance, the non-transitory, machine-readable medium 3160 may be embodied by devices described for the storage 3158 or may include specific storage units such as storage devices and/or storage disks that include optical disks (e.g., digital versatile disk (DVD), compact disk (CD), CD-ROM, Blu-ray disk), flash drives, floppy disks, hard drives (e.g., SSDs), or any number of other hardware devices in which information is stored for any duration (e.g., for extended time periods, permanently, for brief instances, for temporarily buffering, and/or caching).

The non-transitory, machine-readable medium 3160 may include instructions to direct the processor 3152 to perform a specific sequence or flow of actions, for example, as described with respect to the flowchart(s) and block diagram(s) of operations and functionality depicted above. the terms "machine-readable medium" and "computer-readable medium" are interchangeable. the term "non-transitory computer-readable medium" is expressly defined to include any type of computer readable storage device and/or storage disk and to exclude propagating signals and to exclude transmission media.

In further examples, a machine-readable medium also includes any tangible medium that is capable of storing, encoding or carrying instructions for execution by a machine and that cause the machine to perform any one or more of the methodologies of the present disclosure or that is capable of storing, encoding or carrying data structures utilized by or associated with such instructions. A "machine-readable medium" thus may include but is not limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks. The instructions embodied by a machine-readable medium may further be transmitted or received over a communications network using a transmission medium via a network interface device utilizing any one of a number of transfer protocols (e.g., HTTP).

A machine-readable medium may be provided by a storage device or other apparatus which is capable of hosting data in a non-transitory format. In an example, information stored or otherwise provided on a machine-readable medium may be representative of instructions, such as instructions themselves or a format from which the instructions may be derived. This format from which the instructions may be derived may include source code, encoded instructions (e.g., in compressed or encrypted form), packaged instructions (e.g., split into multiple packages), or the like. The information representative of the instructions in the machine-readable medium may be processed by processing circuitry into the instructions to implement any of the operations discussed herein. For example, deriving the instructions from the information (e.g., processing by the processing circuitry) may include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions.

In an example, the derivation of the instructions may include assembly, compilation, or interpretation of the information (e.g., by the processing circuitry) to create the instructions from some intermediate or preprocessed format provided by the machine-readable medium. The information, when provided in multiple parts, may be combined, unpacked, and modified to create the instructions. For example, the information may be in multiple compressed source code packages (or object code, or binary executable code, etc.) on one or several remote servers. The source code packages may be encrypted when in transit over a network and decrypted, uncompressed, assembled (e.g., linked) if necessary, and compiled or interpreted (e.g., into a library, stand-alone executable, etc.) at a local machine, and executed by the local machine.

The illustrations of FIGS. 30 and 31 are intended to depict a high-level view of components of a varying device, subsystem, or arrangement of an edge computing node. However, it will be understood that some of the components shown may be omitted, additional components may be present, and a different arrangement of the components shown may occur in other implementations. Further, these arrangements are usable in a variety of use cases and environments, including those discussed below (e.g., a mobile UE in industrial compute for smart city or smart factory, among many other examples).

The respective compute platforms of FIGS. 30 and 31 may support multiple edge instances (e.g., edge clusters) by use of tenant containers running on a single compute platform. Likewise, multiple edge nodes may exist as subnodes running on tenants within the same compute platform. Accordingly, based on available resource partitioning, a single system or compute platform may be partitioned or divided into supporting multiple tenants and edge node instances, each of which may support multiple services and functions-even while being potentially operated or controlled in multiple compute platform instances by multiple owners. These various types of partitions may support complex multi-tenancy and many combinations of multi-stakeholders through the use of an LSM or other implementation of an isolation/security policy. References to the use of an LSM and security features which enhance or implement such security features are thus noted in the following sections. Likewise, services and functions operating on these various types of multi-entity partitions may be load-balanced, migrated, and orchestrated to accomplish necessary service objectives and operations.

FIGS. 30 and 31 depict examples of edge computing systems and environments that may fulfill any of the compute nodes or devices discussed herein. Respective edge compute nodes may be embodied as a type of device, appliance, computer, or other "thing" capable of communicating with other edge, networking, or endpoint components. For example, an edge compute device may be embodied as a smartphone, a mobile compute device, a smart appliance, an in-vehicle compute system (e.g., a navigation system), or other device or system capable of performing the described functions.

4. Example Implementations

Additional examples of the presently described systems, devices, and methods include the following, non-limiting example implementations. Each of the following non-limiting examples may stand on its own or may be combined in any permutation or combination with any one or more of the other examples provided below or throughout the present disclosure.

Example 1 includes a method of operating a first multi-access compute node to manage traffic for multi-access communication in a multi-access communication environment, the method comprising: determining a Per Packet Prioritization (PPP) value for a data unit based on one or more configured PPP rules; generating the data unit including the determined PPP value; and transmitting the generated data unit to a second multi-access compute node.

Example 2 includes the method of example 1 and/or some other example(s) herein, wherein the one or more configured PPP rules are defined in a PPP configuration.

Example 3 includes the method of example 2 and/or some other example(s) herein, wherein the one or more PPP rules includes a PPP rule based on a data unit size, and determining the PPP value comprises: determining a size of the data unit; and determining, from the PPP configuration, the PPP value that corresponds to a data unit size range that includes the determined size of the data unit.

Example 4 includes the method of examples 2-3 and/or some other example(s) herein, wherein the one or more PPP rules includes a PPP rule based on a data unit size code, and determining the PPP value comprises: determining the PPP value using a coding scheme defined in the PPP configuration.

Example 5 includes the method of example 4 and/or some other example(s) herein, wherein the coding scheme is a modulo operation, and determining the PPP value further comprises: determining a size of the data unit; and determining the PPP value as a modulus of S modulo K, where S is the size of the data unit and K is a number of priority levels indicated by the PPP configuration.

Example 6 includes the method of examples 2-5 and/or some other example(s) herein, wherein the one or more PPP rules includes a PPP rule based on a Generic Payload Type (GPT), and determining the PPP value comprises: determining a set of GPT parameters; and determining, from the PPP configuration, the PPP value that corresponds to the determined set of GPT parameters.

Example 7 includes the method of example 6 and/or some other example(s) herein, wherein the set of GPT parameters includes a GPT offset, a GPT length, and a GPT value.

Example 8 includes the method of examples 2-7 and/or some other example(s) herein, wherein the one or more PPP rules includes a PPP rule based on a flow rate, and determining the PPP value comprises: determining a flow rate for the data unit; and determining, from a PPP configuration, the PPP value that corresponds to a flow rate range that includes the determined flow rate.

Example 9 includes the method of examples 2-8 and/or some other example(s) herein, wherein the PPP configuration further includes one or more flow classification parameters to be used to identify a flow for which the one or more PPP rules are applicable, and a number of priority levels.

Example 10 includes the method of examples 1-9 and/or some other example(s) herein, further comprising: sending a first control message to the second multi-access compute node, the first control message indicating support of a PPP capability by the first multi-access compute node; and receiving a second control message from the second multi-access compute node.

Example 11 includes the method of example 10 and/or some other example(s) herein, further comprising: generating the data unit to include the PPP value when the second control message indicates support of the PPP capability by the second multi-access compute node.

Example 12 includes the method of examples 1-11 and/or some other example(s) herein, further comprising: receiving one or more other data units including respective PPP values.

Example 13 includes the method of examples 1-12 and/or some other example(s) herein, transmitting the generated data unit comprises: enqueuing the data unit into a queue; and dequeuing the data unit for transmission to the second multi-access compute node.

Example 14 includes the method of examples 12-13 and/or some other example(s) herein, further comprising: detecting a traffic congestion condition; and performing PPP-based active queue management (AQM) in response to detecting the traffic congestion condition.

Example 15 includes the method of examples 6-14 and/or some other example(s) herein, wherein generating the data unit further comprises: generating the data unit to include a GPT field; and inserting the PPP value into the GPT field.

Example 16 includes the method of example 15 and/or some other example(s) herein, wherein generating the data unit further comprises: generating the GPT field within a payload section of the data unit according to a GPT offset and a GPT length, wherein: the GPT offset is a number of bits or bytes from an end of a header section of the data unit to a start of the GPT field, and the GPT length is a number of bits or bytes of the GPT field.

Example 17 includes the method of example 16 and/or some other example(s) herein, wherein generating the data unit further comprises: generating the GPT field within the data unit further according to a GPT quality of service (QoS) class mapping, wherein the GPT QoS class mapping indicates a number of QoS classes, and for each QoS class of the number of QoS classes, a QoS class value and a GPT value range.

Example 18 includes the method of example 17 and/or some other example(s) herein, wherein the PPP value is a QoS class value corresponding to a QoS class of the number of QoS classes.

Example 19 includes the method of examples 17-18, further comprising: identifying, from a GPT intra-flow classification configuration, the GPT offset, the GPT length, the GPT QoS class mapping, and intra-flow classification information, wherein the intra-flow classification information includes information used to identify subflows making up a flow.

Example 20 includes the method of example 19 and/or some other example(s) herein, further comprising: obtaining, over an intra-flow classification application programming interface (API), the GPT intra-flow classification configuration from an application in an application layer.

Example 21 includes the method of examples 14-20 and/or some other example(s) herein, wherein the GPT intra-flow classification configuration further comprises a per packet delay bound, wherein the per packet delay bound is set to a value corresponding to a QoS requirement of a traffic stream to which the data unit belongs.

Example 22 includes the method of example 21 and/or some other example(s) herein, wherein performing PPP-based AQM in response to detecting the traffic congestion condition comprises: dropping, when the traffic congestion condition is detected, the data unit when the PPP value indicates that the data unit has a lower priority than other data units in a queue; and transmitting the generated data unit to the second multi-access compute node when the data unit is not dropped.

Example 23 includes the method of example 22 and/or some other example(s) herein, wherein performing PPP-based AQM in response to detecting the traffic congestion condition comprises: dropping data units that violate the per packet delay bound.

Example 24 includes the method of examples 22-23 and/or some other example(s) herein, wherein dropping the data unit comprises: dropping the data unit when a current queue size of the queue is greater than a weighted queue size, wherein the weighted queue size is based on a weight applied to the PPP value and a predefined or configured queue size limit.

Example 25 includes the method of examples 22-23 and/or some other example(s) herein, wherein dropping the data unit comprises: dropping the data unit when a current queuing delay of the data unit is greater than a weighted queuing delay, wherein the weighted queuing delay is based on a weight applied to the PPP value and the per packet delay bound.

Example 26 includes the method of examples 22-23 and/or some other example(s) herein, wherein dropping the data unit comprises: dropping the data unit and a number of queued data units having a same PPP value as the data unit when the number of queued data units having the same PPP value as the data unit is greater than or equal to a drop parameter.

Example 27 includes the method of examples 10-26 and/or some other example(s) herein, wherein the multi-access communication environment is a Multi-Access Management Services (MAMS) communication environment, and the MAMS communication environment comprises a Multi-Access Management Services (MAMS) framework.

Example 28 includes the method of example 27 and/or some other example(s) herein, wherein the first multi-access (MX) compute node is a client device, the second MX compute node is a server, the first control message is an MX capability request message (mx_capability_req), and the second control message is an MX capability response message (mx_capability_rsp).

Example 29 includes the method of example 28 and/or some other example(s) herein, further comprising: receiving an MX PPP Configuration request message (mx_ppp_config_req) when the mx_capability_rsp indicates support of the PPP capability, the mx_ppp_config_req including the PPP configuration.

Example 30 includes the method of example 27 and/or some other example(s) herein, wherein the first MX compute node is a server, the second MX compute node is a client device, the first control message is an mx_capability_rsp, and the second control message is an mx_capability_req.

Example 31 includes the method of example 30 and/or some other example(s) herein, further comprising: receiving an MX PPP Configuration response message (mx_ppp_config_rsp) when the mx_capability_req indicates support of the PPP capability, the mx_ppp_config_rsp including the PPP configuration.

Example 32 includes the method of examples 27-31 and/or some other example(s) herein, wherein the method is performed by a convergence layer operated by the first multi-access compute node.

Example 33 includes the method of example 32 and/or some other example(s) herein, wherein the convergence layer is a multi-access (MX) convergence layer part of a MAMS protocol stack.

Example 34 includes the method of example 33 and/or some other example(s) herein, wherein the MX convergence layer implements an MX convergence method, wherein the MX convergence method includes one of Generic Multi-Access (GMA), MultiPath Transmission Control Protocol (MPTCP) Proxy, Generic Routing Encapsulation (GRE) Aggregation Proxy, or MultiPath QUIC (MPQUIC).

Example 35 includes the method of examples 33-34 and/or some other example(s) herein, wherein the intra-flow classification API is an interface between an application layer and the MX convergence layer.

Example 36 includes the method of examples 33-35 and/or some other example(s) herein, wherein the MX convergence layer implements a GMA entity when the MX convergence method is the GMA convergence method.

Example 37 includes the method of example 36 and/or some other example(s) herein, wherein the first MX compute node is a client device, the GMA entity is a GMA client (Gc) entity, and the second MX compute node is a server.

Example 38 includes the method of example 37 and/or some other example(s) herein, wherein the client device further comprises a Client Connection Manager (CCM) communicatively coupled with the Gc entity.

Example 39 includes the method of example 36 and/or some other example(s) herein, wherein the first MX compute node is a server, the GMA entity is a GMA server (Gs) entity, and the second MX compute node is a server.

Example 40 includes the method of example 39 and/or some other example(s) herein, wherein the server further comprises a Network Connection Manager (NCM) communicatively coupled with the Gc entity.

Example 41 includes the method of examples 28-40 and/or some other example(s) herein, wherein the client device is a desktop computer, a workstation, a smartphone, a tablet computer, a wearable device, an Internet of Things (IoT) device, or a smart appliance.

Example 42 includes the method of examples 28-40 and/or some other example(s) herein, wherein the server is a gateway device, a radio access network node, a network appliance, a network function within a core network, an application server, an edge server of an edge computing network, or a server of a cloud computing service.

Example 43 includes the method of examples 27-42 and/or some other example(s) herein, wherein the data unit is a data packet.

Example 44 includes the method of example 43 and/or some other example(s) herein, wherein the data packet is a Generic Multi-Access (GMA) Protocol Data Unit (PDU) including a GMA header or a GMA trailer.

Example 45 includes the method of examples 43-44 and/or some other example(s) herein, wherein the GPT field is included in a payload section of the data packet.

Example Z01 includes one or more computer readable media comprising instructions, wherein execution of the instructions by processor circuitry is to cause the processor circuitry to perform the method of examples 1-45 and/or some other example(s) herein.

Example Z02 includes a computer program comprising the instructions of example Z01 and/or some other example(s) herein.

Example Z03 includes an Application Programming Interface defining functions, methods, variables, data structures, and/or protocols for the computer program of example Z02 and/or some other example(s) herein.

Example Z04 includes an apparatus comprising circuitry loaded with the instructions of example Z01 and/or some other example(s) herein.

Example Z05 includes an apparatus comprising circuitry operable to run the instructions of example Z01 and/or some other example(s) herein.

Example Z06 includes an integrated circuit comprising one or more of the processor circuitry of example Z01 and the one or more computer readable media of example Z01 and/or some other example(s) herein.

Example Z07 includes a computing system comprising the one or more computer readable media and the processor circuitry of example Z01 and/or some other example(s) herein.

Example Z08 includes an apparatus comprising means for executing the instructions of example Z01 and/or some other example(s) herein.

Example Z09 includes a signal generated as a result of executing the instructions of example Z01 and/or some other example(s) herein.

Example Z10 includes a data unit generated as a result of executing the instructions of example Z01 and/or some other example(s) herein.

Example Z11 includes the data unit of example Z10 and/or some other example(s) herein, wherein the data unit is a datagram, network packet, data frame, data segment, a PDU, a service data unit (SDU), a message, or a database object.

Example Z12 includes a signal encoded with the data unit of examples Z10-Z11 and/or some other example(s) herein.

Example Z13 includes an electromagnetic signal carrying the instructions of example Z01 and/or some other example(s) herein.

Example Z14 includes an apparatus comprising means for performing the method of examples 1-45 and/or some other example(s) herein.

5. Terminology

As used herein, the singular forms "a," "an" and "the" are intended to include plural forms as well, unless the context clearly indicates otherwise. It will be further understood that the terms "comprises" and/or "comprising," when used in this specification, specific the presence of stated features, integers, steps, operations, elements, and/or components, but do not preclude the presence or addition of one or more other features, integers, steps, operation, elements, components, and/or groups thereof. The phrase "A and/or B" means (A), (B), or (A and B). For the purposes of the present disclosure, the phrase "A, B, and/or C" means (A), (B), (C), (A and B), (A and C), (B and C), or (A, B and C). The description may use the phrases "in an embodiment," or "In some embodiments," each of which may refer to one or more of the same or different embodiments. Furthermore, the terms "comprising," "including," "having," and the like, as used with respect to the present disclosure, are synonymous.

The terms "coupled," "communicatively coupled," along with derivatives thereof are used herein. The term "coupled" may mean two or more elements are in direct physical or electrical contact with one another, may mean that two or more elements indirectly contact each other but still cooperate or interact with each other, and/or may mean that one or more other elements are coupled or connected between the elements that are said to be coupled with each other. The term "directly coupled" may mean that two or more elements are in direct contact with one another. The term "communicatively coupled" may mean that two or more elements may be in contact with one another by a means of communication including through a wire or other interconnect connection, through a wireless communication channel or ink, and/or the like.

The term "circuitry" at least in some embodiments refers to a circuit or system of multiple circuits configured to perform a particular function in an electronic device. The circuit or system of circuits may be part of, or include one or more hardware components, such as a logic circuit, a processor (shared, dedicated, or group) and/or memory (shared, dedicated, or group), an ASIC, a FPGA, programmable logic controller (PLC), SoC, SiP, multi-chip package (MCP), DSP, etc., that are configured to provide the described functionality. In addition, the term "circuitry" may also refer to a combination of one or more hardware elements with the program code used to carry out the functionality of that program code. Some types of circuitry may execute one or more software or firmware programs to provide at least some of the described functionality. Such a combination of hardware elements and program code may be referred to as a particular type of circuitry.

It should be understood that the functional units or capabilities described in this specification may have been referred to or labeled as components or modules, in order to more particularly emphasize their implementation independence. Such components may be embodied by any number of software or hardware forms. For example, a component or module may be implemented as a hardware circuit comprising custom very-large-scale integration (VLSI) circuits or gate arrays, off-the-shelf semiconductors such as logic chips, transistors, or other discrete components. A component or module may also be implemented in programmable hardware devices such as field programmable gate arrays, programmable array logic, programmable logic devices, or the like. Components or modules may also be implemented in software for execution by various types of processors. An identified component or module of executable code may, for instance, comprise one or more physical or logical blocks of computer instructions, which may, for instance, be organized as an object, procedure, or function. Nevertheless, the executables of an identified component or module need not be physically located together but may comprise disparate instructions stored in different locations which, when joined logically together, comprise the component or module and achieve the stated purpose for the component or module.

Indeed, a component or module of executable code may be a single instruction, or many instructions, and may even be distributed over several different code segments, among different programs, and across several memory devices or processing systems. In particular, some aspects of the described process (such as code rewriting and code analysis) may take place on a different processing system (e.g., in a computer in a data center) than that in which the code is deployed (e.g., in a computer embedded in a sensor or robot). Similarly, operational data may be identified and illustrated herein within components or modules and may be embodied in any suitable form and organized within any suitable type of data structure. The operational data may be collected as a single data set or may be distributed over different locations including over different storage devices, and may exist, at least partially, merely as electronic signals on a system or network. The components or modules may be passive or active, including agents operable to perform desired functions.

The term "processor circuitry" at least in some embodiments refers to, is part of, or includes circuitry capable of sequentially and automatically carrying out a sequence of arithmetic or logical operations, or recording, storing, and/or transferring digital data. The term "processor circuitry" at least in some embodiments refers to one or more application processors, one or more baseband processors, a physical CPU, a single-core processor, a dual-core processor, a triple-core processor, a quad-core processor, and/or any other device capable of executing or otherwise operating computer-executable instructions, such as program code, software modules, and/or functional processes. The terms "application circuitry" and/or "baseband circuitry" may be considered synonymous to, and may be referred to as, "processor circuitry."

The term "memory" and/or "memory circuitry" at least in some embodiments refers to one or more hardware devices for storing data, including RAM, MRAM, PRAM, DRAM, and/or SDRAM, core memory, ROM, magnetic disk storage mediums, optical storage mediums, flash memory devices or other machine readable mediums for storing data. The term "computer-readable medium" may include, but is not limited to, memory, portable or fixed storage devices, optical storage devices, and various other mediums capable of storing, containing or carrying instructions or data.

The term "interface circuitry" at least in some embodiments refers to, is part of, or includes circuitry that enables the exchange of information between two or more components or devices. The term "interface circuitry" at least in some embodiments refers to one or more hardware interfaces, for example, buses, I/O interfaces, peripheral component interfaces, network interface cards, and/or the like.

The term "element" at least in some embodiments refers to a unit that is indivisible at a given level of abstraction and has a clearly defined boundary, wherein an element may be any type of entity including, for example, one or more devices, systems, controllers, network elements, modules, etc., or combinations thereof. The term "device" at least in some embodiments refers to a physical entity embedded inside, or attached to, another physical entity in its vicinity, with capabilities to convey digital information from or to that physical entity. The term "entity" at least in some embodiments refers to a distinct component of an architecture or device, or information transferred as a payload. The term "controller" at least in some embodiments refers to an element or entity that has the capability to affect a physical entity, such as by changing its state or causing the physical entity to move.

The term "Edge computing" encompasses many implementations of distributed computing that move processing activities and resources (e.g., compute, storage, acceleration resources) towards the "Edge" of the network, in an effort to reduce latency and increase throughput for endpoint users (client devices, user equipment, etc.). Such Edge computing implementations typically involve the offering of such activities and resources in cloud-like services, functions, applications, and subsystems, from one or multiple locations accessible via wireless networks. Thus, the references to an "Edge" of a network, cluster, domain, system or computing arrangement used herein are groups or groupings of functional distributed compute elements and, therefore, generally unrelated to "Edges" (links or connections) as used in graph theory. Specific arrangements of Edge computing applications and services accessible via mobile wireless networks (e.g., cellular and WiFi data networks) may be referred to as "mobile Edge computing" or "multi-access edge computing", which may be referenced by the acronym "MEC". The usage of "MEC" herein may also refer to a standardized implementation promulgated by the European Telecommunications Standards Institute (ETSI), referred to as "ETSI MEC". Terminology that is used by the ETSI MEC specification is generally incorporated herein by reference, unless a conflicting definition or usage is provided herein.

The term "compute node" or "compute device" at least in some embodiments refers to an identifiable entity implementing an aspect of Edge computing operations, whether part of a larger system, distributed collection of systems, or a standalone apparatus. In some examples, a compute node may be referred to as a "Edge node", "Edge device", "Edge system", whether in operation as a client, server, or intermediate entity. Specific implementations of a compute node may be incorporated into a server, base station, gateway, road side unit, on premise unit, UE or end consuming device, or the like.

The term "computer system" at least in some embodiments refers to any type interconnected electronic devices, computer devices, or components thereof. Additionally, the terms "computer system" and/or "system" at least in some embodiments refer to various components of a computer that are communicatively coupled with one another. Furthermore, the term "computer system" and/or "system" at least in some embodiments refer to multiple computer devices and/or multiple computing systems that are communicatively coupled with one another and configured to share computing and/or networking resources.

The term "architecture" at least in some embodiments refers to a computer architecture or a network architecture. A "network architecture" is a physical and logical design or arrangement of software and/or hardware elements in a network including communication protocols, interfaces, and media transmission. A "computer architecture" is a physical and logical design or arrangement of software and/or hardware elements in a computing system or platform including technology standards for interacts therebetween.

The term "appliance," "computer appliance," or the like, at least in some embodiments refers to a computer device or computer system with program code (e.g., software or firmware) that is specifically designed to provide a specific computing resource. A "virtual appliance" is a virtual machine image to be implemented by a hypervisor-equipped device that virtualizes or emulates a computer appliance or otherwise is dedicated to provide a specific computing resource.

The term "user equipment" or "UE" at least in some embodiments refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, station, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface. The term "station" or "STA" at least in some embodiments refers to a logical entity that is a singly addressable instance of a medium access control (MAC) and physical layer (PHY) interface to the wireless medium (WM). The term "wireless medium" or WM" at least in some embodiments refers to the medium used to implement the transfer of protocol data units (PDUs) between peer physical layer (PHY) entities of a wireless local area network (LAN).

The term "network element" at least in some embodiments refers to physical or virtualized equipment and/or infrastructure used to provide wired or wireless communication network services. The term "network element" may be considered synonymous to and/or referred to as a networked computer, networking hardware, network equipment, network node, router, switch, hub, bridge, radio network controller, RAN device, RAN node, gateway, server, virtualized VNF, NFVI, and/or the like.

The term "access point" or "AP" at least in some embodiments refers to an entity that contains one station (STA) and provides access to the distribution services, via the wireless medium (WM) for associated STAs. An AP comprises a STA and a distribution system access function (DSAF).

The term "base station" at least in some embodiments refers to a network element in a radio access network (RAN), such as a fourth-generation (4G) or fifth-generation (5G) mobile communications network which is responsible for the transmission and reception of radio signals in one or more cells to or from a user equipment (UE). A base station can have an integrated antenna or may be connected to an antenna array by feeder cables. A base station uses specialized digital signal processing and network function hardware. In some examples, the base station may be split into multiple functional blocks operating in software for flexibility, cost, and performance. In some examples, a base station can include an evolved node-B (eNB) or a next generation node-B (gNB). In some examples, the base station may operate or include compute hardware to operate as a compute node. However, in many of the scenarios discussed herein, a RAN base station may be substituted with an access point (e.g., wireless network access point) or other network access hardware.

The term "Residential Gateway" or "RG" at least in some embodiments refers to a device providing, for example, voice, data, broadcast video, video on demand, to other devices in customer premises. The term "Wireline 5G Access Network" or "W-5GAN" at least in some embodiments refers to a wireline AN that connects to a 5GC via N2 and N3 reference points. The W-5GAN can be either a W-5GBAN or W-5GCAN. The term "Wireline 5G Cable Access Network" or "W-5GCAN" at least in some embodiments refers to an Access Network defined in/by CableLabs. The term "Wireline BBF Access Network" or "W-5GBAN" at least in some embodiments refers to an Access Network defined in/by the Broadband Forum (BBF). The term "Wireline Access Gateway Function" or "W-AGF" at least in some embodiments refers to a Network function in W-5GAN that provides connectivity to a 3GPP 5G Core network (5GC) to 5G-RG and/or FN-RG. The term "5G-RG" at least in some embodiments refers to an RG capable of connecting to a 5GC playing the role of a user equipment with regard to the 5GC; it supports secure element and exchanges N1 signaling with 5GC. The 5G-RG can be either a 5G-BRG or 5G-CRG The term "central office" (or CO) indicates an aggregation point for telecommunications infrastructure within an accessible or defined geographical area, often where telecommunication service providers have traditionally located switching equipment for one or multiple types of access networks. The CO can be physically designed to house telecommunications infrastructure equipment or compute, data storage, and network resources. The CO need not, however, be a designated location by a telecommunications service provider. The CO may host any number of compute devices for Edge applications and services, or even local implementations of cloud-like services.

The term "cloud computing" or "cloud" at least in some embodiments refers to a paradigm for enabling network access to a scalable and elastic pool of shareable computing resources with self-service provisioning and administration on-demand and without active management by users. Cloud computing provides cloud computing services (or cloud services), which are one or more capabilities offered via cloud computing that are invoked using a defined interface (e.g., an API or the like). The term "computing resource" or simply "resource" at least in some embodiments refers to any physical or virtual component, or usage of such components, of limited availability within a computer system or network. Examples of computing resources include usage/access to, for a period of time, servers, processor(s), storage equipment, memory devices, memory areas, networks, electrical power, input/output (peripheral) devices, mechanical devices, network connections (e.g., channels/links, ports, network sockets, etc.), operating systems, virtual machines (VMs), software/applications, computer files, and/or the like. A "hardware resource" may refer to compute, storage, and/or network resources provided by physical hardware element(s). A "virtualized resource" may refer to compute, storage, and/or network resources provided by virtualization infrastructure to an application, device, system, etc. The term "network resource" or "communication resource" may refer to resources that are accessible by computer devices/systems via a communications network. The term "system resources" may refer to any kind of shared entities to provide services, and may include computing and/or network resources. System resources may be considered as a set of coherent functions, network data objects or services, accessible through a server where such system resources reside on a single host or multiple hosts and are clearly identifiable.

The term "workload" at least in some embodiments refers to an amount of work performed by a computing system, device, entity, etc., during a period of time or at a particular instant of time. A workload may be represented as a benchmark, such as a response time, throughput (e.g., how much work is accomplished over a period of time), and/or the like. Additionally or alternatively, the workload may be represented as a memory workload (e.g., an amount of memory space needed for program execution to store temporary or permanent data and to perform intermediate computations), processor workload (e.g., a number of instructions being executed by a processor during a given period of time or at a particular time instant), an I/O workload (e.g., a number of inputs and outputs or system accesses during a given period of time or at a particular time instant), database workloads (e.g., a number of database queries during a period of time), a network-related workload (e.g., a number of network attachments, a number of mobility updates, a number of radio link failures, a number of handovers, an amount of data to be transferred over an air interface, etc.), and/or the like. Various algorithms may be used to determine a workload and/or workload characteristics, which may be based on any of the aforementioned workload types.

The term "cloud service provider" (or CSP) indicates an organization which operates typically large-scale "cloud" resources comprised of centralized, regional, and Edge data centers (e.g., as used in the context of the public cloud). In other examples, a CSP may also be referred to as a Cloud Service Operator (CSO). References to "cloud computing" generally refer to computing resources and services offered by a CSP or a CSO, at remote locations with at least some increased latency, distance, or constraints relative to Edge computing.

The term "data center" at least in some embodiments refers to a purpose-designed structure that is intended to house multiple high-performance compute and data storage nodes such that a large amount of compute, data storage and network resources are present at a single location. This often entails specialized rack and enclosure systems, suitable heating, cooling, ventilation, security, fire suppression, and power delivery systems. The term may also refer to a compute and data storage node in some contexts. A data center may vary in scale between a centralized or cloud data center (e.g., largest), regional data center, and Edge data center (e.g., smallest).

The term "access Edge layer" indicates the sub-layer of infrastructure Edge closest to the end user or device. For example, such layer may be fulfilled by an Edge data center deployed at a cellular network site. The access Edge layer functions as the front line of the infrastructure Edge and may connect to an aggregation Edge layer higher in the hierarchy.

The term "aggregation Edge layer" indicates the layer of infrastructure Edge one hop away from the access Edge layer. This layer can exist as either a medium-scale data center in a single location or may be formed from multiple interconnected micro data centers to form a hierarchical topology with the access Edge to allow for greater collaboration, workload failover, and scalability than access Edge alone.

The term "network function virtualization" (or NFV) indicates the migration of NFs from embedded services inside proprietary hardware appliances to software-based virtualized NFs (or VNFs) running on standardized CPUs (e.g., within standard x86® and ARM® servers, such as those including Intel® Xeon™ or AMD® Epyc™ or Opteron™ processors) using industry standard virtualization and cloud computing technologies. Additionally or alternatively, NFV processing and data storage will occur at the Edge data centers that are connected directly to the local cellular site, within the infrastructure Edge.

The term "virtualized NF" (or VNF) indicates a software-based NF operating on multi-function, multi-purpose compute resources (e.g., x86, ARM processing architecture) which are used by NFV in place of dedicated physical equipment. Additionally or alternatively, several VNFs will operate on an Edge data center at the infrastructure Edge.

The term "Edge compute node" at least in some embodiments refers to a real-world, logical, or virtualized implementation of a compute-capable element in the form of a device, gateway, bridge, system or subsystem, component, whether operating in a server, client, endpoint, or peer mode, and whether located at an "Edge" of an network or at a connected location further within the network. References to a "node" used herein are generally interchangeable with a "device", "component", and "sub-system"; however, references to an "Edge computing system" generally refer to a distributed architecture, organization, or collection of multiple nodes and devices, and which is organized to accomplish or offer some aspect of services or resources in an Edge computing setting.

The term "cluster" at least in some embodiments refers to a set or grouping of entities as part of an Edge computing system (or systems), in the form of physical entities (e.g., different computing systems, networks or network groups), logical entities (e.g., applications, functions, security constructs, containers), and the like. In some locations, a "cluster" is also referred to as a "group" or a "domain". The membership of cluster may be modified or affected based on conditions or functions, including from dynamic or property-based membership, from network or system management scenarios, or from various example techniques discussed below which may add, modify, or remove an entity in a cluster. Clusters may also include or be associated with multiple layers, levels, or properties, including variations in security features and results based on such layers, levels, or properties.

The term "radio technology" at least in some embodiments refers to technology for wireless transmission and/or reception of electromagnetic radiation for information transfer. The term "radio access technology" or "RAT" at least in some embodiments refers to the technology used for the underlying physical connection to a radio based communication network. The "RAT type" identifies the transmission technology used in an access network, for example, new radio (NR), narrowband IoT (NB-IOT), Untrusted Non-3GPP, Trusted Non-3GPP, Trusted IEEE 802.11, Non-3GPP access, Wireline, Wireline-Cable, Wireline Broadband Forum (wireline-BBF), etc.

The term "V2X" at least in some embodiments refers to vehicle to vehicle (V2V), vehicle to infrastructure (V2I), infrastructure to vehicle (I2V), vehicle to network (V2N), and/or network to vehicle (N2V) communications and associated radio access technologies.

The term "communication protocol" (either wired or wireless) at least in some embodiments refers to a set of standardized rules or instructions implemented by a communication device and/or system to communicate with other devices and/or systems, including instructions for packetizing/depacketizing data, modulating/demodulating signals, implementation of protocols stacks, and/or the like. Examples of wireless communications protocols include a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology including, for example, 3GPP Fifth Generation (5G) or New Radio (NR), Universal Mobile Telecommunications System (UMTS), Freedom of Multimedia Access (FOMA), Long Term Evolution (LTE), LTE-Advanced (LTE Advanced), LTE Extra, LTE-A Pro, cdmaOne (2G), Code Division Multiple Access 2000 (CDMA 2000), Cellular Digital Packet Data (CDPD), Mobitex, Circuit Switched Data (CSD), High-Speed CSD (HSCSD), Wideband Code Division Multiple Access (W-CDM), High Speed Packet Access (HSPA), HSPA Plus (HSPA+), Time Division-Code Division Multiple Access (TD-CDMA), Time Division-Synchronous Code Division Multiple Access (TD-SCDMA), LTE LAA, MuLTEfire, UMTS Terrestrial Radio Access (UTRA), Evolved UTRA (E-UTRA), Evolution-Data Optimized or Evolution-Data Only (EV-DO), Advanced Mobile Phone System (AMPS), Digital AMPS (D-AMPS), Total Access Communication System/Extended Total Access Communication System (TACS/ETACS), Push-to-talk (PTT), Mobile Telephone System (MTS), Improved Mobile Telephone System (IMTS), Advanced Mobile Telephone System (AMTS), Cellular Digital Packet Data (CDPD), DataTAC, Integrated Digital Enhanced Network (iDEN), Personal Digital Cellular (PDC), Personal Handy-phone System (PHS), Wideband Integrated Digital Enhanced Network (WiDEN), iBurst, Unlicensed Mobile Access (UMA), also referred to as also referred to as 3GPP Generic Access Network, or GAN standard), Bluetooth®, Bluetooth Low Energy (BLE), IEEE 802.15.4 based protocols (e.g., IPv6 over Low power Wireless Personal Area Networks (6LoWPAN), WirelessHART, MiWi, Thread, 802.11a, etc.) WiFi-direct, ANT/ANT+, Zig-Bee, Z-Wave, 3GPP device-to-device (D2D) or Proximity Services (ProSe), Universal Plug and Play (UPnP), Low-Power Wide-Area-Network (LPWAN), Long Range Wide Area Network (LoRA) or LoRaWAN™ developed by Semtech and the LoRa Alliance, Digital Enhanced Cordless Telecommunications (DECT), DECT Ultra Low Energy (DECT ULE), DECT-2020, Sigfox, Wireless Gigabit Alliance (WiGig) standard, Worldwide Interoperability for Microwave Access (WiMAX), mmWave standards in general (e.g., wireless systems operating at 10-300 GHz and above such as WiGig, IEEE 802.11ad, IEEE 802.11ay, etc.), V2X communication including C-V2X, WAVE, 802.11bd, Dedicated Short Range Communications (DSRC), Intelligent-Transport-Systems (ITS) including the European ITS-G5, ITS-G5B, ITS-G5C, etc. Ultra High Frequency (UHF) communication, Very High Frequency (VHF) communication. In addition to the standards listed above, any number of satellite uplink technologies may be used for purposes of the present disclosure including, for example, radios compliant with standards issued by the International Telecommunication Union (ITU), or the ETSI, among others. The examples provided herein are thus understood as being applicable to various other communication technologies, both existing and not yet formulated.

The term "channel" at least in some embodiments refers to any transmission medium, either tangible or intangible, which is used to communicate data or a data stream. The term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" at least in some embodiments refers to a connection between two devices through a RAT for the purpose of transmitting and receiving information.

The term "Quality of Service" or "QoS' at least in some embodiments refers to a description or measurement of the overall performance of a service (e.g., telephony and/or cellular service, network service, wireless communication/connectivity service, cloud computing service, etc.). In some cases, the QoS may be described or measured from the perspective of the users of that service, and as such, QoS may be the collective effect of service performance that determine the degree of satisfaction of a user of that service. In other cases, QoS at least in some embodiments refers to traffic prioritization and resource reservation control mechanisms rather than the achieved perception of service quality. In these cases, QoS is the ability to provide different priorities to different applications, users, or flows, or to guarantee a certain level of performance to a flow. In either case, QoS is characterized by the combined aspects of performance factors applicable to one or more services such as, for example, service operability performance, service accessibility performance; service retain ability performance; service reliability performance, service integrity performance, and other factors specific to each service. Several related aspects of the service may be considered when quantifying the QoS, including packet loss rates, bit rates, throughput, transmission delay, availability, reliability, jitter, signal strength and/or quality measurements, and/or other measurements such as those discussed herein.

The terms "beamforming" and "beam steering" at least in some embodiments refer to a spatial filtering mechanism used at a transmitter (Tx) to improve the received signal power, signal-to-noise ratio (SNR), or some other signaling metric at an intended receiver (Rx). The term "beamformer" at least in some embodiments refers to a STA that transmits a physical layer PDU (PPDU) using a beamforming steering matrix. The term "beamforming steering matrix" at least in some embodiments refers to a matrix determined using knowledge of the channel between a Tx and an intended Rx that maps from space-time streams to transmit antennas with the goal of improving the signal power, SNR, and/or some other signaling metric at the intended Rx.

The term "basic service set" or "BSS" at least in some embodiments refers to a set of STAs that have successfully synchronized using the JOIN service primitives and one STA that has used the START primitive. Alternatively, a set of STAs that have used the START primitive specifying matching mesh profiles where the match of the mesh profiles has been verified via the scanning procedure. Membership in a BSS does not imply that wireless communication with all other members of the BSS is possible.

The term "coordination function" at least in some embodiments refers to a logical function that determines when a STA is permitted to transmit PDUs via a WM. The term "distributed coordination function" or "DCF" at least in some embodiments refers to a class of coordination function(s) where the same coordination function logic is active in every STA in a basic service set (BSS) whenever the network is in operation. The term "distribution service" at least in some embodiments refers to a service that, by using association information, delivers medium access control (MAC) service tuples within a distribution system (DS). The term "distribution system" or "DS" at least in some embodiments refers to a system used to interconnect a set of basic service sets (BSSs) and integrated local area networks (LANs) to create an extended service set (ESS).

The term "clear channel assessment (CCA) function" at least in some embodiments refers to a logical function in the physical layer (PHY) that determines the current state of use of a WM.

The terms "instantiate," "instantiation," and the like at least in some embodiments refers to the creation of an instance. An "instance" also at least in some embodiments refers to a concrete occurrence of an object, which may occur, for example, during execution of program code. The term "information element" at least in some embodiments refers to a structural element containing one or more fields. The term "field" at least in some embodiments refers to individual contents of an information element, or a data element that contains content. The term "database object", "data structure", or the like may refer to any representation of information that is in the form of an object, attribute-value pair (AVP), key-value pair (KVP), tuple, etc., and may include variables, data structures, functions, methods, classes, database records, database fields, database entities, associations between data and/or database entities (also referred to as a "relation"), blocks and links between blocks in block chain implementations, and/or the like. The term "data element" or "DE" at least in some embodiments refers to a data type that contains one single data. The term "data frame" or "DF" at least in some embodiments refers to a data type that contains more than one data element in a pre-defined order.

The term "datagram" at least in some embodiments at least in some embodiments refers to a basic transfer unit associated with a packet-switched network; a datagram may be structured to have header and payload sections. The term "datagram" at least in some embodiments may be referred to as a "data unit" or the like.

The term "subframe" at least in some embodiments at least in some embodiments refers to a time interval during which a signal is signaled. In some implementations, a subframe is equal to 1 millisecond (ms). The term "time slot" at least in some embodiments at least in some embodiments refers to an integer multiple of consecutive subframes. The term "superframe" at least in some embodiments at least in some embodiments refers to a time interval comprising two time slots.

The term "Interoperability" at least in some embodiments refers to the ability of STAs utilizing one communication system or RAT to communicate with other STAs utilizing another communication system or RAT. The term "Coexistence" at least in some embodiments refers to sharing or allocating radiofrequency resources among STAs using either communication system or RAT.

The term "reliability" at least in some embodiments refers to the ability of a computer-related component (e.g., software, hardware, or network element/entity) to consistently perform a desired function and/or operate according to a specification. Reliability in the context of network communications (e.g., "network reliability") may refer to the ability of a network to carry out communication. Network reliability may also be (or be a measure of) the probability of delivering a specified amount of data from a source to a destination (or sink).

The term "user" in the context of reconfigurable radio equipment/systems, at least in some embodiments refers to an abstract representation of any entity issuing command requests (e.g., using the services) to the multiradio computer. Three types of users are distinguished based on the type of services used: administrator for multiradio management plane, mobility policy manager for control plane, and networking stack for user plane.

The term "use case" at least in some embodiments refers to a description of a system from a user's perspective. Use cases sometimes treat a system as a black box, and the interactions with the system, including system responses, are perceived as from outside the system. Use cases typically avoid technical jargon, preferring instead the language of the end user or domain expert.

The term "application" may refer to a complete and deployable package, environment to achieve a certain function in an operational environment. The term "AI/ML application" or the like may be an application that contains some AI/ML models and application-level descriptions. The term "machine learning" or "ML" at least in some embodiments refers to the use of computer systems implementing algorithms and/or statistical models to perform specific task(s) without using explicit instructions, but instead relying on patterns and inferences. ML algorithms build or estimate mathematical model(s) (referred to as "ML models" or the like) based on sample data (referred to as "training data," "model training information," or the like) in order to make predictions or decisions without being explicitly programmed to perform such tasks. Generally, an ML algorithm is a computer program that learns from experience with respect to some task and some performance measure, and an ML model may be any object or data structure created after an ML algorithm is trained with one or more training datasets. After training, an ML model may be used to make predictions on new datasets. Although the term "ML algorithm" at least in some embodiments refers to different concepts than the term "ML model," these terms as discussed herein may be used interchangeably for the purposes of the present disclosure.

The term "session" at least in some embodiments refers to a temporary and interactive information interchange between two or more communicating devices, two or more application instances, between a computer and user, or between any two or more entities or elements.

The term "Data Network" or "DN" at least in some embodiments refers to a network hosting data-centric services such as, for example, operator services, the internet, third-party services, or enterprise networks. Additionally or alternatively, a DN at least in some embodiments refers to service networks that belong to an operator or third party, which are offered as a service to a client or user equipment (UE). DNs are sometimes referred to as "Packet Data Networks" or "PDNs". The term "Local Area Data Network" or "LADN" at least in some embodiments refers to a DN that is accessible by the UE only in specific locations, that provides connectivity to a specific DNN, and whose availability is provided to the UE.

The term "PDU Connectivity Service" at least in some embodiments refers to a service that provides exchange of protocol data units (PDUs) between a UE and a DN. The term "PDU Session" at least in some embodiments refers to an association between a UE and a DN that provides a PDU connectivity service. A PDU Session type can be IPv4, IPv6, IPv4v6, Ethernet, Unstructured, or any other network/connection type, such as those discussed herein. The term "MA PDU Session" at least in some embodiments refers to a PDU Session that provides a PDU connectivity service, which can use one access network at a time or multiple access networks simultaneously.

The term "core" at least in some embodiments refers to a functional element that anchors a client network address (e.g., IP address) used for communication with applications via the network. The term "anchor connection" at least in some embodiments refers to the network path from a network element (e.g., an N-MADP) to a UP gateway (e.g., IP anchor) that has assigned a network address (e.g., IP address) to a client. The term "delivery connection" as used herein refers to a network path from a network element (e.g., an N-MADP) to a client.

The term "traffic shaping" at least in some embodiments refers to a bandwidth management technique that manages data transmission to comply with a desired traffic profile or class of service. Traffic shaping ensures sufficient network bandwidth for time-sensitive, critical applications using policy rules, data classification, queuing, QoS, and other techniques. The term "throttling" at least in some embodiments refers to the regulation of flows into or out of a network, or into or out of a specific device or element.

The term "network address" at least in some embodiments refers to an identifier for a node or host in a computer network, and may be a unique identifier across a network and/or may be unique to a locally administered portion of the network. Examples of network addresses include a Closed Access Group Identifier (CAG-ID), Bluetooth hardware device address (BD_ADDR), a cellular network address (e.g., Access Point Name (APN), AMF identifier (ID), AF-Service-Identifier, Edge Application Server (EAS) ID, Data Network Access Identifier (DNAI), Data Network Name (DNN), EPS Bearer Identity (EBI), Equipment Identity Register (EIR) and/or 5G-EIR, Extended Unique Identifier (EUI), Group ID for Network Selection (GIN), Generic Public Subscription Identifier (GPSI), Globally Unique AMF Identifier (GUAMI), Globally Unique Temporary Identifier (GUTI) and/or 5G-GUTI, International Mobile Equipment Identity (IMEI), IMEI Type Allocation Code (IMEA/TAC), International Mobile Subscriber Identity (IMSI), Local Area Data Network (LADN) DNN, Mobile Subscriber Identification Number (MSIN), Mobile Subscriber/Station ISDN Number (MSISDN), Network identifier (NID), Network Slice Instance (NSI) ID, Permanent Equipment Identifier (PEI), Public Land Mobile Network (PLMN) ID, QoS Flow ID (QFI) and/or 5G QoS Identifier (5QI), RAN ID, Routing Indicator, SMS Function (SMSF) ID, Stand-alone Non-Public Network (SNPN) ID, Subscription Concealed Identifier (SUCI), Subscription Permanent Identifier (SUPI), Temporary Mobile Subscriber Identity (TMSI) and variants thereof, UE Access Category and Identity, and/or other cellular network related identifiers), an email address, Enterprise Application Server (EAS) ID, an endpoint address, an Electronic Product Code (EPC) as defined by the EPCglobal Tag Data Standard, a Fully Qualified Domain Name (FQDN), an internet protocol (IP) address in an IP network (e.g., IP version 4 (Ipv4), IP version 6 (IPv6), etc.), an internet packet exchange (IPX) address, Local Area Network (LAN) ID, a media access control (MAC) address, personal area network (PAN) ID, a port number (e.g., Transmission Control Protocol (TCP) port number, User Datagram Protocol (UDP) port number), QUIC connection ID, RFID tag, service set identifier (SSID) and variants thereof, telephone numbers in a public switched telephone network (PTSN), universally unique identifier (UUID) (e.g., as specified in ISO/IEC 11578:1996), a Universal Resource Locator (URL) and/or Universal Resource Identifier (URI), Virtual LAN (VLAN) ID, an X.21 address, an X.25 address, Zigbee® ID, Zigbee® Device Network ID, and/or any other suitable network address and components thereof. The term "application identifier", "application ID", or "app ID" at least in some embodiments refers to an identifier that can be mapped to a specific application or application instance; in the context of 3GPP 5G/NR systems, an "application identifier" may refer to an identifier that can be mapped to a specific application traffic detection rule. An "endpoint address" may refer to an address used to determine the host/authority part of a target URI, where the target URI is used to access an NF service (e.g., to invoke service operations) of an NF service producer or for notifications to an NF service consumer. The term "CAG-ID" at least in some embodiments refers to an identifier of a Closed Access Group (CAG), and the term "closed access group" or "CAG" at least in some embodiments refers to a group of list of users permitted to connect and/or access a specific network, a specific access network, and/or attach to a specific cell or network access node. Closed access groups (CAGs) are sometimes referred to as Access Control Lists (ACLs), Closed Subscriber Groups (CSGs), Closed User Groups (CUGs), and the like. The term "port" as used herein (e.g., in the context of computer networks) at least in some embodiments refers to a communication endpoint, a virtual data connection between two or more entities, and/or a virtual point where network connections start and end; additionally or alternatively, a "port" is associated with a specific process or service.

The term "subnetwork" or "subnet" at least in some embodiments refers to a logical subdivision of a network, such as an IP network. The practice of dividing a network into two or more networks is called "subnetting." The term "netmask" or "subnet mask" at least in some embodiments refers to a bitmask applied by bitwise AND operations to a network address (e.g., an IP address in an IP network) to yield a routing prefix, and/or is a 32-bit "mask" used to divide an IP address into subnets and specify the network's available hosts.

The term "cryptographic hash function", "hash function", or "hash") at least in some embodiments refers to a mathematical algorithm that maps data of arbitrary size (sometimes referred to as a "message") to a bit array of a fixed size (sometimes referred to as a "hash value", "hash", or "message digest"). A cryptographic hash function is usually a one-way function, which is a function that is practically infeasible to invert. The term "integrity" at least in some embodiments refers to a mechanism that assures that data has not been altered in an unapproved way. Examples of cryptographic mechanisms that can be used for integrity protection include digital signatures, message authentication codes (MAC), and secure hashes.

The term "flow" at least in some embodiments refers to a sequence of data and/or data units (e.g., datagrams, packets, or the like) from a source entity/element to a destination entity/element. Additionally or alternatively, the terms "flow" or "traffic flow" at least in some embodiments refer to an artificial and/or logical equivalent to a call, connection, or link. Additionally or alternatively, the terms "flow" or "traffic flow" at least in some embodiments refer to a sequence of packets sent from a particular source to a particular unicast, anycast, or multicast destination that the source desires to label as a flow; from an upper-layer viewpoint, a flow may include of all packets in a specific transport connection or a media stream, however, a flow is not necessarily 1:1 mapped to a transport connection. Additionally or alternatively, the terms "flow" or "traffic flow" at least in some embodiments refer to a set of data and/or data units (e.g., datagrams, packets, or the like) passing an observation point in a network during a certain time interval. Additionally or alternatively, the term "flow" at least in some embodiments refers to a user plane data link that is attached to an association. Examples are circuit switched phone call, voice over IP call, reception of an SMS, sending of a contact card, PDP context for internet access, demultiplexing a TV channel from a channel multiplex, calculation of position coordinates from geopositioning satellite signals, etc. For purposes of the present disclosure, the terms "traffic flow", "data flow", "dataflow", "packet flow", "network flow", and/or "flow" may be used interchangeably even though these terms may refer to different concepts.

The term "stream" at least in some embodiments refers to a sequence of data elements made available over time. At least in some embodiments, functions that operate on a stream, which may produce another stream, are referred to as "filters," and can be connected in pipelines, analogously to function composition. Filters may operate on one item of a stream at a time, or may base an item of output on multiple items of input, such as a moving average.

The term "distributed computations" at least in some embodiments refers to a model in which components located on networked computers communicate and coordinate their actions by passing messages interacting with each other in order to achieve a common goal.

The term "microservice" at least in some embodiments refers to one or more processes that communicate over a network to fulfil a goal using technology-agnostic protocols (e.g., HTTP or the like). Additionally or alternatively, the term "microservice" at least in some embodiments refers to services that are relatively small in size, messaging-enabled, bounded by contexts, autonomously developed, independently deployable, decentralized, and/or built and released with automated processes. Additionally or alternatively, the term "microservice" at least in some embodiments refers to a self-contained piece of functionality with clear interfaces, and may implement a layered architecture through its own internal components. The term "microservice architecture" at least in some embodiments refers to a variant of the service-oriented architecture (SOA) structural style wherein applications are arranged as a collection of loosely-coupled services (e.g., fine-grained services) and may use lightweight protocols.

The term "time to live" (or "TTL") or "hop limit" at least in some embodiments refers to a mechanism which limits the lifespan or lifetime of data in a computer or network. TTL may be implemented as a counter or timestamp attached to or embedded in the data. Once the prescribed event count or timespan has elapsed, data is discarded or revalidated.

The term "queue" at least in some embodiments refers to a collection of entities (e.g., data, objects, events, etc.) are stored and held to be processed later. that are maintained in a sequence and can be modified by the addition of entities at one end of the sequence and the removal of entities from the other end of the sequence; the end of the sequence at which elements are added may be referred to as the "back", "tail", or "rear" of the queue, and the end at which elements are removed may be referred to as the "head" or "front" of the queue. Additionally, a queue may perform the function of a buffer, and the terms "queue" and "buffer" may be used interchangeably throughout the present disclosure. The term "enqueue" at least in some embodiments refers to one or more operations of adding an element to the rear of a queue. The term "dequeue" at least in some embodiments refers to one or more operations of removing an element from the front of a queue.

The term "queuing delay" at least in some embodiments refers to an amount of time a job waits in a queue until that job can be executed. Additionally or alternatively, the term "queuing delay" at least in some embodiments refers to an amount of time a packet waits in a queue until it can be processed and/or transmitted. The term "packet delay" at least in some embodiments refers to the time it takes to transfer any packet from one point to another. Additionally or alternatively, the term "packet delay" or "per packet delay" at least in some embodiments refers to the difference between a packet reception time and packet transmission time. Additionally or alternatively, the "packet delay" or "per packet delay" can be measured by subtracting the packet sending time from the packet receiving time where the transmitter and receiver are at least somewhat synchronized. The term "processing delay" at least in some embodiments refers to an amount of time taken to process a packet in a network node. The term "transmission delay" at least in some embodiments refers to an amount of time needed (or necessary) to push a packet (or all bits of a packet) into a transmission medium. The term "propagation delay" at least in some embodiments refers to amount of time it takes a signal's header to travel from a sender to a receiver. The term "network delay" at least in some embodiments refers to the delay of an a data unit within a network (e.g., an IP packet within an IP network).

The term "delay bound" at least in some embodiments refers to a predetermined or configured amount of acceptable delay. The term "per-packet delay bound" at least in some embodiments refers to a predetermined or configured amount of acceptable packet delay where packets that are not processed and/or transmitted within the delay bound are considered to be delivery failures and are discarded or dropped.

The term "Packet Drop Rate" at least in some embodiments refers to a share of packets that were not sent to the target due to high traffic load or traffic management and should be seen as a part of the packet loss rate. The term "Packet Loss Rate" at least in some embodiments refers to a share of packets that could not be received by the target, including packets dropped, packets lost in transmission and packets received in wrong format. The term "latency" at least in some embodiments refers to the amount of time it takes to transfer a first/initial data unit in a data burst from one point to another.

Although many of the previous examples are provided with use of specific cellular/mobile network terminology, including with the use of 4G/5G 3GPP network components (or expected terahertz-based 6G/6G+ technologies), it will be understood these examples may be applied to many other deployments of wide area and local wireless networks, as well as the integration of wired networks (including optical networks and associated fibers, transceivers, etc.).

Although these implementations have been described with reference to specific examples, it will be evident that various modifications and changes may be made to these aspects without departing from the broader scope of the present disclosure. Many of the arrangements and processes described herein can be used in combination or in parallel implementations to provide greater bandwidth/throughput and to support Edge services selections that can be made available to the Edge systems being serviced. Accordingly, the specification and drawings are to be regarded in an illustrative rather than a restrictive sense. The accompanying drawings that form a part hereof show, by way of illustration, and not of limitation, specific aspects in which the subject matter may be practiced. The aspects illustrated are described in sufficient detail to enable those skilled in the art to practice the teachings disclosed herein. Other aspects may be utilized and derived therefrom, such that structural and logical substitutions and changes may be made without departing from the scope of this disclosure. This Detailed Description, therefore, is not to be taken in a limiting sense, and the scope of various aspects is defined only by the appended claims, along with the full range of equivalents to which such claims are entitled.

Such aspects of the inventive subject matter may be referred to herein, individually and/or collectively, merely for convenience and without intending to voluntarily limit the scope of this application to any single aspect or inventive concept if more than one is in fact disclosed. Thus, although specific aspects have been illustrated and described herein, it should be appreciated that any arrangement calculated to achieve the same purpose may be substituted for the specific aspects shown. This disclosure is intended to cover any and all adaptations or variations of various aspects. Combinations of the above aspects and other aspects not specifically described herein will be apparent to those of skill in the art upon reviewing the above description.

The invention claimed is:

1. An apparatus employed as a first multi-access (MX) compute node for managing traffic for MX communication in an MX communication environment, the apparatus comprising:
   processor circuitry arranged to operate an application to produce data to be conveyed to a second MX compute node; and
   communication circuitry coupled with the processor circuitry, the communication circuitry arranged to:
   obtain the data from the application;
   determine, based on one or more Per Packet Prioritization (PPP) rules defined in a PPP configuration, a PPP value that is an unsigned integer between 0 and 255;
   generate a data unit that includes:
   an internet protocol (IP) header;
   an IP payload; and
   a generic multi-access (GMA) portion with a PPP field that includes an indication of the PPP value; and
   transmit the generated data unit to the second MX compute node.

2. The apparatus of claim 1, wherein the one or more PPP rules includes a PPP rule based on a data unit size, and to determine the PPP value, the communication circuitry arranged to:
   determine a size of the data unit; and
   determine, from the PPP configuration, the PPP value that corresponds to a data unit size range that includes the determined size of the data unit.

3. The apparatus of claim 1, wherein the one or more PPP rules includes a PPP rule based on a data unit size code, and to determine the PPP value, the communication circuitry arranged to:
   determine the PPP value using a coding scheme defined in the PPP configuration.

4. The apparatus of claim 3, wherein the coding scheme is a modulo operation, and to determine the PPP value, the communication circuitry arranged to:
   determine a size of the data unit; and
   determine the PPP value as a modulus of S modulo K, where S is the size of the data unit and K is a number of priority levels defined in the PPP configuration.

5. The apparatus of claim 1, wherein the one or more PPP rules includes a PPP rule based on a Generic Payload Type (GPT), and to determine the PPP value, the communication circuitry arranged to:
   determine a set of GPT parameters; and
   determine, from the PPP configuration, the PPP value that corresponds to the determined set of GPT parameters, wherein the set of GPT parameters includes a GPT offset, a GPT length, and a GPT value.

6. The apparatus of claim 1, wherein the one or more PPP rules includes a PPP rule based on a flow rate, and to determine the PPP value, the communication circuitry to:
   determine a flow rate for the data unit; and
   determine, from the PPP configuration, the PPP value that corresponds to a flow rate range that includes the determined flow rate.

7. The apparatus of claim 1, wherein the PPP configuration further includes one or more flow classification parameters to be used to identify a flow for which the one or more PPP rules are applicable, and a number of priority levels.

8. The apparatus of claim 1, wherein the communication circuitry is further arranged to:
   send a first control message to the second MX compute node, the first control message indicating support of a PPP capability by the first MX compute node;
   identify a received second control message from the second MX compute node; and
   generate the data unit to include the PPP value based on an identification that the second control message indicates support of the PPP capability by the second MX compute node.

9. The apparatus of claim 8, wherein the MX communication environment is a Multi-Access Management Services (MAMS) communication environment comprising a MAMS framework.

10. The apparatus of claim 9, wherein the first MX compute node is a client device, the second MX compute node is a server, the first control message is an MX capability request message (mx_capability_req), and the second control message is an MX capability response message (mx_capability_rsp), and the communication circuitry is further arranged to:
    receive an MX PPP Configuration request message (mx_ppp_config_req) when the mx_capability_rsp indicates support of the PPP capability, the mx_ppp_config_req including the PPP configuration.

11. The apparatus of claim 9, wherein the first MX compute node is a server, the second MX compute node is a client device, the first control message is an MX capability response message (mx_capability_rsp), and the second control message is an MX capability request message (mx_capability_req), and the communication circuitry is further arranged to:

receive an MX PPP Configuration response message (mx_ppp_config_rsp) when the mx_capability_req indicates support of the PPP capability, the mx_ppp_config_rsp including the PPP configuration.

12. One or more non-transitory computer-readable media (NTCRM) comprising instructions that, when executed by one or more processors of an electronic device, are to cause a first multi-access (MX) compute node in an MX communication environment to:
identify data that is to be conveyed to a second MX compute node;
determine, based on one or more Per Packet Prioritization (PPP) rules defined in a PPP configuration, a PPP value that is an unsigned integer between 0 and 255;
generate a data unit that includes:
an internet protocol (IP) header;
an IP payload; and
a generic multi-access (GMA) portion with a PPP field that includes an indication of the PPP value; and
transmit the generated data unit to the second MX compute node.

13. The one or more NTCRM of claim 12, wherein the instructions are further to cause the first MX compute node to:
send a first control message to the second MX compute node, the first control message indicating support of a PPP capability by the first MX compute node;
identify a second control message received from the second MX compute node; and
generate the data unit to include the PPP value based on an identification that the second control message indicates support of the PPP capability by the second MX compute node.

14. The one or more NTCRM of claim 13, wherein the MX communication environment is a Multi-Access Management Services (MAMS) communication environment comprising a MAMS framework.

15. The one or more NTCRM of claim 14, wherein the first MX compute node is a client device, the second MX compute node is a server, the first control message is an MX capability request message (mx_capability_req), and the second control message is an MX capability response message (mx_capability_rsp), and the instructions are further to cause the first MX compute node to:
identify a received MX PPP Configuration request message (mx_ppp_config_req) when the mx_capability_rsp indicates support of the PPP capability, the mx_ppp_config_req including the PPP configuration.

16. The one or more NTCRM of claim 14, wherein the first MX compute node is a server, the second MX compute node is a client device, the first control message is an MX capability response message (mx_capability_rsp), and the second control message is an MX capability request message (mx_capability_req), and the instructions are further to cause the first MX compute node to:
identify a received MX PPP Configuration response message (mx_ppp_config_rsp) when the mx_capability_req indicates support of the PPP capability, the mx_ppp_config_rsp including the PPP configuration.

17. A multi-access (MX) compute node comprising:
memory store data that is to be conveyed to a second MX compute node in a Multi-Access Management Services (MAMS) communication environment; and
one or more processors configured to:
determine, based on one or more Per Packet Prioritization (PPP) rules defined in a PPP configuration, a PPP value that is an unsigned integer between 0 and 255;
generate a data unit that includes:
an internet protocol (IP) header;
an IP payload; and
a generic multi-access (GMA) portion with a PPP field that includes an indication of the PPP value; and
facilitate transmission, by the MX compute node to the second MX compute node, of the generated data unit to the second MX compute node.

18. The MX compute node of claim 17, wherein the one or more processors are further configured to:
facilitate transmission of a first control message to the second MX compute node, the first control message indicating support of a PPP capability by the MX compute node;
identify a second control message received from the second MX compute node; and
determine that the data unit is to include the PPP value based on an identification that the second control message indicates support of the PPP capability by the second MX compute node.

19. The MX compute node of claim 18, wherein
the MX compute node is a client device, the second MX compute node is a server, the first control message is an MX capability request message (mx_capability_req), and the second control message is an MX capability response message (mx_capability_rsp), and the one or more processors are further configured to:
identify a received MX PPP Configuration request message (mx_ppp_config_req) when the mx_capability_rsp indicates support of the PPP capability, the mx_ppp_config_req including the PPP configuration.

20. The MX compute node of claim 18, wherein the MX compute node is a server, the second MX compute node is a client device, the first control message is an MX capability response message (mx_capability_rsp), and the second control message is an MX capability request message (mx_capability_req), and the one or more processors are further configured to:
identify a received MX PPP Configuration response message (mx_ppp_config_rsp) when the mx_capability_req indicates support of the PPP capability, the mx_ppp_config_rsp including the PPP configuration.

* * * * *

UNITED STATES PATENT AND TRADEMARK OFFICE
CERTIFICATE OF CORRECTION

PATENT NO. : 12,184,554 B2
APPLICATION NO. : 17/469331
DATED : December 31, 2024
INVENTOR(S) : Jing Zhu et al.

Page 1 of 1

It is certified that error appears in the above-identified patent and that said Letters Patent is hereby corrected as shown below:

In the Claims

Column 131
Line 61, Claim 1 "rules includes a PPP rule…" should read --rules include a PPP rule…--

Column 132
Line 2, Claim 3 "rules includes a PPP rule…" should read --rules include a PPP rule…--
Line 15, Claim 5 "rules includes a PPP rule…" should read --rules include a PPP rule…--
Line 25, Claim 6 "…rules includes a PPP rule…" should read --…rules include a PPP rule…--

Signed and Sealed this
Thirteenth Day of May, 2025

Coke Morgan Stewart
*Acting Director of the United States Patent and Trademark Office*